United States Patent
Marcil et al.

(10) Patent No.: US 12,540,186 B2
(45) Date of Patent: Feb. 3, 2026

(54) ANTI-EGFRVIII ANTIBODIES AND ANTIGEN-BINDING FRAGMENTS THEREOF

(71) Applicant: NATIONAL RESEARCH COUNCIL OF CANADA, Ottawa (CA)

(72) Inventors: Anne Marcil, Pierrefonds (CA); Maria Jaramillo, Beaconsfield (CA); Traian Sulea, Kirkland (CA); Maria Moreno, Ottawa (CA); Cunle Wu, Montreal (CA)

(73) Assignee: National Research Council of Canada, Ottawa (CA)

( * ) Notice: Subject to any disclaimer, the term of this patent is extended or adjusted under 35 U.S.C. 154(b) by 1165 days.

(21) Appl. No.: 17/441,708

(22) PCT Filed: Mar. 23, 2020

(86) PCT No.: PCT/CA2020/050376
§ 371 (c)(1),
(2) Date: Sep. 22, 2021

(87) PCT Pub. No.: WO2020/191485
PCT Pub. Date: Oct. 1, 2020

(65) Prior Publication Data
US 2022/0193132 A1    Jun. 23, 2022

Related U.S. Application Data

(60) Provisional application No. 62/824,386, filed on Mar. 27, 2019.

(51) Int. Cl.
| | |
|---|---|
| A61K 39/395 | (2006.01) |
| A61K 40/11 | (2025.01) |
| A61K 40/31 | (2025.01) |
| A61K 40/42 | (2025.01) |
| A61K 47/68 | (2017.01) |
| A61P 35/00 | (2006.01) |
| C07K 16/28 | (2006.01) |
| C07K 16/30 | (2006.01) |
| C12N 5/0783 | (2010.01) |
| A61K 39/00 | (2006.01) |

(52) U.S. Cl.
CPC ...... *C07K 16/2863* (2013.01); *A61K 39/3955* (2013.01); *A61K 39/39558* (2013.01); *A61K 40/11* (2025.01); *A61K 40/31* (2025.01); *A61K 40/4204* (2025.01); *A61K 47/68031* (2023.08); *A61K 47/68033* (2023.08); *A61K 47/6849* (2017.08); *A61K 47/6851* (2017.08); *A61P 35/00* (2018.01); *C07K 16/2809* (2013.01); *C07K 16/30* (2013.01); *C12N 5/0636* (2013.01); *C12N 5/0646* (2013.01); *A61K 2039/505* (2013.01); *A61K 2239/31* (2023.05); *A61K 2239/38* (2023.05); *A61K 2239/47* (2023.05)

(58) Field of Classification Search
CPC .......... A61K 2039/505; A61K 39/3955; A61K 39/39558; A61K 47/6849; A61K 47/6851; A61K 47/6803; A61K 40/4204; C07K 16/2863; C07K 16/30
See application file for complete search history.

(56) References Cited

U.S. PATENT DOCUMENTS

| | | | |
|---|---|---|---|
| 4,943,533 A | 7/1990 | Mendelsohn et al. | |
| 7,736,644 B2 | 6/2010 | Weber et al. | |
| 9,249,217 B2 | 2/2016 | Bigner et al. | |
| 9,562,102 B2 | 2/2017 | Old et al. | |

FOREIGN PATENT DOCUMENTS

| | | |
|---|---|---|
| CN | 101484186 A | 7/2009 |
| CN | 104212800 A | 12/2014 |
| WO | 2008014386 A2 | 1/2008 |
| WO | 2009012488 | 1/2009 |
| WO | 2013075048 | 5/2013 |
| WO | 2015138460 | 3/2015 |
| WO | 2017021370 | 2/2017 |

OTHER PUBLICATIONS

Bhattacharya et al. Impact of genetic variation on three dimensional structure and function of proteins. PLoS One 12(3): e0171355, 2017.*
Bork, P. Powers and pitfalls in sequence analysis: the 70% hurdle. Genome Res 10: 398-400, 2000.*
Bork, P. Go hunting in sequence databases but watch out for the traps. Trends in Genetics 12(10): 425-427, 1996.*
Brenner. S.E. Errors in genome annotation. Trends in Genetics 15:132-133, 1999.*
Brummell et al. Probing the combing site of an anti-carbohydrate antibody by saturation-mutagenesis: role of the heavy-chain CDR3 residues. Biochem 32:1180-1187, 1993.*
Burks et al. In vitro scanning saturation mutagenesis of an antibody binding pocket. Proc Natl Acad Sci USA 94: 412-417, 1997.*
Colman, P.M. Effects of amino acid sequence changes on antibody-antigen interactions. Res Immunol 145: 33-36, 1994.*
Doerks et al. Protein annotation: detective work for function prediction. Trends in Genetics 14:248-250, 1998.*

(Continued)

*Primary Examiner* — Bridget E Bunner
(74) *Attorney, Agent, or Firm* — Gail C. Silver

(57) ABSTRACT

Antigen-binding agents such as antibodies or antigen-binding fragments thereof, chimeric antigen receptors (CARs), bispecific T-cell engagers (BiTEs) and the like that specifically bind to epidermal growth factor receptor variant III (EGFRvIII) are provided. The EGFRvIII-specific antibodies or antigen-binding fragments, CARs and BiTEs thereof may be used for the treatment of cancer. Antibody drug conjugates targeting EGFRvIII-expressing cells are particularly contemplated.

20 Claims, 24 Drawing Sheets

Specification includes a Sequence Listing.

(56) References Cited

OTHER PUBLICATIONS

Fenton et al. Rheostat positions: a new classification of protein positions relevant to pharmacogenomics. Medicinal Chem Res 29: 1133-1146, 2020.*
Ge et al. Evidence of high incidence of EGFRvIII expression and coexpression with EGFR in human invasive breast cancer by laser capture microdissection and immunohistochemical analysis. Int J Cancer 98: 357-361, 2002.*
Gedeon et al. An EGFRvIII-targeted bispecific T-cell engager overcomes limitations of the standard of care for glioblastoma. Expert Rev Clin Pharmacol 6(4): 375-386, 2013.*
Guo et al. Protein tolerance to random amino acid change. Proc Natl Acad Sci USA 101(25): 9205-9210, 2004.*
Kobayashi et al. Tryptophan H33 plays an important role in pyrimidine (6-4) pyrimidone photoproduct binding by a high affinity antibody. Protein Engineer 12(10): 879-884, 1999.*
Moscatello et al. Frequent Expression of a Mutant Epidermal Growth Factor Receptor in Multiple Human Tumors. Cancer Res 55: 5536-5539, 1995.*
Okamoto et al. Expression of constitutively activated EGFRvIII in non-small cell lung cancer. Cancer Sci 94: 50-56, 2003.*
Olapade-Olaopa et al. Evidence for the differential expression of a variant EGF receptor protein in human prostate cancer. Brit J Cancer 82(1): 186-194, 2000.*
O'Rourke et al. A single dose of peripherally infused EGFRvIII-directed CAR T cells mediates antigen loss and induces adaptive resistance in patients with recurrent glioblastoma. Sci Translat Med 9: eaaa0984, 2017 (15 total pages).*
Paul, William E., Fundamental Immunology, 3rd Edition, Raven Press, New York, Chapt. 8, pp. 292-295 (1993).*
Ren et al. Anti-EGFRvIII Chimeric Antigen Receptor-Modified T Cells for Adoptive Cell Therapy of Glioblastoma. Curr Pharmaceut Design 23: 2113-2116, 2017.*
Sela-Culang et al. The structural basis of antibody-antigen recognition. Front Immunol 4: 302, 2013 (13 total pages).*
Skolnick et al. From genes to protein structure and function: novel applications of computational approaches in the genomic era. Trends Biotechnol 18(I):34-39 2000.*
Smith et al. The challenges of genome sequence annotation or "the devil is in the details". Nature Biotechnol 15: 1222-1223, 1997.*
Sok et al. Mutant Epidermal Growth Factor Receptor (EGFRvIII) Contributes to Head and Neck Cancer Growth and Resistance to EGFR Targeting. Clin Cancer Res 12(17): 5064-5073, 2006.*
Tokuriki et al. Stability effects of mutations and protein evolvability. Curr Opin Structural Biol 19: 596-604, 2009.*
Vasudevan et al. A single amino acid change in the binding pocket alters specificity of an anti-integrin antibody AP7.4 as revealed by its crystal structure. Blood Cells Mol Diseases 32: 176-181, 2004.*
Wu et al. Humanization of a murine monoclonal antibody by simultaneous optimization of framework and CDR residues. J Mol Biol. 294: 151-162, 1999.*
Yang et al. Targeting EGFRvIII for glioblastoma multiforme. Cancer Lett 403: 224-230, 2017.*
Zhang et al. Comprehensive optimization of a single-chain variable domain antibody fragment as a targeting ligand for a cytotoxic nanoparticle. mAbs 7(1): 42-52, 2015.*
Ellwanger, K. et al., "Highly Specific and Effective Targeting of EGFRvIII-Positive Tumors with TandAb Antibodies", Front. Oncol: May 19, 2017;7:100 (doi: 10.3389/fonc.2017.00100; PMID: 28596941; PMCID: PMC5442391).
Gan, H.K., et al., "Targerting of a Conformationally Exposed, Tumor-Specific Epitope of EGFR as a Strategy for Cancer Therapy", Cancer Res, 72(12), pp. 2924-2930 (2012).
Kussie, P.H. et al. "A Single Engineered Amino Acid Substitution Changes Antibody Fine Specificity." journal of Immunology, 152, pp. 146-152 (1994).
Panka, J. et al. "Variable region framework differences result in decreased or increased affinity of varlant anti-digoxin antibodies". Proc Natl Acad Sci U.S A. 85(9):3080-3084 (1988).

Rudikoff, S, et al.: "Single amino acid substitution altering antigen-binding specificity". Proc. Nat. Acad. Sci. USA vol. 79, pp. 1979-1983 (1982).
Abhinandan and Martin, Analysis and Improvements to Kabat and Structurally Correct Numbering of Antibody Variable Domains, Mol Immunol., 45(14):3832-9 (2008).
Chothia C, Lesk AM. Canonical structures for the hypervariable regions of immunoglobulins. J Mol Biol.; 196(4):901-17 (1987).
Cleary, J.M. et al., A phase 1 study of ABT-806 in subjects with advanced solid tumors, Invest New Drugs, 33:671-678 (2015).
Feldhaus MJ et al., "Flow-Cytometric Isolation of Human Antibodies from a Nonimmune *Saccharomyces cerevisiae* Surface Display Librairy", Nat Biotechnol. 21(2):163-70 (2003).
Gan H.K., Anna N. Cvrljevic, Terrance G. Johns. The epidermal growth factor receptor variant III (EGFRvIII): where wild things are altered. FEBS Journal 280;5350-5370 (2013).
Hamblett K.J, et al., "AMG 595, an Anti-EGFRvIII Antibody-Drug Conjugate, Induces Potent Antitumor Acrivity against EGFRvIII-Expresssing Glioblastoma", Molecular Cancer Therapeutics, vol. 14(7), pp. 1614-1624 (2015).
Johnson G, Wu TT. The Kabat database and a bioinformatics example. Methods Mol Biol., 248:11-25 (2004).
Jones PT, Dear PH, Foote J, Neuberger MS, Winter G., "Replacing the Complementarity-Determining Regions in a Human Antibody with those from a Mouse" Nature 321, 522-525 (1986).
Kabat EA, Wu TT. Identical V region amino acid sequences and segments of sequences in antibodies of different specificities. Relative contributions of VH and VL genes, minigenes, and complementarity-determining regions to binding of antibody-combining sites. J Immunol., 147:1709-19 (1991).
Kuan, C-T. et al., «EGFR mutant receptor vill as a molecular target in cancer therapy. Endocrine-Related Cancer, 8, No. 2, pp. 83-96 (2001).
Mendelsohn J, Prewett M, Rockwell P, Goldstein Ni. CCR 20th anniversary commentary: a chimeric antibody, C225, inhibits EGFR activation and tumor growth. Clin Cancer Res. 21(2):227-9 (2015).
Panousis, C. et al., Engineering and characterisation of chimeric monoclonal antibody 806 (ch806) for targeted Immunotherapy of tumours expressing de2-7 EGFR or amplified EGFR, British Journal of Cancer, 92:1069-1077 (2005).
Queen C, Schneider WP, Selick HE, Payne PW, Landolfi NF, Duncan JF, Avdalovic NM, Levitt M, Junghans RP, Waldmann TA. "A Humanized Antibody that Binds to the Interleukin 2 Receptor" Proc Natl Acad Sci USA 86, 10029-10033 (1989).
Reilly, E.B. et al., « Characterization of ABT-806, a Humanized Tumor-Specific Anti-EGFR Monoclonal Antibody, Molecular Cancer Therapeutics, vol. 14, No. 5, pp. 1141-1145 (2015).
Sato J.D., et al., "Biological Effects in Vitro of Monoclonal Antibodies to human Epidermal Growth Factor Receptors" Mol. Biol. Med. 1: 511-529, (1983).
Tatiana A. Tatusova, Thomas L. Madden (1999), "Blast 2 sequences—a new tool for comparing protein and nucleotide sequences", FEMS Microbiol Lett. 174:247-250 (1999).
Tempest PR, Bremmer P, Lambert M, Taylor G, Furze JM, Carr FJ, Harris WJ., R. "Reshaping a Human Monoclonal Antibody to Inhibit Human Respiratory Syncytial Virus Infection in vivo" Biotechnology 9, 266-271 (1991).
Tsurushita N, Hinton, RP, Kumar S., Design of humanized antibodies: From anti-Tac to Zenapax. Methods 36, 69-83 (2005).
Ward et al., "Binding Activities of a Repertoire of Single Immunoglobulin Variable Domains Secreted from *Escherichia coli*" Nature 341:544-546 (1989).
Yano S, Kondo K, Yamaguchi M, Richmond G, Hutchison M, Wakeling A, Averbuch S, Wadsworth P. "Distribution and function of EGFR in human tissue and the effect of EGFR tyrosine kinase inhibition" Anticancer Res. 23(5A):3639-50 (2003).
Riechmann L, Clark M, Waldmann H, Winter G. "Reshaping human Antibodies for Therapy" Nature 332, 323-327 (1988).
Brown, et al., "Tolerance to Single, but Not Multiple, Amino Acid Replacements in Antibody Vh CDR2," The American Association of Immunologists, vol. 96, 3285-3291, 1996.

* cited by examiner

Fig. 1A: 5G6
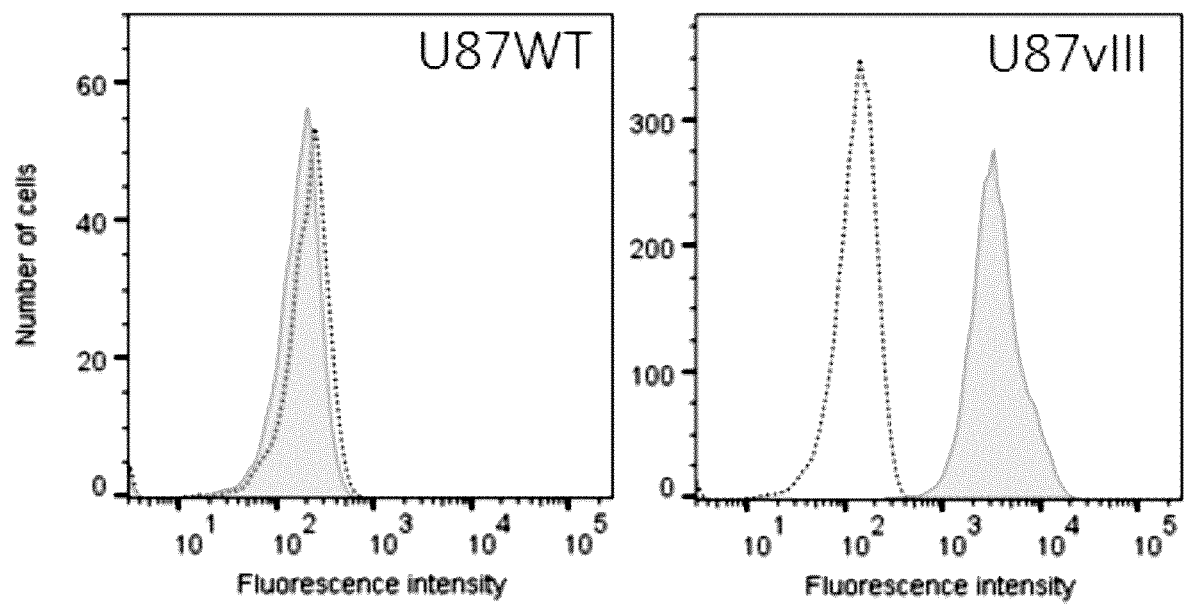
Fig. 1B: 1A8
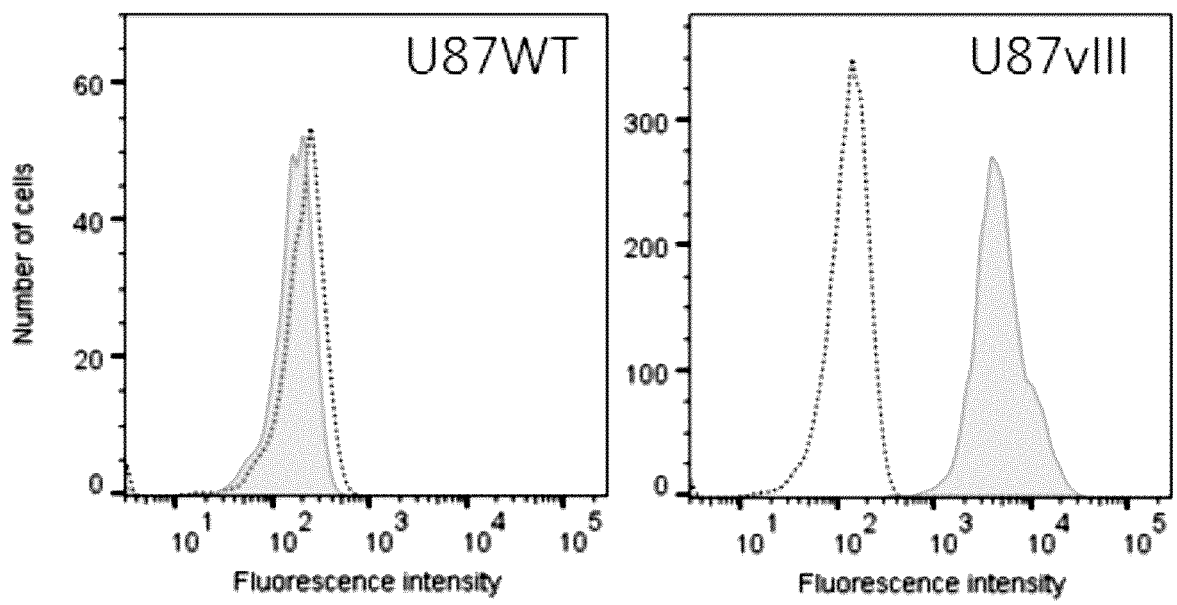

Fig. 1C: 4B3
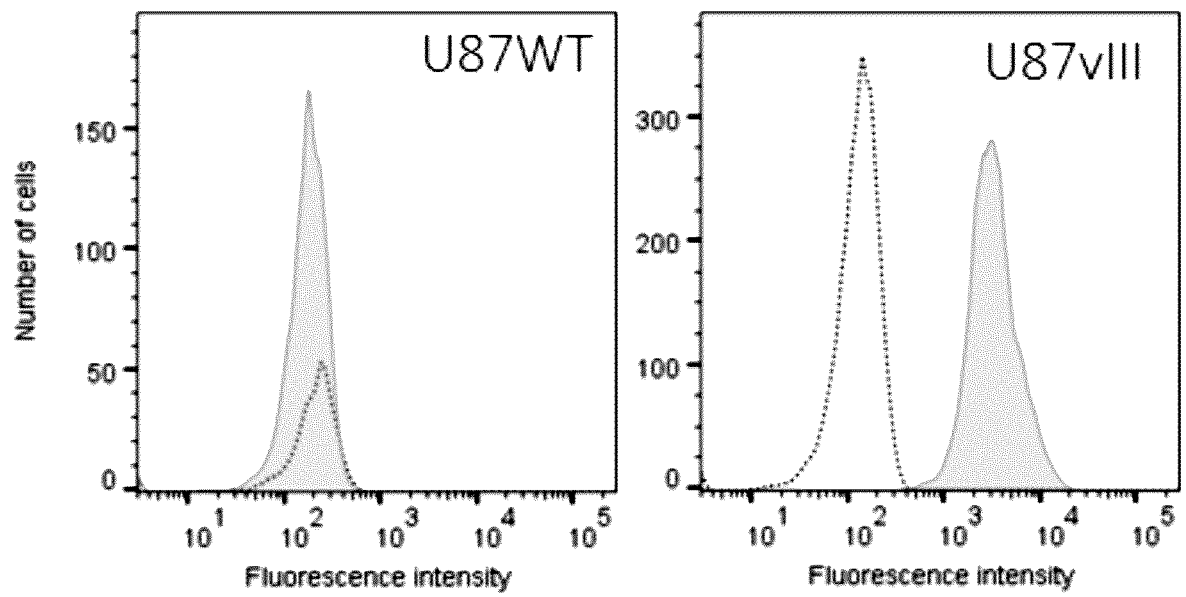
Fig. 1D: 4E11
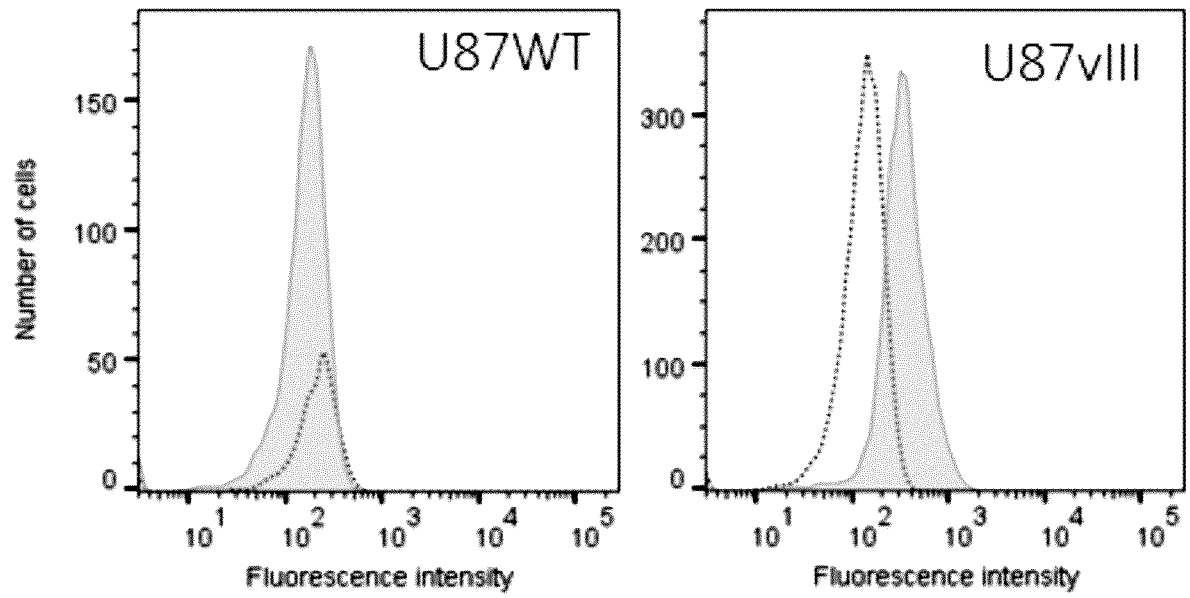

Fig. 1E: 5D8
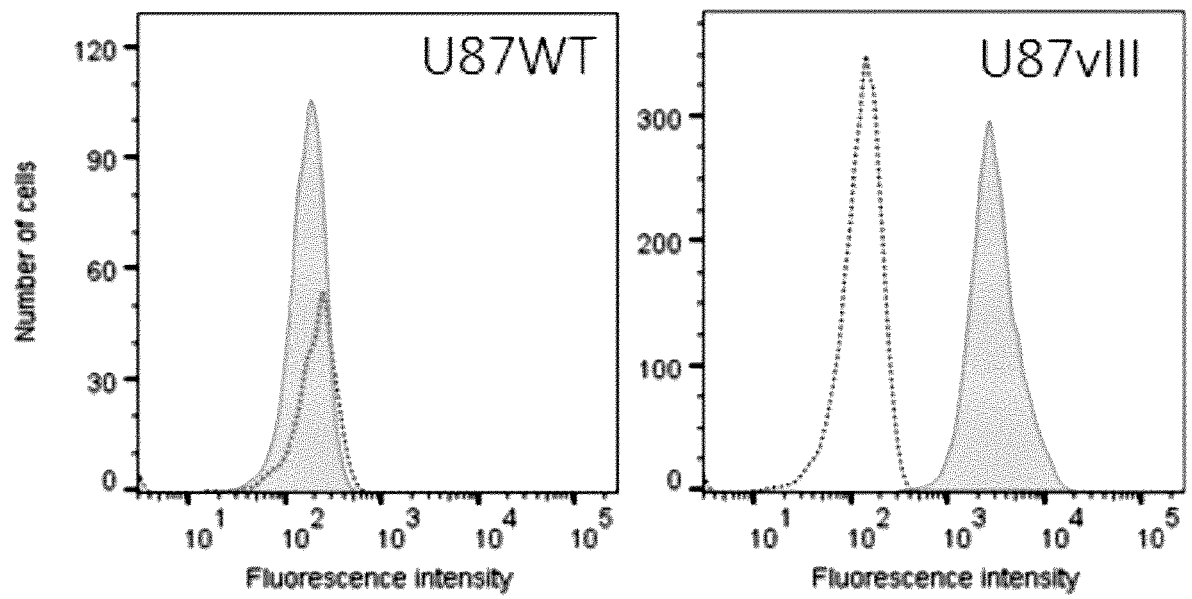
Fig. 1F: 9C9
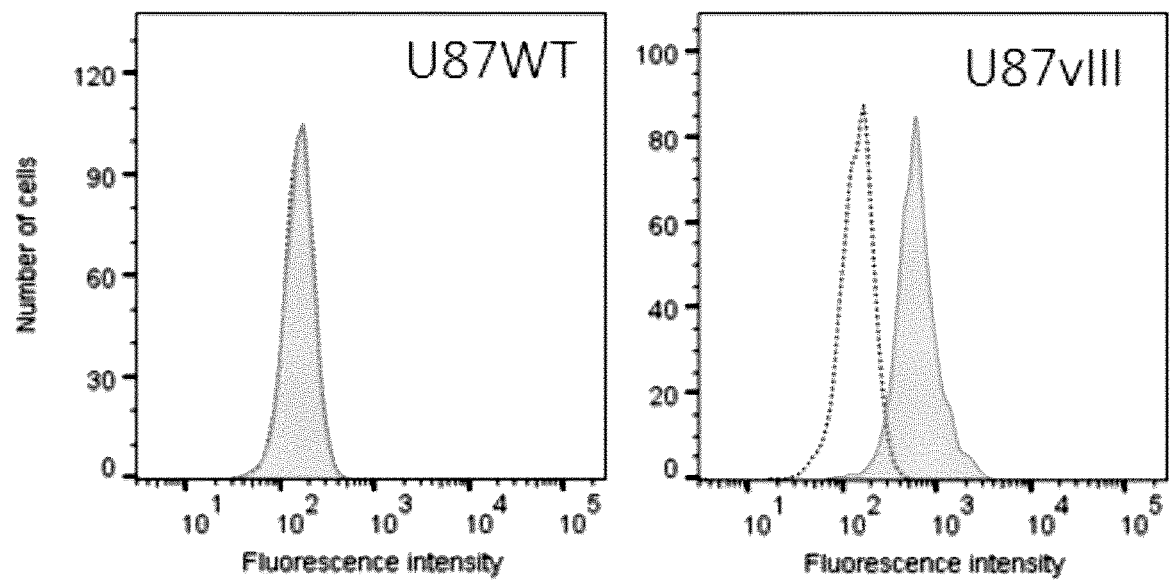

Fig. 1G: 11B1
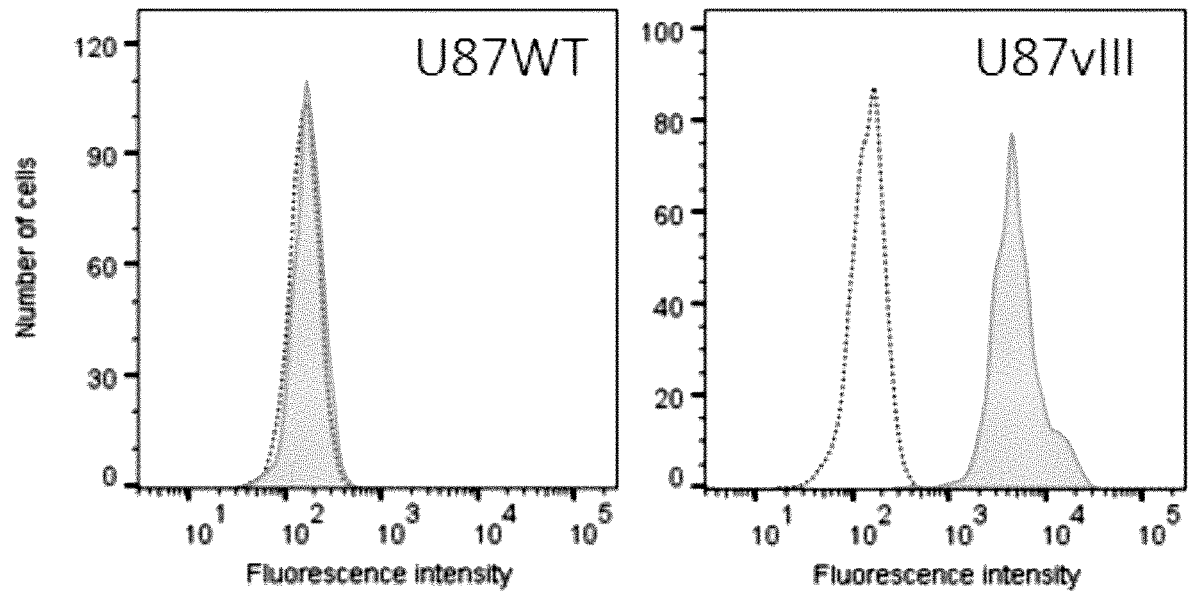
Fig. 1H: 11C8
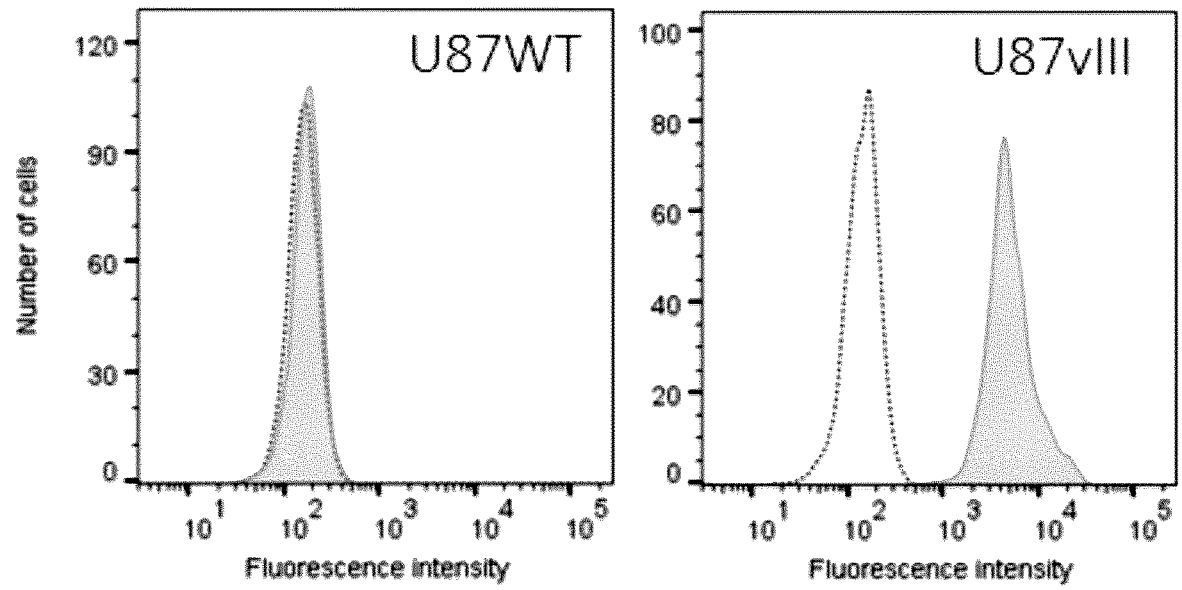

Fig. 1I: 11H3
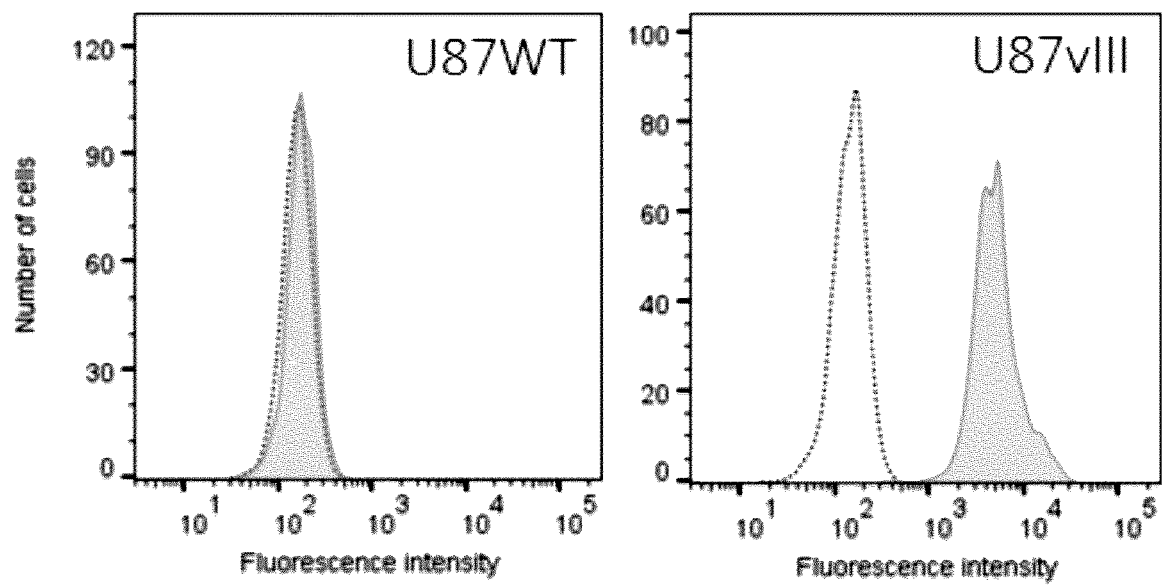
Fig. 1J: 225
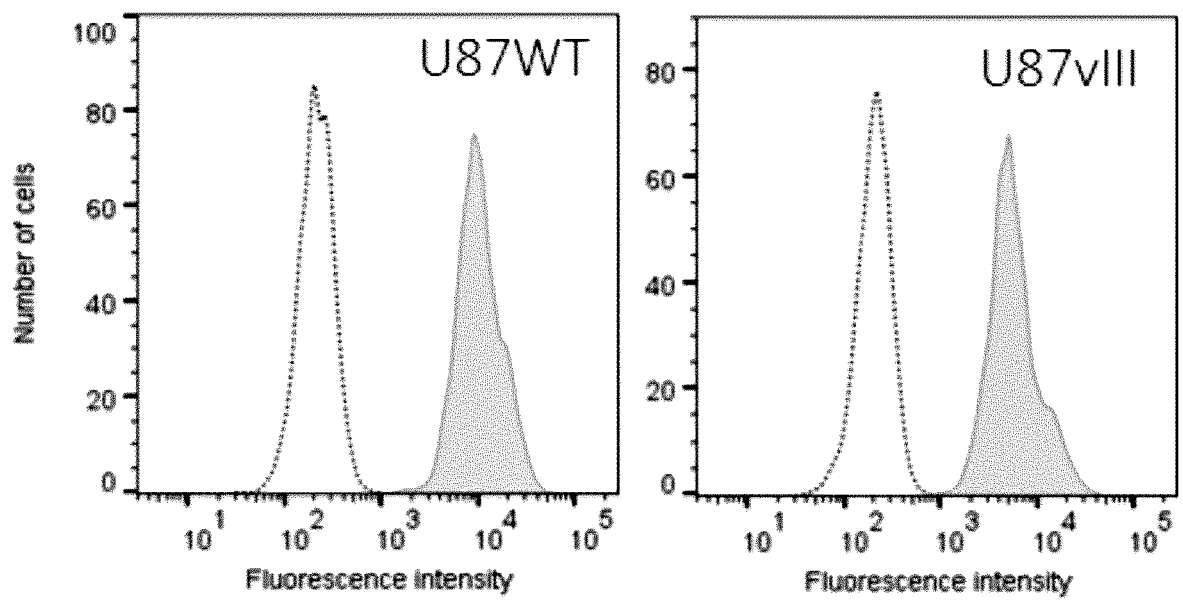

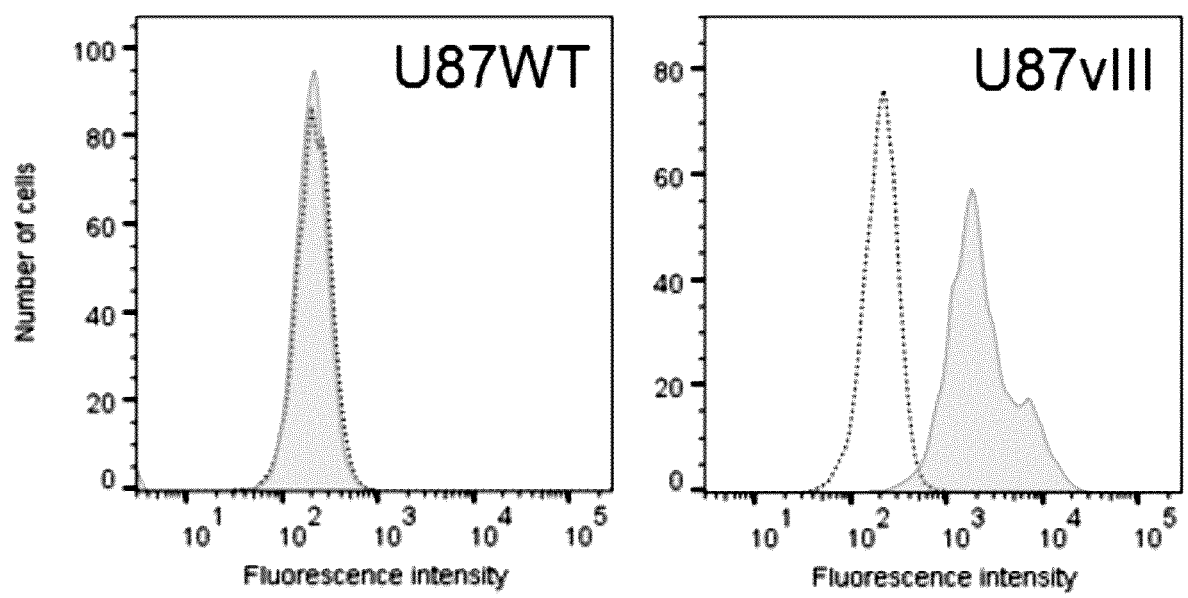
Fig. 1K: 13.1.2 (mIgG2a)

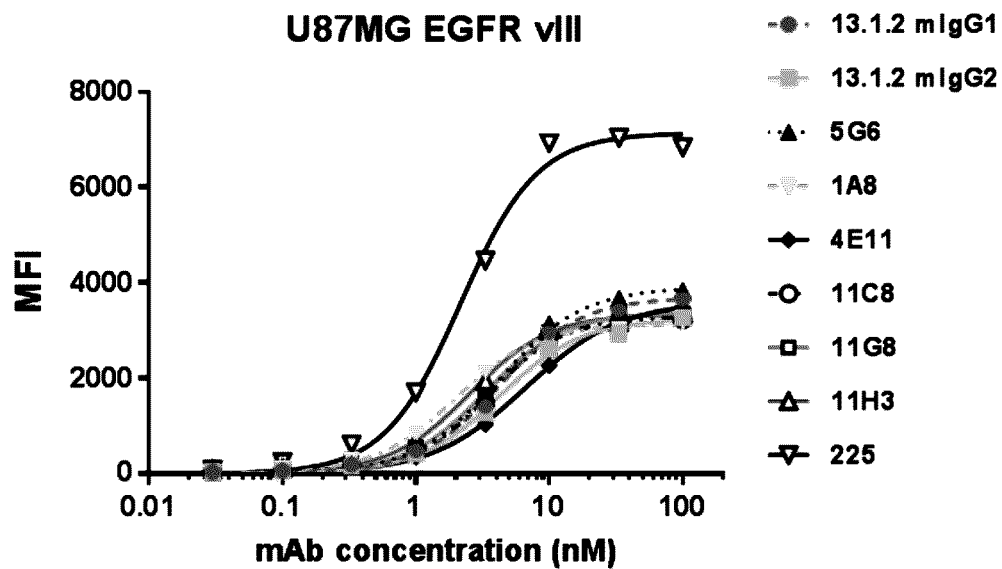
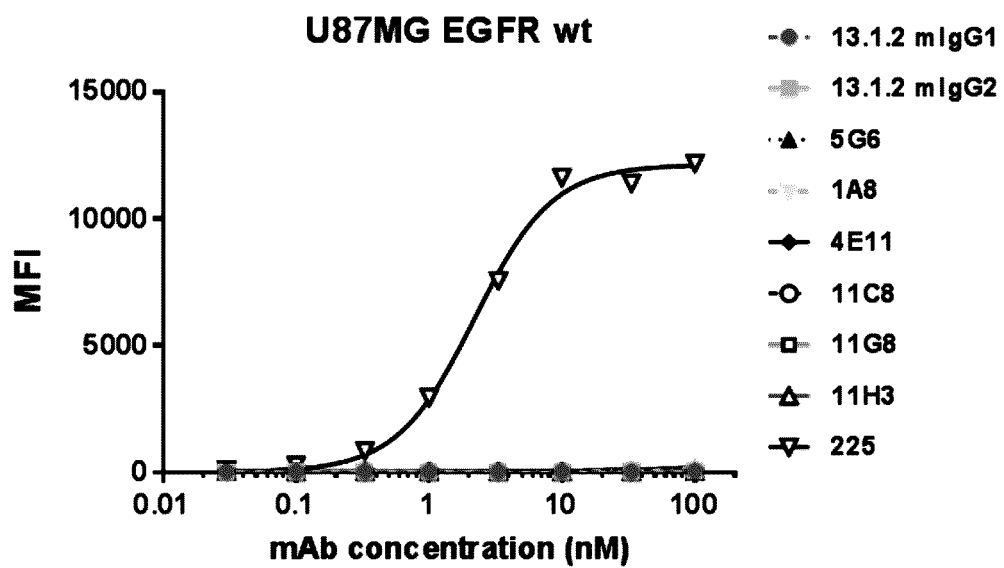
Figure 2 A and B

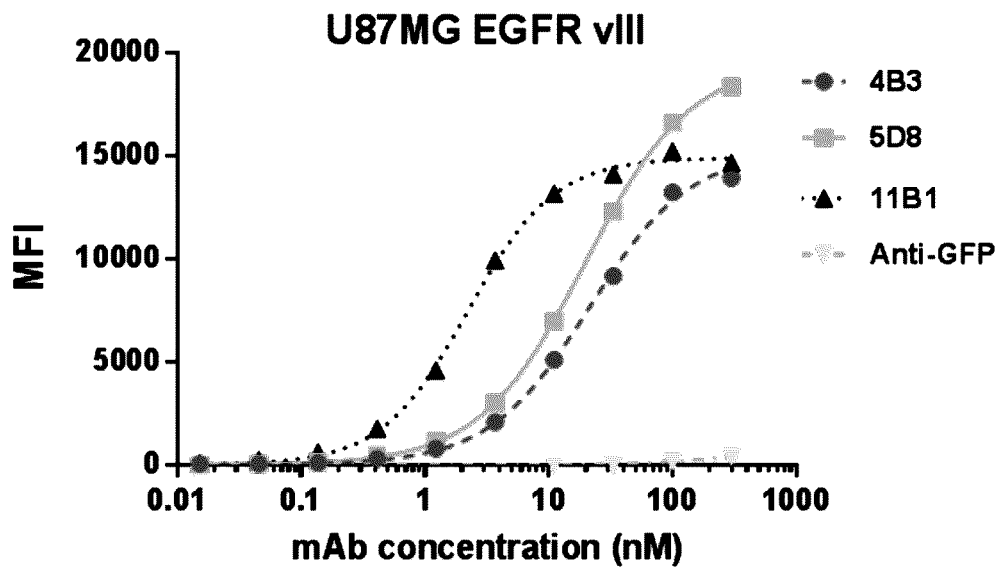
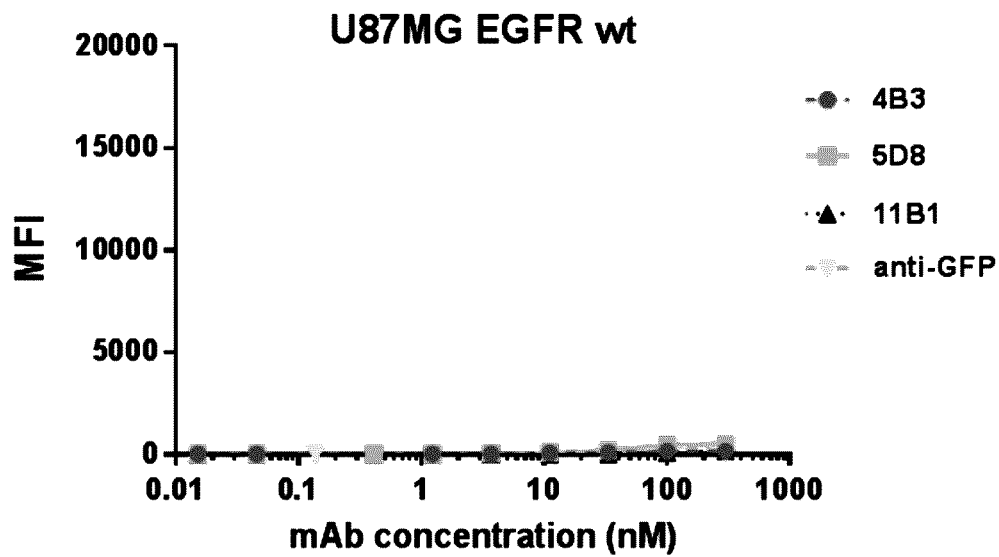
Figure 2 C and D

| | | | |
|---|---|---|---|
| EGFR WT | 1 | LEEKKVCQGTSNKLTQLGTFEDHFLSLQRMFNNCEVVLGNLEITYVQRNYDLSFLKTIQE | 60 |
| EGFRvIII | 1 | LEEKK------------------------------------------------------ | 5 |
| EGFR WT | 61 | VAGYVLIALNTVERIPLENLQIIRGNMYYENSYALAVLSNYDANKTGLKELPMRNLQEIL | 120 |
| EGFRvIII | 5 | ----------------------------------------------------------- | 5 |
| EGFR WT | 121 | HGAVRFSNNPALCNVESIQWRDIVSSDFLSNMSMDFQNHLGSCQKCDPSCPNGSCWGAGE | 180 |
| EGFRvIII | 5 | ----------------------------------------------------------- | 5 |
| EGFR WT | 181 | ENCQKLTKIICAQQCSGRCRGKSPSDCCHNQCAAGCTGPRESDCLVCRKFRDEATCKDTC | 240 |
| EGFRvIII | 5 | ----------------------------------------------------------- | 5 |
| EGFR WT | 241 | PPLMLYNPTTYQMDVNPEGKYSFGATCVKKCPRNYVVTDHGSCVRACGADSYEMEEDGVR | 300 |
| EGFRvIII | 5 | -------------------GNYVVTDHGSCVRACGADSYEMEEDGVR | 33 |
| EGFR WT | 301 | KCKKCEGPCRKVCNGIGIGEFKDSLSINATNIKHFKNCTSISGDLHILPVAFRGDSFTHT | 360 |
| EGFRvIII | 34 | KCKKCEGPCRKVCNGIGIGEFKDSLSINATNIKHFKNCTSISGDLHILPVAFRGDSFTHT | 93 |
| EGFR WT | 361 | PPLDPQELDILKTVKEITGFLLIQAWPENRTDLHAFENLEIIRGRTKQHGQFSLAVVSLN | 420 |
| EGFRvIII | 94 | PPLDPQELDILKTVKEITGFLLIQAWPENRTDLHAFENLEIIRGRTKQHGQFSLAVVSLN | 153 |
| EGFR WT | 421 | ITSLGLRSLKEISDGDVIISGNKNLCYANTINWKKLFGTSGQKTKIISNRGENSCKATGQ | 480 |
| EGFRvIII | 154 | ITSLGLRSLKEISDGDVIISGNKNLCYANTINWKKLFGTSGQKTKIISNRGENSCKATGQ | 213 |
| EGFR WT | 481 | VCHALCSPEGCWGPEPRDCVSCRNVSRGRECVDKCNLLEGEPREFVENSECIQCHPECLP | 540 |
| EGFRvIII | 214 | VCHALCSPEGCWGPEPRDCVSCRNVSRGRECVDKCNLLEGEPREFVENSECIQCHPECLP | 273 |
| EGFR WT | 541 | QAMNITCTGRGPDNCIQCAHYIDGPHCVKTCPAGVMGENNTLVWKYADAGHVCHLCHPNC | 600 |
| EGFRvIII | 274 | QAMNITCTGRGPDNCIQCAHYIDGPHCVKTCPAGVMGENNTLVWKYADAGHVCHLCHPNC | 333 |
| EGFR WT | 541 | TYGCTGPGLEGCPTNGPKIPS | 621 |
| EGFRvIII | 214 | TYGCTGPGLEGCPTNGPKIPS | 354 |

Figure 3

| Clone | EGFR fragment | 5G6 | 1A8 | 4B3 | 4E11 | hFc-4E11 | 5D8 | 9C9 | 11B1 | 11H5 | 11H3 | hFc-13.1.2 | anti-EGFR 225 |
|---|---|---|---|---|---|---|---|---|---|---|---|---|---|
| 2R-1 | viii_(1-62) | +++ | nt | nt | +++ | nt | nt | + | nt | nt | nt | +++ | nt |
| 2R-2 | viii_(1-49) | +++ | +++ | +++ | +++ | nt | +++ | + | +++ | +++ | +++ | +++ | nt |
| 2R-3 | viii_(1-33) | +++ | +++ | - | - | nt | - | - | +++ | +++ | +++ | +++ | nt |
| 2R-4 | viii_(1-18) | +++ | +++ | nt | +++ | nt | nt | nt | nt | nt | nt | - | nt |
| 2R-5 | viii_(19-76) | - | nt | nt | +++ | nt | nt | nt | nt | nt | nt | - | nt |
| 2R-6 | viii_(19-62) | - | nt | nt | +++ | nt | nt | nt | nt | nt | nt | - | nt |
| 2R-7 | viii_(19-49) | - | nt | nt | - | +++ | nt | -/+ | nt | nt | nt | nt | nt |
| 2R-8 | viii_(19-33) | - | nt | nt | - | nt | nt | nt | nt | nt | nt | nt | nt |
| 2R-9 | viii_(58-76) | - | nt | nt | - | - | nt | - | nt | nt | nt | nt | nt |
| 2R-10 | viii_(43-76) | nt | - | nt | nt | +++ | - | - | nt | nt | nt | nt | nt |
| 2R-11 | viii_(43-62) | nt | nt | nt | nt | - | nt | - | nt | nt | nt | nt | nt |
| 3R-2 | viii_(28-49) | nt | nt | nt | nt | - | nt | -/+ | - | - | - | nt | nt |
| 3R-3 | viii_(33-49) | nt | nt | nt | nt | - | nt | - | nt | nt | nt | nt | nt |
| 3R-4 | viii_(36-49) | nt | nt | nt | nt | +++ | nt | - | nt | nt | nt | nt | nt |
| 3R-5 | viii_(19-45) | nt | - | - | nt | - | - | - | nt | nt | nt | nt | nt |
| 3R-6 | viii_(28-45) | nt | nt | nt | nt | nt | nt | -/+ | nt | nt | nt | nt | nt |
| 3R-7 | viii_(33-45) | nt | nt | nt | nt | nt | nt | - | - | - | - | nt | nt |
| 3R-8 | viii_(36-45) | nt | - | - | nt | +++ | - | -/+ | nt | nt | nt | nt | nt |
| 3R-9 | viii_(19-37) | nt | nt | nt | nt | nt | nt | - | - | - | - | nt | nt |
| 3R-10 | viii_(28-37) | nt | nt | nt | nt | nt | nt | -/+ | nt | nt | nt | nt | nt |

Figure 4A

| Clone | EGFR fragment | 5G6 | 1A8 | 4B3 | 4E11 | hFc-4E11 | 5D8 | 9C9 | 11B1 | 11H5 | 11H3 | hFc-13.1.2 | anti-EGFR 225 |
|---|---|---|---|---|---|---|---|---|---|---|---|---|---|
| 4R-2 | vIII_(1-45) | +++ | nt | nt | nt | +++ | nt | + | nt | nt | nt | +++ | nt |
| 4R-3 | vIII_(1-37) | +++ | +++ | +++ | nt | +++ | +++ | + | +++ | +++ | +++ | +++ | nt |
| 4R-4 | vIII_(3-49) | +++ | nt | nt | nt | +++ | nt | + | nt | nt | nt | - | nt |
| 4R-5 | vIII_(3-45) | +++ | ++ | +++ | nt | +++ | +++ | + | nt | nt | - | - | nt |
| 4R-6 | vIII_(3-37) | +++ | nt | nt | nt | +++ | nt | + | nt | nt | nt | - | nt |
| 4R-7 | vIII_(6-49) | - | nt | nt | nt | +++ | nt | + | - | - | - | - | nt |
| 4R-8 | vIII_(6-45) | - | nt | nt | nt | +++ | nt | + | nt | nt | nt | - | nt |
| 4R-9 | vIII_(6-37) | - | nt | nt | nt | +++ | nt | + | nt | nt | nt | - | nt |
| 4R-10 | vIII_(10-49) | - | nt | nt | nt | +++ | nt | + | nt | nt | nt | - | nt |
| 4R-11 | vIII_(10-45) | - | nt | nt | nt | +++ | nt | + | nt | nt | nt | - | nt |
| 4R-12 | vIII_(10-37) | - | nt | nt | nt | +++ | nt | + | nt | nt | nt | - | nt |
| 4R-13 | vIII_(15-49) | - | nt | +++ | nt | +++ | +++ | + | nt | nt | nt | - | nt |
| 4R-14 | vIII_(15-45) | - | nt | +++ | nt | +++ | +++ | + | nt | nt | nt | - | nt |
| 4R-15 | vIII_(15-37) | - | - | - | nt | +++ | +++ | - | - | - | - | - | nt |
| 1R-3 | vIII_(1-76) | +++ | +++ | +++ | +++ | +++ | +++ | + | +++ | +++ | +++ | +++ | ++ |
| 1R-5 | vIII_(43-456) | - | - | - | - | - | - | - | - | - | - | - | - |
| YF-3 | wt(266-482) | - | - | | ++ | ++ | - | - | - | - | - | - | nt |
| YF-5 | wt(1-623) | - | - | | + | + | - | - | - | - | - | - | nt |

Figure 4B

```
SEQ102    QIQLVQSGPELKKPGETVKISCKASGYTFTTAGMQWVQKMPGKGFKWIGWINTHSGDPKY  60
SEQ77     QIQLVQSGPELKKPGETVKISCKASGYTFTTAGMQWVKKMPGKGFKWIGWINTHSGDPKY  60
SEQ92     QIQLVQSGPELKKPGETVKISCKASGYTFTTAGMQWVQKMPGKGFKWIGWINTHSGDPKY  60
          **************************************:*********************

SEQ102    AEDFKGRFAFSLETYASTAYLQISNLKNEDTAFYFCARTHIYDGYNYAMDYWGQGTSVTV 120
SEQ77     AEDFKGRFAFSLETYASTAYLQISNLKNEDTASYFCARTHIYDGYNYAMDYWGQGTSVTV 120
SEQ92     AEDFKGRFAFSLETYASTAYLQISNLKNEDTASYFCARTHIYDGYNYAMDYWGQGTSVTV 120
          ********************************:***************************

SEQ102    SS 122
SEQ77     SS 122
SEQ92     SS 122
          **
```

```
SEQ27   EIVLTQSPALMAASPGEKVTITCSVSSSISSSNLHWYQQKSETSPKPWIYGTSNLASGVP  60
SEQ47   EIVLTQSPVFMAASPGEKVTITCSVSSSISSSNLHWYQQKSETSPKPWIYGTSNLASGVP  60
        ********:*:************************************************

SEQ27   VRFSGSGSGTSYSLTISSMEAEDAATYYCQQWSSYPLTFGAGTKLELE  108
SEQ47   VRFSGSGSGTSYSLTISSMEAEDAATYYCQQWSSYPLTFGAGTKLELK  108
        ********************************************:
```

C

```
SEQ32   EVQLQQSGPELVKPGSSVKISCKASGYTFTDYNMDWVKQSHGKSLEWIGTINPNNGGTSY  60
SEQ52   EVQLQQSGPDLVKPGSSVKISCKASGYTFTDYNIDWVKQSHGKSLEWIGTINPNGGTSY   60
        *********:***********************:*****************:******

SEQ32   NQKFKGKATLTVDKSSNTAYMELRSLTSEDSAVYYCARGYDYDLWFAYWGQGTLVTVSA  119
SEQ52   NQKFKGKATLTVDKSSTAYMELRSLTSEDSAVYYCARGYDYDLWFAYWGQGTLVTVSA   119
        ****************:*****************************************
```

Figure 5B and C

```
SEQID27  EIVLTQSPALMAASPGEKVTITCSVSSSISSSNLHWYQQKSETSPKPWIYGTSNLASGVP 60
SEQID47  EIVLTQSPVFMAASPGEKVTITCSVSSSISSSNLHWYQQKSETSPKPWIYGTSNLASGVP 60
SEQID57  EIVLTQSPTLMAASPGEKVTITCSVSSSISSSNLHWYQQKSETSPKPWIYDTSNLASGVP 60
         *******  ***********************************:********

SEQID27  VRFSGSGSGTSYSLTISSMEAEDAATYYCQQWSSYPLTFGAGTKLELE  108
SEQID47  VRFSGSGSGTSYSLTISSMEAEDAATYYCQQWSSYPLTFGAGTKLELK  108
SEQID57  IRFSGSGSGTSYSLTISSVEAEDAATYYCQQWSSYPLTFGSGTKLEIK  108
         :****************:********************:*****::
```

Figure 5D

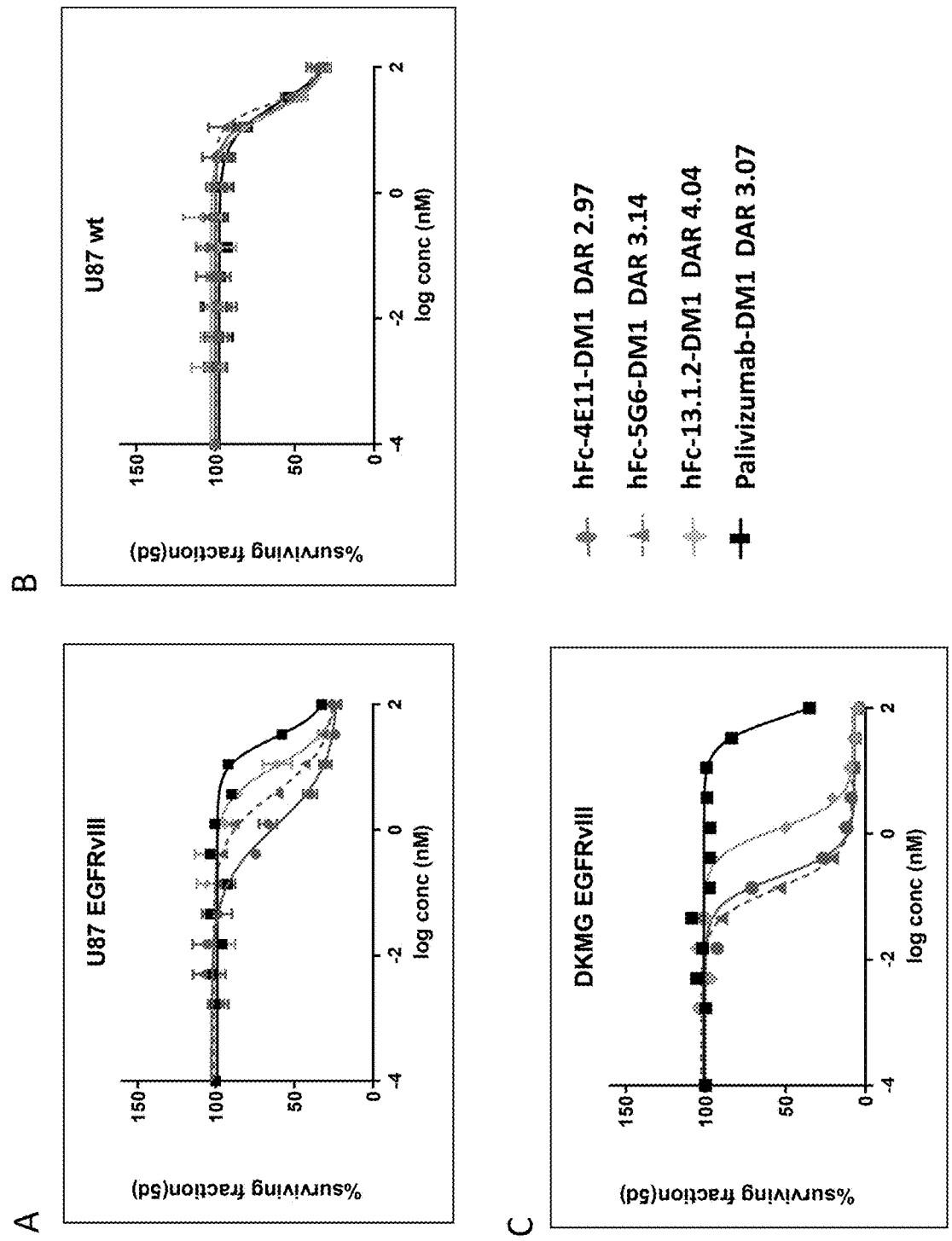
Figure 6A, B and C

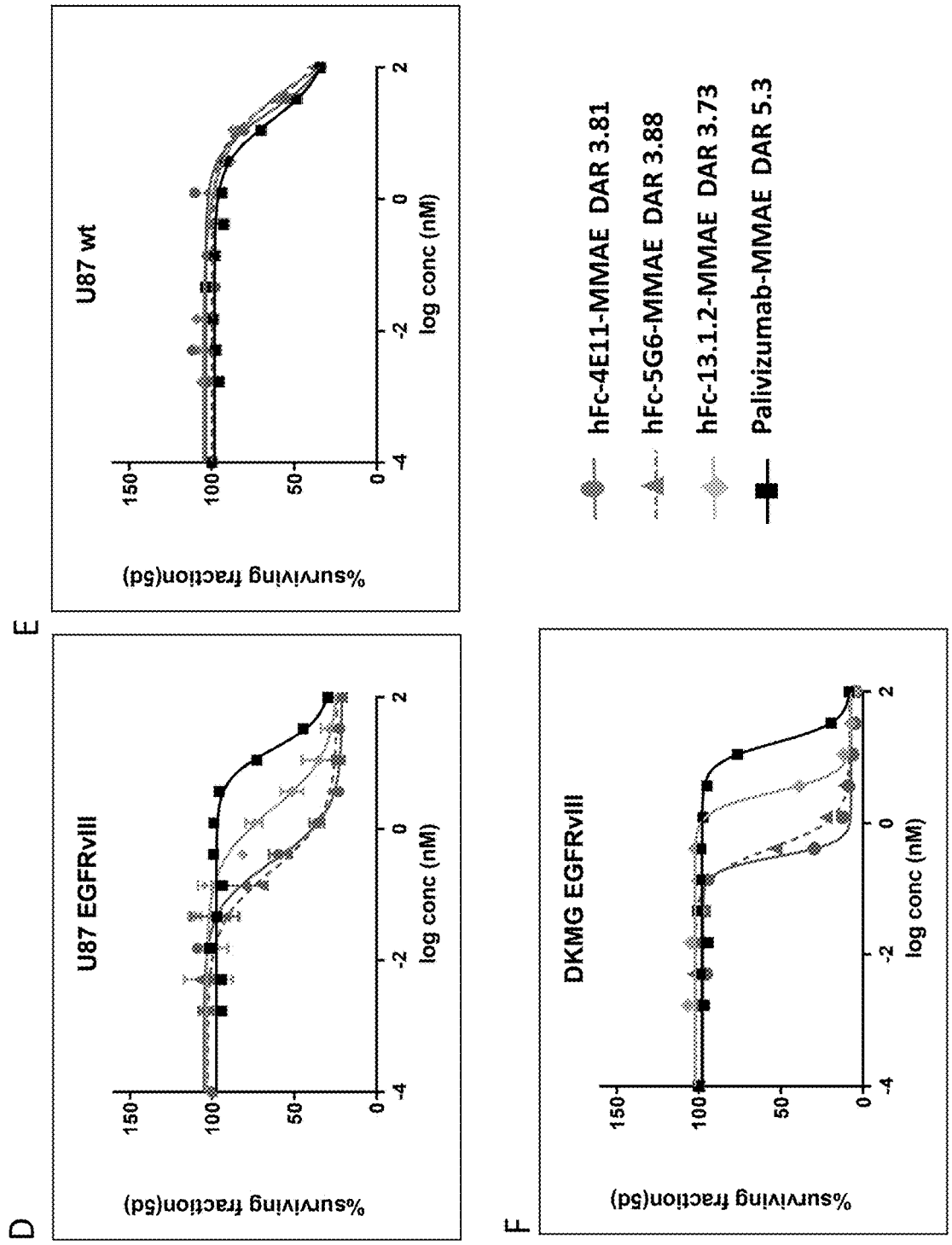
Figure 6D, E and F

A
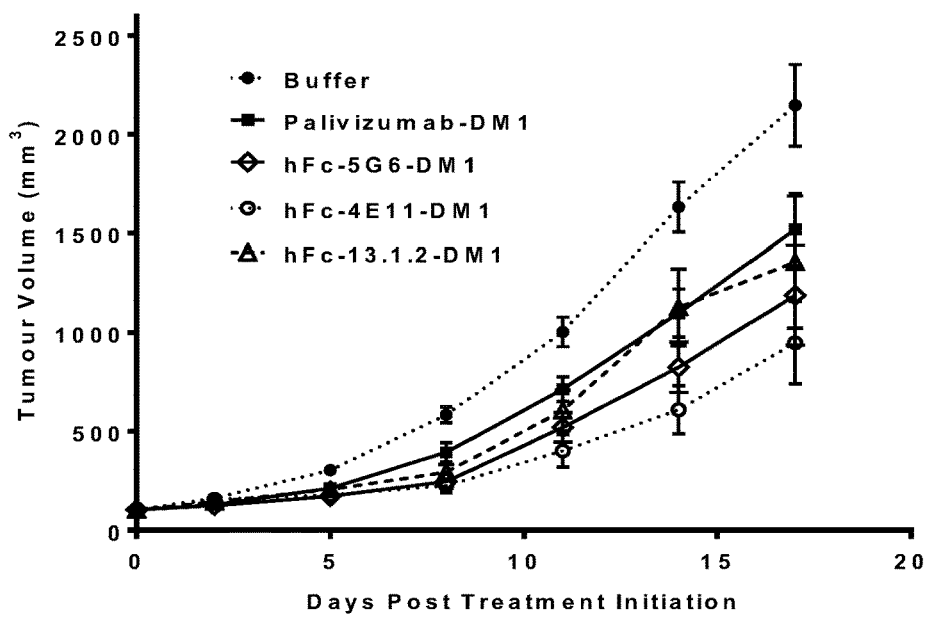
B
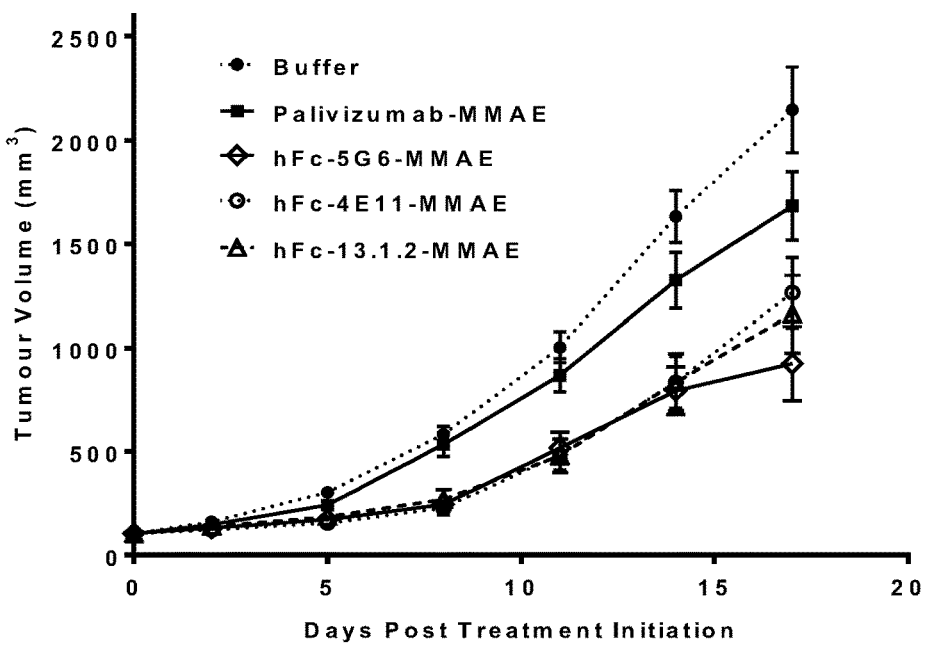
Figure 8 A and B

ANTI-EGFRVIII ANTIBODIES AND ANTIGEN-BINDING FRAGMENTS THEREOF

TECHNICAL FIELD

The present disclosure provides antigen-binding agents such as antibodies or antigen-binding fragments thereof, chimeric antigen receptors (CARs), bispecific T-cell engagers (BiTEs) and the like that specifically bind to epidermal growth factor receptor variant III (EGFRvIII). The EGFRvIII-specific antibodies or antigen-binding fragments thereof, CARs or BiTEs of the instant disclosure may be used, for example, for the treatment of cancer. Antibody drug conjugates targeting EGFRvIII-expressing cells are particularly contemplated.

BACKGROUND

The epidermal growth factor receptor variant III (EGFRvIII) is amplified, highly expressed and present in 25-64% of glioblastoma multiforme (GBM). It should be noted that the different detection methods yielded inconsistent results, but EGFRvIII mRNA and protein expression has been detected in a subset of carcinomas of the breast as well as in head and neck squamous cell carcinoma (HNSCC) using multiple complementary techniques (reviewed in Gan et al 2013). Unlike wild type (wt) epidermal growth factor receptor (EGFR), which is expressed in tissues of epithelial, mesenchymal and neuronal origin and plays a major role in normal cellular processes such as proliferation, differentiation and development, EGFRvIII is not expressed on normal tissues.

The EGFRvIII variant originates from an in-frame deletion of exons 2-7 of the EGFR gene resulting in the removal of a sequence encoding 267 amino acid residues of the extracellular domain. The newly formed splice junction encodes a glycine residue which has no counterpart in wild type human EGFR and therefore forms a neo-epitope. Moreover, numerous studies showed that normal tissues are devoid of EGFRvIII. EGFRvIII thus contains a new tumor specific cell surface epitope that could be exploited for antibody targeted therapies. However, the EGFRvIII neo-epitope is not very immunogenic compared to the remaining of the human sequence, and many of the antibodies generated to date have not been shown to be specifically recognizing EGFRvIII (reviewed in Gan et al 2013).

In rare cases, monoclonal antibodies (mAbs) directed against the EGFRvIII neo-epitope have been described, including antibody 13.1.2 (U.S. Pat. No. 7,736,644) which is also being developed as an antibody drug conjugate (ADC) by Amgen (AMG 595: Hamblett K. J, et al., Molecular Cancer Therapeutics, Vol. 14(7), pp. 1614-24, 2015). U.S. Pat. No. 9,562,102 also describes the 806 antibody developed by Abbvie (ABT-806, ABT-414), which binds to EGFRvIII as well as a subset of amplified EGFR on EGFR overexpressing tumor cells (Cleary, J M et al., Invest New Drugs, 33(3), pp. 671-8, 2015; Reilly, E B., Molecular Cancer Therapeutics, Vol. 14(5), pp. 1141-51, 2015). Although this antibody has been shown to bind preferentially to tumor EGFR in preclinical models, binding of this antibody to wt EGFR present in human skin has been shown to account for the cutaneous toxicity that ABT-806 exhibits in some patients (Cleary et al 2015).

Antibodies or antigen-binding fragments thereof that specifically target an epitope of EGFRvIII that is absent or not accessible in EGFR-expressing cells would be beneficial for the treatment of cancer patients.

SUMMARY

Antigen-binding agents such as antibodies or an antigen-binding fragments thereof, chimeric antigen receptors (CARs), bispecific T-cell engagers (BiTEs) and the like which specifically bind to epidermal growth factor receptor variant III (EGFRvIII) are provided.

As described in more details below, some anti-EGFRvIII antibodies or antigen-binding fragments thereof may bind to EGFRvIII at the surface of cancer cells (e.g., glioblastoma cells). In some embodiments, the antibodies or antigen-binding fragments thereof do not significantly bind to EGFR expressed on cancer cells (e.g., U87MG-EGFR WT).

The antibodies or antigen-binding fragments thereof of the present disclosure may be internalized by cancer cells and may thus be used, in an aspect thereof, for delivery of cargo molecules. Particularly contemplated are anti-EGFRvIII antibodies or antigen-binding fragments thereof that are conjugated to therapeutic moieties. The anti-EGFRvIII antibodies described herein may be used for inhibiting the growth of EGFRvIII-expressing tumor cells.

In some embodiments of the present disclosure, the anti-EGFRvIII antibodies or antigen-binding fragments thereof may be able to bind to an epitope present in both native EGFRvIII (e.g., native recombinant EGFRvIII) and denatured EGFRvIII (e.g., denatured recombinant EGFRvIII).

Generally, the antibodies or antigen-binding fragments thereof of the present disclosure may be able to bind to a peptide comprising an EGFRvIII fragment consisting of amino acid residues 1 to 76 of EGFRvIII (SEQ ID NO:119). A subset of the antibodies or antigen-binding fragments thereof are able to bind to amino acid residues 1 to 18 of EGFRvIII (SEQ ID NO:125) and another subset of antibodies are able to bind amino acid residues 15 to 37 of EGFRvIII (SEQ ID NO:6).

More particularly, the present disclosure provides anti-EGFRvIII antibodies or antigen-binding fragments thereof that may be able to bind to one or more of the EGFRvIII fragments illustrated in FIGS. 4a and/or 4b.

Embodiments of anti-EGFRvIII antibodies or antigen-binding fragments thereof encompassed by the present disclosure includes, for example:

Antibodies that are able to bind to a peptide comprising an EGFRvIII fragment consisting of amino acid residues 1 to 18 of EGFRvIII (SEQ ID NO:125);

Antibodies that are able to bind to a peptide comprising an EGFRvIII fragment consisting of amino acid residues 3 to 18 of EGFRvIII (SEQ ID NO:129);

Antibodies that are able to bind to a peptide comprising an EGFRvIII fragment consisting of amino acid residues 15 to 37 of EGFRvIII (SEQ ID NO:6), or;

Antibodies that are able to bind to a peptide comprising an EGFRvIII fragment consisting of amino acid residues 19 to 37 of EGFRvIII (SEQ ID NO:142)

Some particular anti-EFGRvIII antibodies or antigen-binding fragments thereof encompassed by the present disclosure include those that do not require the presence of amino acid residues 1-2 of EGFRvIIII for binding. Particularly contemplated are anti-EFGRvIII antibodies or antigen-binding fragments thereof that are capable of binding to one or more EGFRvIII fragments amongst fragment 19-76 (SEQ ID NO:138), fragment 19-62 (SEQ ID NO:139), fragment 19-49 (SEQ ID NO:140), fragment 19-45 (SEQ ID NO:141), fragment 28-45 (SEQ ID NO:143), fragment 28-37 (SEQ ID NO:144), fragment 19-37 (SEQ ID NO:142), fragment 3-45 (SEQ ID NO:127), fragment 3-49 (SEQ ID NO:126), fragment 3-37 (SEQ ID NO:128), fragment 6-49 (SEQ ID NO:130), fragment 6-45 (SEQ ID NO:131), fragment 6-37 (SEQ ID NO:132), fragment 10-49 (SEQ ID NO:133), fragment 10-45 (SEQ ID NO:134), fragment 10-37 (SEQ ID NO:135), fragment 15-49 (SEQ ID NO:136), fragment 15-45 (SEQ ID NO:137) or fragment 15-37 (SEQ ID NO:6).

The anti-EGFRvIII antibodies or antigen-binding fragments provided herein include antibodies or antigen-binding fragments that are able to bind to a peptide comprising an EGFRvIII fragment consisting of amino acid residues 3 to 37 of EGFRvIII (SEQ ID NO:128) such as for example, the F260-5G6 (referred herein also as 5G6), F263-1A8 (referred herein also as 1A8), F263-4B3 (referred herein also as 4B3), F263-4E11 (referred herein also as 4E11), F263-5D8 (referred herein also as 5D8) and F265-9C9 (referred to herein also as 9C9) antibody.

Other anti-EGFRvIII antibodies or antigen-binding fragments provided herein include antibodies or antigen-binding fragments that are able to bind to a peptide comprising an EGFRvIII fragment consisting of amino acid residues 1 to 33 of EGFRvIII (SEQ ID NO:124).

Exemplary antibodies or antigen-binding fragments thereof of the present disclosure include an antibody or antigen-binding fragment thereof that specifically binds to EGFRvIII (SEQ ID NO:5) and that is capable of binding to an EGFRvIII fragment selected from the group consisting of:

a. a fragment consisting of amino acid residues 15 to 37 of EGFRvIII (SEQ ID NO:6);
b. a fragment consisting of amino acid residues 1 to 76 of EGFRvIII (SEQ ID NO:119);
c. a fragment consisting of amino acid residues 1 to 62 of EGFRvIII (SEQ ID NO: 120);
d. a fragment consisting of amino acid residues 1 to 49 of EGFRvIII (SEQ ID NO:121);
e. a fragment consisting of amino acid residues 1 to 45 of EGFRvIII (SEQ ID NO:122);
f. a fragment consisting of amino acid residues 1 to 37 of EGFRvIII (SEQ ID NO:123);
g. a fragment consisting of amino acid residues 3 to 49 of EGFRvIII (SEQ ID NO:126);
h. a fragment consisting of amino acid residues 3 to 45 of EGFRvIII (SEQ ID NO:127);
i. a fragment consisting of amino acid residues 3 to 37 of EGFRvIII (SEQ ID NO:128);
j. a fragment consisting of amino acid residues 6 to 49 of EGFRvIII (SEQ ID NO:130);
k. a fragment consisting of amino acid residues 6 to 45 of EGFRvIII (SEQ ID NO:131);
l. a fragment consisting of amino acid residues 6 to 37 of EGFRvIII (SEQ ID NO:132);
m. a fragment consisting of amino acid residues 10 to 49 of EGFRvIII (SEQ ID NO:133);
n. a fragment consisting of amino acid residues 10 to 45 of EGFRvIII (SEQ ID NO:134);
o. a fragment consisting of amino acid residues 10 to 37 of EGFRvIII (SEQ ID NO:135);
p. a fragment consisting of amino acid residues 15 to 49 of EGFRvIII (SEQ ID NO:136);
q. A fragment consisting of amino acid residues 15 to 45 of EGFRvIII (SEQ ID NO:137);
r. a fragment consisting of amino acid residues 19 to 76 of EGFRvIII (SEQ ID NO:138);
s. a fragment consisting of amino acid residues 19 to 62 of EGFRvIII (SEQ ID NO:139);
t. a fragment consisting of amino acid residues 19 to 49 of EGFRvIII (SEQ ID NO:140);
u. a fragment consisting of amino acid residues 19 to 45 of EGFRvIII (SEQ ID NO:141);
v. a fragment consisting of amino acid residues 19 to 37 of EGFRvIII (SEQ ID NO:142), and;
w. any combination of the above fragments thereof,
wherein the antibody or antigen binding fragment thereof fails to bind a peptide comprising or consisting of the amino acid sequence set forth in SEQ ID NO: 149.

The antibody or antigen-binding fragment thereof of the present disclosure may be capable of binding to a peptide comprising or consisting of an amino acid sequence selected from the group consisting of SEQ ID NO:145, SEQ ID NO:146, SEQ ID NO:147, SEQ ID NO:148, SEQ ID NO:150, SEQ ID NO:151, SEQ ID NO:152, SEQ ID NO:153, SEQ ID NO:155, SEQ ID NO:156, SEQ ID NO:157, SEQ ID NO:162, SEQ ID NO:164, SEQ ID NO:165 and combination thereof.

The antibody or antigen-binding fragment thereof may also be capable of binding to a peptide comprising or consisting of an amino acid sequence set forth in SEQ ID NO:160.

Other exemplary embodiments of the disclosure include antibodies or antigen-binding fragments thereof that specifically bind to EGFRvIII (SEQ ID NO:5) and that are capable of binding to an EGFRvIII fragment selected from the group consisting of:

a. a fragment consisting of amino acid residues 15 to 37 of EGFRvIII (SEQ ID NO:6);
b. a fragment consisting of amino acid residues 1 to 76 of EGFRvIII (SEQ ID NO:119);
c. a fragment consisting of amino acid residues 1 to 49 of EGFRvIII (SEQ ID NO:121);
d. a fragment consisting of amino acid residues 1 to 37 of EGFRvIII (SEQ ID NO:123);
e. a fragment consisting of amino acid residues 3 to 37 of EGFRvIII (SEQ ID NO:128); and;
f. any combination of the above fragments thereof,
wherein the antibodies or antigen binding fragments thereof fail to bind a peptide comprising of consisting of the amino acid sequence set forth in SEQ ID NO: 149.

The antibody or antigen-binding fragment thereof of the present disclosure may be capable of binding to a peptide comprising or consisting of an amino acid sequence selected from the group consisting of SEQ ID NO:145, SEQ ID NO:146, SEQ ID NO:147, SEQ ID NO:151, SEQ ID NO:152, SEQ ID NO:153, SEQ ID NO:155, SEQ ID NO:156, SEQ ID NO:157, SEQ ID NO:158, SEQ ID NO:160, SEQ ID NO:161, SEQ ID NO:162, SEQ ID NO:164, SEQ ID NO:165 and combination thereof. The antibody or antigen-binding fragment thereof may also be capable of binding to a peptide comprising or consisting of an amino acid sequence set forth in SEQ ID NO:154. The antibody or antigen-binding fragment thereof may also be capable of binding to a peptide comprising or consisting of an amino acid sequence set forth in SEQ ID NO:159.

Yet other exemplary embodiments of the disclosure include antibodies or antigen-binding fragments thereof that specifically bind to EGFRvIII (SEQ ID NO:5) and that are capable of binding to an EGFRvIII fragment selected from the group consisting of:

a. a fragment consisting of amino acid residues 15 to 37 of EGFRvIII (SEQ ID NO:6);

b. a fragment consisting of amino acid residues 1 to 76 of EGFRvIII (SEQ ID NO:119);
c. a fragment consisting of amino acid residues 1 to 62 of EGFRvIII (SEQ ID NO: 120);
d. a fragment consisting of amino acid residues 1 to 49 of EGFRvIII (SEQ ID NO:121);
e. a fragment consisting of amino acid residues 1 to 45 of EGFRvIII (SEQ ID NO:122);
f. a fragment consisting of amino acid residues 1 to 37 of EGFRvIII (SEQ ID NO:123);
g. a fragment consisting of amino acid residues 3 to 49 of EGFRvIII (SEQ ID NO:126);
h. a fragment consisting of amino acid residues 3 to 45 of EGFRvIII (SEQ ID NO:127);
i. a fragment consisting of amino acid residues 3 to 37 of EGFRvIII (SEQ ID NO:128);
j. a fragment consisting of amino acid residues 6 to 49 of EGFRvIII (SEQ ID NO:130);
k. a fragment consisting of amino acid residues 6 to 45 of EGFRvIII (SEQ ID NO:131);
l. a fragment consisting of amino acid residues 6 to 37 of EGFRvIII (SEQ ID NO:132);
m. a fragment consisting of amino acid residues 10 to 49 of EGFRvIII (SEQ ID NO:133);
n. a fragment consisting of amino acid residues 10 to 45 of EGFRvIII (SEQ ID NO:134);
o. a fragment consisting of amino acid residues 10 to 37 of EGFRvIII (SEQ ID NO:135);
p. a fragment consisting of amino acid residues 15 to 49 of EGFRvIII (SEQ ID NO:136);
q. a fragment consisting of amino acid residues 15 to 45 of EGFRvIII (SEQ ID NO:137); and;
r. any combination of the above fragments thereof.

The antibodies or antigen-binding fragments thereof may also bind to:
a. a fragment consisting of amino acid residues 19 to 49 of EGFRvIII (SEQ ID NO:140);
b. a fragment consisting of amino acid residues 19 to 37 of EGFRvIII (SEQ ID NO:142);
c. a fragment consisting of amino acid residues 28 to 45 of EGFRvIII (SEQ ID NO:143);
d. a fragment consisting of amino acid residues 28 to 37 of EGFRvIII (SEQ ID NO:144), or;
any combination of the above fragments thereof.

The antibody or antigen-binding fragment thereof may also be capable of binding to a peptide comprising or consisting of an amino acid sequence selected from the group consisting SEQ ID NO:145, SEQ ID NO:147, SEQ ID NO:148, SEQ ID NO:150, SEQ ID NO:151, SEQ ID NO:152, SEQ ID NO:153, SEQ ID NO:155, SEQ ID NO:156, SEQ ID NO:157, SEQ ID NO:165 and combination thereof. The antibody or antigen-binding fragment thereof may also be capable of binding to a peptide comprising or consisting of an amino acid sequence set forth in SEQ ID NO:149.

Also provided are anti-EGFRvIII antibodies or antigen-binding fragments thereof that are able to bind an epitope comprising or involving amino acid residue Cys20 in said peptide. These include for example, anti-EGFRvIII antibodies or antigen-binding fragments that bind EGFRvIII and/or a peptide comprising an EGFRvIII fragment consisting of the amino acid sequence set forth in SEQ ID NO:6 but that are not able to bind a peptide comprising or consisting of the amino acid sequence SCVRAAGADSYE-MEEDGVRKCKK (SEQ ID NO:149). Such antibodies or antigen binding fragments encompass, for example, the 4B3, 5D8 and 4E11 antibodies.

Also specifically encompassed by the present disclosure are anti-EGFRvIII antibodies or antigen-binding fragments thereof that are able to bind an epitope comprising or involving amino acid residue Cys35 in said peptide. These include for example, anti-EGFRvIII antibodies or antigen-binding fragments that bind EGFRvIII and/or a peptide comprising an EGFRvIII fragment consisting of the amino acid sequence set forth in SEQ ID NO:6 but that are not able to bind a peptide comprising or consisting of the amino acid sequence SCVRACGADSYEMEEDGVRKAKK (SEQ ID NO:163). Such antibodies or antigen binding fragments encompass, for example, the 4B3, 5D8, 9C9 and 4E11 antibodies.

Further encompassed by the present disclosure are anti-EGFRvIII antibodies or antigen-binding fragments thereof that are able to bind an epitope in a peptide comprising or involving amino acid residue Cys20 and Cys35 in said peptide. These include for example, anti-EGFRvIII antibodies or antigen-binding fragments that bind EGFRvIII and/or a peptide comprising or consisting of an EGFRvIII fragment set forth in SEQ ID NO:6 but that are not able to bind a peptide comprising or consisting of the amino acid sequence selected from SCVRAAGADSYEMEEDGVRKCKK (SEQ ID NO:149) or SCVRACGADSYEMEEDGVRKAKK (SEQ ID NO:163). Such antibodies or antigen binding fragments encompass, for example, the 4B3, 5D8 and 4E11 antibodies.

In addition to amino acid residues Cys20 and/or Cys35, the epitope to which the anti-EGFRvIII antibodies or antigen-binding fragments thereof bind or which are involved in its binding may further include Glu26, Asp30, Gly31 and/or Arg33. The epitope may also further include Asp23 and/or Val32.

For example, anti-EGFRvIII antibodies or antigen-binding fragments thereof encompassed by the present disclosure include those that bind to an epitope comprising or involving:
Cys20, Glu26, Asp30, Gly31, Arg33 and Cys35, or;
Cys20, Asp23, Glu26, Asp30, Gly31, Val32, Arg33 and Cys35.

In addition to amino acid residues Cys20 and/or Cys35, the epitope to which the anti-EGFRvIII antibodies or antigen-binding fragments thereof bind or involved in its binding may further include Arg18 and/or Gly21. The epitope may also further include Glu26 and/or Gly31.

For example, the anti-EGFRvIII antibodies or antigen-binding fragments thereof encompassed by the present disclosure include those that bind to an epitope comprising or involving:
Arg18, Cys20, Gly21 and Cys35, or;
Arg18, Cys20, Gly21, Glu26, Gly31 and Cys35.

Additional anti-EGFRvIII antibodies or antigen-binding fragments thereof encompassed by the present disclosure include those that bind to an epitope comprising or involving:
Cys16, Glu26, Gly31, Val32, Arg33, Lys34, Cys35 and Lys36, or;
Cys16, Cys20, Glu26, Asp30, Gly31, Val32, Arg33, Lys34, Cys35 and Lys36.

Embodiments of the disclosure particularly include anti-EGFRvIII antibodies or antigen-binding fragments thereof that are able to compete with the 4E11 antibody or antigen-binding fragment thereof or that are able to compete with an antibody or antigen-binding fragment thereof that comprises the CDRs of the 4E11 antibody.

Other embodiments of the present disclosure include anti-EGFRvIII antibodies or antigen-binding fragments thereof that are able to compete with the 5G6 antibody or antigen-binding fragment thereof or that are able to compete with an antibody or antigen-binding fragment thereof that comprises the CDRs of the 5G6 antibody.

Further embodiments of the present disclosure include anti-EGFRvIII antibodies or antigen-binding fragments thereof that are able to compete with the 9C9 antibody or antigen-binding fragment thereof or that are able to compete with an antibody or antigen-binding fragment thereof that comprises the CDRs of the 9C9 antibody.

A particular embodiment encompassed by the present disclosure relates to an anti-EGFRvIII antibody or antigen-binding fragment thereof comprising the CDRs of the 4E11 antibody.

The present disclosure provides anti-EGFRvIII antibodies or antigen binding fragments comprising a sequence selected from the group consisting of:
  an antibody or fragment thereof comprising CDRL1 (SEQ ID NO:38), CDRL2 (SEQ ID NO:39), CDRL3 (SEQ ID NO:40), CDRH1 (SEQ ID NO:43), CDRH2 (SEQ ID NO:44) and CDRH3 (SEQ ID NO:45) of the 4E11 antibody;
  an antibody or fragment thereof comprising CDRL1 (SEQ ID NO:8), CDRL2 (SEQ ID NO:9), CDR L3 (SEQ ID NO:10), CDRH1 (SEQ ID NO:13), CDRH2 (SEQ ID NO:14) and CDRH3 (SEQ ID NO:15) of the 5G6 antibody;
  an antibody or fragment thereof comprising CDRL1 (SEQ ID NO:18), CDRL2 (SEQ ID NO:19), CDRL3 (SEQ ID NO:20), CDRH1 (SEQ ID NO:23), CDRH2 (SEQ ID NO:24) and CDRH3 (SEQ ID NO:25) of the 1A8 antibody;
  an antibody or fragment thereof comprising CDRL1 (SEQ ID NO:28), CDRL2 (SEQ ID NO:29), CDRL3 (SEQ ID NO:30), CDRH1 (SEQ ID NO:33), CDRH2 (SEQ ID NO: 34) and CDRH3 (SEQ ID NO:35) of the 4B3 antibody;
  an antibody or fragment thereof comprising CDRL1 (SEQ ID NO:48), CDRL2 (SEQ ID NO:49), CDRL3 (SEQ ID NO:50), CDRH1 (SEQ ID NO:53), CDRH2 (SEQ ID NO:54) and CDRH3 (SEQ ID NO:55) of the 5D8 antibody;
  an antibody or fragment thereof comprising CDRL1 (SEQ ID NO:58), CDRL2 (SEQ ID NO:59), CDRL3 (SEQ ID NO:60), CDRH1 (SEQ ID NO:63), CDRH2 (SEQ ID NO:64), CDRH3 (SEQ ID NO:65) of the 9C9 antibody; and
  an antibody or fragment thereof comprising CDRL1 (SEQ ID NO: 68 or 73), CDRL2 (SEQ ID NO:69 or 74), CDRL3 (SEQ ID NO:70 or 75), CDRH1 (SEQ ID NO:78), CDRH2 (SEQ ID NO:79) and CDRH3 (SEQ ID NO:80) of the F266-11B1 (referred to herein as 11B1), F266-11C8 (referred to herein as 11C8), F266-11H5 (referred to herein as 11H5) and/or F266-11H3 (referred to herein as 11H3) antibodies.

Embodiments encompassed by the present disclosure relates to an anti-EGFRvIII antibody or antigen-binding fragment thereof comprising the CDRs of the 5G6 antibody, Another embodiment encompassed by the present disclosure relates to an anti-EGFRvIII antibody or antigen-binding fragment thereof comprising the CDRs of the 1A8 antibody.

A further embodiment encompassed by the present disclosure relates to an anti-EGFRvIII antibody or antigen-binding fragment thereof comprising the CDRs of the 4B3 antibody.

Another embodiment encompassed by the present disclosure relates to an anti-EGFRvIII antibody or antigen-binding fragment thereof comprising the CDRs of the 5D8 antibody.

A further embodiment encompassed by the present disclosure relates to an anti-EGFRvIII antibody or antigen-binding fragment thereof comprising the CDRs of the 9C9 antibody.

Another embodiment encompassed by the present disclosure relates to an anti-EGFRvIII antibody or antigen-binding fragment thereof comprising the CDRs of the 11B1 or of the 11C8 antibody.

The present disclosure provides anti-EGFRvIII antibodies or antigen-binding fragments selected from the group consisting of:
  an antibody or antigen-binding fragment thereof comprising CDR sequences consisting of CDRL1 (SEQ ID NO:8), CDRL2 (SEQ ID NO:9), CDRL3 (SEQ ID NO:10), CDRH1 (SEQ ID NO:13), CDRH2 (SEQ ID NO:14), CDRH3 (SEQ ID NO:15);
  an antibody or antigen-binding fragment thereof comprising CDR sequences consisting of CDRL1 (SEQ ID NO:18), CDRL2 (SEQ ID NO:19), CDRL3 (SEQ ID NO:20), CDRH1 (SEQ ID NO:23), CDRH2 (SEQ ID NO:24), CDRH3 (SEQ ID NO:25);
  an antibody or antigen-binding fragment thereof comprising CDR sequences consisting of CDRL1 (SEQ ID NO:28), CDRL2 (SEQ ID NO:29), CDRL3 (SEQ ID NO:30), CDRH1 (SEQ ID NO:33), CDRH2 (SEQ ID NO:34), CDRH3 (SEQ ID NO:35);
  an antibody or antigen-binding fragment thereof comprising CDR sequences consisting of CDRL1 (SEQ ID NO:38), CDRL2 (SEQ ID NO:39), CDRL3 (SEQ ID NO:40), CDRH1 (SEQ ID NO:43), CDRH2 (SEQ ID NO:44), CDRH3 (SEQ ID NO:45);
  an antibody or antigen-binding fragment thereof comprising CDR sequences consisting of CDRL1 (SEQ ID NO:48), CDRL2 (SEQ ID NO:49), CDRL3 (SEQ ID NO:50), CDRH1 (SEQ ID NO:53), CDRH2 (SEQ ID NO:54), CDRH3 (SEQ ID NO:55);
  an antibody or antigen-binding fragment thereof comprising CDR sequences consisting of CDRL1 (SEQ ID NO:58), CDRL2 (SEQ ID NO:59), CDRL3 (SEQ ID NO:60), CDRH1 (SEQ ID NO:63), CDRH2 (SEQ ID NO:64), CDRH3 (SEQ ID NO:65);
  an antibody or fragment thereof comprising CDR sequences consisting of CDRL1 (SEQ ID NO:68), CDRL2 (SEQ ID NO:69), CDRL3 (SEQ ID NO:70), CDRH1 (SEQ ID NO:78), CDRH2 (SEQ ID NO:79), CDRH3 (SEQ ID NO:80), and;
  an antibody or antigen-binding fragment thereof comprising CDR sequences consisting of CDRL1 (SEQ ID NO:73), CDRL2 (SEQ ID NO:74), CDRL3 (SEQ ID NO:75), CDRH1 (SEQ ID NO:78), CDRH2 (SEQ ID NO:79), CDRH3 (SEQ ID NO:80).

The present disclosure provides in some embodiments, an antigen-binding agent such as an antibody or an antigen-binding fragment thereof, CAR, BiTE and the like which specifically binds to EGFRvIII and which may comprise for example:
  a. a light chain variable region which may comprise a CDRL1 having the amino acid sequence set forth in SEQ ID NO:8, a CDRL2 having the amino acid sequence set forth in SEQ ID NO:9 and a CDRL3 having the amino acid sequence set forth in SEQ ID NO:10 and a heavy chain variable region which may comprise a CDRH1 having the amino acid sequence set forth in SEQ ID NO:13, a CDRH2 having the amino acid sequence set forth in SEQ ID NO:14 and a CDRH3 having the amino acid sequence set forth in SEQ ID NO:15;
b. a light chain variable region which may comprise a CDRL1 having the amino acid sequence set forth in SEQ ID NO:18, a CDRL2 having the amino acid sequence set forth in SEQ ID NO:19 and a CDRL3 having the amino acid sequence set forth in SEQ ID NO:20 and a heavy chain variable region which may comprise a CDRH1 having the amino acid sequence set forth in SEQ ID NO:23, a CDRH2 having the amino acid sequence set forth in SEQ ID NO:24 and a CDRH3 having the amino acid sequence set forth in SEQ ID NO:25;
c. a light chain variable region which may comprise a CDRL1 having the amino acid sequence set forth in SEQ ID NO:28, a CDRL2 having the amino acid sequence set forth in SEQ ID NO:29 and a CDRL3 having the amino acid sequence set forth in SEQ ID NO:30 and a heavy chain variable region which may comprise a CDRH1 having the amino acid sequence set forth in SEQ ID NO:33, a CDRH2 having the amino acid sequence set forth in SEQ ID NO:34 and a CDRH3 having the amino acid sequence set forth in SEQ ID NO:35;
d. a light chain variable region which may comprise a CDRL1 having the amino acid sequence set forth in SEQ ID NO:38, a CDRL2 having the amino acid sequence set forth in SEQ ID NO:39 and a CDRL3 having the amino acid sequence set forth in SEQ ID NO:40 and a heavy chain variable region which may comprise a CDRH1 having the amino acid sequence set forth in SEQ ID NO:43, a CDRH2 having the amino acid sequence set forth in SEQ ID NO:44 and a CDRH3 having the amino acid sequence set forth in SEQ ID NO:45;
e. a light chain variable region which may comprise a CDRL1 having the amino acid sequence set forth in SEQ ID NO:48, a CDRL2 having the amino acid sequence set forth in SEQ ID NO:49 and a CDRL3 having the amino acid sequence set forth in SEQ ID NO:50 and a heavy chain variable region which may comprise a CDRH1 having the amino acid sequence set forth in SEQ ID NO:53, a CDRH2 having the amino acid sequence set forth in SEQ ID NO:54 and a CDRH3 having the amino acid sequence set forth in SEQ ID NO:55;
f. a light chain variable region which may comprise a CDRL1 having the amino acid sequence set forth in SEQ ID NO:58, a CDRL2 having the amino acid sequence set forth in SEQ ID NO:59 and a CDRL3 having the amino acid sequence set forth in SEQ ID NO:60 and a heavy chain variable region which may comprise a CDRH1 having the amino acid sequence set forth in SEQ ID NO:63, a CDRH2 having the amino acid sequence set forth in SEQ ID NO:64 and a CDRH3 having the amino acid sequence set forth in SEQ ID NO:65;
g. a light chain variable region which may comprise a CDRL1 having the amino acid sequence set forth in SEQ ID NO:68, a CDRL2 having the amino acid sequence set forth in SEQ ID NO:69 and a CDRL3 having the amino acid sequence set forth in SEQ ID NO:70 and a heavy chain variable region which may comprise a CDRH1 having the amino acid sequence set forth in SEQ ID NO:78, a CDRH2 having the amino acid sequence set forth in SEQ ID NO:79 and a CDRH3 having the amino acid sequence set forth in SEQ ID NO:80, or;
h. a light chain variable region which may comprise a CDRL1 having the amino acid sequence set forth in SEQ ID NO:73, a CDRL2 having the amino acid sequence set forth in SEQ ID NO:74 and a CDRL3 having the amino acid sequence set forth in SEQ ID NO:75 and a heavy chain variable region which may comprise a CDRH1 having the amino acid sequence set forth in SEQ ID NO:78, a CDRH2 having the amino acid sequence set forth in SEQ ID NO:79 and a CDRH3 having the amino acid sequence set forth in SEQ ID NO:80.

The present disclosure provides in additional embodiments, an antigen-binding agent such as an antibody or an antigen-binding fragment thereof, CAR, BiTE and the like which specifically binds to EGFRvIII which may comprise:
a. A light chain variable region which may comprise an amino acid sequence at least 80% identical to the amino acid sequence set forth in SEQ ID NO: 118 or substantially identical to SEQ ID NO:118 and/or a heavy chain variable region which may comprise an amino acid sequence at least 80% identical to the amino acid sequence set forth in SEQ ID NO:116 or substantially identical to SEQ ID NO:116;
b. A light chain variable region which may comprise an amino acid sequence at least 80% identical to the amino acid sequence set forth in SEQ ID NO: 115 or substantially identical to SEQ ID NO:115 and a heavy chain variable region which may comprise an amino acid sequence at least 80% identical to the amino acid sequence set forth in SEQ ID NO:116 or substantially identical to SEQ ID NO:116, or;
c. A light chain variable region which may comprise an amino acid sequence at least 80% identical to the amino acid sequence set forth in SEQ ID NO: 118 or substantially identical to SEQ ID NO:118 and a heavy chain variable region which may comprise an amino acid sequence at least 80% identical to the amino acid sequence set forth in SEQ ID NO:62 or substantially identical to SEQ ID NO:62.

In an aspect thereof, antigen-binding agents having light chain at least 80% identical or substantially identical to the amino acid sequence set forth in SEQ ID NO: 115 or SEQ ID NO: 118 may have CDRs identical to those of SEQ ID NO: 115 or SEQ ID NO: 118 respectively.

In an aspect thereof, antigen-binding agents having heavy chain at least 80% identical or substantially identical to the amino acid sequence set forth in SEQ ID NO: 62 or SEQ ID NO: 116 may have CDRs identical to those of SEQ ID NO: 62 or SEQ ID NO: 116 respectively.

The present disclosure provides in further embodiments, an antigen-binding agent such as an antibody or an antigen-binding fragment thereof, CAR, BiTE and the like which specifically binds to EGFRvIII which may comprise:
a. A light chain variable region which may comprise an amino acid sequence at least 80% identical to the amino acid sequence set forth in SEQ ID NO:7 or substantially identical to SEQ ID NO:7 and a heavy chain variable region which may comprise an amino acid sequence at least 80% identical to the amino acid sequence set forth in SEQ ID NO:12 or substantially identical to SEQ ID NO:12;
b. A light chain variable region which may comprise an amino acid sequence at least 80% identical to the amino acid sequence set forth in SEQ ID NO: 17 or substantially identical to SEQ ID NO:17 and a heavy chain variable region which may comprise an amino acid sequence at least 80% identical to the amino acid sequence set forth in SEQ ID NO:22 or substantially identical to SEQ ID NO:22;
c. A light chain variable region which may comprise an amino acid sequence at least 80% identical to the amino acid sequence set forth in SEQ ID NO:27 or substantially identical to SEQ ID NO:27 and a heavy chain variable region which may comprise an amino acid sequence at least 80% identical to the amino acid sequence set forth in SEQ ID NO:32 or substantially identical to SEQ ID NO:32;
d. A light chain variable region which may comprise an amino acid sequence at least 80% identical to the amino acid sequence set forth in SEQ ID NO: 37 or substantially identical to SEQ ID NO:37 and a heavy chain variable region which may comprise an amino acid sequence at least 80% identical to the amino acid sequence set forth in SEQ ID NO:42 or substantially identical to SEQ ID NO:42;
e. A light chain variable region which may comprise an amino acid sequence at least 80% identical to the amino acid sequence set forth in SEQ ID NO:47 or substantially identical to SEQ ID NO:47 and a heavy chain variable region which may comprise an amino acid sequence at least 80% identical to the amino acid sequence set forth in SEQ ID NO:52 or substantially identical to SEQ ID NO:52;
f. A light chain variable region which may comprise an amino acid sequence at least 80% identical to the amino acid sequence set forth in SEQ ID NO:57 or substantially identical to SEQ ID NO:57 and a heavy chain variable region which may comprise an amino acid sequence at least 80% identical to the amino acid sequence set forth in SEQ ID NO:62 or substantially identical to SEQ ID NO:62;
g. A light chain variable region which may comprise an amino acid sequence at least 80% identical to the amino acid sequence set forth in SEQ ID NO:67 or substantially identical to SEQ ID NO:67 and a heavy chain variable region which may comprise an amino acid sequence at least 80% identical to the amino acid sequence set forth in SEQ ID NO: 77 or substantially identical to SEQ ID NO: 77, at least 80% identical to the amino acid set forth in SEQ ID NO:92 or substantially identical to SEQ ID NO:92 or at least 80% identical to the amino acid sequence set forth in SEQ ID NO:102 or substantially identical to SEQ ID NO:102, or;
h. A light chain variable region which may comprise an amino acid sequence at least 80% identical to the amino acid sequence set forth in SEQ ID NO:72 or substantially identical to SEQ ID NO: 72 and a heavy chain variable region which may comprise an amino acid sequence at least 80% identical to the amino acid sequence set forth in SEQ ID NO:77 or substantially identical to SEQ ID NO: 77 or at least 80% identical to the amino acid set forth in SEQ ID NO:92 or substantially identical to SEQ ID NO:92.

The light chain variable regions, light chains, heavy chain variable regions or heavy chains which may comprise an amino acid sequence at least 80% identical to that of given antibody may have CDRs that are identical to that antibody. In an embodiment of the present disclosure, the VL and VH sequences of the antibodies and antigen-binding fragments provided in the present disclosure may comprise a sequence substantially identical to the VL and VH sequences provided herein, or may comprise a sequence having at least 80%, at least 90%, or at least 95% sequence identity, wherein sequence variation is preferably outside the CDRs of the VL and VH sequences provided.

Moreover, the present disclosure specifically provides antigen-binding agent such as an antibody or an antigen-binding fragment thereof, CAR, BiTE and the like which specifically binds to EGFRvIII and which may comprise:
a. A light chain which may comprise an amino acid sequence at least 80% identical to the amino acid sequence set forth in SEQ ID NO:108 or substantially identical to SEQ ID NO:108 and a heavy chain which may comprise an amino acid sequence at least 80% identical to the amino acid sequence set forth in SEQ ID NO:107 or substantially identical to SEQ ID NO:107, or;
b. A light chain which may comprise an amino acid sequence at least 80% identical to the amino acid sequence set forth in SEQ ID NO: 110 or substantially identical to SEQ ID NO:110 and a heavy chain which may comprise an amino acid sequence at least 80% identical to the amino acid sequence set forth in SEQ ID NO:109 or substantially identical to SEQ ID NO:109.

The present disclosure particularly provides antigen-binding agent such as anti-EGFRvIII antibodies or an antigen-binding fragments thereof, CARs, BiTEs and the like which may comprise:
a. a CDRL1 having the amino acid sequence set forth in SEQ ID NO:38, a CDRL2 having the amino acid sequence set forth in SEQ ID NO:39 and a CDRL3 having the amino acid sequence set forth in SEQ ID NO:40, a CDRH1 having the amino acid sequence set forth in SEQ ID NO:43, a CDRH2 having the amino acid sequence set forth in SEQ ID NO:44 and a CDRH3 having the amino acid sequence set forth in SEQ ID NO:45;
b. A light chain variable region which may comprise an amino acid sequence at least 80% identical, at least 85% identical, at least 90% identical, at least 95% identical or identical to the amino acid sequence set forth in SEQ ID NO: 37 and a heavy chain variable region which may comprise an amino acid sequence at least 80% identical, at least 85% identical, at least 90% identical, at least 95% identical or identical to the amino acid sequence set forth in SEQ ID NO:42 or;
c. A light chain which may comprise an amino acid sequence at least 80% identical, at least 85% identical, at least 90% identical, at least 95% identical or identical to the amino acid sequence set forth in SEQ ID NO:108 and a heavy chain which may comprise an amino acid sequence at least 80% identical, at least 85% identical, at least 90% identical, at least 95% identical or identical to the amino acid sequence set forth in SEQ ID NO:107.

In accordance with the present disclosure, the antibody or antigen-binding fragment thereof of item b. or c. may have CDRs identical or substantially identical to those set forth in SEQ ID NOs:38, 39, 40, 43, 44 and 45.

In accordance with the present disclosure, the antibody or antigen-binding fragment thereof may have, for example, an affinity of less than 100 nM such as for example, an affinity of 50 nM or less, 20 nM or less, 10 nM or less, 5 nM or less, etc.

Exemplary embodiments of the present disclosure include antibodies or antigen-binding fragments thereof which may comprise a human IgG constant region. Antibodies or antigen-binding fragments of the present disclosure may comprise, for example and without limitation, a human IgG1 constant region or a human IgG2 constant region.

In an exemplary embodiment, the antigen-binding agents disclosed herein may comprise humanized framework regions.

In accordance with the present disclosure, the antibody or antigen-binding fragment thereof may be monoclonal antibody, a polyclonal antibody, a humanized antibody, a chimeric antibody, a human antibody, a single chain antibody, or a multispecific antibody (e.g., a bispecific antibody).

Bispecific antibodies or antigen-binding fragments thereof of the present disclosure includes those that may comprise a first arm that specifically binds to a first human EGFRvIII epitope and a second arm that specifically binds to a second (non-overlapping) human EGFRvIII epitope (e.g. a biparatopic antibody).

Additional embodiments of bispecific antibodies or antigen-binding fragments thereof of the present disclosure includes those that may comprise a first arm that specifically binds to a first human EGFRvIII epitope and a second arm that specifically binds to another antigen.

The bispecific antibody or antigen-binding fragment thereof of the present disclosure include bispecific immune cell engagers such as those comprising a first arm that specifically binds to human EGFRvIII and a second arm that specifically binds to CD3.

In accordance with the present disclosure, the antigen-binding fragment comprises, for example, a scFv, a Fab, a Fab' or a (Fab')$_2$.

In a further aspect, the present disclosure provides anti-EGFRvIII antibodies or antigen-binding fragments thereof which may be linked to a cargo molecule.

In accordance with the present disclosure, the cargo molecule may comprise a therapeutic moiety, such as for example, a cytotoxic agent, a cytostatic agent, an anti-cancer agent or a radiotherapeutic. In particular embodiments of the disclosure, the antibody drug conjugates may comprise a cytotoxic agent. Another particular embodiment of the disclosure relates to antibody drug conjugates comprising a radiotherapeutic.

In accordance with the present disclosure, the cargo molecule may comprise a detectable moiety.

The antibodies or antigen-binding fragments thereof of the present disclosure may be provided in the form of pharmaceutical compositions. The pharmaceutical composition may comprise, for example, a pharmaceutically acceptable carrier, diluent or excipient.

The present disclosure additionally provides nucleic acid molecules encoding a light chain variable region and/or a heavy chain variable region of the antibody or antigen-binding fragment thereof disclosed herein.

Exemplary embodiments of nucleic acid molecules of the present disclosure include:

a. a nucleic acid molecule which may comprise a sequence at least 80% identical to the nucleotide sequence set forth in SEQ ID NO: 11 and/or a nucleic acid molecule which may comprise a sequence at least 80% identical to the nucleotide sequence set forth in SEQ ID NO:16 or that encodes an amino acid sequence substantially identical to the amino acid sequence of SEQ ID NO: 7 and/or SEQ ID NO: 12;

b. a nucleic acid molecule which may comprise a sequence at least 80% identical to the nucleotide sequence set forth in SEQ ID NO:21 and/or a nucleic acid molecule which may comprise a sequence at least 80% identical to the nucleotide sequence set forth in SEQ ID NO:26 or that encodes an amino acid sequence substantially identical to the amino acid sequence of SEQ ID NO:17 and/or SEQ ID NO:22;

c. a nucleic acid molecule which may comprise a sequence at least 80% identical to the nucleotide sequence set forth in SEQ ID NO:31 and/or a nucleic acid molecule which may comprise a sequence at least 80% identical to the nucleotide sequence set forth in SEQ ID NO:36 or that encodes an amino acid sequence substantially identical to the amino acid sequence of SEQ ID NO:27 and/or SEQ ID NO:32 d. a nucleic acid molecule which may comprise a sequence at least 80% identical to the nucleotide sequence set forth in SEQ ID NO:41 and/or a nucleic acid molecule which may comprise a sequence at least 80% identical to the nucleotide sequence set forth in SEQ ID NO:46 or that encodes an amino acid sequence substantially identical to the sequence of SEQ ID NO:37 and/or SEQ ID NO:42;

e. a nucleic acid molecule which may comprise a sequence at least 80% identical to the nucleotide sequence set forth in SEQ ID NO:51 and/or a nucleic acid molecule which may comprise a sequence at least 80% identical to the nucleotide sequence set forth in SEQ ID NO:56 or that encodes an amino acid sequence substantially identical to the sequence of SEQ ID NO:47 and/or SEQ ID NO:52;

f. a nucleic acid molecule which may comprise a sequence at least 80% identical to the nucleotide sequence set forth in SEQ ID NO:61 and/or a nucleic acid molecule which may comprise a sequence at least 80% identical to the nucleotide sequence set forth in SEQ ID NO:66 or that encodes an amino acid sequence substantially identical to the sequence of SEQ ID NO:57 and/or SEQ ID NO:62;

g. a nucleic acid molecule which may comprise the nucleotide sequence a sequence at least 80% identical to set forth in SEQ ID NO:71 and/or a nucleic acid molecule which may comprise a sequence at least 80% identical to the nucleotide sequence set forth in SEQ ID NO:81 or that encodes an amino acid sequence substantially identical to the sequence of SEQ ID NO:67 and/or SEQ ID NO:77;

h. a nucleic acid molecule which may comprise the nucleotide sequence a sequence at least 80% identical to set forth in SEQ ID NO:76 and/or a nucleic acid molecule which may comprise a sequence at least 80% identical to the nucleotide sequence set forth in SEQ ID NO:81 or that encodes an amino acid sequence substantially identical to the sequence of SEQ ID NO:72 and/or SEQ ID NO:77;

i. a nucleic acid molecule which may comprise a sequence at least 80% identical to the nucleotide sequence set forth in SEQ ID NO:86 and/or a nucleic acid molecule which may comprise a sequence at least 80% identical to the nucleotide sequence set forth in SEQ ID NO:96 or that encodes an amino acid sequence substantially identical to the sequence of SEQ ID NO:82 and/or SEQ ID NO:92;

j. a nucleic acid molecule which may comprise a sequence at least 80% identical to the nucleotide sequence set forth in SEQ ID NO:91 and/or a nucleic acid molecule which may comprise a sequence at least 80% identical to the nucleotide sequence set forth in SEQ ID NO:96 or that encodes an amino acid sequence substantially identical to the sequence of SEQ ID NO:87 and/or SEQ ID NO:92, or;

k. a nucleic acid molecule which may comprise a sequence at least 80% identical to the nucleotide sequence set forth in SEQ ID NO:101 and/or a nucleic acid molecule which may comprise a sequence at least 80% identical to the nucleotide sequence set forth in SEQ ID NO:106 or that encodes an amino acid sequence substantially identical to the sequence of SEQ ID NO:97 and/or SEQ ID NO:102.

In a further aspect, the present disclosure provides a kit comprising at least one of the antibody or antigen-binding fragments thereof disclosed herein.

Additional aspects of the present disclosure relate to a vector or set of vectors which may comprise a nucleic acid encoding a light chain variable region and a heavy chain variable region of the antibody or antigen-binding fragment disclosed herein. The nucleic acids encoding the light chain variable region or the light chain and the heavy chain variable region or the heavy chain may be provided on the same vector or on separate vectors.

Further aspects of the present disclosure relate to isolated cells comprising the vector or set of vectors described herein. The isolated cells may be capable of expressing, assembling and/or secreting the antibody or antigen-binding fragment thereof.

Other aspects of the present disclosure relate to a kit comprising a first vial comprising a nucleic acid or vector encoding the light chain of the antibody or antigen-binding fragment thereof of the present disclosure and a second vial comprising a nucleic acid or vector encoding the heavy chain of the antibody or antigen-binding fragment thereof.

Additional aspects of the present disclosure relate to a method of treating cancer which comprises cells (e.g., tumor cells) expressing EGFRvIII. The method may comprise administering the antibody or antigen-binding fragment thereof described herein to subject in need. Antibody or antigen-binding fragments that are conjugated to a therapeutic moiety (ADCs) are particularly contemplated in methods of treatments.

The present disclosure additionally relates to the use of the antibody or antigen-binding fragment thereof described herein in the treatment of cancer.

The present disclosure further relates to the use of the antibody or antigen-binding fragment thereof described herein in the manufacture of a medicament for the treatment of cancer.

In accordance with the present disclosure, the antibody or antigen-binding fragment thereof may be used in combination with a chemotherapeutic.

In accordance with the present disclosure, the subject in need has or is suspected of having gliobastoma multiforme.

Further in accordance with the present disclosure, the subject in need has or is suspected of having a carcinoma.

Further aspects of the present disclosure relate to a method of detecting EGFRvIII. The method may comprise contacting a sample comprising or suspected of comprising EGFRvIII with the antibody or antigen-binding fragment described herein.

Additional aspects of the present disclosure relate to a method of making the antibody or antigen-binding fragment thereof of the present disclosure by culturing a cell comprising nucleic acids or vectors encoding the antibody or antigen-binding fragment so that the antibody or antigen-binding fragment thereof is produced. The antibody or antigen-binding fragment thereof may thus be isolated and/or purified.

The method may further comprise conjugating the antibody or antigen-binding fragment thereof with a cargo molecule, such as for example, a therapeutic moiety.

Further scope, applicability and advantages of the present disclosure will become apparent from the non-restrictive detailed description given hereinafter. It should be understood, however, that this detailed description, while indicating exemplary embodiments of the disclosure, is given by way of example only, with reference to the accompanying drawings.

BRIEF DESCRIPTION OF THE DRAWINGS

FIGS. 1A-1K represent histograms obtained using flow cytometry on supernatants of selected hybridomas on U87MG cell lines overexpressing wild type human EGFR (U87WT) or EGFRvIII (U87vIII) as indicated.

FIGS. 2A-2D represent dose-response binding curves obtained from flow cytometry data of purified monoclonal antibodies on U87MG glioblastoma cell lines overexpressing EGFR vIII (U87MG EGFR vIII) or wild type EGFR (U87MG EGFR wt) as indicated.

FIG. 3 is an alignment between the amino acid sequence of the extracellular domains of wild type human EGFR (SEQ ID NO: 3) and EGFRvIII (SEQ ID NO: 5). Identical amino acids are underlined.

FIGS. 4A and 4B show the results of anti-hEGFRvIII mAbs binding properties to various fragments of the EGFRvIII displayed on yeast cells (+++ represents 95%+/−5% positive yeast cells which is characterized by positive antibody binding with high affinity; ++ represents 70%+/−20% positive yeast cells which is characterized by positive antibody binding with medium affinity; + represents 30%+/−20% positive yeast cells which is characterized by positive antibody binding with low affinity; (+) represents 5-9% positive yeast cells which is characterized by positive antibody binding with very low affinity; −/+ represents less than 5% positive yeast cells which is characterized by ambiguous antibody binding, − represents 0% positive yeast cells which is characterized by no binding; nt=not tested.

FIG. 5A is an alignment between the amino acid sequence of 11B1 (SEQ ID NO: 77), 11C8 (SEQ ID NO:92) and 11H3 (SEQ ID NO:102) heavy chain variable regions where "*" means that the residues in that column are identical in all sequences in the alignment, ":" means that conserved substitutions have been observed (Sievers F. et al., Molecular Systems Biology, 11 Oct. 2011, 7:539).

FIG. 5B is an alignment between the amino acid sequence of 4B3 (SEQ ID NO:27) and 5D8 (SEQ ID NO:47) light chain variable regions, where "*" means that the residues in that column are identical in all sequences in the alignment, ":" means that conserved substitutions have been observed and "." means that semi-conserved substitutions are observed.

FIG. 5C is an alignment between the amino acid sequence of 4B3 (SEQ ID NO:32) and 5D8 (SEQ ID NO:52) heavy chain variable regions.

FIG. 5D is an alignment between the amino acid sequence of 4B3 (SEQ ID:27), 5D8 (SEQ ID:47) and 9C9 (SEQ ID:57) light chain variable regions where "*" means that the residues in that column are identical in all sequences in the alignment, ":" means that conserved substitutions have been observed and "." means that semi-conserved substitutions are observed.

FIGS. 6A-F show results of the effect of anti-EGFRvIII antibodies as DM1- (A, B and C) or MMAE-conjugates (D, E and F) on cell viability in glioblastoma cells expressing wild type EGFR (U87 wt) or EGFRvIII (U87 EGFRvIII or DKMG EGFRvIII) as indicated.

FIG. 8A is a graph showing tumor growth inhibition in U87MG EGFRvIII tumor-bearing mice treated twice (day 0 and 4) with selected DM1-ADCs at 3 mg/kg based on DAR=3. Tumor volumes (mm$^3$) were recorded every three days. Each data point represents mean±SEM (n=12).

FIG. 8B is a graph showing tumor growth inhibition in U87MG EGFRvIII tumor-bearing mice treated twice (day 0 and 4) with selected MMAE-ADCs at 3 mg/kg based on DAR=3. Tumor volumes (mm$^3$) were recorded every three days. Each data point represents mean±SEM (n=12).

DETAILED DESCRIPTION

Figure 7:
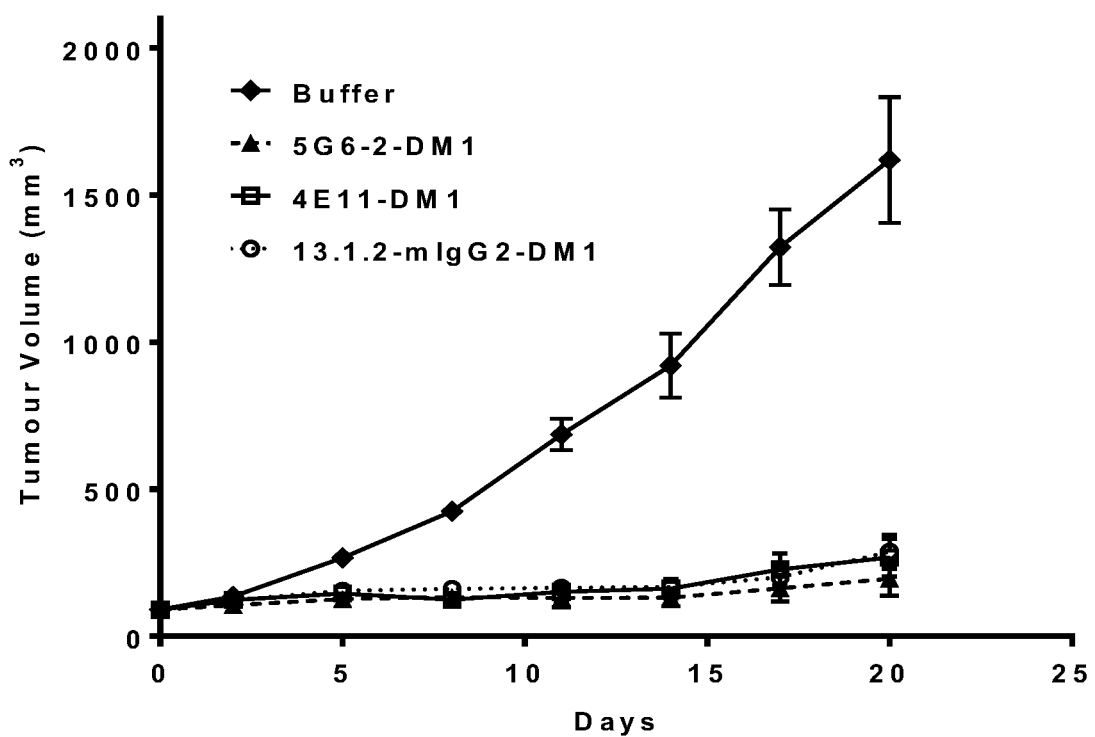
FIG. 7 is a graph showing tumor growth curve in U87MG EGFRvIII tumor-bearing mice treated twice (day 0 and 4) with selected ADCs at 5 mg/kg based on DAR=3. Tumor volumes (mm$^3$) were recorded every three days. Each data point represents mean±SEM, (n=8).
Figure 9:
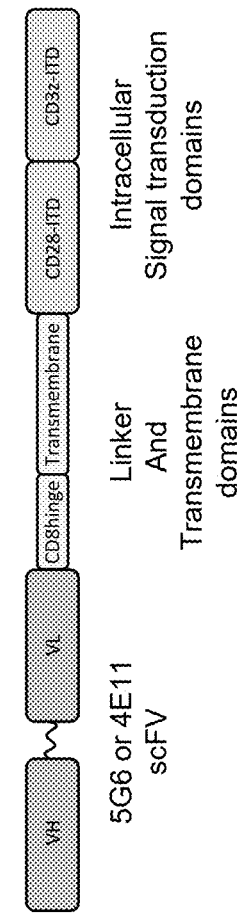
FIG. 9: Schematic illustrating the synthetic assembly and sequence of the 5G6 or 4E11 antigen-binding domain in a synthetic chimeric antigen receptor (CAR) construct.

As used herein the term "EGFRvIII" refers to epidermal growth factor receptor variant III.

The terms "EGFRvIII" and "vIII" are used interchangeably.

As used herein the term "EGFR" refers to human epidermal growth factor receptor. The term "wt EGFR", "WT EGFR", "EGFR WT" or "EGFR wt" are used interchangeably and refers to wild type EGFR.

The use of the terms "a" and "an" and "the" and similar referents in the context of describing the disclosure (especially in the context of the claims) are to be construed to cover both the singular and the plural, unless otherwise indicated herein or clearly contradicted by context.

Unless specifically stated or obvious from context, as used herein the term "or" is understood to be inclusive and covers both "or" and "and".

The term "and/or" where used herein is to be taken as specific disclosure of each of the specified features or components with or without the other.

The terms "comprising", "having", "including", and "containing" are to be construed as open-ended terms (i.e., meaning "including, but not limited to") unless otherwise noted. The term "consisting of" is to be construed as close-ended.

As used herein the term "native" with respect to a protein such as EGFRvIII or EGFR refers to the natural conformation of the protein and includes proteins that are properly folded and/or functional.

As used herein the term "denatured" with respect to a protein such EGFRvIII or EGFR refers to a protein that has lost its natural conformation and may entail for example, a loss in the tertiary and secondary structure.

As used herein the expression "a peptide comprising or consisting of an EGFRvIII fragment" means that the peptide may comprise a portion other than the EGFRvIII fragment or that it consists in the EGFRvIII fragment.

As used herein the term "binds to an epitope comprising amino acid residues" means that the amino acid residue is either part of the epitope or that it is necessary for binding of the antibody.

As used herein the term "fails to bind to" a peptide or protein means that the antibody or antigen binding fragment a) does not bind significantly to the peptide or protein when expressed recombinantly or in cells, b) no detectable binding is observed, c) has similar binding property as a negative control antibody, d) does not binds specifically or e) binds with a value between 0% and 15% as determined by the flow cytometry experiments carried out in Example 10.

As used herein the term "autologous" refers to material derived from the same individual.

As used herein the term "antigen-binding domain" refers to the domain of an antibody or of an antigen-binding fragment which allows specific binding to an antigen.

As used herein, the term "antibody" encompasses monoclonal antibody, polyclonal antibody, humanized antibody, chimeric antibody, human antibody, single domain antibody (such as a VHH, VH, VL, nanobody, or any camelid or llama single domain antibody), multispecific antibody (e.g., bispecific antibodies) etc. The term "antibody" encompasses molecules that have a format similar to those occurring in nature (e.g., human IgGs, etc.). The term "antibody", also referred to in the art as "immunoglobulin" (Ig), as used herein refers to a protein constructed from paired heavy and light polypeptide chains; various Ig isotypes exist, including IgA, IgD, IgE, IgG, and IgM. When an antibody is correctly folded, each chain folds into a number of distinct globular domains joined by more linear polypeptide sequences. For example, the immunoglobulin light chain folds into a variable (VL) and a constant (CL) domain, while the heavy chain folds into a variable (VH) and three constant (CH1, CH2, CH3) domains. Interaction of the heavy and light chain variable domains (VH and VL) results in the formation of an antigen-binding region (Fv). Each domain has a well-established structure familiar to those of skill in the art.

Typically, an antibody is constituted from the pairing of two light chains and two heavy chains. Different antibody isotypes exist, including IgA, IgD, IgE, IgG and IgM. Human IgGs are further divided into four distinct subgroups namely; IgG1, IgG2, IgG3 and IgG4. Therapeutic antibodies are generally developed as IgG1 or IgG2.

In an exemplary embodiment, the antibody or antigen-binding fragment of the present disclosure may comprise, for example, a human IgG1 constant region or a fragment thereof. In another exemplary embodiment, the antibody or antigen-binding fragment of the present disclosure may comprise, for example, a human IgG2 constant region or a fragment thereof. Constant regions of other antibody subtypes are also contemplated.

The light chain and heavy chain of human antibody IgG isotypes each comprise a variable region having 3 hypervariable regions named complementarity determining regions (CDRs). The light chain CDRs are identified herein as CDRL1 or L1, CDRL2 or L2 and CDRL3 or L3. The heavy chain CDRs are identified herein as CDRH1 or H1, CDRH2 or H2 and CDRH3 or H3. Complementarity determining regions are flanked by framework regions (FR) in the order: FR1-CDR1-FR2-CDR2-FR3-CDR3-FR4. The light and heavy chain variable regions are responsible for binding the target antigen and can therefore show significant sequence diversity between antibodies. The constant regions show less sequence diversity and are responsible for binding a number of natural proteins to elicit important biochemical events. The variable region of an antibody contains the antigen-binding determinants of the molecule, and thus determines the specificity of an antibody for its target antigen. The majority of sequence variability occurs in the CDRs which combine to form the antigen-binding site and contribute to binding and recognition of an antigenic determinant. The framework regions may play a role in the proper positioning and alignment in three dimensions of the CDRs for optimal antigen-binding. The specificity and affinity of an antibody for its antigen is determined by the structure of the hypervariable regions, as well as their size, shape, and chemistry of the surface they present to the antigen. Various schemes exist for identification of the regions of hypervariability, the two most common being those of Kabat and of Chothia and Lesk. Kabat et al (1991) define the "complementarity-determining regions" (CDR) based on sequence variability at the antigen-binding regions of the VH and VL domains. Chothia and Lesk (1987) define the "hypervariable loops" (H or L) based on the location of the structural loop regions in the VH and VL domains. These individual schemes define CDR and hypervariable loop regions that are adjacent or overlapping, those of skill in the antibody art often utilize the terms "CDR" and "hypervariable loop" interchangeably, and they may be so used herein. The CDR/loops are identified herein according to the Kabat scheme.

Recombinant DNA technology now allows the design of various antibody format such as single chain antibodies (e.g., single domain), diabody, minibody, nanobody and the like which are encompassed by the present disclosure.

An "antigen-binding fragment" as referred to herein may include any suitable antigen-binding fragment known in the art. The antigen-binding fragment may be a naturally-occurring fragment or may be obtained by manipulation of a naturally-occurring antibody or by using recombinant methods. For example, an antibody fragment may include, but is not limited to a Fv, single-chain Fv (scFv; a molecule consisting of VL and VH connected with a peptide linker), Fab, F(ab')2, single-domain antibody (sdAb; a fragment composed of a single VL or VH), and multivalent presentations of any of these. Antibody fragments such as those just described may require linker sequences, disulfide bonds, or other type of covalent bond to link different portions of the fragments; those of skill in the art will be familiar with the requirements of the different types of fragments and various approaches and various approaches for their construction.

Antigen-binding fragments thereof of the present disclosure encompass molecules having an antigen-binding site comprising amino acid residues that confer specific binding to an antigen (e.g., one or more CDRs).

Exemplary embodiments of antigen-binding fragments disclosure thus includes without limitation (i) a Fab fragment, a monovalent fragment consisting of the $V_L$, $V_H$, $C_L$ and $C_{H1}$ domains; (ii) a F(ab')$_2$ fragment, a bivalent fragment comprising two Fab fragments linked by a disulfide bridge at the hinge region; (iii) a Fd fragment consisting of the $V_H$ and $C_{H1}$ domains; (iv) a Fv fragment consisting of the $V_L$ and $V_H$ domains of a single arm of an antibody, (v) a dAb fragment (Ward et al., (1989) Nature 341:544-546), which consists of a $V_H$ domain; and (vi) an isolated complementarity determining region (CDR), e.g., $V_H$ CDR3.

Specific embodiments of antigen-binding fragments may include for example, a scFv, a Fab, a Fab' or a (Fab')$_2$.

The term "humanized antibody" encompasses fully humanized antibody (i.e., frameworks are 100% humanized) and partially humanized antibody (e.g., at least one variable region contains one or more amino acids from a human antibody, while other amino acids are amino acids of a non-human parent antibody). Typically, a "humanized antibody" contains CDRs of a non-human parent antibody (e.g., mouse, rat, rabbit, non-human primate, etc.) and frameworks that are identical to those of a natural human antibody or of a human antibody consensus. In such instance, those "humanized antibodies" are characterized as fully humanized. A "humanized antibody" may also contain one or more amino acid substitutions that have no correspondence to those of the human antibody or human antibody consensus. Such substitutions include, for example, back-mutations (e.g., re-introduction of non-human amino acids) that may preserve the antibody characteristics (e.g., affinity, specificity etc.). Such substitutions are usually in the framework region. A "humanized antibody" usually also comprise a constant region (Fc) which is typically that of a human antibody. Typically, the constant region of a "humanized antibody" is identical to that of a human antibody. A humanized antibody may be obtained by CDR grafting (Tsurushita et al, 2005; Jones et al, 1986; Tempest et al, 1991; Riechmann et al, 1988; Queen et al, 1989). Such antibody is considered as fully humanized.

The term "chimeric antibody" refers to an antibody having a constant region from an origin distinct from that of the parent antibody. The term "chimeric antibody" encompasses antibodies having a human constant region. Typically, a "chimeric antibody" is composed of variable regions originating from a mouse antibody and of a human constant region.

The term "hybrid antibody" refers to an antibody comprising one of its heavy or light chain variable region (its heavy or light chain) from a certain type of antibody (e.g., humanized) while the other of the heavy or light chain variable region (the heavy or light chain) is from another type (e.g., murine, chimeric).

Antibodies and/or antigen-binding fragments of the present disclosure may originate, for example, from a mouse, a rat or any other mammal or from other sources such as through recombinant DNA technologies. Antibodies or antigen-binding fragment of the present disclosure may include for example, a synthetic antibody, a non-naturally occurring antibody, an antibody obtained following immunization of a non-human mammal etc.

Antibodies or antigen-binding fragments thereof of the present disclosure may be isolated and/or substantially purified.

Variant Antigen-Binding Agent

The present disclosure also encompasses variants of the antigen-binding agents described herein.

More particularly, the present disclosure encompasses variants of the antibodies or antigen-binding fragments, CARs and BiTEs described herein. Variants (e.g., antibodies or antigen-binding fragments, CARs, BiTEs and the like) include those having a variation in their amino acid sequence, e.g., in one or more CDRs, in one or more framework regions and/or in the constant region. Variants (e.g., antibodies or antigen-binding fragments, CARs, BiTEs and the like) included in the present disclosure are those having, for example, similar or improved binding affinity in comparison with the original antibody or antigen-binding fragment.

Variants encompassed by the present disclosure are those which may comprise an insertion, a deletion or an amino acid substitution (conservative or non-conservative). These variants may have at least one amino acid residue in its amino acid sequence removed and a different residue inserted in its place.

More particularly, variants encompassed by the present disclosure include those having a light chain variable region and/or a heavy chain variable region having at least 80% sequence identity with the light chain variable region and/or a heavy chain variable region of the antibody or antigen-binding variant disclosed herein. The CDRs of the variant antibody may be identical to those of the antibody or antigen-binding fragments disclosed herein.

Also encompassed by the present disclosure are variants having CDRs amino acid residues that are identical and framework regions that are at least 80% sequence identical to those of the antibody or antigen-binding fragment disclosed herein.

Conservative substitutions may be made by exchanging an amino acid residue (of a CDR, variable chain, framework region or constant region, etc.) from one of the groups listed below (group 1 to 6) for another amino acid of the same group.

Other exemplary embodiments of conservative substitutions are shown in the table below.

(group 1) hydrophobic: norleucine, methionine (Met), Alanine (Ala), Valine (Val), Leucine (Leu), Isoleucine (Ile)

(group 2) neutral hydrophilic: Cysteine (Cys), Serine (Ser), Threonine (Thr)

(group 3) acidic: Aspartic acid (Asp), Glutamic acid (Glu)

(group 4) basic: Asparagine (Asn), Glutamine (Gln), Histidine (His), Lysine (Lys), Arginine (Arg)

(group 5) residues that influence chain orientation: Glycine (Gly), Proline (Pro); and (group 6) aromatic: Tryptophan (Trp), Tyrosine (Tyr), Phenylalanine (Phe)

Non-conservative substitutions will entail exchanging a member of one of these groups for another.

| Original residue | Exemplary substitution | Conservative substitution |
|---|---|---|
| Ala (A) | Val, Leu, Ile | Val |
| Arg (R) | Lys, Gln, Asn | Lys |
| Asn (N) | Gln, His, Lys, Arg, Asp | Gln |
| Asp (D) | Glu, Asn | Glu |
| Cys (C) | Ser, Ala | Ser |
| Gln (Q) | Asn; Glu | Asn |
| Glu (E) | Asp, Gln | Asp |
| Gly (G) | Ala | Ala |
| His (H) | Asn, Gln, Lys, Arg, | Arg |
| Ile (I) | Leu, Val, Met, Ala, Phe norleucine | Leu |
| Leu (L) | Norleucine, Ile, Val, Met, Ala, Phe | Ile |
| Lys (K) | Arg, Gln, Asn | Arg |
| Met (M) | Leu, Phe, Ile | Leu |
| Phe (F) | Leu, Val, Ile, Ala, Tyr | Tyr |
| Pro (P) | Ala | Ala |
| Ser (S) | Thr | Thr |
| Thr (T) | Ser | Ser |
| Trp (W) | Tyr, Phe | Tyr |
| Tyr (Y) | Trp, Phe, Thr, Ser | Phe |
| Val (V) | Ile, Leu, Met, Phe, Ala, norleucine | Leu |

Percent identity is indicative of amino acids which are identical in comparison with the original peptide and which may occupy the same or similar position. Percent similarity will be indicative of amino acids which are identical and those which are replaced with conservative amino acid substitution in comparison with the original peptide at the same or similar position.

Generally, the degree of similarity and identity between variable chains has been determined herein using the Blast2 sequence program (Tatiana A. Tatusova, Thomas L. Madden (1999), "Blast 2 sequences—a new tool for comparing protein and nucleotide sequences", FEMS Microbiol Lett. 174:247-250) using default settings, i.e., blastp program, BLOSUM62 matrix (open gap 11 and extension gap penalty 1; gapx dropoff 50, expect 10.0, word size 3) and activated filters.

A "substantially identical" sequence may comprise one or more conservative amino acid mutations, or amino acid deletions that allow for biologically functional activity to be maintained. It is known in the art that one or more conservative amino acid mutations to a reference sequence may yield a variant peptide with no substantial change in physiological, chemical, physico-chemical or functional properties compared to the reference sequence; in such a case, the reference and variant sequences would be considered "substantially identical" polypeptides.

Variants of the present disclosure therefore comprise those which may have at least 70%, 75%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity with an original sequence or a portion of an original sequence.

Nucleic Acids, Vectors and Cells

Antibodies are usually made in cells allowing expression of the light chain and heavy chain expressed from a vector(s) comprising a nucleic acid sequence encoding the light chain and/or heavy chain.

The present disclosure therefore encompasses nucleic acids capable of encoding any of the CDRs, light chain variable regions, heavy chain variable regions, light chains, heavy chains described herein.

As used herein, the term "nucleic acid' refers to RNA, DNA, cDNA and the like.

Due to the inherent degeneracy of the genetic code, other nucleic acid sequences that encode the same amino acid sequence may be produced and used to express the antibody or antigen-binding fragments thereof of the present disclosure. The nucleotide sequences may be engineered using methods generally known in the art in order to alter the nucleotide sequences for a variety of purposes including, but not limited to, modification of the cloning, processing, and/or expression of the gene product. DNA shuffling by random fragmentation and PCR reassembly of gene fragments and synthetic oligonucleotides may be used to engineer the nucleotide sequences. For example, oligonucleotide-mediated site-directed mutagenesis may be used to introduce mutations that create new restriction sites, alter glycosylation patterns, change codon preference, produce splice variants, and so forth.

In yet another aspect, the present disclosure relates to a vector comprising the nucleic acids described herein.

In accordance with the present disclosure, the vector may be an expression vector.

The expression vector usually contains the elements for transcriptional and translational control of the inserted coding sequence in a particular host. These elements may include regulatory sequences, such as enhancers, constitutive and inducible promoters, and 5' and 3' un-translated regions. Methods that are well known to those skilled in the art may be used to construct such expression vectors. These methods include in vitro recombinant DNA techniques, synthetic techniques, and in vivo genetic recombination.

The light chain variable region and the heavy chain variable region of the antibody or antigen-binding fragment thereof may be encoded by the same nucleic acid molecule (e.g., same vector) or by separate molecules (e.g., separate vectors).

The present disclosure therefore provides a set of vectors, where one of the vectors is capable of expressing the light chain or light chain variable region and the other vector is capable of expressing the heavy chain or heavy chain variable region.

Additional aspects of the disclosure relate to kits which comprising a first vial containing a nucleic acid or vector encoding the light chain or the light chain variable region of the antibody or antigen-binding fragment thereof of the present disclosure and second vial containing a nucleic acid or vector encoding the heavy chain or the heavy chain variable region of the antibody or antigen-binding fragment thereof.

In another aspect the present disclosure relates to an isolated cell which may comprise the nucleic acids, vectors, antibodies or antigen-binding fragment described herein.

The isolated cell may comprise a nucleic acid encoding a light chain variable region and a nucleic acid encoding a heavy chain variable region either on separate vectors or on the same vector. The isolated cell may also comprise a nucleic acid encoding a light chain and a nucleic acid encoding a heavy chain either on separate vectors or on the same vector.

In accordance with the present disclosure, the cell may be capable of expressing, assembling and/or secreting an antibody or antigen-binding fragment thereof.

Also, in accordance with the present disclosure, the cell may comprise and/or may express the antibody described herein.

Further in accordance with the disclosure, the cell may comprise a nucleic acid encoding a light chain variable region and a nucleic acid encoding a heavy chain variable region.

Production of the Antibodies or Antigen-Binding Fragments in Cells

The antibodies that are disclosed herein can be made by a variety of methods familiar to those skilled in the art including hybridoma methodology or recombinant DNA methods.

Conventional hybridoma technology entails immunizing a rodent with an antigen, isolating and fusing spleen cells with myeloma cells lacking HGPRT expression and selecting hybrid cells by hypoxanthine, aminopterin and thymine (HAT) containing media. Hybridoma are screened to identify those producing antibodies that are specific for a given antigen. The hybridoma is expanded and cloned. The nucleic acid sequence of the light chain and heavy chain variable regions is obtained by standard sequencing methodology and expression vectors comprising the light chain and heavy chain nucleic acid sequence of an antibody are generated.

For recombinant expression of antibodies, host cells are transformed with a vector or a set of vectors comprising the nucleic acid sequence of the light chain and heavy chain of the antibody or antigen-binding fragment thereof (on the same vector or separate vectors).

For long-term production of recombinant proteins in mammalian systems, cell lines stably expressing proteins may be obtained. For example, nucleotide sequences able to encode any one of a light and heavy immunoglobulin chains described herein may be transformed into cell lines using expression vectors that may contain viral origins of replication and/or endogenous expression elements and a selectable or visible marker gene on the same or on a separate vector. The disclosure is not to be limited by the vector or host cell employed. In certain embodiments of the present disclosure, the nucleotide sequences able to encode any one of a light and heavy immunoglobulin chains described herein may each be ligated into a separate expression vector and each chain expressed separately. In another embodiment, both the light and heavy chains able to encode any one of a light and heavy immunoglobulin chains described herein may be ligated into a single expression vector and expressed simultaneously.

Immunological methods for detecting and measuring the expression of polypeptides are known in the art. Examples of such techniques include enzyme-linked immunosorbent assays (ELISAs), radioimmunoassays (RIAs), fluorescence activated cell sorting (FACS) or flow cytometry. Those of skill in the art may readily adapt these methodologies to the present disclosure.

Different host cells that have specific cellular machinery and characteristic mechanisms for post-translational activities (e.g., Chinese Hamster Ovary (CHO), HeLa, MDCK, HEK293, and WI-38) are available commercially and from the American Type Culture Collection (ATCC) and may be chosen to ensure the correct modification and processing of the expressed polypeptide.

Typically, antibody or antigen-binding fragments thereof are produced in CHO cells, NS0 murine myeloma cells, PER.C6® human cells.

The present disclosure relates to a method of making an antibody or an antigen-binding fragment thereof comprising expressing the light chain and heavy chain of the antibody or antigen-binding fragment of the present disclosure in cultured cells.

The method may further comprise purifying or isolating the antibody or antigen-binding fragment of the present disclosure. The method may also further comprise conjugating the antibody or antigen-binding fragment of the present disclosure to a cargo molecule such as a therapeutic or detectable moiety.

Antibody Conjugates

The antibody or antigen-binding fragment thereof of the present disclosure may be linked to a cargo molecule. Exemplary embodiments of cargo molecules include without limitation a therapeutic moiety a detectable moiety, a polypeptide (e.g., peptide, enzyme, growth factor), a polynucleotide, liposome, nanoparticle, nanowire, nanotube, quantum dot, etc.

More particularly, the antibody or antigen-binding fragment thereof of the present disclosure may be conjugated with a therapeutic moiety. The therapeutic moiety is usually attached to the antibody via a linker which may be cleavable or non-cleavable.

Included amongst the list of therapeutic moieties are cytotoxic agents, cytostatic agents, anti-cancer agents (chemotherapeutics) and radiotherapeutics (e.g. radioisotopes).

Exemplary embodiments of cytotoxic agents include, without limitation, alpha-amanitine, cryptophycin, duocarmazine, duocarmycin, chalicheamicin, deruxtecan, pyrrolobenzodiazepine (PBD), dolastatins, *Pseudomonas* endotoxin, ricin, auristatins (e.g., monomethyl auristatin E, monomethyl auristatin F), maytansinoids (e.g., mertansine), pyrrolobenzodiazepine (PBD) and analogues.

Exemplary embodiments of radiotherapeutics include without limitation, Yttrium-90, Scandium-47, Rhenium-186, Iodine-131, Iodine-125, and many others recognized by those skilled in the art (e.g., lutetium (e.g., $Lu^{17}$), bismuth (e.g., $Bi^{21}$), copper (e.g., $Cu^{61}$), astatine-211 (211At), actinium 225 (Ac-225), etc).

Exemplary embodiments of chemotherapeutics include, without limitation, 5-fluorouracil, adriamycin, irinotecan, taxanes, carboplatin, cisplatin, etc.

The antibody or antigen-binding fragment of the present disclosure may also be conjugated with a detectable moiety (i.e., for detection or diagnostic purposes).

A "detectable moiety" comprises agents detectable by spectroscopic, photochemical, biochemical, immunochemical, chemical and/or other physical means. A detectable moiety may be coupled either directly and/or indirectly (for example via a linkage, such as, without limitation, a DOTA or NHS linkage) to antibodies and antigen-binding fragments thereof of the present disclosure using methods well known in the art. A wide variety of detectable moieties may be used, with the choice depending on the sensitivity required, ease of conjugation, stability requirements and available instrumentation. A suitable detectable moiety include, but is not limited to, a fluorescent label, a radioactive label (for example, without limitation, $^{125}I$, $In^{111}$, $Tc^{99}$, $I^{131}$ and including positron emitting isotopes for PET scanner etc.), a nuclear magnetic resonance active label, a luminescent label, a chemiluminescent label, a chromophore label, an enzyme label (for example and without limitation horseradish peroxidase, alkaline phosphatase, etc.), quantum dots and/or a nanoparticle. Detectable moiety may cause and/or produce a detectable signal thereby allowing for a signal from the detectable moiety to be detected.

Chimeric Antigen Receptors and Other Immunotherapeutics

The sequence of the antibodies and antigen-binding fragments thereof of the present disclosure may be used to generate chimeric antigen receptors (CARs), bi-specific T-cell engagers (BiTE) or other immunotherapeutics such as for example and without limitations, bispecific killer cell engagers (BiKE), trispecific killer cell engagers (TriKE) or any immunotherapeutic compounds.

The CARs of the present disclosure may comprise for example, a) an antigen-binding domain of an antibody that specifically binds to epidermal growth factor receptor variant III (EGFRvIII), b) optionally a spacer, c) a transmembrane domain, d) optionally at least one costimulatory domain, and e) at least one intracellular signaling domain.

Chimeric antigen receptors may also comprise a hinge region or spacer which connects the antigen-binding domain and the transmembrane domain. The spacer may allow a better presentation of the antigen-binding domain at the surface of the cell.

In accordance with the present disclosure, the spacer may be optional. Alternatively, the spacer may comprise for example, between 1 to 200 amino acid residues, typically between 10 to 100 amino acid residues and more typically between 25 to 50 amino acid residues. The spacer may originate from a human protein.

In accordance with the present disclosure, the spacer or hinge region may be, for example and without limitation a CD8 hinge (e.g., mouse, human CD8) or an IgG hinge (a human immunoglobulin hinge) or combination thereof.

Exemplary embodiments of transmembrane domains include, for example and without limitation, the alpha, beta or CD3zeta chain of the T-cell receptor complex, CD28, CD27, CD3 epsilon, CD45, CD4, CD5, CD8, CD9, CD16, CD22, CD33, CD37, CD64, CD80, CD86, CD134, CD137, CD154.

In some embodiments, the transmembrane domain may include at least the transmembrane region(s) of, e.g., KIRDS2, OX40, CD2, CD27, LFA-1 (CD 11a, CD18), ICOS (CD278), 4-1BB (CD137), GITR, CD40, BAFFR, HVEM (LIGHTR), SLAMF7, NKp80 (KLRF1), NKp44, NKp30, NKp46, CD 160, CD 19, IL2R beta, IL2R gamma, IL7R a, ITGA1, VLA1, CD49a, ITGA4, IA4, CD49D, ITGA6, VLA-6, CD49f, ITGAD, CD1d, ITGAE, CD103, ITGAL, CD11a, LFA-1, ITGAM, CD11b, ITGAX, CD11c, ITGB 1, CD29, ITGB2, CD18, LFA-1, ITGB7, TNFR2, DNAM1 (CD226), SLAMF4 (CD244, 2B4), CD84, CD96 (Tactile), CEACAM1, CRT AM, Ly9 (CD229), CD160 (BY55), PSGL1, CD100 (SEMA4D), SLAMF6 (NTB-A, Ly108), SLAM (SLAMF1, CD150, IPO-3), BLAME (SLAMF8), SELPLG (CD162), LTBR, PAG/Cbp, NKG2D, NKG2C.

A particular embodiment of transmembrane domain is the transmembrane domain of CD28.

The costimulatory domain may be, for example and without limitation, from CD28, CD27, 4-1BB, OX40, CD7, B7-1 (CD80), B7-2 (CD86), CD30, CD40, PD-1, ICOS, lymphocyte function-associated antigen-1 (LFA-1), CD2, LIGHT, NKG2C, B7-H3, a ligand that specifically binds with CD83, CDS, ICAM-1, GITR, BAFFR, HVEM (LIGHTR), SLAMF7, NKp80 (KLRF1), CD160, CD19, CD4, CD8alpha, CD8beta, IL2R beta, IL2R gamma, IL7R alpha, ITGA4, VLA1, CD49a, ITGA4, IA4, CD49D, ITGA6, VLA-6, CD49f, ITGAD, CD1d, ITGAE, CD103, ITGAL, CD11a, LFA-1, ITGAM, CD11b, ITGAX, CD11c, ITGB1, CD29, ITGB2, CD18, LFA-1, ITGB7, TNFR2, TRANCE/RANKL, DNAM1 (CD226), SLAMF4 (CD244, 2B4), CD84, CD96 (Tactile), CEACAM1, CRTAM, Ly9 (CD229), CD160 (BY55), PSGL1, CD100 (SEMA4D), CD69, SLAMF6 (NTB-A, Ly108), SLAM (SLAMF1, CD150, IPO-3), BLAME (SLAMF8), SELPLG (CD162), LTBR, LAT, GADS, SLP-76, PAG/Cbp, NKp44, NKp30, NKp46, and NKG2D or a combination thereof.

The intracellular signaling domain may be, for example and without limitation, from CD3 zeta, CD3 gamma, CD3 delta, CD3 epsilon, common FcR gamma (FCERIG), FcR beta (Fc Epsilon Rib), CD79a, CD79b, Fcgamma RIIa, DAP10, or DAP12.

In order to be targeted to the secretory pathway, the chimeric antigen receptor may also comprise a signal peptide such as, for example, a signal peptide of CD28 or any other signal peptide suitable for immune cells. The signal peptide is cleaved (cleavable).

BiTE, BiKE and TriKE molecules may comprise an antigen-binding domain (e.g. scFv) that specifically binds to EGFRvIII and another domain (scFv) that binds to specific immune cells including but not limited to a T-cell specific molecule (e.g., CD3) and NK-cell surface molecules (e.g. CD16). These generally comprise multiple scFvs connected in tandem by flexible linkers.

Pharmaceutical Compositions

The present disclosure also relates to pharmaceutical compositions comprising the antibodies or antigen-binding fragments (conjugated or not) disclosed herein.

In addition to the active ingredients, a pharmaceutical composition may contain pharmaceutically acceptable carriers comprising without limitation, water, PBS, salt solutions, gelatins, oils, alcohols, and other excipients and auxiliaries that facilitate processing of the active compounds into preparations that may be used pharmaceutically. In other instances, such preparations may be sterilized.

As used herein, "pharmaceutical composition" means therapeutically effective amounts of the agent together with pharmaceutically acceptable diluents, preservatives, solubilizers, emulsifiers, adjuvant and/or carriers. A "therapeutically effective amount" as used herein refers to that amount which provides a therapeutic effect for a given condition and administration regimen. Such compositions are liquids or lyophilized or otherwise dried formulations and include diluents of various buffer content (e.g., Tris-HCl., acetate, phosphate), pH and ionic strength, additives such as albumin or gelatin to prevent absorption to surfaces, detergents (e.g., Tween 20, Tween 80, Pluronic F68, bile acid salts). Solubilizing agents (e.g., glycerol, polyethylene glycerol), antioxidants (e.g., ascorbic acid, sodium metabisulfite), preservatives (e.g., thimerosal, benzyl alcohol, parabens), bulking substances or tonicity modifiers (e.g., lactose, mannitol), covalent attachment of polymers such as polyethylene glycol to the protein, complexation with metal ions, or incorporation of the material into or onto particulate preparations of polymeric compounds such as polylactic acid, polyglycolic acid, hydrogels, etc., or onto liposomes, microemulsions, micelles, unilamellar or multilamellar vesicles, erythrocyte ghosts, or spheroplasts. Such compositions will influence the physical state, solubility, stability, rate of in vivo release, and rate of in vivo clearance. Controlled or sustained release compositions include formulation in lipophilic depots (e.g., fatty acids, waxes, oils). Also comprehended by the disclosure are particulate compositions coated with polymers (e.g., poloxamers or poloxamines). Other embodiments of the compositions of the disclosure incorporate particulate forms protective coatings, protease inhibitors or permeation enhancers for various routes of administration, including parenteral, pulmonary, nasal, oral, vaginal, rectal routes. In one embodiment the pharmaceutical composition is administered parenterally, paracancerally, transmucosally, transdermally, intramuscularly, intravenously, intradermally, subcutaneously, intraperitonealy, intraventricularly, intracranially and intratumorally.

Further, as used herein "pharmaceutically acceptable carrier" or "pharmaceutical carrier" are known in the art and include, but are not limited to, 0.01-0.1 M or 0.05 M phosphate buffer or 0.8% saline. Additionally, such pharmaceutically acceptable carriers may be aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's or fixed oils. Intravenous vehicles include fluid and nutrient replenishers, electrolyte replenishers such as those based on Ringer's dextrose, and the like. Preservatives and other additives may also be present, such as, for example, antimicrobials, antioxidants, collating agents, inert gases and the like.

For any compound, the therapeutically effective dose may be estimated initially either in cell culture assays or in animal models such as mice, rats, rabbits, dogs, or pigs. An animal model may also be used to determine the concentration range and route of administration. Such information may then be used to determine useful doses and routes for administration in humans. These techniques are well known to one skilled in the art and a therapeutically effective dose refers to that amount of active ingredient that ameliorates the symptoms or condition. Therapeutic efficacy and toxicity may be determined by standard pharmaceutical procedures in cell cultures or with experimental animals, such as by calculating and contrasting the $ED_{50}$ (the dose therapeutically effective in 50% of the population) and $LD_{50}$ (the dose lethal to 50% of the population) statistics. Any of the therapeutic compositions described above may be applied to any subject in need of such therapy, including, but not limited to, mammals such as dogs, cats, cows, horses, rabbits, monkeys, and humans.

The pharmaceutical compositions utilized in this disclosure may be administered by any number of routes including, but not limited to, oral, intravenous, intramuscular, intra-arterial, intramedullary, intrathecal, intraventricular, transdermal, subcutaneous, intraperitoneal, intranasal, enteral, topical, sublingual, or rectal means.

Additional aspects of the disclosure relate to kits which may include vial(s) containing one or more antibodies or antigen-binding fragments or antibody drug conjugates described herein.

METHODS OF USE

Aspects of the disclosure comprise administering antibodies or antigen binding fragments thereof, CAR, BiTE, BiKE or TriKE molecules to a subject in need.

Other aspects of the disclosure comprise administering immune cells engineered to express the CAR, BiTE, BiKE or TriKE molecules to a subject in need.

The CAR, BiTE, BiKE or TriKE constructs of the present disclosure may be used to re-target engineered immune cells towards EGFRvIII-positive tumors.

The engineered immune cells may be administered to a subject in need.

In accordance with an aspect of the present disclosure, immune cells are isolated from the subject, engineered to express the CAR, BiTE, BiKE or TriKE construct and re-administered to the same subject.

The antibody or antigen-binding fragment thereof of the present disclosure may be used in an unconjugated form or conjugated with a therapeutic moiety in the treatment of cancer.

More particularly, the antibody or antigen-binding fragment thereof of the present disclosure may be used to inhibit the growth of tumor cells expressing EGFRvIII. Antibody drug conjugates and radioimmunoconjugates are especially contemplated for such purposes.

The present disclosure more particularly relates to a method of treating a subject having or suspected of having cancer by administering the antibody or antigen-binding fragment thereof or an antibody drug conjugate disclosed herein.

The antibody or antigen-binding fragment thereof or antibody drug conjugate may be administered as a pharmaceutical composition either alone or in combination with other anti-cancer drugs.

As used herein the term "subject" encompasses humans and animals such as non-human primates, cattle, rabbits, mice, rats, sheep, goats, horses, birds, etc. The term "subject" particularly encompasses humans.

Subjects in need which would benefit from treatment include humans having tumor cells expressing EGFRvIII. More particularly, the antibody or antigen-binding fragments thereof or antibody drug conjugate may be administered to a subject suspected of having glioblastoma multiforme (GBM). Subjects in need also encompass those having or suspected of having carcinomas, such as those from breast, head and neck or oral origin, The term "treatment" for purposes of this disclosure refers to both therapeutic treatment and prophylactic or preventative measures, wherein the object is slow down (lessen) the targeted pathologic condition or disorder. Those in need of treatment include those already with the disorder as well as those prone to have the disorder or those in whom the disorder is to be prevented. Particularly, subjects in need include subjects with an elevated level of one or more cancer markers.

Alternatively, in order to carry out the methods of the present disclosure and as known in the art, the antibody or antigen-binding fragment of the present disclosure (conjugated or not) may be used in combination with a second molecule (e.g., a secondary antibody, etc.) which is able to specifically bind to the antibody or antigen-binding fragment of the present disclosure and which may carry a desirable detectable, diagnostic or therapeutic moiety.

The antibody or antigen-binding fragment thereof of the present disclosure may be used in an unconjugated form or conjugated with a detectable moiety in assays or methods involving detection of EGFRvIII.

Methods of treating subject having a cancer associated with EGFRvIII expression are particularly contemplated. Such method may comprise administering an antigen-binding agent disclosed herein or cells expressing such antigen-binding agent.

In an exemplary embodiment, the method may comprise administering an antibody-drug conjugate.

In another exemplary embodiment, the method may comprise administering cells expressing a chimeric antigen receptor, a bi-specific T-cell engager, a bispecific killer cell engager or a trispecific killer cell engager.

Another aspect of the disclosure relates a method for detecting EGFRvIII, the method may comprise contacting a cell expressing EGFRvIII, or a sample (biopsy, a body fluid such as serum, plasma, urine etc.) comprising or suspected of comprising EGFRvIII with the antibody or antigen-binding fragments described herein and measuring binding. The sample may originate from a mammal (e.g., a human) which may have cancer (e.g., glioblastoma multiforme or carcinoma) or may be suspected of having such cancer. The sample may be a tissue sample obtained from the mammal or a cell culture supernatant.

In accordance with the disclosure the sample may be a serum sample, a plasma sample, a blood sample or ascitic fluid obtained from the mammal.

Further scope, applicability and advantages of the present disclosure will become apparent from the non-restrictive detailed description given hereinafter. It should be understood, however, that this detailed description, while indicating exemplary embodiments of the disclosure, is given by way of example only, with reference to the accompanying drawings.

EXAMPLES

Example 1: Generation of EGFRvIII Specific Monoclonal Antibodies

Monoclonal antibodies (mAb) against EGFRvIII were generated by immunizing mice with the extracellular domain of recombinant proteins.

Immunizations

Mice were bled (pre-immune serum) and injected intraperitoneally and subcutaneously with 100 µg of recombinant EGFRvIII protein emulsified in TITERMAX™ adjuvant (Cedarlane Labs, Burlington, ON) at day 0 and in PBS without adjuvant at day 22. Blood was collected in microvette CB 300Z (Sarstedt, Montreal, QC) at day 29, and serum was stored at −20° C. until further use.

ELISA (Serum Titer Determination)

Pre- and post-immune sera titers of animals were assessed by ELISA on recombinant EGFRvIII protein. Unless otherwise stated, all incubations were performed at room temperature. Briefly, half-area 96-well plates (Costar #3690) were coated with 25 µl per well of immunogen at 5 µg/ml in PBS and incubated overnight at 4° C. Microplates were washed three times in PBS and blocked for 30 min with PBS containing 1% bovine serum albumin (BSA, Sigma Cat #A7030). Blocking buffer was removed and 25 µl of serial dilutions of sera samples were added. After a 2-h incubation, microplates were washed 4 times with PBS-TWEEN™ 20 0.05% and 25 µl of a 1/5,000 dilution of alkaline phosphatase conjugated F(ab')$_2$ goat anti-mouse IgG (H+L, #115-056-062, Jackson Immunoresearch, Cedarlane, Burlington, ON) in blocking buffer was added. After a 1-h incubation, microplates were washed 4 times and 25 µl of p-nitrophenyl phosphate (pNPP) substrate (Sigma-Aldrich Canada Co., Oakville, ON) at 1 mg/ml in carbonate buffer at pH 9.6 was added and further incubated for 30 min. Absorbance was read at 405 nm using a SpectraMax 340 PC plate reader (Molecular Devices, Sunnyvale, CA). All pre-immune bleeds were negative and all post-immune bleeds were very strong (titer above 1/51200) on recombinant protein.

Generation of Hybridomas

Mice received a final boost of 100 µg of recombinant EGFRvIII protein and their spleen was harvested 3 to 4 days later. All manipulations were done under sterile conditions. Spleen cells were harvested in Iscove's Modified Dulbecco's medium (IMDM, Gibco Cat. #31980-030) and fused to NS0 myeloma cell line using electrofusion protocol.

Spleen cells and myeloma cells were washed separately in IMDM. Cells were washed in Isoosmolar buffer (Eppendorf cat #4308070536), then in Cytofusion Medium C (BTX cat #47-0001). Myeloma and lymphocytes were mixed together at a 1:1 ratio and fused using an ECM 2001 Cell Fusion System (BTX, Harvard Bioscience Inc.) following manufacturer's instructions.

Following fusion, cells were suspended at a concentration of 2-4×10$^5$ input myeloma cells per ml in HAT selection medium (IMDM containing 20% heat inactivated FBS, penicillin-streptomycin (Sigma Cat #P7539), 1 ng/ml mouse IL-6 (Biolegend Cat #575706), HAT media supplement (Sigma Cat #H0262) and L-glutamine (Hy-Clone Cat #SH30034.01) and incubated at 37° C., 5% CO$_2$. The next day, hybridoma cells were washed and suspended at a concentration of 2-5×10$^5$ input myeloma cells per ml in semi-solid medium D (StemCell Technologies Cat. #03804) supplemented with 5% heat inactivated FBS, 1 ng/ml mouse IL-6 and 10 µg/ml FITC-F(ab')$_2$ Goat anti-mouse IgG Fc gamma specific (Jackson #115-096-071). The cell mixture was plated in Omnitray dish (Nunc cat #242811) and further incubated for 6-7 days at 37° C., 5% CO$_2$.

Fluorescent secretor clones were then transferred using a mammalian cell clone picker (ClonepixFL™, Molecular Devices) into sterile 96-w plates (Costar #3595) containing 200 µl of IMDM supplemented with 20% heat inactivated FBS, penicillin-streptomycin, 1 ng/ml mouse IL-6, HT media supplement (Sigma Cat #H0137) and L-glutamine and incubated for 2-3 days at 37° C., 5% CO$_2$.

Five thousand (5000) hybridoma supernatants from seven (7) fusion experiments were screened by ELISA using recombinant EGFRvIII or EGFR wild type proteins to detect specific binders. To this end, half-area 96-well plates (Costar #3690) were coated with 25 µl per well of immunogen at 5 µg/ml in PBS and incubated overnight at 4° C. Microplates were washed three times in PBS and blocked for 30 min with PBS containing 1% bovine serum albumin (BSA, Sigma Cat #A7030). Blocking buffer was removed and 25 µl of hybridoma supernatant were added. After a 2-h incubation, microplates were washed 4 times with PBS-TWEEN™ 20 0.05% and 25 µl of a 1/5,000 dilution of alkaline phosphatase conjugated F(ab')$_2$ goat anti-mouse IgG (Fc specific, #115-056-071, Jackson Immunoresearch, Cedarlane, Burlington, ON) in blocking buffer was added. After a 1-h incubation, microplates were washed 4 times and 25 µl of p-nitrophenyl phosphate (pNPP) substrate (Sigma-Aldrich Canada Co., Oakville, ON) at 1 mg/ml in carbonate buffer at pH 9.6 was added and further incubated for one hour at 37° C. Absorbance was read at 405 nm using a SpectraMax 340 PC plate reader (Molecular Devices, Sunnyvale, CA).

ELISA positive antibodies were selected and further characterized by flow cytometry on U87MG cells overexpressing wt EGFR or EGFRvIII to confirm their specificity. To this end, 15-ml supernatant from each positive clone was produced.

Example 2: Cell Surface Binding by Flow Cytometry

The binding properties of the anti-EGFRvIII monoclonal antibodies selected in Example 1 were assessed by flow cytometry on human glioblastoma cell lines U87MG overexpressing wild-type EGFR (U87MG-EGFR wt or U87 WT) and U87MG overexpressing EGFRvIII mutation (A2-7 deletion mutation of EGFR; U87MG-EGFRvIII or U87vIII).

Briefly, cells overexpressing full length wt EGFR or EGFRvIII were obtained from the laboratory of W. Cavanee (Ludwig Institute for Cancer Research, University of California at San Diego). Cells were grown in DMEM high glucose medium containing 10% FBS and 400 µg/ml G418. Prior to analysis, cells were plated such that they were not more than 80% confluent on the day of analysis, washed in PBS and harvested by the addition of cell dissociation buffer (Sigma). After centrifugation, cells were resuspended in complete medium at a cell density of 2×10$^6$ cells/mL. Fifty µL/well of cells are distributed in a polypropylene v-bottom 96 well plate and equal volume of hybridoma supernatant were added and incubated for 2 hours. Cells were washed twice by centrifugation and further incubated with a FITC labeled F(ab')$_2$ goat anti-mouse antibody (Fc specific, #115-096-071, Jackson Immunoresearch, Cedarlane, Burlington, ON) for an hour. Cells were washed and resuspended in medium containing propidium iodide to exclude dead cells from analysis. Samples were filtered through a 60 µm nylon mesh filter plate (Millipore, Ireland) to remove cell aggregates. Flow cytometry analyses were performed on 2,000 viable single-cells events gated on forward scattering, side scattering parameters and propidium iodide dye exclusion using a BD-LSRFortessa flow cytometer (Becton-Dickinson Biosciences, CA, USA) and a standard filter set using BD FACSDiva™ acquisition software, according to manufacturer's instructions.

Cells were stained with either negative control anti-GFP 3E6 mAb supernatant (open histograms) or tested hybridoma supernatant (grey histograms). Specific binding was reflected by the increase in the mean fluorescent intensity of antibody binding to U87 cells expressing EGFRvIII but not wt EGFR.

Out of the 36 positive cell based binding antibodies derived from 7 independent fusion experiments, we chose to further study nine hybridoma supernatants, whose binding was found to be specific for EGFRvIII overexpressing U87MG cells, including 5G6 (FIG. 1A), 1A8 (FIG. 1B), 4B3 (FIG. 1C), 4E11 (FIG. 1D), 5D8 (FIG. 1E), 9C9 (FIG. 1F), 11B1 (FIG. 1G), 11C8 (FIG. 1H) and 11H3 (FIG. 1I). We used the 225 mAb (ATCC HB-8508) which is a positive control mAb that can bind to both EGFR WT and vIII as shown in FIG. 1J. The 13.1.2 antibody was generated and used as a positive control recombinant mAb that binds specifically to vIII isoform, as shown in FIG. 1K.

Example 3: Evaluation of Binding on Purified Denatured Antigen

To evaluate if monoclonal antibodies bind to a conformational epitope, an ELISA analysis on native and denatured recombinant human wild type EGFR and EGFRvIII proteins were performed. The 13.1.2 antibody which is specific to the EGFRvIII mutation (Hamblett K. J, et al., 2015, U.S. Pat. No. 7,736,644) and the 225 antibody, a murine mAb which recognizes both wt EGFR and EGFRvIII were used as controls (Mendelson J et al., 2015, U.S. Pat. No. 4,943,533, Sato J. D. et al., 1983).

Antigens at 1-2 mg/ml were incubated at 95° C. for 5 min in PBS containing DTT at a final concentration of 40 mM. They were then incubated on ice for 5 min and diluted at their final coating concentration for ELISA purpose.

mAbs were purified using HiTrap ProteinG HP 1 mL columns GE Healthcare cat no. 17-0404-01 and desalted using Zeba-spin desalting columns 5 mL (Pierce) pre-equilibrated in PBS and filter sterilized through 0.22 µM membrane (Millipore). The final concentration of the antibody solutions was determined using a Nano-drop 2000 (ThermoScientific), using IgG as sample type. ELISA was performed as described above (serum titer determination) using 25 µl of mAb supernatant (Exp 1) or purified mAb at 1 µg/ml (Exp 2).

Table 1 shows ELISA results (n=2) of different mAb clones assessed on recombinant EGFRvIII or wt EGFR, in native or denatured conditions. As expected, the 225 antibody binds to both wt EGFR and EGFRvIII under native conditions only. The 13.1.2 antibody binds to EGFRvIII in native and denatured conformation, but not to EGFR wild type native or denatured. The monoclonal antibodies generated by our immunization schemes bind to EGFRvIII in native and denatured conformations. Notably, a few of our anti-EGFRvIII monoclonal antibodies (4B3, 4E11, 5D8 and 9C9) were positive on wt EGFR native antigen although these were not binding to U87MG overexpressing wt EGFR as demonstrated in Example 2.

Example 4: Assessment of Anti-EGFRvIII mAb for Internalization

The purified anti-EGFRvIII monoclonal antibodies were evaluated for their ability to internalize into EGFRvIII expressing cells using a surrogate assay in which anti-mouse Fc secondary antibodies are coupled to the pHrodo dyes (Thermo Fisher Scientific). These pH-sensitive dyes can be used to specifically detect endocytosis in live cells due to their enhanced fluorescence in the low pH environment of endosomes and lysosomes.

To that effect, glioblastoma U87-MG cells overexpressing human EGFR WT or vIII mutation were used. Generally, cells were passaged once or twice a week and used within 4-6 weeks for all experiments. U87MG cells were seeded in 96-well plates (Corning 3721) at a density of 12,500 cells/well in 100 µl of culture medium. The next day primary mouse antibodies (anti-EGFRvIII monoclonal antibodies) at 20 nM were pre-incubated for 30 min with 30 nM of anti-mouse secondary antibody chemically conjugated with pHrodo Red (Thermofisher Scientific), a pH-sensitive dye that is almost non-fluorescent at neutral pH and fluoresces brightly in acidic environments as it is internalized. Cell culture medium was replaced with 50 µl of fresh medium and 50 µl of the antibody complex was added to the cells and their fluorescence was measured after 24-h incubation at 37° C., 5% $CO_2$. Incubation with no primary antibody (secondary antibody alone) or an irrelevant primary antibody (control mouse IgG or anti-GFP mAb) was used to assess non-target internalization. Microplate was read at $Exc_{560nm}/Em_{590nm}$ (5 nm bandwidths) and data were blank subtracted.

Table 2 shows the results of the surrogate antibody internalization of anti-EGFRvIII monoclonal antibodies on EGFRvIII- or wild type EGFR-overexpressing U87MG cells. Results are expressed as the percentage of relative fluorescence unit (RFU) compared to the 225 antibody positive control (a wild type EGFR internalizing mAb that can bind to both wt EGFR and EGFRvIII antigens) calculated according to Formula I:

$$\% \text{ internalization} = \text{RFU test mAb}/\text{RFU 225 mAb} \times 100 \quad \text{(Formula I)}$$

The selected panel of mAbs showed significant internalization when incubated with EGFRvIII-overexpressing U87MG cells and no internalization in wt EGFR-overexpressing cells.

TABLE 1

Binding on native or denatured recombinant proteins by ELISA

| | EGFRvIII | | | | wt EGFR | | | |
|---|---|---|---|---|---|---|---|---|
| | Native | | Denatured | | Native | | Denatured | |
| Clone | Exp 1 | Exp 2 | Exp 1 | Exp 2 | Exp 1 | Exp 2 | Exp 1 | Exp 2 |
| 5G6 | 1.450 | 1.736 | 1.943 | 1.743 | 0.000 | 0.001 | 0.005 | 0.000 |
| 1A8 | 1.665 | 1.791 | 2.086 | 1.713 | 0.016 | 0.002 | 0.013 | 0.001 |
| 4B3 | 1.499 | 1.194 | 1.735 | 0.603 | 1.087 | 0.066 | 0.041 | 0.003 |
| 4E11 | 1.365 | 1.527 | 1.392 | 0.997 | 1.616 | 1.698 | 0.029 | 0.001 |
| 5D8 | 1.434 | 1.492 | 1.863 | 0.848 | 1.376 | 0.159 | 0.049 | 0.000 |
| 9C9 | 1.203 | 1.286 | 1.723 | 0.503 | 0.210 | 0.038 | 0.064 | 0.003 |
| 11B1 | 1.666 | 1.720 | 2.199 | 1.769 | 0.034 | 0.002 | 0.032 | 0.004 |
| 1108 | 1.561 | 1.722 | 2.099 | 1.713 | 0.011 | 0.000 | 0.009 | −0.001 |
| 11H3 | 1.661 | 1.778 | 2.096 | 1.787 | 0.053 | 0.001 | 0.041 | 0.000 |
| 225 | 1.081 | 1.496 | 0.001 | 0.004 | 1.204 | 1.320 | −0.010 | 0.002 |
| 13.1.2 mIgG1 | 1.097 | 1.671 | 1.914 | 1.705 | 0.011 | 0.003 | 0.003 | 0.005 |
| 13.1.2 mIgG2a | 1.291 | 1.487 | 2.094 | 1.495 | 0.009 | 0.003 | 0.007 | 0.002 |
| Neg ctrl mouse mAb | ND | −0.001 | ND | 0.002 | ND | 0.002 | ND | 0.000 |

ND: not determined

TABLE 2 pHrodo surrogate assay:
% internalization of mAb (n = 2)

| Clone | U87vIII | U87wt |
|---|---|---|
| 5G6 | 102 ± 26 | <2 |
| 1A8 | 100 ± 12 | <2 |
| 4B3 | 61 ± 9 | <2 |
| 4E11[a] | 67 ± 7 | <2 |
| 5D8 | 64 ± 2 | <2 |
| 9C9 | 87 ± 3 | <2 |
| 11B1 | 131 ± 7 | <2 |
| 11C8 | 136 ± 3 | <2 |
| 11H3 | 131 ± 8 | <2 |
| 225 | 100 ± 12 | 101 ± 5 |
| Neg ctrl mIgG | <3 | <2 |

[a]This mAb was assessed at 1 nM final concentration

Anti-EGFRvIII monoclonal antibodies showing internalization potency in secondary conjugate pHrodo-based internalization screening in EGFRvIII overexpressing cells but not in EGFR-WT were selected for further analysis.

Example 5: Functional Characterization for Antibody Drug Conjugate (ADC) Potential The purified anti-EGFRvIII monoclonal antibodies were evaluated for their ability to cause growth inhibition in EGFRvIII expressing cells using a surrogate assay in which anti-mouse Fc secondary antibodies were coupled to the DM1 maytansine drug through a non-cleavable linker. Once internalized, linker catabolism in the lysosome releases active DM1 drug which destabilizes microtubules and causes growth inhibition. U87MG glioblastoma cell lines overexpressing wt EGFR or EGFRvIII were used. Generally, cells were passaged once or twice a week and used within 4-6 weeks for all experiments.

U87MG cells (EGFR WT or EGFRvIII) were seeded the day before at 2,000 cells/100 μL/well in 96-well plates (Corning 3917). Primary mouse antibodies (anti-EGFRvIII monoclonal antibodies) at 1 nM were pre-incubated for 30 min with 1.5 nM of anti-mouse secondary antibodies chemically conjugated with Maytansine (DM1), a tubulin inhibitor that needs to be internalized to cause cell death. The antibody complex was then added to the cells indicated and their effects on cell viability measured after 5 days of incubation at 37° C. Incubation with no primary antibody (secondary antibody alone) or an irrelevant primary antibody (control mouse IgG or 3E6 anti-GFP mAb) was used to assess non-target-directed cytotoxicity. Cell viability was determined using CellTiterGlo™ (Promega, Madison), based on quantitation of the ATP present in each well, which signals the presence of metabolically active cells. Signal output was measured on a luminescence plate reader (Envision, Perkin Elmer) set at an integration time of 0.1 sec. Integration time is adjusted to minimize signal saturation at high ATP concentration.

Data expressed as Relative Luminescence Unit (RLU) is normalized to the mouse IgG control wells and expressed as % survival compared to mouse IgG, calculated according to Formula II:

% survival=RLU mAb/RLU mouse IgG×100      (Formula II)

mAbs were selected that show high potency in secondary conjugate DM1-based cytotoxicity screening in EGFRvIII overexpressing cells but not in EGFR-WT.

Table 3 shows results of the ADC surrogate screening assay of anti-EGFRvIII monoclonal antibodies on EGFRvIII or wt EGFR-overexpressing U87MG cells. Results are expressed as the percentage of survival relative to that of non-specific mouse IgG control (set at 100%). The antibodies tested were shown to cause a significant reduction in survival (>15%) in EGFRvIII overexpressing cells relative to EGFR wild type overexpressing cells. As expected, the 225 antibody positive control causes cytotoxicity in both cell lines.

TABLE 3

% Survival of cells in presence of mAbs in an ADC surrogate assay (n = 2)

| Clone | U87vIII | U87wt |
|---|---|---|
| 5G6 | 55 ± 1 | 91 ± 1 |
| 1A8 | 65 ± 5 | >98 |
| 4B3 | 83 ± 1 | >98 |
| 4E11 | 54 ± 1 | >98 |
| 5D8 | 69 ± 3 | >98 |
| 9C9 | 82 ± 1 | >98 |
| 11B1 | 62 ± 1 | >98 |
| 11C8 | 55 ± 1 | >98 |
| 11H3 | 62 ± 9 | >98 |
| 225 | 49 ± 3 | 52 ± 14 |
| Neg ctrl mouse mAb | >98 | >98 |

The degree of cytotoxicity associated with these antibodies selected from among 36 primary mouse mAbs tested, demonstrates that they exhibit a high degree of internalization and appropriate intracellular routing to achieve activation of the DM1 or MMAE drug, making them suitable for ADC development. Thus, mAbs that exhibited cytotoxicity in a surrogate ADC assay were selected for direct conjugation to DM1 or MMAE.

Selected hybridoma were recloned by limiting dilution to ensure their monoclonality.

Example 6: DM1 Conjugation and ADC Testing of Mouse Monoclonal mAbs

The anti-EGFRvIII monoclonal antibodies purified in Example 3 were conjugated via lysine residues to succinimidyl trans-4-[maleimidylmethyl] cyclohexane-1-carboxylate (SMCC) linked to N2'-deacetyl-N2'-(3-mercapto-1-oxopropyl)-maytansine (DM1) or via reduced interchain Cysteine residues to a cathepsin cleavable linker (valine-citrulline) Monomethyl auristatin E (MMAE). Product purity and drug:antibody ratio were determined by UPLC based size-exclusion chromatography (SEC).

For conjugation, the purified anti-EGFRvIII monoclonal antibodies (5G6 1A8, 4B3, 4E11, 5D8, 9C9, 11B1, 11C8, 11H3; Example 3) were buffer-exchanged into conjugation buffer (100 mM Sodium phophate, 20 mM NaCl, 2 mM EDTA pH 7.2) using pre-equilibrated spin desalting columns. The concentration of each monoclonal antibody was adjusted to 2 mg/mL with conjugation buffer and 200 μg total of each was used for conjugation. A stock solution of SMCC-DM1 was prepared in dimethylacetamide (DMA). SMCC-DM1 from the DMA stock solution was added to each monoclonal antibody to achieve a molar SMCC-DM1: mAb ratio of 10.0. The solution was mixed thoroughly and incubated at 37° C. for 3 hours. The reaction was stopped by passing the reaction mixture through two spin desalting columns equilibrated in Conjugation buffer with 0.02% w/v Polysorbate-20 added.

ADCs were selected for an appropriate drug-antibody ratio (DAR) range (generally between 3 and 5 drugs/antibody) and monomeric purity (>95% monomer content using analytical SEC). DAR was determined by integrating the monomeric peak from the UPLC-SEC chromatogram at both 280 nm and 252 nm and comparing these to the ratios of extinction coefficients for the unconjugated antibody and free drug at the same wavelengths. Percent monomer was determined from the total integrated areas of monomer, high-molecular weight species and low-molecular weight species observed in the chromatogram. In vitro growth inhibition potency results for these DM-1 conjugated ADCs are shown in Table 4. Specifically, anti-EGFRvIII ADCs prepared above were tested for their effects on viability of U87MG overexpressing EGFR WT or EGFRvIII cells. Following 5 days of exposure, cell growth/viability was assessed using CellTiterGlo reagent and dose-response curves were generated to measure their potency ($IC_{50}$) and efficacy (% maximal inhibition) using the log(inhibitor) vs. response—Variable slope (four parameters) model from GraphPad Prism v6.0 software.

All the DM1-conjugated anti-EGFRvIII antibodies tested demonstrated good efficacy (from 76-97% maximal growth inhibition) and strong potency (IC50<0.37-4.1 nM) on EGFRvIII expressing U87MG cells as compared to the non-targeted irrelevant anti-GFP mouse IgG-DM1 conjugate negative control (Table 4). Furthermore, this effect was specific for EGFRvIII-expressing cells, since activity seen in the EGFRwt U87MG expressing cells (IC50 range=15-30 nM) was not significantly different than that seen for the irrelevant ADC control (IC50~25 nM).

labeled F(ab')2 goat anti-mouse antibody (Fc specific, #115-096-071, Jackson Immunoresearch, Cedarlane, Burlington, ON) for an hour. Cells were washed and re-suspended in medium containing Propidium iodide to exclude dead cells from analysis. Samples were filtered through a 60 μm nylon mesh filter plate (Millipore, Ireland) to remove cell aggregates. Flow cytometry analyses were performed on 2,000 viable single-cells events gated on forward scattering, side scattering parameters and propidium iodide dye exclusion using a BD-LSRFortessa flow cytometer (Becton-Dickinson Biosciences, CA, USA) and a standard filter set using BD FACSDiva™ acquisition software, according to manufacturer's instructions.

Specific detection of antibody binding was calculated as the mean fluorescent intensity of binding to each primary antibody after background level subtraction of the mean fluorescent intensity of binding of mouse IgG control. The data were analyzed with GraphPad Prism v 6.0 software using one-site specific binding with Hill slope non-linear regression curve fit model to determine Bmax (maximum specific binding) and $Kd_{app}$ (concentration needed to achieve a half-maximum binding at equilibrium) for each mAb tested. The model used was according to formula III:

$$Y = Bmax*X^h/(Kd^h + X^h) \quad \text{(formula III)}$$

Bmax is the maximum specific binding, in the same unit as Y.

Table 4 provides the results of ADC testing of mAbs anti-EGFRvIII

| | | U87MG EGFRvIII | | U87MG EGFR WT | |
|---|---|---|---|---|---|
| antibody | DAR | IC50 (nM) | % max inh | IC50 (nM) | % max inh |
| 5G6-DMI | 3.0-4.7 | 1.615 +/− 1.044 (14) | 79 +/− 4 (14) | 29.4 +/− 16.6 (12) | 79 +/− 20 (12) |
| 1A8-DMI | 2.9-3.5 | 4.10 +/− 1.72 (7) | 76 +/− 4 (7) | 32.5 +/− 21.6 (7) | 76 +/− 20 (6) |
| 4E11-3-DMI | 2.6-3.5 | 0.375 +/− 0.138 (13) | 78 +/− 3 (13) | 15.03 +/− 4.13 (9) | 71 +/− 4 (9) |
| 11H3-DMI | 3.2-3.6 | 2.33 +/− 0.332 (7) | 78 +/− 5 (7) | 20.1 +/− 8.18 (7) | 73 +/− 6 (7) |
| 11C8-DMI | 3.1-3.4 | 2.32 +/− 1.80 (6) | 76 +/− 2 (6) | 26.2 +/− 5.69 (6) | 76 +/− 10 (6) |
| 4B3-DMI | 3.5 | 7.0 +/− 1.3 (2) | 79 +/− 2 (2) | 30 +/− 15 (2) | 76 +/− 13 (2) |
| 5D8-DM1 | 3.4 | 10.2 +/− 6.7 (2) | 82 +/− 4 (2) | 34 +/− 10 (2) | 77 +/− 17 (2) |
| 9C9-DMI | 3.7 | 10.6 +/− 0.4 (2) | 78 +/− 1 (2) | 46 +/− 36 (2) | 104 +/− 45 (2) |
| 11B1-DM1 | 3.0 | 3.4 +/− 0.2 (2) | 72 +/− 6 (2) | 23.3 +/− 3.2 (2) | 71 +/− 9 (2) |
| Anti-GFP-DM1 mIgG1 | 3.5 | 21.6 +/− 5.3 (2) | 73 +/− 3 (2) | 21.6 +/− 0.6 (2) | 66 +/− 1 (2) |
| Anti-GFP-DM1 mIgG2a | 2.4-3.4 | 22.9 +/− 8.0 (3) | 76 +/− 9 (3) | 17.6 +/− 4.4 (3) | 69 +/− 7 (3) |

% max inh = percent maximal inhibition.

Example 7: Evaluation of Apparent Affinity by Flow Cytometry

Purified anti-EGFRvIII monoclonal antibodies were assessed for their binding activity by flow cytometry in a dose-dependent binding curve using U87MG glioblastoma cell line overexpressing vIII or wt EGFR.

Prior to analysis, cells were plated such that they were not more than 80% confluent on the day of analysis. Unless otherwise stated, all media are kept are 4° C. and all incubations are performed on wet ice. Cells were washed in PBS, harvested by the addition of cell dissociation buffer (Sigma), centrifuged and resuspended in complete medium at a cell density of $2 \times 10^6$ cells/mL. Fifty μL/well of cells were distributed in a polypropylene v-bottom 96 well plate and serial ⅓ dilutions of purified mAbs starting at 100 nM were added and incubated for 2 hours. Cells were washed twice by centrifugation and further incubated with a FITC Kd is the ligand concentration needed to achieve half maximum binding at equilibrium, expressed in the same unit as X.

The variable "h" is the hill slope.

FIG. 2 shows results of flow cytometry experiments determining the binding properties of anti-EGFRvIII monoclonal antibodies to cell surface-expressed EGFRvIII (FIGS. 2A and 2C) or wt EGFR (FIGS. 2B and 2D). The 225 is a mouse mAb that binds to both wild type and vIII mutant EGFR and is used as a positive control for both cell lines. All anti-EGFRvIII mAbs showed strong and comparable binding to cells overexpressing EGFRvIII variant (FIGS. 2A and 2C) and no detectable binding (ndb) on cells overexpressing wild type EGFR (FIGS. 2B and 2D). Except for 9C9 (data not shown), all monoclonal antibodies bind with low nM affinity to cells overexpressing EGFR vIII variant in flow cytometry analysis (Table 5).

TABLE 5

Apparent $K_D$ of anti-EGFR vIII mAbs as determined by Flow cytometry analysis.

| mAbs | U87MG-EGFRvIII Kd (nM) | U87MG-EGFRwt Kd (nM) |
|---|---|---|
| 5G6 | 4.2 | ndb |
| 1A8 | 2.0 | ndb |
| 4B3 | 21.2 | ndb |
| 4E11 | 6.7 | ndb |
| 5D8 | 19.7 | ndb |
| 9C9 | >200 | ndb |
| 11B1 | 2.2 | ndb |
| 11C8 | 3.5 | ndb |
| 11G8 | 3.3 | ndb |
| 11H3 | 2.5 | ndb |
| 225 | 2.2 | 2.2 |
| 13.1.2 mIgG1 | 4.3 | ndb |
| 13.1.2 mIgG2 | 4.2 | ndb | ndb: no detectable binding

Example 8: Epitope Binning by Flow Cytometry Competition

In order to evaluate whether anti-EGFRvIII monoclonal antibodies bind to the same epitope region, flow cytometry competition experiments on U87MG-vIII cells were performed.

To that effect, the purified monoclonal antibodies 4E11 and 13.1.2 were conjugated to AlexaFluor 488 fluorescent dye (Thermofisher, Burlington, ON, Canada) using a NHS Ester derivative, according to manufacturer's instructions.

A fixed concentration of the labeled mAb (1-10 nM) was incubated with increasing concentration (or 10× concentration) of our unlabeled monoclonal antibodies to assess if their binding capacity was impaired in presence of unlabeled mAbs.

From the results shown in Table 6, it can be seen that the selected anti-EGFRvIII monoclonal antibodies fall into 2 major epitope regions categorized by binding of 2 prototypic antibodies; 1) bin1 antibodies were found to compete with labeled 13.1.2 including antibodies 5G6, 1A8, 11B1, 11C8 and 11H3 and 2) bin2 antibodies were found to compete with labeled 4E11 antibodies including antibodies 4B3 and 5D8. The affinity of antibody 9C9 being lower, it did not compete with any of the labeled mAbs in this experiment.

TABLE 6

Competition Assay by flow cytometry

| mAbs | Labeled mAbs 4E11-AF488 | Labeled mAbs 13.1.2-AF488 | bin |
|---|---|---|---|
| 5G6 | NC | C | 1 |
| 1A8 | NC | C | 1 |
| 4B3 | C | NC | 2 |
| 4E11 | SC | NC | 2 |
| 5D8 | C | NC | 2 |
| 9C9 | NC | NC | ND |
| 11B1 | NC | C | 1 |
| 11C8 | NC | C | 1 |
| 11H3 | NC | C | 1 |
| 225 | NC | NC | NC |
| 13.1.2 mIgG1 | NC | SC | 1 |
| 13.1.2 mIgG2a | NC | SC | 1 |

NC = no competition;
SC = self-competition;
C = competition;
ND = not determined.

Example 9: Epitope Mapping by Yeast Surface Display

The yeast surface display method (Feldhaus M J et al., 2003 Nat Biotechnol. 2003 February; 21(2):163-70) was used to map the epitopes of our anti-EGFRvIII monoclonal antibodies. This technique allows cloned protein or peptide of choice to be expressed and displayed at the cell surface through covalent linkage to cell wall. The displayed protein/peptide can be interrogated for antibody binding.

A total of 36 different hEGFRvIII fragments of variable size from 10 to 414 amino acid residues were cloned into the pPNL6 vector (obtained from The Pacific Northwest National Laboratory, USA) as fusion proteins to be expressed and displayed as Aga2-HA-hEGFRvIII-MYC. The displayed hEGFRvIII fragments were used to identify the smallest fragment required for the binding of each anti-hEGFRvIII mAbs.

Assessment of the binding of anti-EGFRvIII mAbs to the fusion proteins expressed on yeast cell surface was done by flow cytometry analysis. Briefly, yeast cells were labeled with both the anti-hEGFRvIII mAb and chicken anti-Myc antibody, the latter being used to monitor the level of expression of the fusion protein. Following a wash step, binding of the primary antibodies is probed by a two-color indirect fluorescence labeling using secondary antibodies specific for mouse and chicken antibodies, respectively.

The anti-hEGFRvIII mAbs were binding with similar signal intensities to both full length hEGFRvIII protein and small peptides of the same protein, as well to both native and heat denatured yeast displayed antigen fragments, suggesting that the epitopes for these mAbs are contained within a continuous peptide fragment (linear).

FIGS. 4A and 4B show the results of anti-hEGFRvIII monoclonal antibodies binding properties to various fragments of the hEGFRvIII and wt EGFR protein displayed on yeast cells.

Table 7 shows the smallest fragment (peptide) required for respective anti-hEGFRvIII mAbs binding. Four different epitope bins were identified: 1) aa 1-18 recognized by 11B1, 11C8 (H5) and 11H3 as well as the 13.1.2 control mAb, 2) aa 3-18 recognized by 5G6 and 1A8, 3) aa 15-37 recognized by 4B3, 5D8 and 9C9, and 4) aa 19-37 recognized by 4E11. Despite the absence of binding on U87MG-EGFR WT expressing cells, 4E11 did bind to yeast cells engineered to express EGFR WT fragments 266-482 and 1-623 (FIGS. 4A and 4B).

TABLE 7

Summary of epitope binning

| mAb Clone Name | Epitope Containing EGFRvIII Fragment |
|---|---|
| 5G6 | aa 3-18 |
| 1A8 | aa 3-18 |
| 4B3 | aa 15-37 |
| 4E11 | aa 19-37 |
| 5D8 | aa 15-37 |
| 9C9 | aa 15-37 |
| 11B1 | aa 1-18 |
| 11H5 (11C8) | aa 1-18 |
| 11H3 | aa 1-18 |
| hFc-13.1.2 | aa 1-18 |
| 225 | aa 43-456 |

Example 10: Fine Epitope Using Yeast Surface Display

To further characterize mAb epitopes within the EGFRvIII 15-37 region, an alanine scan of this region was performed, and modified fragments were expressed at the surface of the yeast. All of the amino acids of SEQ ID NO.:6 were mutated to alanine, except for amino acid residues 5 and 8 which correspond to the original Ala19 and Ala22 of EGFRvIII. The resulting peptides were expressed at the surface of the yeast and each anti-EGFRvIII mAbs was tested on the corresponding yeast mutant strain by flow cytometry analysis. Thus, this assay determined the contribution of each amino acid(s) in the monoclonal antibody binding. Table 8 shows the results obtained in flow cytometry analysis for the 4B3, 5D8, 9C9 and 4E11 monoclonal antibodies. Results obtained are in line with the previous results shown in Table 7, i.e. binding of mAbs in bin 15-37 are strongly inhibited by mutation of one AA between position 15 and 19.

Both mAbs 4B3 and 5D8 binding is abolished by mutation of either amino acid residues Arg18, Cys20, Gly21 or Cys35, and weakened by mutation of Gly31 to Alanine. mAb 5D8 binding is weakened by mutation of Glu26 to Alanine. 9C9 binding is compromised by mutation of either Cys16, Glu26, Gly31, Val32, Arg33, Lys34, Cys35 or Lys36, and weakened by Cys20 or Asp30 mutation to Alanine. 4E11 binding is strongly inhibited by mutation of either Cys20, Glu26, Asp30, Gly31, Arg33 or Cys35, and weakened by Asp23 or Val32 mutation to Alanine. Based on these results, amino acid residues Cys20 and Cys35 appear important for binding of antibodies targeting amino acid residues 15-37 of EGFRvIII.

TABLE 8

Flow cytometry evaluation of mAb binding to yeast expressing mutated amino acid within fragment 15-37 of EGFRvIII.

| Amino acid mutated to Ala | Bin 15-37 | | | Bin 19-37 | Corresponding peptide |
|---|---|---|---|---|---|
| | 4B3 | 5D8 | 9C9 | 4E11 | sequence |
| Ser15 | 94.7 | 93.1 | 115.4 | 94.9 | SEQ ID NO: 145 |
| Cys16 | 168.7 | 154.0 | 10.4 | 176.3 | SEQ ID NO: 146 |
| Val17 | 145.9 | 143.8 | 87.5 | 147.8 | SEQ ID NO: 147 |
| Arg18 | 0.1 | 0.1 | 205.2 | 102.4 | SEQ ID NO: 148 |
| Ala19* | ND | ND | ND | ND | |
| Cys20 | 0.1 | 0.1 | 51.9 | 6.5 | SEQ ID NO: 149 |
| Gly21 | 0.0 | 0.0 | 160.0 | 179.8 | SEQ ID NO: 150 |
| Ala22* | ND | ND | ND | ND | |
| Asp23 | 94.1 | 106.5 | 63.2 | 58.4 | SEQ ID NO: 151 |
| Ser24 | 194.4 | 245.6 | 211.4 | 170.0 | SEQ ID NO: 152 |
| Tyr25 | 98.8 | 108.2 | 152.0 | 83.3 | SEQ ID NO: 153 |
| Glu26 | 102.3 | 37.9 | 0.8 | 0.0 | SEQ ID NO: 154 |
| Met27 | 101.1 | 96.5 | 158.7 | 102.3 | SEQ ID NO: 155 |
| Glu28 | 86.7 | 81.6 | 87.1 | 90.9 | SEQ ID NO: 156 |
| Glu29 | 71.6 | 77.3 | 138.4 | 75.3 | SEQ ID NO: 157 |
| Asp30 | 94.3 | 80.4 | 22.6 | 0.1 | SEQ ID NO: 158 |
| Gly31 | 49.9 | 40.4 | 10.7 | 0.0 | SEQ ID NO: 159 |
| Val32 | 92.4 | 95.2 | 1.6 | 30.4 | SEQ ID NO: 160 |
| Arg33 | 68.4 | 71.8 | 0.7 | 1.8 | SEQ ID NO: 161 |
| Lys34 | 136.2 | 151.3 | 3.5 | 129.8 | SEQ ID NO: 162 |
| Cys35 | 0.1 | 0.0 | 2.5 | 0.3 | SEQ ID NO: 163 |
| Lys36 | 99.2 | 97.9 | 1.0 | 110.0 | SEQ ID NO: 164 |
| Lys37 | 169.5 | 193.9 | 107.7 | 190.9 | SEQ ID NO: 165 |

Data represent the % of binding of mAb on the yeast displaying the mutated sequence compared to the binding on the yeast displaying the wild-type sequence, normalized to the Myc-tag expression.
*Original Ala 19 and Ala 22 were not mutated
Legend
Values between 0% and 15%: No binding
Values between 16% and 59%: Partial binding
Values at or above 60%: Complete binding

Example 11: Antibody Sequencing

The sequences of the VH and VL domains of thirteen anti-EGFRvIII monoclonal antibodies of Examples 2-5 were analyzed.

Briefly, total RNA was extracted from hybridoma clones (Qiagen, RNEasy) and reverse transcribed into cDNA (SuperScript™, ThermoFisher Scientific, Waltham, MA, USA). DNA encoding VH and VL domains was PCR amplified (Platinum Taq or equivalent) using mixtures of degenerate forward primers annealing in FR1 and a single reverse primer annealing in CH1 (Novagen/EMD Millipore cat. no 69831-3). The resulting amplicons were sequenced using the Sanger method on an ABI 3730xl instrument or were determined using 2×250 bp reads on an Illumina MiSeq instrument.

Sequences of the VH and VL domains as well as the CDR regions are shown in the sequence table. The CDRs are generally indicated in bold in the light chain or heavy chain variable regions amino acid sequences. Analysis of the sequence for a consensus binding sequence of the CDR 1-3 regions of the VH and VL chains was conducted using Kabat numbering scheme (Kabat et L 1992, Johnson et al 2004). The results indicated that the CDR regions of both the VH and VL regions of the 11B1, 11C8 and 11H3 monoclonal antibodies are identical. There is one amino acid difference in VH between 11B1 and 11C8 (FR2 region), one amino acid difference in VH between 11C8 and 11H3 (FR3 region), and 2 amino acid difference between 11B1 and 11H3 (FR2 and FR3). These antibodies clustered together and recognize a common linear epitope within fragment 1-18 (Table 7).

An alignment between 11B1 (SEQ ID NO:77), 11C8 (SEQ ID NO:92) and 11H3 (SEQ ID NO:102) heavy chain variable regions is presented in FIG. 5A. The consensus obtained from this alignment is provided in SEQ ID NO:117. The 11B1 (SEQ ID NO:67), 11C8 (SEQ ID NO:82) and 11H3 (SEQ ID NO:97) light chains are identical.

4B3 and 5D8 have identical VL CDRs, with 2 amino acid differences in FR1 and one amino acid difference in FR4. They have similar VH CDRs, with one amino acid difference in CDRH1, one amino acid difference in CDRH2 and one amino acid difference in each of FR1 and FR3. They both bind to the same epitope on EGFRvIII as shown in Table 8.

An alignment between the 4B3 (SEQ ID NO:27) and 5D8 (SEQ ID NO:47) light chain variable regions is provided in FIG. 5B. The consensus obtained from this alignment is provided in SEQ ID NO:115. An alignment between the 4B3 (SEQ ID NO:32) and 5D8 (SEQ ID NO:52) heavy chain variable regions is provided in FIG. 5C. The consensus obtained from this alignment is provided in SEQ ID NO:116.

9C9 has VL similar to that of 4B3 and 5D8 (one amino acid difference in CDRH1 and four others in FR3 and FR4) and a unique VH, and binds to a unique epitope (Table 8).

An alignment between 4B3 (SEQ ID NO:27), 5D8 (SEQ ID NO:47) and 9C9 (SEQ ID NO:57) light chain variable regions is presented in FIG. 5D. The consensus obtained from this alignment is provided in SEQ ID NO:118.

The sequence analysis also revealed that clone 11B1 expresses two light chains; one which is dominant (variable region illustrated by SEQ ID NO:67) and a low abundant transcript (SEQ ID NO:72). Similarly, clone 11C8 expresses two light chains; a dominant (SEQ ID NO:82) and a low abundant transcript (SEQ ID NO:87). Clones 11G8 and 11H5 also expresses these two transcripts (data not shown).

The sequence analysis revealed that clones 5G6, 1A8 and 4E11 have unique VH and VL CDRs.

Example 12: Recombinant Antibody Production and Purification

To facilitate large scale antibody productions and consistency between productions, the anti-EGFRvIII monoclonal antibodies identified in Example 11 were produced recombinantly in CHO cells.

The VH and VL regions were cloned as fusions with human IgG1 constant regions (human IgG1 heavy chain and human kappa light chain, respectively) into the pTT5 vector, thereby generating chimeric antibodies.

The amino acid sequences of the chimeric antibodies: hFC-5G6, hFC-4E11, and hFC-13.1.2 is provided in the sequence table. All light chain sequences comprise a signal sequence MVLQTQVFISLLLWISGAYG (SEQ ID NO:113) at the N-terminus, while heavy chain sequences comprised the signal sequence MDWTWRIL-FLVAAATGTHA (SEQ ID NO:114) at the N-terminus.

Chimeric antibody expression was validated via a 2 mL expression scout. Briefly, CHO cells were transiently transfected with VL and VH containing constructs (1:1 ratio); conditioned medium (CM) was harvested on day 7, and chimeric antibody expression levels were evaluated by SDS-PAGE (data not shown). The chimeric antibody expressed well and a small-scale production (50 mL) was initiated by transiently transfecting CHO cells with the same construct ratio. Conditioned medium (CM) was harvested on day 7, chimeric antibodies were purified (ProtA), quantitated, and evaluated by SDS-PAGE. The data showed that all four chimeric antibodies were well expressed by the transiently transfected CHO cells.

To confirm that the recombinantly expressed chimeric antibodies behave similarly to the hybridoma-expressed monoclonal antibodies, flow cytometry binding experiments on U87MG overexpressing EGFRvIII were performed to ensure that EGFRvIII binding was not compromised. Furthermore, binding and ADC activity were also tested using a glioblastoma cell line that overexpresses EGFRvIII that was obtained from Cellther Polska (catalogue number CL 01008-CLTH). These cells were grown in RPMI and 10% fetal bovine serum using standard culturing conditions.

Evaluation of apparent affinity was performed by flow cytometry analysis as described in Example 7, except that a secondary AF488 labeled F(ab')2 donkey anti-human antibody (Fc specific, #709-546-098 Jackson Immunoresearch, Cedarlane, Burlington, ON) was used to detect the primary antibody binding.

All chimeric antibodies bind with specificity and with similar affinity to glioblastoma cells overexpressing EGFRvIII mutation in flow cytometry analysis (Table 9). Importantly, all chimeric antibodies (including the benchmark 13.1.2) fail to bind wt EGFR as seen by the lack of cell surface binding on U87 cells overexpressing wtEGFR. This specificity is unlike that seen with ABT-806 which has been shown to bind significantly to U87MG EGFRwt cells (Panousis et al 2005) and which may account for toxicity due to wt EGFR expression on normal tissues.

TABLE 9

Cell binding on EGFRvIII expressing glioblastoma cells

| | Cell Line | | | | | |
|---|---|---|---|---|---|---|
| | U87MG EGFRvIII | | U87MG EGFR wt | | DKMG EGFRvIII | |
| Ab | Kd (nM) | Bmax | Kd (nM) | Bmax | Kd (nM) | Bmax |
| hFc-4E11 | 2.60 +/− 1.12 (3) | 6398 +/− 1305 (3) | ndb | | 1.430 (1) | 12113 (1) |
| hFc-5G6 | 1.53 +/− 0.340 (2) | 6891 +/− 206 (2) | ndb | | 0.832 (1) | 16930 (1) |
| hFc-13.1.2 | 5.22 +/− 4.76 (2) | 6105 +/− 286 (2) | ndb | | 0.947 (1) | 16480 (1) |
| Palivizumab | ndb | | ndb | | ndb | | ndb = not detectable binding

Example 13: DM1 and MMAE Conjugation of Recombinantly Expressed Chimeric mAbs and ADC Testing Chimeric antibodies produced in Example 12 were conjugated with DM1 or MMAE and tested on glioblastoma cells overexpressing wt EGFR or EGFRvIII protein as described in Example 6. Conjugation of antibodies to the reduced interchain cysteines of EGFRvIII or control mAbs to monomethylauristatin E (MMAE) drug attached to a peptide cleavable valine-citrulline linker was done using the following methodology. Lyophilized MC-vc-PAB-MMAE is solubilized in dimethylacetamide to a final concentration of 10 mM. This stock is aliquoted and stored at −20° C. until used. Prior to conjugation, each protein sample must have its surface-accessible disulphide bonds reduced to generate reactive free thiols. The level of DAR is controlled by adjusting the degree of reduction of disulphide bonds by increasing the concentration of reducing agent. To achieve the desired specified DAR, a three-point scouting experiment using three different concentrations of TCEP (24, 40 and 55 μM) with a final concentration of antibody of 10 μM. The reduction is initiated by addition of TCEP from a 25× working stock into the antibody solution in the following buffer: 100 mM sodium phosphate, 20 mM NaCl, 2 mM EDTA, pH 7.2. The mixture is incubated at 37° C. for 3 h. A 10-fold molar excess (100 μM) of MC-vc-PAB-MMAE is added to the reaction mixture from a 20× working stock in DMA. The final concentration of co-solvent in the reaction is 5% v/v. The reaction is incubated at 25° C. for 1 h. During this incubation, 3×0 0.5 mL 7K MWCO Zeba Spin columns are pre-equilibrated in standard formulation buffer (20 mM Succinate, 0.02% w/v Polysorbate-20, pH 6.0). After the reaction is complete, Polysorbate-20 is added to a final concentration of 0.02% w/v prior to passing the reaction mixture consecutively through the pre-equilibrated Zeba columns. To the eluant, ⅕th volume of 36% Trehalose solution (in formulations buffer) is added. Absorbance measurements of the conjugate at 248 nm and 280 nm are used to calculate the DAR, and the sample measured for monomeric purity by HPLC-Superdex size-exclusion chromatography. The DAR for each of the three TCEP concentrations is plotted vs the DAR and the slope of the linear relationship used to determine the optimal concentration to reach the desired DAR. The above procedure is then repeated using these optimal conditions at the specified scale. Final concentration reported for the conjugate is adjusted to compensate for contribution at 280 nm from attached drug.

Prior to conjugation, an absorbance scan of the protein (antibody) sample (2 μL) is measured on a Nanodrop 2000 instrument. The ratio of the absorbance at 248/280 nm is determined and used to calculate the extinction coefficient of the antibody to be conjugated at 252 nm (for MCC-DM1 conjugates) or 248 nm (for val-cit MMAE conjugates). This value will be used to determine the drug:antibody ratio (DAR) for the conjugate produced.

Drug (DM1- and MMAE-) conjugated antibodies were tested for growth inhibition activity on glioblastoma cell lines (U87 and/or DKMG) expressing EGFRvIII or wt EGFR. Typical results are shown in FIG. 6 and averages presented in Tables 10 and 11.

The DM1-conjugated chimeric anti-EGFRvIII antibodies demonstrated good efficacy (from 77-80% maximal growth inhibition) and strong potency (IC50 range 0.9-3.9 nM) compared to the benchmark mAb used (hFc13.1.2-DM1, IC50=9.3 nM) in the U87 EGFRvIII expressing cell lines analyzed. Furthermore, the activity of both test antibodies, particularly hFc-4E11-DM1, appeared to be very potent on EGFRvIII expressing cells i.e. 18-fold more potent than that seen on EGFRwt expressing cells and 25-fold more potent than that seen with DM1-conjugated Palivizumab, the non-targeted irrelevant control ADC. (Table 10). Similar results were seen in DKMG cells expressing EGFRvIII.

Table 10 provides the results of DM1-ADC testing of chimeric anti-EGFRvIII antibodies DAR: drug-antibody ratio % max inh=percent maximal inhibition.

TABLE 10

Results of DM1-ADC testing of chimeric anti-EGFRvIII Antibodies

| Chimeric mAb | DAR | U87MG EGFRvIII | | U87MG EGFR wt | | DKMG EGFRvIII | |
|---|---|---|---|---|---|---|---|
| | | IC50 (nM) | % max inh | IC50 (nM) | % max inh | IC50 (nM) | % max inh |
| hFc-4E11-DM1 | 3.0-3.2 | 0.9 +/− 0.5 (14) | 80 +/− 5 (14) | 16.3 +/− 5.7 (3) | 70 +/− 3 (3) | 0.6 +/− 0.4 (2) | 92 +/− 1 (2) |
| hFc-5G6-DM1 | 3.1-3.2 | 3.9 +/− 1.5 (14) | 80 +/− 5 (14) | 20.4 +/− 3.7 (3) | 70 +/− 6 (3) | 0.8 +/− 0.5 (2) | 95 +/− 0.4 (2) |

TABLE 10-continued

Results of DM1-ADC testing of chimeric anti-EGFRvIII Antibodies

| Chimeric mAb | DAR | U87MG EGFRvIII | | U87MG EGFR wt | | DKMG EGFRvIII | |
|---|---|---|---|---|---|---|---|
| | | IC50 (nM) | % max inh | IC50 (nM) | % max inh | IC50 (nM) | % max inh |
| hFc-13.1.2-DM1 | 3.5-4.0 | 9.3 +/− 4.4 (16) | 78 +/− 5 (16) | 14.9 +/− 3.4 (3) | 70 +/− 6 (3) | 5.7 +/− 3.9 (2) | 95 +/− 0.4 (2) |
| Palivizumab-DM1 | 2.3-3.4 | 24.7 +/− 10.6 (25) | 77 +/− 9 (25) | 20.2 +/− 4.7 (12) | 68 +/− 7 (12) | 40.4 +/− 33.3 (2) | 112 +/− 15 (2) |

When tested, the MMAE-conjugated chimeric anti-EGFRvIII antibodies demonstrated good efficacy (from 75-95% maximal growth inhibition) and strong potency (IC50<0.2-0.4 nM) in cell lines overexpressing EGFRvIII compared to the benchmark 13.1.2 (IC50 of 1.9-2.5) or to the non-targeted irrelevant chimeric Palivizumab conjugate negative control (Table 11).

Table 11 provides the results of MMAE-ADC testing of chimeric anti-EGFRvIII Antibodies

| | | Cell Line | | | | | |
|---|---|---|---|---|---|---|---|
| | | U87MG EGFRvIII | | U87MG EGFR wt | | DKMG EGFRvIII | |
| mAb | DAR | IC50 (nM) | % max inh | IC50 (nM) | % max inh | IC50 (nM) | % max inh |
| hFc-4E11-MMAE | 3.4-3.8 | 0.2 +/− 0.1 (11) | 78 +/− 4 (11) | 18.8 +/− 4.1 (2) | 72 +/− 9 (2) | 0.4 +/− 0.2 (2) | 94 +/− 0.4 (2) |
| hFc-5G6-MMAE | 3.2-3.9 | 0.3 +/− 0.1 (10) | 75 +/− 4 (10) | 31.4 +/− 0.7 (2) | 65 +/− 14 (2) | 0.3 +/− 0.2 (2) | 95 +/− 0.4 (2) |
| hFc-13.1.2-MMAE | 3.0-3.7 | 1.9 +/− 0.9 (13) | 79 +/− 7 (13) | 25.0 (1) | 61 (1) | 2.5 +/− 1.8 (2) | 94 +/− 0.4 (2) |
| Palivizumab-MMAE | 4.3-5.3 | 18.8 +/− 4.7 (8) | 78 +/− 5 (8) | 16.0 +/− 0.3 (2) | 70 +/− 1 (2) | 68.1 +/− 4.4 (2) | 95 +/− 3 (2) |

Notably, both DM1- and MMAE conjugated hFc-4E11 and hFc-5G6 show superior functional activity in that they were up to 10× more potent than the corresponding benchmark 13.1.2 antibody conjugates against cells overexpressing EGFRvIII. In all cases, activity was shown to be significantly greater than that of a non-targeted irrelevant ADC control on cells expressing EGFRvIII. Furthermore, this effect was specific for EGFRvIII-expressing cells, since activity seen in the EGFRwt U87MG expressing cells was not significantly different than that seen for the corresponding irrelevant ADC control.

Example 14: In Vivo Tumor Growth Inhibition by ADCs in U87MG-vIII Tumor Xenograft Mouse Models To further assess efficacy in vivo, anti-EGFRvIII antibody-drug conjugates (ADCs) were evaluated for their ability to inhibit tumor growth in xenograft models expressing EGFRvIII.

The ADCs were tested in glioblastoma subcutaneous xenograft models (study number SP.03: 5 mg/kg of ADC and study number SP.06: 3 mg/kg of ADC).

Briefly, U87MG overexpressing EGFRvIII cells were cultured as described in Example 2. Cells were passaged twice a week and used within 4-6 weeks after thawing. They were harvested by trypsinization (0.25% trypsin/EDTA, Gibco15090-046) followed by washing in cold phosphate-buffered saline solution (PBS) and assessed for viability by capacity to exclude trypan blue dye. All cell populations for growth as xenografts in mice were, at a minimum, 98% viable.

Six weeks old, 25 gram male CD1 Albino mice (Crl:CD1-Foxn1$^{nu}$), were obtained from Charles River Canada (St-Constant, Quebec, Canada). Animals were cared for and used in accordance with the guidelines of the Canadian Council on Animal Care (CCAC).

Cells were subcutaneously inoculated ($5 \times 10^6$ cells in a volume of 0.1 mL PBS or HBSS per injection site) in the left flank of isoflurane anesthetized nude mice (n=12) under sterile condition. Tumors were allowed to grow to a size between 80 and 100 mm$^3$ in volume, after which animals were randomized one day prior to the dosing day to ensure that each cohort contains animals with variable tumor sizes.

Tumor growth was monitored every three days by caliper measurement for 29 days post treatment or until they were euthanized for ethical reasons (humane endpoints): 1) more than 10% body weight loss without weight recovery within 48 hours; 2) tumor volume over 2500 mm$^3$; 3) tumor ulcerations; 4) clear signs of distress such as immobility and reduced grooming etc.

Tumor volumes were calculated according to Formula IV:

$$\text{Estimated tumor volume [mm}^3\text{]} = \pi/6(\text{length [mm]}) \times (\text{width [mm]} \times (\text{height [mm]}))  \quad \text{(Formula IV)}$$

Test articles were prepared in ADC buffer and shown to contain <5% aggregates (by HPLC-SEC) and <1 EU/mg endotoxin. Mice were injected intravenously (i.v.) with the test articles at 5 mg/kg (Study SP.03) or 3 mg/kg (Study SP.06) based on DAR3 on day 0 and 4 (96 h interval) via tail vein. A control group was treated with ADC buffer.

All animals were observed once daily for mortality and signs of illness. Individual body weight and tumor size of animals were measured and recorded on the day of treatment and every three days afterwards.

Tumor volumes in each group are shown as mean±SEM and plotted as a function of measurement time after U87MG-EGFRvIII cell inoculation. Group comparisons for the tumor volume data were conducted using two-way ANOVA with Tukey's multiple comparisons test using GraphPad Prism version 7.0. Differences between treatment and control groups were statistically significant at p<0.05.

FIG. 7 represents the results of Study SP.03 and shows the effect of mouse anti-EGFRvIII ADCs on tumor growth, assessed as tumor volume.

A statistically significant (p<0.05) effect on tumor growth was observed between 5 mg/kg anti-EGFRvIII-DM1-treated and ADC buffer-treated groups from day 4 to day 20. The average tumor volume growth in the mouse anti-EGFRvIII-treated group was from about 90 to 195-287 $mm^3$, compared to the control group, which experienced tumor growth from about 90 to 1620 $mm^3$ at day 20. No statistically significant differences in tumor growth inhibition were observed among the different anti-ADCs at 5 mg/kg (Table 12). This striking difference in tumor volume shows that our mouse anti-EGFRvIII ADC can greatly inhibit tumor growth in a glioblastoma tumor model.

Body weight was measured as an indicator of off-target potential toxicity. No significant difference in body weight was observed between the control animals (ADC buffer group) and ADCs treated animals. Mice in both groups gained about 5-10% body weight during the experimental period.

TABLE 12

Percentage of tumor volume reduction compared to the control groups (ADC buffer).

| Study number | Test article | % of tumor volume reduction compared to control |
|---|---|---|
| SP.03 | 13.1.2-mIgG2-DM1 (DAR = 3.01) | 87.1 ± 3.9 |
| | 5G6-DM1 (DAR = 3.14) | 93.1 ± 3.8 |
| | 4E11-DM1 (DAR = 3.14) | 88.4 ± 4.2 |

Percentage of tumor volume (TV) reduction compared to control was calculated based on the equation: $\% = (\Delta TV_{control} - \Delta TV_{treated})/\Delta TV_{control} * 100$; $\Delta TV = TV_{d28} - TV_{d0}$ Significant tumor growth inhibition, ranging from 20-50% tumor volume reduction, was also observed in animals treated with 2 mg/kg of mouse anti-EGFRvIII ADCs, including 3E6-DM1, 11 H3-DM1, 1A8-DM1 in addition to 5G6-DM1, 4E11-DM1 and the benchmark 13.1.2-DM1 groups as compared to anti-GFP-DM1 irrelevant ADC control (data not shown).

FIG. 8A and FIG. 8B represent the result of Study SP.06 and show the effect of chimeric anti-EGFRvIII DM1-ADCs or MMAE-ADCs respectively on tumor growth, assessed as tumor volume. Tumor growth curves in U87MG-EGFRvIII tumor-bearing mice treated twice (day 0 and 4) with either ADC buffer (control) or 3 mg/kg of ADCs, with tumor volumes ($mm^3$) being recorded every three days for 17 days. Each data point represents mean±SEM, for ADC buffer (circles), hFc-5G6-DM1 (diamonds), hFc-4E11-DM1 (open circles), the benchmark hFc-13.1.2-DM1 (triangles) and the negative control Palivizumab-DM1 (squares) groups. Palivizumab is a humanized mAb against respiratory syncytial virus (RSV).

Both Palivizumab-DM1 (FIG. 8A) and Palivizumab-MMAE (FIG. 8B) treated animals showed a significant decrease (p<0.05) in tumor growth compared to ADC buffer-treated groups with a tumor reduction of 31.0 and 22.8% respectively at day 17 (Table 13). However, the chimeric anti-EGFRvIII ADC-treated animals showed a more significant (p<0.05) reduction in tumor growth compared to buffer-treated groups from day 11 to day 17 with a tumor volume reduction between 37.2 to 60.0% at day 17. No statistically significant differences in tumor growth inhibition were observed among the different chimeric anti-EGFRvIII ADCs. There were no statistically significant differences between the corresponding DM1 and MMAE conjugates (p>0.05). U87MGvIII xenografted tumors tended to ulcerate during the experimental period. Both control and ADC-treated groups showed more than 50% ulceration rates, with the only exception of the hFc-4E11-DM1-treated animals that exhibited a markedly lower ulceration rate (~16.7%, data not shown).

TABLE 13

Percentage of tumor volume reduction compared to the control groups (ADC buffer) at day 17 post-treatment initiation (Mean ± SEM).

| Study number | Test article | % of tumor volume reduction compared to control |
|---|---|---|
| SP.06 | Palivizumab-DM1 (DAR = 3.39) | 31.0 ± 9.36 |
| | hFc-13.1.2-DM1 (DAR = 4.04) | 38.7 ± 16.23 |
| | hFc-5G6-DM1 (DAR = 3.14) | 52.9 ± 12.28 |
| | hFc-4E11-DM1 (DAR = 2.97) | 58.8 ± 10.1 |
| | hFc-13.1.2-MMAE (DAR = 3.73) | 41.9 ± 7.26 |
| | hFc-5G6-MMAE (DAR = 3.88) | 60.0 ± 8.83 |
| | hFc-4E11-MMAE (DAR = 3.81) | 37.2 ± 6.26 |
| | Palivizumab-MMAE (DAR = 5.30) | 22.8 ± 8.09 |

Percentage of tumor volume (TV) reduction compared to control was calculated based on the equation: $\% = (\Delta TV_{control} - \Delta TV_{treated})/\Delta TV_{control} * 100$; $\Delta TV = TV_{d17} - TV_{d0}$ In summary, the chimeric anti-EGFRvIII ADC-treated animals showed a more significant (p<0.05) reduction in tumor growth compared to buffer-treated groups during the course of the study and were shown to be comparable to or more potent than the 13.1.2 benchmark when evaluated as an MMAE or DM1 conjugate, respectively. Notably, at day 17, the benchmark 13.1.2-DM1 induced a significantly lower tumor growth inhibition in the U87MGvIII model compared to 4E11-DM1 (p<0.05).

Example 15: Chimeric Antigen Receptor T-Cell Functional Testing

Various experiments were performed to demonstrate the activity of novel EGFRvIII-specific single chain variable fragments in the context of a chimeric antigen receptor (CAR). Briefly, single chain variable fragments composed of the heavy and light chains of 5G6 (SEQ ID NO:12 and SEQ ID NO:7 respectively, for example as in the scFv of SEQ ID NO:166) or 4E11 (SEQ ID NO: 42 and SEQ ID NO:37 respectively, as provided in for example the scFv of SEQ ID NO:167) sequences linked using a flexible linker sequence and restriction sites (for example, GTGGGGSGGGGSGGGGSDV (SEQ ID NO:171), it should be noted that any suitable linker known in the art may be used in the scFv constructs provided herein) were combined with a standard CAR construct. CAR construct used for testing was comprised of one of a human CD28-signal peptide, immediately aforementioned scFv sequences, a mouse CD8-hinge domain, human CD28-transmembrane domain, CD28-intracellular signal transduction domain, and CD3-zeta intracellular signal transduction domain (5G6-CAR SEQ ID NO: 168, 4E11-CAR SEQ ID NO: 169).

Figure 10:
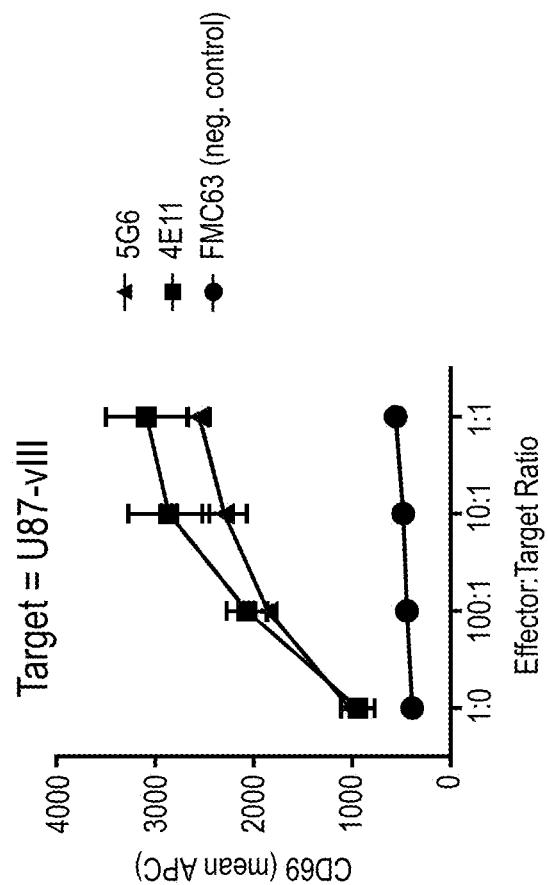
FIG. 10: Graph illustrating the in vitro functionality of EGFRvIII CAR-T constructs. Jurkat cells electroporated with various CAR constructs (EGFRvIII 5G6 CAR, EGFRvIII 4E11 CAR, or control CD19-specific FMC63 CAR) were exposed to target cells with (U87vIII) or without (U87, OVCAR3 and A20) EGFRvIII target expression for 24 hours. The level of cell activation was measured by quantifying surface expression of CD69 on Jurkat cells (CD45 positive) by flow cytometry.

The in vitro functionality of the EGFRvIII CAR constructs was tested using a novel flow cytometry based high-throughput screening platform developed by the Applicant; which is in some instances referred to as CAR-J assay. In brief, EGFRvIII-specific (described immediately above) or control (CD19-targeted) CAR plasmids were electroporated into the Jurkat human CD8+ T-cell line. Cells expressing CAR were then exposed to various target cell lines (with or without EGFRvIII expression) in varying doses and maintained under standard culture conditions. Following 24 hours of co-incubation with target cells, CAR-T cells were examined for cellular activation by flow cytometry via surface expression of the T-cell activation marker CD69. The level of auto-activation (tonic signaling) associated with each CAR was also examined by quantification of the level of CD69 expression on non-stimulated CAR-expressing Jurkat cells or CAR-expressing Jurkat cells incubated with irrelevant target cells (FIG. 10).

Human primary peripheral blood derived T cells were used for confirmation of in vitro and in vivo activity of EGFRvIII targeted 4E11 or 5G6 CARs constructs in the context of primary human immune cells. In brief, EGFRvIII-CAR or control (human CD19-targeted FMC63-CAR) lentivirus was generated using standard production protocols in HEK293 and concentrated using ultracentrifugation. Primary T cells were isolated from donor blood samples using magnetic separation and activated using anti-CD3/CD28 beads. Primary T cells were then transduced with CAR lentivirus and expanded for several days in culture.

Figure 11:
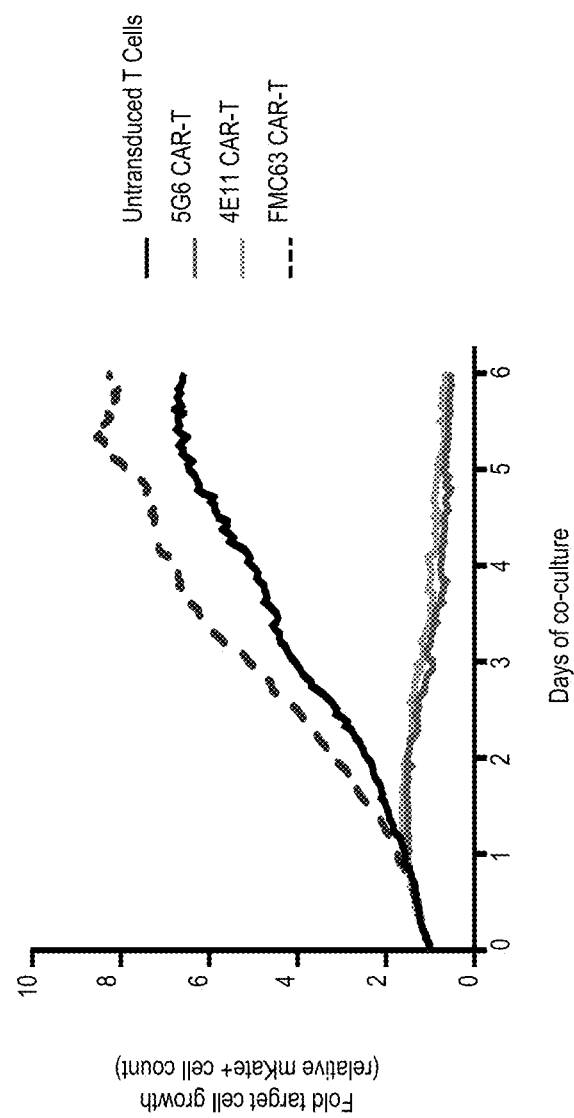
FIG. 11: Graph illustrating repression of target cell growth in CAR transduced T-cell/target cell co-cultures. Human primary peripheral blood derived T cells were transduced with EGFRvIII-specific CAR lentivirus (4E11-CAR-T or 5G6-CAR-T), CD19-specific CAR lentivirus (FMC63) or treated similarly in the absence of lentivirus (Mock) and grown for several days in culture. CAR transduced or non-transduced T cells were then placed in co-culture with EGFRvIII antigen expressing target cells which express nuclear localized mKate2-fluorescent protein (U87vIII). Cells were then examined using live fluorescence microscopy (Incucyte™, Sartorius). Graph depicts the relative target cell growth over 6 days as measured via automated counting of mKate2+ cells.

In vitro functionality of primary human EGFRvIII-specific CAR-transduced T cells were assessed using a live-fluorescence microscopy approach. Briefly, EGFRvIII targeted CAR-T or mock transduced T cells, wherein no lentiviral construct was introduced into cells handled under similar conditions, were generated as described immediately above. Cells were then placed in co-culture with EGFRvIII-expressing target cells modified to also express a nuclear-localized form of mKate2 fluorescent protein. Co-cultures were monitored constantly over 6 days using the Incucyte™ automated live fluorescent microscopy device (Sartorius, USA). The relative growth of target cells was then assessed using automated counting of mKate2+ cells (FIG. 11). Data showed that the growth of U87MG overexpressing EGFRvIII cells was efficiently repressed by 4E11 or 5G6 CAR-T compared to a control CAR-T (FMC63) or mock transduced T-cells.

Figure 12A:
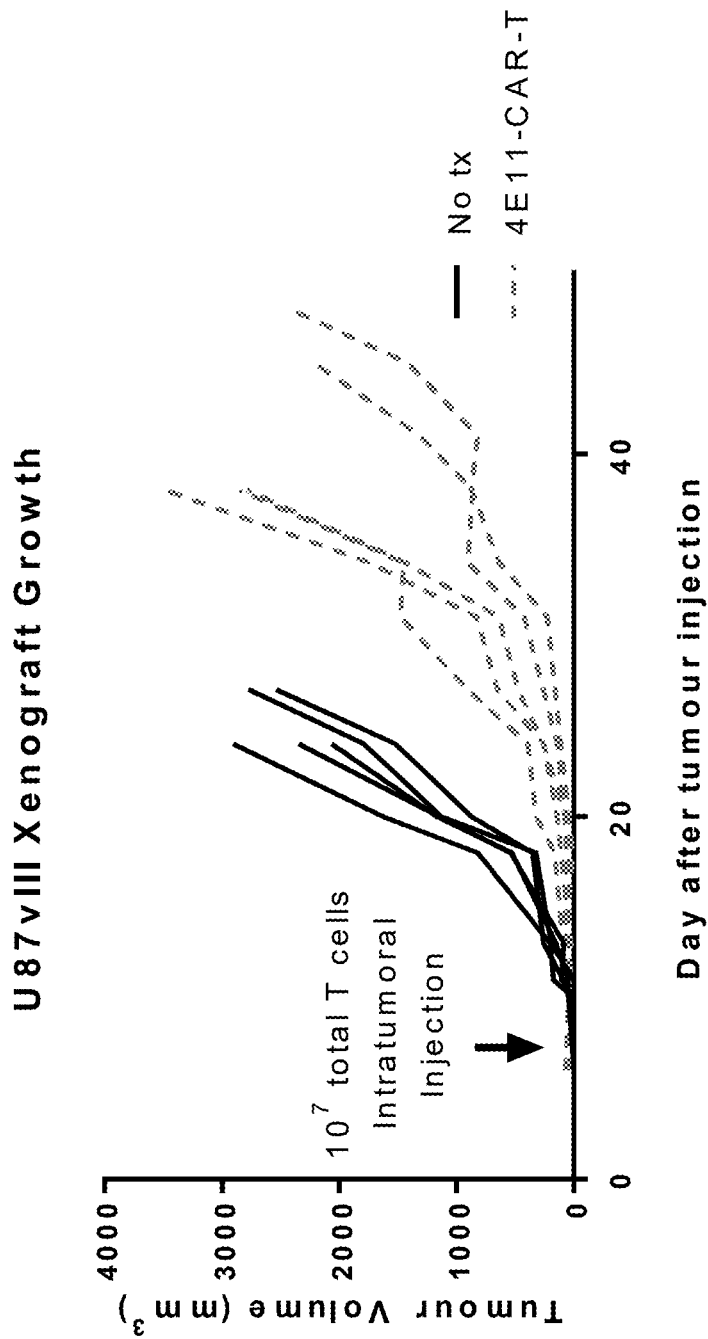
FIG. 12: Graphs illustrating tumor growth (left panels) and survival (right panels) of tumor-bearing NOD/SCID/IL-2Rγ-null (NSG) mice. NSG mice (Jackson Laboratory, Barr Harbor, ME) were injected subcutaneously with 1×10$^6$ U87vIII human glioblastoma cells expressing EGFRvIII. On day 7 post tumor cell injection, mice were given either primary human T cells transduced with EGFRvIII-4E11 CAR or left untreated. Tumour growth was then monitored by caliper measurements (FIG. 12A). Tumor size (the length and the width) was measured using a digital vernier caliper. Tumor volume was calculated by using the formula: Tumor volume=(0.4) (ab2), where a=large diameter and b=smaller diameter. Survival is defined as time to humane endpoint (defined as a tumour volume exceeding 2000 mm$^3$) with and without CAR-T treatment (FIG. 12B).
Figure 12B:
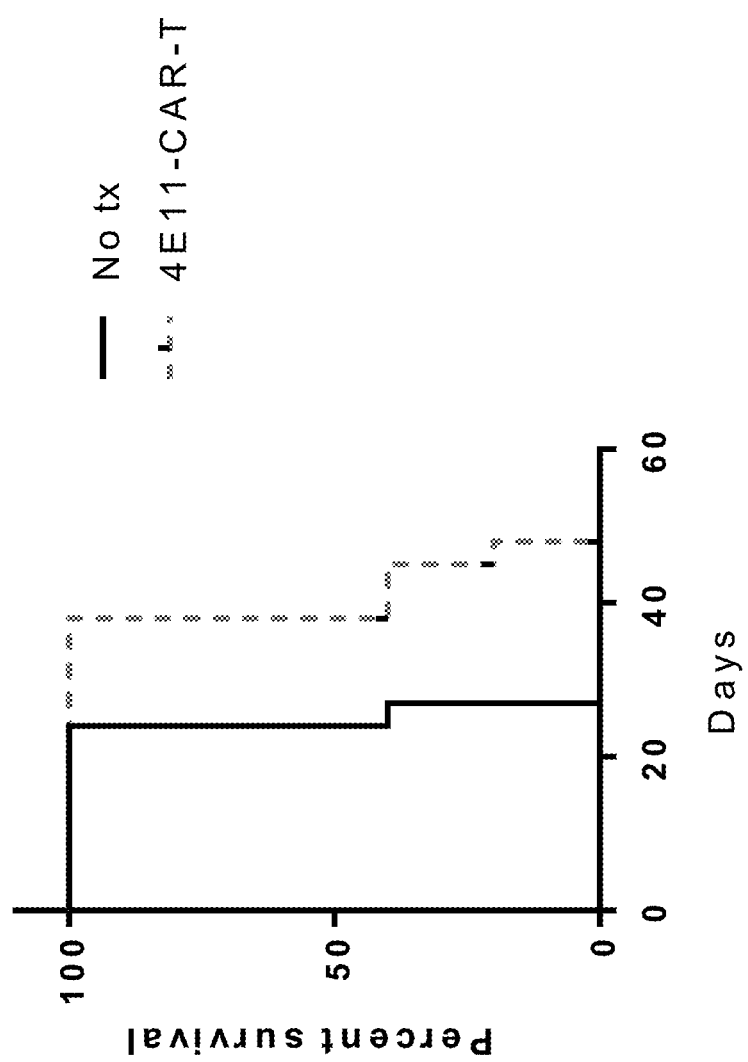

The in vivo functionality of the EGFRvIII targeted primary CAR-T cells was also tested using Nod-SCID-IL2γR2$^{-/-}$ (NSG) mice (Jackson Laboratory, Barr Harbor, ME) bearing EGFRvIII expressing U87vIII tumors. Briefly, mice were subcutaneously injected with 1×10$^6$ fluorescently labelled U87-vIII cells. Eight days after tumour cell injection, cryo-preserved CAR-T cells were thawed, washed with PBS, and 1×10$^7$ total T cells (with 20-25% CAR transduction) were immediately delivered intra-tumourally, ensuring equal distribution of tumour sizes between groups. Tumour growth was evaluated three times per week using calipers by trained animal technicians blinded to specific treatment groups (FIG. 12A). Primary endpoint was tumour size above 2000 mm3, with secondary endpoints determined by overall animal health and well-being (FIG. 12B). Tumor volume was calculated by using the formula: Tumor volume=(0.4) (ab2), where a=large diameter and b=smaller diameter.

In this study, better control of tumor growth and increased survival was seen in animals receiving target-specific 4E11 primary CAR-T compared to untreated control animals (FIG. 12A and FIG. 12B) respectively.

Example 16: Bi-Specific Immune Cell Engager Functional Testing

Figure 13:
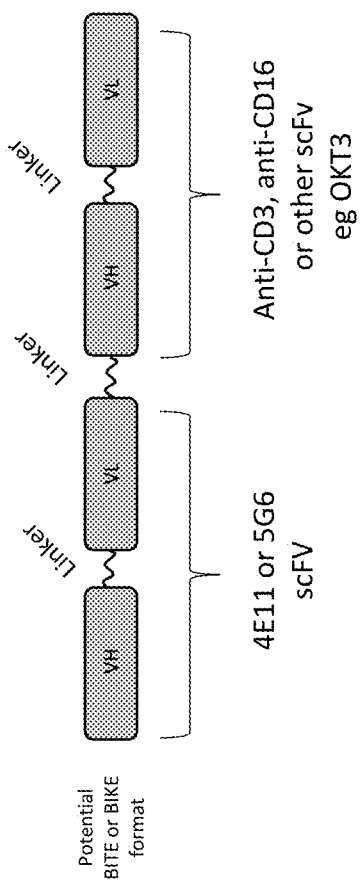
FIG. 13: Schematic illustrating potential bi-specific T-cell engagers and bispecific killer cell engagers.
Figure 14:
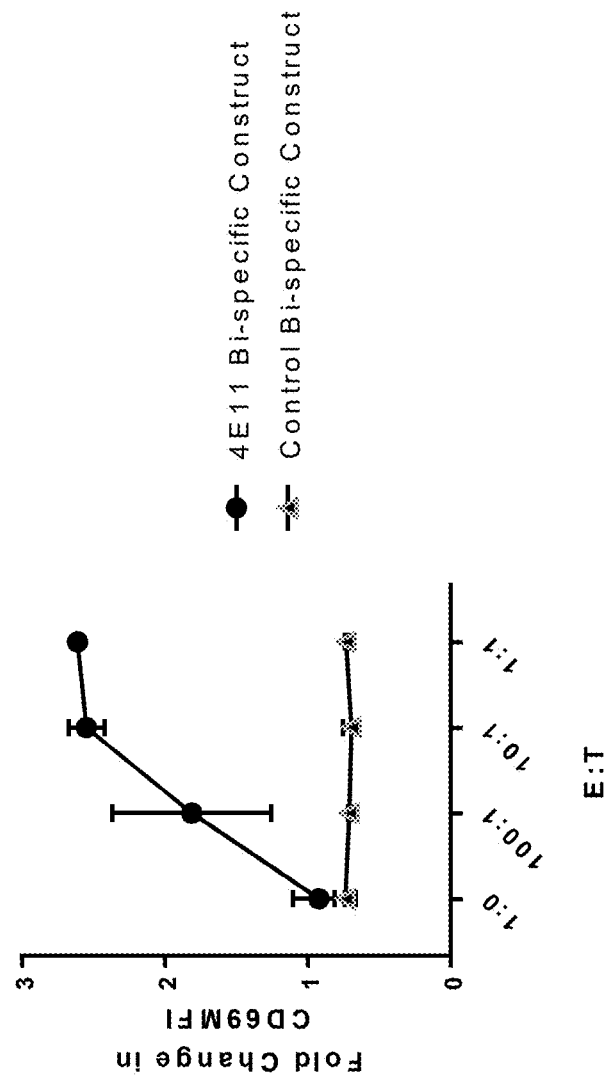
FIG. 14: Graph illustrating screening of bi-specific T cell engager activity with EGFRvIII-specific construct containing 4E11-scFV sequence linked to OKT3 human CD3-specific scFV. Supernatant from human embryonic kidney (HEK293) cells transiently expressing 4E11-OKT3 bi-specific engager construct were transferred to wells containing Jurkat cells and varying doses of antigen expressing target cells (U87vIII). Target-induced activation of in the presence or absence of bispecific T-cell engager was measured by examining the level of CD69 expression using human CD69-specific antibody staining and flow cytometry. The fold change in CD69 expression with and without bispecific-T cell engager over varying doses of target cell is shown here.

Various experiments were performed to demonstrate the activity of the novel EGFRvIII-specific single chain variable fragment in the context of a bispecific T cell engager. Constructs were generated using synthetic DNA wherein the 4E11 scFV sequence (SEQ ID NO: 167) was linked to a previously demonstrated CD3-engaging scFv sequence (OKT3) to form a bi-specific engager molecule (SEQ ID NO:170). A schematic for an exemplary bi-specific immune cell engager is provided (FIG. 13). A plasmid expressing this bi-specific construct was transfected into human embryonic kidney cells (HEK293T) and supernatant was collected after 2 to 4 days in culture. Supernatant from HEK293T were transferred to wells containing Jurkat cells and varying doses of antigen expressing target cells (U87vIII). Target-induced activation in the presence or absence of bispecific T-cell engager was measured by examining the level of CD69 expression using human CD69-specific antibody staining and flow cytometry (FIG. 14). Data showed that only EGFRvIII targeted 4E11 bi-specific construct could induce high target-specific T-cell activation response compared to a control bi-specific molecule.

Figure 15:
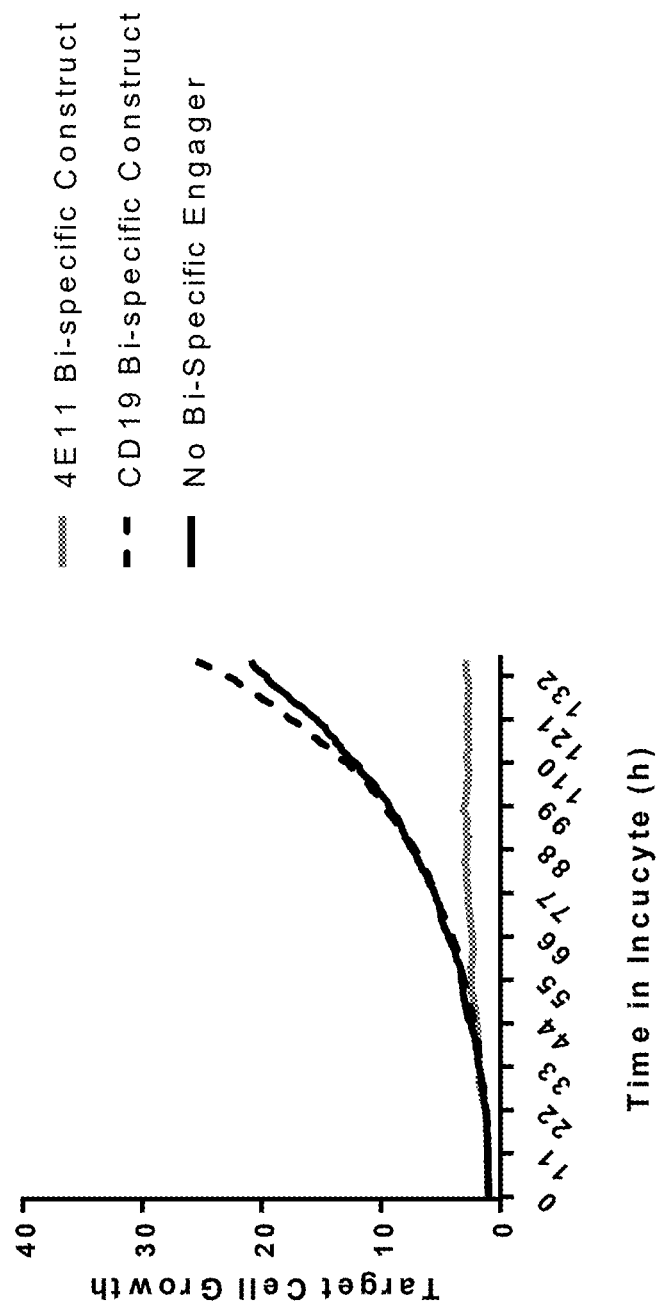
FIG. 15: Graph illustrating repression of target cell growth in T-cell/target cell co-cultures in the presence of a bi-specific T cell engager constructs containing 4E11-scFV sequence linked to OKT3 human CD3-specific scFV. A control bi-specific T cell engager composed of human-CD19-specific scFv linked to OKT3 is shown for comparison. Supernatant from human embryonic kidney cells transiently expressing 4E11-OKT3 bi-specific T cell engager construct or the CD19-OKT3 bi-specific T cell engager construct were transferred to wells containing primary blood derived T cells and EGFRvIII antigen expressing target cells which express nuclear localized mKate2-fluorescent protein (U87vIII). Cells were then examined using live fluorescence microscopy (Incucyte™, Sartorius, USA). Graph depicts the relative target cell growth over 72 hours as measured via automated counting of mKate2+ cells.

In vitro functionality of primary human EGFRvIII-specific bi-specific immune cell engager in interaction with primary human T cells were assessed using a live-fluorescence microscopy approach. Briefly, polyclonally expanded human T cells which were allowed to return to a rest state over several weeks in culture were placed in co-culture with EGFRvIII-expressing target cells modified to also express a nuclear-localized form of mKate2 fluorescent protein. Various doses of HEK293T supernatant, or supernatant wherein cells were secreting a control CD19-CD3 targeted or EGFRvIII-specific 4E11-CD3 targeted bi-specific immune cell engager were transferred to T-cell target cell co-cultures. Co-cultures were then monitored constantly over 6 days using the Incucyte™ automated live fluorescent microscopy device (Sartorius, USA). The relative growth of target cells was then assessed using automated counting of mKate2+ cells (FIG. 15). Results demonstrate that 4E11-CD3 bi-specific immune cell engagers can actively induce T-cell mediated repression of EGFRvIII-positive tumour cell growth compared to the bi-specific CD19-CD3 control molecule or mock supernatant.

The embodiments and examples described herein are illustrative and are not meant to limit the scope of the disclosure as claimed. Variations of the foregoing embodiments, including alternatives, modifications and equivalents, are intended by the inventors to be encompassed by the claims. Citations listed in the present application are incorporated herein by reference.

REFERENCES

All patents, patent applications and publications referred to throughout the application are incorporated herein by reference.

Abhinandan, K R and Martin, A C R. Analysis and improvements to Kabat and structurally correct numbering of antibody variable domains. 2008; Mol Immunol, 45, 3832-3839.

Cleary, J M et al., Invest New Drugs, 33(3), pp. 671-8, 2015.;

Chothia C, Lesk A M. Canonical structures for the hypervariable regions of immunoglobulins. J Mol Biol. 1987 Aug. 20; 196(4):901-17.

Elvin A. Kabat, Tai Te Wu, Carl Foeller, Harold M. Perry, Kay S. Gottesman, Sequences of Proteins of Immunological Interest, Vol. 1 DIANE Publishing, 1992-2719.

Feldhaus M J et al., 2003 Nat Biotechnol. 2003 February; 21(2):163-70.

Gan H K, Cvrljevic A N, Johns T G. The epidermal growth factor receptor variant III (EGFRvIII): where wild things are altered. FEBS J. 2013 280):5350-70.

Hamblett K. J, et al., Molecular Cancer Therapeutics, Vol. 14(7), pp. 1614-24, 2015.

Johnson G, Wu T T. The Kabat database and a bioinformatics example. Methods Mol Biol. 2004; 248:11-25.

Jones P T, Dear P H, Foote J, Neuberger M S, Winter G (1986) Nature 321, 522-525.

Kabat E A, Wu T T. Identical V region amino acid sequences and segments of sequences in antibodies of different specificities. Relative contributions of VH and VL genes, minigenes, and complementarity-determining regions to binding of antibody-combining sites. J Immunol. 1991; 147:1709-19.

Mendelsohn J, et al., Clin Cancer Res. 2015 Jan. 15; 21(2):227-9.

Reilly, E B., Molecular Cancer Therapeutics, Vol. 14(5), pp. 1141-51, 2015.201

Jones P T, Dear P H, Foote J, Neuberger M S, Winter G (1986) Nature 321, 522-525

Riechmann L, Clark M, Waldmann H, Winter G (1988) Nature 332, 323-327.

Sato J D, et al., Mol. Biol. Med. 1: 511-529, 1983.

Tempest P R, Bremmer P, Lambert M, Taylor G, Furze J M, Carr F J, Harris W J (1991) Biotechnology 9, 266-271.

Tsurushita N, Hinton, R P, Kumar S (2005) Design of humanized antibodies: From anti-Tac to Zenapax. Methods 36, 69-83.

Queen C, Schneider W P, Selick H E, Payne P W, Landolfi N F, Duncan J F, Avdalovic N M, Levitt M, Junghans R P, Waldmann T A (1989) Proc Natl Acad Sci USA 86, 10029-10033.

Tempest P R, Bremmer P, Lambert M, Taylor G, Furze J M, Carr F J, Harris W J (1991) Biotechnology 9, 266-271.

U.S. Pat. No. 7,736,644.

U.S. Pat. No. 4,943,533 dated Jul. 24 1990.

Yano S, Kondo K, Yamaguchi M, Richmond G, Hutchison M, Wakeling A, Averbuch S, Wadsworth P. Distribution and function of EGFR in human tissue and the effect of EGFR tyrosine kinase inhibition. Anticancer Res. 2003 September-October; 23(5A):3639-50.

Cleary J M, Reardon D A, Azad N, Gandhi L, Shapiro G I, Chaves J, Pedersen M, Ansell P, Ames W, Xiong H, Munasinghe W, Dudley M, Reilly E B, Holen K, Humerickhouse R. A phase 1 study of ABT-806 in subjects with advanced solid tumors. Invest New Drugs. 2015 June; 33(3):671-8 2015

Panousis C, Rayzman V M, Johns T G, Renner C, Liu Z, Cartwright G, Lee F T, Wang D, Gan H, Cao D, Kypridis A, Smyth F E, Brechbiel M W, Burgess A W, Old L J, Scott A M. Engineering and characterisation of chimeric monoclonal antibody 806 (ch806) for targeted immunotherapy of tumours expressing de2-7 EGFR or amplified EGFR. Br J Cancer. 2005 Mar. 28; 92(6):1069-77.

SEQUENCE TABLE
In some sequences, CDRs are underlined and indicated in bold

| Seq. ID | Description | Sequence |
|---|---|---|
| 1 | Wild type human EGFR amino acid sequence (signal peptide in bold and underined) | MRPSGTAGAALLALLAALCPASRALEEKKVCQGTSNKLTQLGTFEDHFLSLQR MFNNCEVVLGNLEITYVQRNYDLSFLKTIQEVAGYVLIALNTVERIPLENLQI IRGNMYYENSYALAVLsNYDANKTGLKELPMRNLQEILHGAVRFSNNPALCNV ESIQWRDIVSSDFLSNMSMDFQNHLGSCQKCDPSCPNGSCWGAGEENCQKLTK IICAQQCSGRCRGKSPSDCCHNQCAAGCTGPRESDCLVCRKFRDEATCKDTCP PLMLYNPTTYQMDVNPEGKYSFGATCVKKCPRNYVVTDHGSCVRACGADSYEM EEDGVRKCKKCEGPCRKVCNGIGIGEFKDSLSINATNIKHFKNCTSISGDLHI LPVAFRGDSFTHTPPLDPQELDILKTVKEITGFLLIQAWPENRTDLHAFENLE IIRGRTKQHGQFSLAVVSLNITSLGLRSLKEISDGDVIISGNKNLCYANTINW KKLFGTSGQKTKIISNRGENSCKATGQVCHALCSPEGCWGPEPRDCVSCRNVS RGRECVDKCNLLEGEPREFVENSECIQCHPECLPQAMNITCTGRGPDNCIQCA HYIDGPHCVKTCPAGVMGENNTLVWKYADAGHVCHLCHPNCTYGCTGPGLEGC PTNGPKIPSIATGMVGALLLLLVVALGIGLFMRRRHIVRKRTLRRLLQERELV EPLTPSGEAPNQALLRILKETEFKKIKVLGSGAFGTVYKGLWIPEGEKVKIPV AIKELREATSPKANKEILDEAYVMASVDNPHVCRLLGICLTSTVQLITQLMPF GCLLDYVREHKDNIGSQYLLNWCVQIAKGMNYLEDRRLVHRDLAARNVLVKTP QHVKITDFGLAKLLGAEEKEYHAEGGKVPIKWMALESILHRIYTHQSDVWSYG VTVWELMTFGSKPYDGIPASEISSILEKGERLPQPPICTIDVYMIMVKCWMID |

SEQUENCE TABLE
In some sequences, CDRs are underlined and indicated in bold

| Seq. ID | Description | Sequence |
|---|---|---|
| | | ADSRPKFRELIIEFSKMARDPQRYLVIQGDERMHLPSPTDSNFYRALMDEEDM<br>DDVVDADEYLIPQQGFFSSPSTSRTPLLSSLSATSNNSTVACIDRNGLQSCPI<br>KEDSFLQRYSSDPTGALTEDSIDDTFLPVPEYINQSVPKRPAGSVQNPVYHNQ<br>PLNPAPSRDPHYQDPHSTAVGNPEYLNTVQPTCVNSTFDSPAHWAQKGSHQIS<br>LDNPDYQQDFFPKEAKPNGIFKGSTAENAEYLRVAPQSSEFIGA |
| 2 | Wild type human EGFR ectodomain cDNA sequence | CTGGAGGAAAAGAAAGTTTGCCAAGGCACGAGTAACAAGCTCACGCAGTTGGG<br>CACTTTTGAAGATCATTTTCTCAGCCTCCAGAGGATGTTCAATAACTGTGAGG<br>TGGTCCTTGGGAATTTGGAAATTACCTATGTGCAGAGGAATTATGATCTTTCC<br>TTCTTAAAGACCATCCAGGAGGTGGCTGGTTATGTCCTCATTGCCCTCAACAC<br>AGTGGAGCGAATTCCTTTGGAAAACCTGCAGATCATCAGAGGAAATATGTACT<br>ACGAAAATTCCTATGCCTTAGCAGTCTTATCTAACTATGATGCAAATAAAACC<br>GGACTGAAGGAGCTGCCCATGAGAAATTTACAGGAAATCCTGCATGGCGCCGT<br>GCGGTTCAGCAACAACCCTGCCCTGTGCAACGTGGAGAGCATCCAGTGGCGGG<br>ACATAGTCAGCAGTGACTTTCTCAGCAACATGTCGATGGACTTCCAGAACCAC<br>CTGGGCAGCTGCCAAAAGTGTGATCCAAGCTGTCCCAATGGGAGCTGCTGGGG<br>TGCAGGAGAGGAGAACTGCCAGAAACTGACCAAAATCATCTGTGCCCAGCAGT<br>GCTCCGGGCGCTGCCGTGGCAAGTCCCCCAGTGACTGCTGCCACAACCAGTGT<br>GCTGCAGGCTGCACAGGCCCCCGGGAGAGCGACTGCCTGGTCTGCCGCAAATT<br>CCGAGACGAAGCCACGTGCAAGGACACCTGCCCCCCACTCATGCTCTACAACC<br>CCACCACGTACCAGATGGATGTGAACCCCGAGGGCAAATACAGCTTTGGTGCC<br>ACCTGCGTGAAGAAGTGTCCCCGTAATTATGTGGTGACAGATCACGGCTCGTG<br>CGTCCGAGCCTGTGGGGCCGACAGCTATGAGATGGAGGAAGACGGCGTCCGCA<br>AGTGTAAGAAGTGCGAAGGGCCTTGCCGCAAAGTGTGTAACGGAATAGGTATT<br>GGTGAATTTAAAGACTCACTCTCCATAAATGCTACGAATATTAAACACTTCAA<br>AAACTGCACCTCCATCAGTGGCGATCTCCACATCCTGCCGGTGGCATTTAGGG<br>GTGACTCCTTCACACATACTCCTCCTCTGGATCCACAGGAACTGGATATTCTG<br>AAAACCGTAAAGGAAATCACAGGGTTTTTGCTGATTCAGGCTTGGCCTGAAAA<br>CAGGACGGACCTCCATGCCTTTGAGAACCTAGAAATCATACGCGGCAGGACCA<br>AGCAACATGGTCAGTTTTCTCTTGCAGTCGTCAGCCTGAACATAACATCCTTG<br>GGATTACGCTCCCTCAAGGAGATAAGTGATGGAGATGTGATAATTTCAGGAAA<br>CAAAAATTTGTGCTATGCAAATACAATAAACTGGAAAAAACTGTTTGGGACCT<br>CCGGTCAGAAAACCAAAATTATAAGCAACAGAGGTGAAAACAGCTGCAAGGCC<br>ACAGGCCAGGTCTGCCATGCCTTGTGCTCCCCCGAGGGCTGCTGGGGCCCGGA<br>GCCCAGGGACTGCGTCTCTTGCCGGAATGTCAGCCGAGGCAGGGAATGCGTGG<br>ACAAGTGCAACCTTCTGGAGGGTGAGCCAAGGGAGTTTGTGGAGAACTCTGAG<br>TGCATACAGTGCCACCCAGAGTGCCTGCCTCAGGCCATGAACATCACCTGCAC<br>AGGACGGGACCAGACAACTGTATCCAGTGTGCCCACTACATTGACGGCCCCC<br>ACTGCGTCAAGACCTGCCCGGCAGGAGTCATGGGAGAAAACAACACCCTGGTC<br>TGGAAGTACGCAGACGCCGGCCATGTGTGCCACCTGTGCCATCCAAACTGCAC<br>CTACGGATGCACTGGGCCAGGTCTTGAAGGCTGTCCAACGAATGGGCCTAAGA<br>TCCCGTCCATCGCC |
| 3 | Human EGFR Ectodomain amino acid sequence | LEEKKVCQGTSNKLTQLGTFEDHFLSLQRMFNNCEVVLGNLEITYVQRNYDLS<br>FLKTIQEVAGYVLIALNTVERIPLENLQIIRGNMYYENSYALAVLsNYDANKT<br>GLKELPMRNLQEILHGAVRFSNNPALCNVESIQWRDIVSSDFLSNMSMDFQNH<br>LGSCQKCDPSCPNGSCWGAGEENCQKLTKIICAQQCSGRCRGKSPSDCCHNQC<br>AAGCTGPRESDCLVCRKFRDEATCKDTCPPLMLYNPTTYQMDVNPEGKYSFGA<br>TCVKKCPRNYVVTDHGSCVRACGADSYEMEEDGVRKCKKCEGPCRKVCNGIGI<br>GEFKDSLSINATNIKHFKNCTSISGDLHILPVAFRGDSFTHTPPLDPQELDIL<br>KTVKEITGFLLIQAWPENRTDLHAFENLEIIRGRTKQHGQFSLAVVSLNITSL<br>GLRSLKEISDGDVIISGNKNLCYANTINWKKLFGTSGQKTKIISNRGENSCKA<br>TGQVCHALCSPEGCWGPEPRDCVSCRNVSRGRECVDKCNLLEGEPREFVENSE<br>CIQCHPECLPQAMNITCTGRGPDNCIQCAHYIDGPHCVKTCPAGVMGENNTLV<br>WKYADAGHVCHLCHPNCTYGCTGPGLEGCPTNGPKIPS |
| 4 | Human EGFRvIII ectodomain cDNA sequence (nuclotides 1-996) | CTGGAAGAGAAGAAAGGCAACTACGTCGTGACCGACCACGGCAGCTGTGTGCG<br>GGCTTGTGGCGCCGATAGCTACGAGATGGAAGAGGACGGCGTGCGGAAGTGCA<br>AGAAGTGCGAGGGCCCCTGCCGGAAAGTGTGCAACGGCATCGGCATCGGAGAG<br>TTCAAGGACAGCCTGAGCATCAACGCCACCAACATCAAGCACTTCAAGAACTG<br>CACCAGCATCAGCGGCGACCTGCACATCCTGCCCGTGGCCTTTAGAGGCGACA<br>GCTTCACCCACACCCCCACTGGACCCCCAGGAACTGGACATCCTGAAAACC<br>GTGAAAGAGATCACCGGCTTTCTGCTGATTCAGGCCTGGCCCGAGAACCGGAC<br>AGACCTGCACGCCTTCGAGAACCTGGAAATCATCCGGGGCAGGACCAAGCAGC<br>ACGGCCAGTTTTCTCTGGCCGTGGTGTCCCTGAACATCACCAGCCTGGGCCTG<br>CGGAGCCTGAAAGAAATCAGCGACGGCGACGTGATCATCTCCGGCAACAAGAA<br>CCTGTGCTACGCCAACACCATCAACTGGAAGAAGCTGTTCGGCACCTCCGGCC<br>AGAAAACAAAGATCATCAGCAACCGGGGCGAGAACAGCTGCAAGGCCACAGGA<br>CAAGTGTGCCACGCCCTGTGTAGCCCTGAGGGCTGTTGGGGACCCGAGCCCAG<br>AGATTGCGTGTCCTGCAGAAACGTGTCCCGGGGCAGAGAATGCGTGGACAAGT<br>GCAACCTGCTGGAAGGCGAGCCCCGCGAGTTCGTGGAAAACAGCGAGTGCATC |

| Seq. ID | Description | Sequence |
|---|---|---|
| | | CAGTGCCACCCCGAGTGTCTGCCCCAGGCCATGAACATTACCTGCACCGGCAG<br>AGGCCCCGACAACTGTATCCAGTGCGCCCACTACATCGACGGCCCCCACTGCG<br>TGAAAACCTGTCCTGCTGGCGTGATGGGAGAGAACAACACCCTCGTGTGGAAG<br>TACGCCGACGCCGGCCATGTGTGCCACCTGTGTCACCCCAAT |
| 5 | Human EGFRvIII ectodomain amino acid sequence (amino acids 1-332) | LEEKKGNYVVTDHGSCVRACGADSYEMEEDGVRKCKKCEGPCRKVCNGIGIGE<br>FKDSLSINATNIKHFKNCTSISGDLHILPVAFRGDSFTHTPPLDPQELDILKT<br>VKEITGFLLIQAWPENRTDLHAFENLEIIRGRTKQHGQFSLAVVSLNITSLGL<br>RSLKEISDGDVIISGNKNLCYANTINWKKLFGTSGQKTKIISNRGENSCKATG<br>QVCHALCSPEGCWGPEPRDCVSCRNVSRGRECVDKCNLLEGEPREFVENSECI<br>QCHPECLPQAMNITCTGRGPDNCIQCAHYIDGPHCVKTCPAGVMGENNTLVWK<br>YADAGHVCHLCHPN |
| 6 | Human EGFRvIII amino acid residues 15 to 37 | SCVRACGADSYEMEEDGVRKCKK |
| 7 | 5G6 light chain variable region (CDRs in bold) | DVVMTQTPLTLSVTIGQPASISCKSSQSLLDSDGKTYLNWLLQRPGQSPKRLI<br>YLASKLDSGVPDRFTGSGSGTDFTLKISRVEAEDLGVYYCWQATHFPWTFGGG<br>TKLEIK |
| 8 | 5G6 CDRL1 | KSSQSLLDSDGKTYLN |
| 9 | 5G6 CDRL2 | LASKLDS |
| 10 | 5G6 CDRL3 | WQATHFPWT |
| 11 | 5G6-Light chain variable region cDNA | GATGTTGTGATGACCCAGACTCCACTCACTTTGTCGGTTACCATTGGACAACC<br>AGCCTCCATCTCTTGCAAGTCAAGTCAGAGCCTCTTAGATAGTGATGGAAAGA<br>CATATTTGAATTGGTTGTTACAGAGGCCTGGCCAGTCTCCAAAGCGCCTAATC<br>TATCTGGCGTCTAAACTGGACTCTGGAGTCCCTGACAGGTTCACTGGCAGTGG<br>ATCAGGGACAGATTTCACACTGAAAATCAGCAGAGTGGAGGCTGAGGATTTGG<br>GAGTTTATTATTGCTGGCAAGCTACACATTTTCCGTGGACGTTCGGTGGAGGC<br>ACCAAGCTGGAAATCAAA |
| 12 | 5G6 heavy chain variable region | EVQLQQSGAELARPGASVKMSCKASGYTFTSYWMHWVKQRPGQGLEWIGAIYP<br>GNSDISYNQKFKGKAKLTAVTSATTAYMELSSLTNEDSAVYYCTLYDYDPDYW<br>GQGTTLTVSS |
| 13 | 5G6 CDRH1 | SYWMH |
| 14 | 5G6 CDRH2 | AIYPGNSDISYNQKFKG |
| 15 | 5G6 CDRH3 | YDYDPDY |
| 16 | 5G6-Heavy chain variable region cDNA | GAGGTCCAACTGCAGCAGTCTGGGGCTGAGCTGGCAAGACCTGGGGCTTCAGT<br>GAAGATGTCCTGCAAGGCTTCTGGCTACACCTTTACCAGCTACTGGATGCACT<br>GGGTAAAACAGAGGCCTGGACAGGGTCTGGAATGGATTGGCGCTATTTATCCT<br>GGAAATAGTGATATTAGCTACAATCAGAAGTTCAAGGGCAAGGCCAAACTGAC<br>TGCAGTCACATCCGCCACCACTGCCTACATGGAGCTCAGCAGCCTAACAAATG<br>AGGACTCTGCGGTCTATTACTGTACCCTCTATGATTACGACCCTGACTACTGG<br>GGCCAAGGCACCACTCTCACAGTCTCCTCA |
| 17 | 1A8 light chain variable region | DIVMTQSPSSLAMSVGQKVTMNCKSSQSLLNSSNQKNYLAWFQQKPGQSPKLL<br>VYFASTRESGVPDRFIGSGSGTDFTLTISSVQAEDLADYFCQQHYSTPLTFGA<br>GTKLELK |
| 18 | 1A8 CDRL1 | KSSQSLLNSSNQKNYLA |
| 19 | 1A8 CDRL2 | FASTRES |
| 20 | 1A8 CDRL3 | QQHYSTPLT |
| 21 | 1A8 light chain variable region cDNA | GACATTGTGATGACACAGTCTCCATCCTCCCTGGCTATGTCAGTAGGACAGAA<br>GGTCACTATGAACTGCAAGTCCAGTCAGAGCCTTTTAAATAGTAGCAATCAAA<br>AGAACTATTTGGCCTGGTTCCAGCAGAAACCAGGACAGTCTCCTAAACTTCTG<br>GTATACTTTGCTTCCACTAGGGAATCTGGGGTCCCTGATCGCTTCATAGGCAG<br>TGGATCTGGGACAGATTTCACTCTTACCATCAGCAGTGTGCAGGCTGAAGACC<br>TGGCAGATTACTTCTGTCAGCAACATTATAGCACTCCTCTCACGTTCGGTGCT<br>GGGACCAAGCTGGAGCTGAAA |
| 22 | 1A8 heavy chain variable region | EVQLQQSGAELVRPGALVKLSCKASGFNIKDYYMHWVKQRPEQGLEWIGWIDP<br>ENGNTIYDPKFQGKATIADTSSNTAYLQLSSLASEDTAVYYCARGWLLLWGQ<br>GTTLTVSS |

| Seq. ID | Description | Sequence |
|---|---|---|
| 23 | 1A8 CDRH1 | DYYMH |
| 24 | 1A8 CDRH2 | wiDPENGNTIYDPKFQG |
| 25 | 1A8 CDRH3 | GWLLL |
| 26 | 1A8 heavy chain variable region cDNA | GAGGTTCAGCTGCAGCAGTCTGGGGCTGAGCTTGTGAGGCCAGGGGCCTTAGT<br>CAAGTTGTCCTGCAAAGCTTCTGGCTTCAACATTAAAGACTACTATATGCACT<br>GGGTGAAGCAGAGGCCTGAACAGGGCCTGGAGTGGATTGGATGGATTGATCCT<br>GAGAATGGTAATACTATATATGACCCGAAGTTCCAGGGCAAGGCCACTATAAC<br>AGCAGACACATCCTCCAACACAGCCTACCTGCAGCTCAGCAGCCTGGCATCTG<br>AGGACACTGCCGTCTATTACTGTGCTAGAGGATGGTTACTACTTTGGGGCCAA<br>GGCACCACTCTCACAGTCTCCTCA |
| 27 | 4B3 light chain variable region | EIVLTQSPALMAASPGEKVTITCSVSSSISSSNLHWYQQKSETSPKPWIYGTS<br>NLASGVPVRFSGSGSGTSYSLTISSMEAEDAATYYCQQWSSYPLTFGAGTKLE<br>LE |
| 28 | 4B3 CDRL1 | SVSSSISSSNLH |
| 29 | 4B3 CDRL2 | GTSNLAS |
| 30 | 4B3 CDRL3 | QQWSSYPLT |
| 31 | 4B3 light chain variable region cDNA | GAAATTGTGCTCACCCAGTCTCCAGCACTCATGGCTGCATCTCCAGGGGAGAA<br>GGTCACCATCACCTGCAGTGTCAGCTCAAGTATAAGTTCCAGCAACTTGCACT<br>GGTACCAGCAGAAGTCAGAAACCTCCCCCAAACCCTGGATTTATGGCACATCC<br>AACCTGGCTTCTGGAGTCCCTGTTCGCTTCAGTGGCAGTGGATCTGGGACCTC<br>TTATTCTCTCACAATCAGCAGCATGGAGGCTGAAGATGCTGCCACTTATTACT<br>GTCAACAGTGGAGTAGTTACCCACTCACGTTCGGTGCTGGGACCAAGCTGGAA<br>CTGGAA |
| 32 | 4B3 heavy chain variable region | EVQLQQSGPELVKPGSSVKISCKASGYTFTDYNMDWVKQSHGKSLEWIGTINP<br>NNGGTSYNQKFKGKATLTVDKSSNTAYMELRSLTSEDSAVYYCARGYDYDLWF<br>AYWGQGTLVTVSA |
| 33 | 4B3 CDRH1 | DYNMD |
| 34 | 4B3 CDRH2 | TINPNNGGTSYNQKFKG |
| 35 | 4B3 CDRH3 | GYDYDLWFAY |
| 36 | 4B3 heavy chain variable region cDNA | GAGGTCCAGCTGCAACAGTCTGGACCTGAGCTGGTGAAGCCTGGGTCTTCAGT<br>GAAGATATCCTGCAAAGCTTCTGGATACACATTCACTGACTACAACATGGACT<br>GGGTGAAGCAGAGCCATGGAAAGAGCCTTGAGTGGATTGGTACTATTAATCCT<br>AACAATGGTGGTACTAGCTACAACCAGAAGTTCAAGGGCAAGGCCACATTGAC<br>TGTAGACAAGTCCTCCAACACAGCCTACATGGAGCTCCGCAGCCTGACATCTG<br>AGGACTCTGCAGTCTATTACTGTGCAAGAGGCTATGATTACGACTTGTGGTTT<br>GCTTACTGGGGCCAAGGGACTCTGGTCACTGTCTCTGCA |
| 37 | 4E11 light chain variable region | DILMTQSPSSMSVSLGDTVSITCHASQGINSNIGWLLQKPGKSFKGLIYHGTN<br>LEDGVPSRFSGSGSGTDYSLTISSLESEDFADYYCVQYAQFPYTFGGGTKLEI<br>K |
| 38 | 4E11 CDRL1 | HASQGINSNIG |
| 39 | 4E11 CDRL2 | HGTNLED |
| 40 | 4E11 CDRL3 | VQYAQFPYT |
| 41 | 4E11 light chain variable region cDNA region cDNA | GACATCCTGATGACCCAATCTCCATCCTCCATGTCTGTATCTCTGGGAGACAC<br>AGTCAGCATCACTTGCCATGCAAGTCAGGGCATTAACAGTAATATAGGGTGGT<br>TGCTGCAGAAACCAGGGAAATCATTTAAGGGCCTGATCTATCATGGAACCAAC<br>TTGGAAGATGGAGTTCCATCAAGGTTCAGTGGCAGTGGATCTGGAACAGATTA<br>TTCTCTCACCATCAGCAGCCTGGAATCTGAGGATTTTGCTGACTATTACTGT<br>TACAGTATGCTCAGTTTCCGTACACGTTCGGAGGGGGGACCAAACTGGAAATA<br>AAA |
| 42 | 4E11 heavy chain variable region | DVQLQESGPGLVKPSQSLSLTCTVTGYSITSDYAWNWIRQFPGNKLEWMGYIG<br>YNGRTSYNPSLKSRISITRDTSKNQFFLQLNYVTTEDTATFYCARLGRGFAYW<br>GQGTLVTVSA |
| 43 | 4E11 CDRH1 | SDYAWN |

| Seq. ID | Description | Sequence |
|---|---|---|
| 44 | 4E11 CDRH2 | YIGYNGRTSYNPSLKS |
| 45 | 4E11 CDRH3 | LGRGFAY |
| 46 | 4E11 heavy chain variable region cDNA | GATGTGCAGCTTCAGGAGTCGGGACCTGGCCTGGTGAAACCTTCTCAGTCTCT GTCCCTCACCTGCACTGTCACTGGCTACTCAATCACCAGTGATTATGCCTGGA ACTGGATCCGGCAGTTTCCAGGAAACAAACTGGAGTGGATGGGCTACATAGGC TACAATGGTAGAACTAGTTACAACCCATCTCTCAAAAGTCGAATCTCTATCAC TCGAGACACATCCAAGAACCAGTTCTTCCTGCAGTTGAATTATGTGACTACTG AGGACACAGCCACATTTTACTGTGCAAGACTGGGCCGAGGGTTTGCTTACTGG GGCCAAGGGACTCTGGTCACTGTCTCTGCA |
| 47 | 5D8 light chain variable region | EIVLTQSPVFMAASPGEKVTITCSVSSSISSSNLHWYQQKSETSPKPWIYGTS NLASGVPVRFSGSGSGTSYSLTISSMEAEDAATYYCQQWSSYPLTFGAGTKLE LK |
| 48 | 5D8 CDRL1 | SVSSSISSSNLH |
| 49 | 5D8 CDRL2 | GTSNLAS |
| 50 | 5D8 CDRL3 | QQWSSYPLT |
| 51 | 5D8 light chain variable region cDNA | GAAATTGTGCTCACCCAGTCTCCAGTATTCATGGCTGCATCTCCAGGGGAGAA GGTCACCATCACCTGCAGTGTCAGCTCAAGTATAAGTTCCAGCAACTTGCACT GGTACCAGCAGAAGTCAGAAACCTCCCCCAAACCCTGGATTTATGGCACATCC AACCTGGCTTCTGGAGTCCCTGTTCGCTTCAGTGGCAGTGGATCTGGGACCTC TTATTCTCTCACAATCAGCAGCATGGAGGCTGAAGATGCTGCCACTTATTACT GTCAACAGTGGAGTAGTTACCCACTCACGTTCGGTGCTGGGACCAAGCTGGAG CTGAAA |
| 52 | 5D8 heavy chain variable region | EVQLQQSGPDLVKPGSSVKISCKASGYTFTDYNIDWVKQSHGKSLEWIGTINP NYGGTSYNQKFKGKATLTVDKSSSTAYMELRSLTSEDSAVYYCARGYDYDLWF AYWGQGTLVTVSA |
| 53 | 5D8 CDRH1 | DYNID |
| 54 | 5D8 CDRH2 | TINPNYGGTSYNQKFKG |
| 55 | 5D8 CDRH3 | GYDYDLWFAY |
| 56 | 5D8 heavy chain variable region cDNA | GAGGTCCAGCTGCAACAGTCTGGACCTGACCTGGTGAAGCCTGGGTCTTCAGT GAAGATTTCCTGCAAAGCTTCTGGATACACATTCACTGACTACAACATTGACT GGGTGAAGCAGAGCCATGGAAAGAGCCTTGAGTGGATTGGAACTATTAATCCT AACTATGGTGGTACTTCCTACAACCAGAAGTTCAAGGGCAAGGCCACATTGAC TGTAGACAAGTCCTCCAGCACAGCCTACATGGAGCTCCGCAGCCTGACATCTG AGGACTCTGCAGTCTATTACTGTGCAAGAGGCTATGATTACGACTTGTGGTTT GCTTACTGGGGCCAAGGGACTCTGGTCACTGTCTCTGCA |
| 57 | 9C9 light chain variable region | EIVLTQSPTLMAASPGEKVTITCSVSSSISSSNLHWYQQKSETSPKPWIYDTS NLASGVPIRFSGSGSGTSYSLTISSVEAEDAATYYCQQWSSYPLTFGSGTKLE IK |
| 58 | 9C9 CDRL1 | SVSSSISSSNLH |
| 59 | 9C9 CDRL2 | DTSNLAS |
| 60 | 9C9 CDRL3 | QQWSSYPLT |
| 61 | 9C9 light chain variable region cDNA | GAAATTGTGCTCACCCAGTCTCCAACACTCATGGCTGCATCTCCAGGGGAGAA GGTCACCATCACCTGCAGTGTCAGCTCAAGTATAAGTTCCAGCAACTTGCACT GGTACCAGCAGAAGTCAGAAACCTCCCCCAAACCCTGGATTTATGACACATCC AACCTGGCTTCTGGAGTCCCTATTCGCTTCAGTGGCAGTGGATCTGGGACCTC TTATTCTCTCACAATCAGCAGCGTGGAGGCTGAAGATGCTGCCACTTATTACT GTCAACAGTGGAGTAGTTACCCACTCACGTTCGGCTCGGGGACAAAGTTGGAA ATAAAA |
| 62 | 9C9 heavy chain variable region | QVQLQQPGAELVKPGASVKLSCKASGYTFTSYWMHWVKQRPGQDLEWIGEIDP SDSYTNYNQKFKGKATLTVDKSSSTAYIQLSSLTSEDSALYYCARFDFAYWGQ GTLVTVSA |
| 63 | 9C9 CDRH1 | SYWMH |
| 64 | 9C9 CDRH2 | EIDPSDSYTNYNQKFKG |

| Seq. ID | Description | Sequence |
|---|---|---|
| 65 | 9C9 CDRH3 | FDFAY |
| 66 | 9C9 heavy chain variable region cDNA | CAGGTCCAACTGCAGCAGCCTGGGGCTGAGCTTGTGAAGCCTGGGGCTTCAGT GAAGCTGTCCTGCAAGGCTTCTGGCTACACCTTCACCAGCTACTGGATGCACT GGGTGAAACAGAGGCCTGGACAAGACCTTGAGTGGATCGGAGAGATTGATCCT TCTGATAGTTATACTAACTACAATCAAAAGTTCAAGGGCAAGGCCACATTGAC TGTAGACAAATCCTCCAGCACAGCCTACATTCAGCTCAGCAGCCTGACATCTG AGGACTCTGCGCTCTATTACTGTGCAAGATTCGATTTTGCTTACTGGGGCCAA GGGACTCTGGTCACTGTCTCTGCA |
| 67 | 11B1 light chain 1 (L1) variable region (dominant) | DVVMTQTPLSLPVSLGDQASISCRSSQSLVYSNGNTYLHWYLQKPGQSPKLLI YKVSNRFSGVPDRFSGSGSGTDFTLKISRVEAEDLGVYFCSQSTHVPFTFGSG TKLEIK |
| 68 | 11B1 L1 CDRL1 | RSSQSLVYSNGNTYLH |
| 69 | 11B1 L1 CDRL2 | KVSNRFS |
| 70 | 11B1 L1 CDRL3 | SQSTHVPFT |
| 71 | 11B1 light chain 1 (L1) variable region cDNA (dominant) | GATGTTGTGATGACCCAAACTCCACTCTCCCTGCCTGTCAGTCTTGGAGATCA AGCCTCCATCTCTTGCAGATCTAGTCAGAGCCTTGTATATAGTAATGGAAACA CCTATTTACATTGGTACCTGCAGAAGCCAGGCCAGTCTCCAAAGCTCCTGATC TACAAAGTTTCCAACCGATTTTCTGGGGTCCCAGACAGGTTCAGTGGCAGTGG ATCAGGGACAGATTTCACACTCAAGATCAGCAGAGTGGAGGCTGAGGATCTGG GAGTTTATTTCTGCTCTCAAAGTACACATGTTCCATTCACGTTCGGCTCGGGG ACAAAGTTGGAAATAAAA |
| 72 | 11B1 light chain 2 (L2) variable region | ENVLTQSPAIMSASLGEKVTMSCRASSSVNYMYWCQQKSDASPKLWIYYTSNL APGVPARFSGSGSGNSYSLTISSMEGEDVATYYCQQFTSSPSMHTFGGGTKLE IK |
| 73 | 11B1 L2 CDRL1 | RASSSVNYMY |
| 74 | 11B1 L2 CDRL2 | YTSNLAP |
| 75 | 11B1 L2 CDRL3 | QQFTSSPSMHT |
| 76 | 11B1 light chain 2 (L2) variable region cDNA | GAAAATGTGCTCACCCAGTCTCCAGCAATCATGTCTGCATCTCTAGGGGAGAA GGTCACCATGAGCTGCAGGGCCAGCTCAAGTGTAAATTACATGTACTGGTGCC AGCAGAAGTCAGATGCCTCCCCCAAACTATGGATTTATTACACATCCAACCTG GCTCCTGGAGTCCCAGCTCGCTTCAGTGGCAGTGGGTCTGGGAACTCTTATTC TCTCACAATCAGCAGCATGGAGGGTGAAGATGTTGCCACTTATTACTGCCAGC AGTTTACTAGTTCCCCATCCATGCACACGTTCGGAGGGGGGACCAAGCTGGAA ATAAAA |
| 77 | 11B1 heavy chain variable region | QIQLVQSGPELKKPGETVKISCKASGYTFTTAGMQWVKKMPGKGFKWIGWINT HSGDPKYAEDFKGRFAFSLETYASTAYLQISNLKNEDTASYFCARTHIYDGYN YAMDYWGQGTSVTVSS |
| 78 | 11B1 CDRH1 | TAGMQ |
| 79 | 11B1 CDRH2 | WINTHSGDPKYAEDFKG |
| 80 | 11B1 CDRH3 | THIYDGYNYAMDY |
| 81 | 11B1 heavy chain variable region cDNA | CAGATCCAGTTGGTGCAGTCTGGACCTGAGCTGAAGAAGCCTGGAGAGACAGT CAAGATCTCCTGCAAGGCTTCTGGGTATACCTTCACAACTGCTGGAATGCAGT GGGTAAAAAAGATGCCAGGAAAGGGTTTTAAGTGGATTGGCTGGATAAACACC CACTCTGGAGATCCAAAATATGCAGAAGACTTCAAGGGACGGTTTGCCTTCTC TTTGGAAACCTACGCCAGTACTGCATATTTGCAGATAAGCAACCTCAAAAACG AGGACACTGCTTCGTATTTCTGTGCGAGGACCCACATCTATGATGGTTATAAC TATGCTATGGACTACTGGGGTCAAGGGACCTCAGTCACCGTCTCCTCA |
| 82 | 11C8 light chain 1 (L1) variable region (dominant) | DVVMTQTPLSLPVSLGDQASISCRSSQSLVYSNGNTYLHWYLQKPGQSPKLLI YKVSNRFSGVPDRFSGSGSGTDFTLKISRVEAEDLGVYFCSQSTHVPFTFGSG TKLEIK |

| Seq. ID | Description | Sequence |
|---|---|---|
| 83 | 11C8 L1 CDRL1 | RSSQSLVYSNGNTYLH |
| 84 | 11C8 L1 CDRL2 | KVSNRFS |
| 85 | 11C8 L1 CDRL3 | SQSTHVPFT |
| 86 | 11C8 light chain 1 (L1) variable region cDNA (dominant) | GATGTTGTGATGACCCAAACTCCACTCTCCCTGCCTGTCAGTCTTGGAGATCA AGCCTCCATCTCTTGCAGATCTAGTCAGAGCCTTGTATATAGTAATGGAAACA CCTATTTACATTGGTACCTGCAGAAGCCAGGCCAGTCTCCAAAGCTCCTGATC TACAAAGTTTCCAACCGATTTTCTGGGGTCCCAGACAGGTTCAGTGGCAGTGG ATCAGGGACAGATTTCACACTCAAGATCAGCAGAGTGGAGGCTGAGGATCTGG GAGTTTATTTCTGCTCTCAAAGTACACATGTTCCATTCACGTTCGGCTCGGGG ACAAAGTTGGAAATAAAA |
| 87 | 11C8 light chain 2 (L2) variable region | ENVLTQSPAIMSASLGEKVTMSCRASSSVNYMYWCQQKSDASPKLWIYYTSNL APGVPARFSGSGSGNSYSLTISSMEGEDVATYYCQQFTSSPSMHTFGGGTKLE IK |
| 88 | 11C8 L2 CDRL1 | RASSSVNYMY |
| 89 | 11C8 L2 CDRL2 | YTSNLAP |
| 90 | 11C8 L2 CDRL3 | QQFTSSPSMHT |
| 91 | 11C8 light chain 2 (L2) variable region cDNA | GAAAATGTGCTCACCCAGTCTCCAGCAATCATGTCTGCATCTCTAGGGGAGAA GGTCACCATGAGCTGCAGGGCCAGCTCAAGTGTAAATTACATGTACTGGTGCC AGCAGAAGTCAGATGCCTCCCCCAAACTATGGATTTATTACATCCAACCTG GCTCCTGGAGTCCCAGCTCGCTTCAGTGGCAGTGGGTCTGGGAACTCTTATTC TCTCACAATCAGCAGCATGGAGGGTGAAGATGTTGCCACTTATTACTGCAGC AGTTTACTAGTTCCCCATCCATGCACACGTTCGGAGGGGGGACCAAGCTGGAA ATAAAA |
| 92 | 11C8 heavy chain variable region | QIQLVQSGPELKKPGETVKISCKASGYTFTTAGMQWVQKMPGKGFKWIGWINT HSGDPKYAEDFKGRFAFSLETYASTAYLQISNLKNEDTASYFCARTHIYDGYN YAMDYWGQGTSVTVSS |
| 93 | 11C8 CDRH1 | TAGMQ |
| 94 | 11C8 CDRH2 | WINTHSGDPKYAEDFKG |
| 95 | 11C8 CDRH3 | THIYDGYNYAMDY |
| 96 | 11C8 heavy chain variable region cDNA | CAGATCCAGTTGGTGCAGTCTGGACCTGAGCTGAAGAAGCCTGGAGAGACAGT CAAGATCTCCTGCAAGGCTTCTGGGTATACCTTCACAACTGCTGGAATGCAGT GGGTACAAAAGATGCCAGGAAAGGGTTTTAAGTGGATTGGCTGGATAAACACC CACTCTGGAGATCCAAAATATGCAGAAGACTTCAAGGGACGGTTTGCCTTCTC TTTGGAAACCTACGCCAGTACTGCATATTTGCAGATAAGCAACCTCAAAAACG AGGACACTGCTTCGTATTTCTGTGCGAGGACCCACATCTATGATGGTTACAAC TATGCCTATGGACTACTGGGGTCAAGGGACCTCAGTCACCGTCTCCTCA |
| 97 | 11H3 light chain variable region | DVVMTQTPLSLPVSLGDQASISCRSSQSLVYSNGNTYLHWYLQKPGQSPKLL1 YKVSNRFSGVPDRFSGSGSGTDFTLKISRVEAEDLGVYFCSQSTHVPFTFGSG TKLEIK |
| 98 | 11H3 CDRL1 | RSSQSLVYSNGNTYLH |
| 99 | 11H3 CDRL2 | KVSNRFS |
| 100 | 11H3 CDRL3 | SQSTHVPFT |
| 101 | 11H3 light chain variable region cDNA | GATGTTGTGATGACCCAAACTCCACTCTCCCTGCCTGTCAGTCTTGGAGATCA AGCCTCCATCTCTTGCAGATCTAGTCAGAGCCTTGTATATAGTAATGGAAACA CCTATTTACATTGGTACCTGCAGAAGCCAGGCCAGTCTCCAAAGCTCCTGATC TACAAAGTTTCCAACCGATTTTCTGGGGTCCCAGACAGGTTCAGTGGCAGTGG ATCAGGGACAGATTTCACACTCAAGATCAGCAGAGTGGAGGCTGAGGATCTGG GAGTTTATTTCTGCTCTCAAAGTACACATGTTCCATTCACGTTCGGCTCGGGG ACAAAGTTGGAAATAAAA |

SEQUENCE TABLE
In some sequences, CDRs are underlined and indicated in bold

| Seq. ID | Description | Sequence |
|---|---|---|
| 102 | 11H3 heavy chain variable region | QIQLVQSGPELKKPGETVKISCKASGYTFTTAGMQWVQKMPGKGFKWIGWINTHSGDPKYAEDFKGRFAFSLETYASTAYLQISNLKNEDTATYFCARTHIYDGYNYAMDYWGQGTSVTVSS |
| 103 | 11H3 CDRH1 | TAGMQ |
| 104 | 11H3 CDRH2 | WINTHSGDPKYAEDFKG |
| 105 | 11H3 CDRH3 | THIYDGYNYAMDY |
| 106 | 11H3 heavy chain variable region cDNA | CAGATCCAGTTGGTGCAGTCTGGACCTGAGCTGAAGAAGCCTGGAGAGACAGT CAAGATCTCCTGCAAGGCTTCTGGGTATACCTTCACAACTGCTGGAATGCAGT GGGTACAAAAGATGCCAGGAAAGGGTTTTAAGTGGATTGGCTGGATAAACACC CACTCTGGAGATCCAAAATATGCAGAAGACTTCAAGGGACGGTTTGCCTTCTC TTTTGGAAACCTACGCCAGCACTGCATATTTGCAGATAAGCAACCTCAAAAACG AGGACACTGCTACGTATTTCTGTGCGAGGACCCATATCTATGATGGTTATAAT TATGCTATGGACTACTGGGGTCAAGGAACCTCAGTCACCGTCTCCTCA |
| 107 | 4E11 Heavy chain human IgG1 (variable region underlined) | DVQLQESGPGLVKPSQSLSLTCTVTGYSITSDYAWNWIRQFPGNKLEWMGYIG YNGRTSYNPSLKSRISITRDTSKNQFFLQLNYVTTEDTATFYCARLGRGFAYW GQGTLVTVSAASTKGPSVFPLAPSSKSTSGGTAALGCLVKDYFPEPVTVSWNS GALTSGVHTFPAVLQSSGLYSLSSVVTVPSSSLGTQTYICNVNHKPSNTKVDK KVEPKSCDKTHTCPPCPAPELLGGPSVFLEPPKPKDTLMISRTPEVTCVVVDV SHEDPEVKFNWYVDGVEVHNAKTKPREEQYNSTYRVVSVLTVLHQDWLNGKEY KCKVSNKALPAPIEKTISKAKGQPREPQVYTLPPSRDELTKNQVSLTCLVKGF YPSDIAVEWESNGQPENNYKTTPPVLDSDGSFFLYSKLTVDKSRWQQGNVFSC SVMHEALHNHYTQKSLSLSPG |
| 108 | 4E11 Light chain human Kappa (variable region underlined) | DILMTQSPSSMSVSLGDTVSITCHASQGINSNIGWLLQKPGKSFKGLIYHGTN LEDGVPSRFSGSGSGTDYSLTISSLESEDFADYYCVQYAQFPYTEGGGTKLEI KRTVAAPSVFIFPPSDEQLKSGTASVVCLLNNFYPREAKVQWKVDNALQSGNS QESVTEQDSKDSTYSLSSTLTLSKADYEKHKVYACEVTHQGLSSPVTKSFNRG EC |
| 109 | 5G6 Heavy chain human IgG1 (variable region underlined) | EVQLQQSGAELARPGASVKMSCKASGYTFTSYWMHWVKQRPGQGLEWIGAIYP GNSDISYNQKFKGKAKLTAVTSATTAYMELSSLTNEDSAVYYCTLYDYDPDYW GQGTTLTVSSASTKGPSVFPLAPSSKSTSGGTAALGCLVKDYFPEPVTVSWNS GALTSGVHTFPAVLQSSGLYSLSSVVTVPSSSLGTQTYICNVNHKPSNTKVDK KVEPKSCDKTHTCPPCPAPELLGGPSVFLEPPKPKDTLMISRTPEVTCVVVDV SHEDPEVKFNWYVDGVEVHNAKTKPREEQYNSTYRVVSVLTVLHQDWLNGKEY KCKVSNKALPAPIEKTISKAKGQPREPQVYTLPPSRDELTKNQVSLTCLVKGF YPSDIAVEWESNGQPENNYKTTPPVLDSDGSFFLYSKLTVDKSRWQQGNVFSC SVMHEALHNHYTQKSLSLSPG |
| 110 | 5G6 Light chain chain Kappa (variable region underlined) | DVVMTQTPLTLSVTIGQPASISCKSSQSLLDSDGKTYLNWLLQRPGQSPKRLI YLASKLDSGVPDRFTGSGSGTDFTLKISRVEAEDLGVYYCWQATHFPWTEGGG TKLEIKRTVAAPSVFIFPPSDEQLKSGTASVVCLLNNFYPREAKVQWKVDNAL QSGNSQESVTEQDSKDSTYSLSSTLTLSKADYEKHKVYACEVTHQGLSSPVTK SFNRGEC |
| 111 | 13.1.2 Heavy chain human IgG1 (variable region underlined) | QVQLVESGGGVVQPGRSLRLSCAASGFTESSYGMHWVRQAPGKGLEWVAVIWY DGSNKYYVDSVKGRFTISRDNSKNTLYLQMNSLRAEDTAVYYCARDGWQQLAP FDYWGQGTLVTVSSASTKGPSVFPLAPSSKSTSGGTAALGCLVKDYFPEPVTV SWNSGALTSGVHTFPAVLQSSGLYSLSSVVTVPSSSLGTQTYICNVNHKPSNT KVDKKVEPKSCDKTHTCPPCPAPELLGGPSVFLEPPKPKDTLMISRTPEVTCV VVDVSHEDPEVKFNWYVDGVEVHNAKTKPREEQYNSTYRVVSVLTVLHQDWLN GKEYKCKVSNKALPAPIEKTISKAKGQPREPQVYTLPPSRDELTKNQVSLTCL VKGFYPSDIAVEWESNGQPENNYKTTPPVLDSDGSFFLYSKLTVDKSRWQQGN VFSCSVMHEALHNHYTQKSLSLSPG |
| 112 | 13.1.2 Light chain human Kappa (variable region underlined) | DIVMTQTPLSSPVTLGQPASISCRSSQSLVHSDGNTYLSWLHQRPGQPPRLLI YKISNRFSGVPDRFSGSGAGTAFTLKISRVEAEDVGVYYCMQATQLPRTFGQG TKVEIKRTVAAPSVFIFPPSDEQLKSGTASVVCLLNNFYPREAKVQWKVDNAL QSGNSQESVTEQDSKDSTYSLSSTLTLSKADYEKHKVYACEVTHQGLSSPVTK SFNRGEC |
| 113 | N-terminal light chain signal sequence | MVLQTQVFISLLLWISGAYG |
| 114 | N-terminal heavy chain signal sequence | MDWTWRILFLVAAATGTHA |

| Seq. ID | Description | Sequence |
|---|---|---|
| 115 | consensus VLs of 4B3 and 508 | EIVLTQSPX$_{1a}$X$_{2a}$MAASPGEKVTITCSVSSSISSSNLHWYQQKSETSPKPWIYGTSNLASGVPVRFSGSGSGTSYSLTISSMEAEDAATYYCQQWSSYPLTFGAGTKLELX$_{3a}$<br>Where X$_{1a}$ may be a conservative amino acid substitution to alanine (A) or valine (V) or is alanine or valine<br>Where X$_{2a}$ may be a conservative amino acid substitution to leucine (L) or phenylalanine (F) or is leucine or phenylalanine<br>Where X$_{3a}$ may be a conservative amino acid substitution to lysine (K) or glutamic acid (E) or is lysine or glutamic acid |
| 116 | consensus VHs of 4B3 and 508 | EVQLQQSGPX$_{1b}$LVKPGSSVKISCKASGYTFTDYNX$_{2b}$DWVKQSHGKSLEWIGTINPNX$_{3b}$GGTSYNQKFKGKATLTVDKSSX$_{4b}$TAYMELRSLTSEDSAVYYCARGYDYDLWFAYWGQGTLVTVSA<br>Where X$_{1b}$ may be a conservative amino acid substitution to glutamic acid (E) or aspartic acid (D) or is glutamic acid or aspartic acid<br>Where X$_{2b}$ may be a conservative amino acid substitution to methionine (M) or isoleucine (I) or is methionine or isoleucine<br>Where X$_{3b}$ may be a conservative amino acid substitution to asparagine (N) or tyrosine (Y) or is asparagine or tyrosine<br>Where X$_{4b}$ may be a conservative amino acid substitution to asparagine (N) or serine (S) or is asparagine or serine |
| 117 | Consensus of VHs of 11B1, 11C8 and 11H3 | QIQLVQSGPELKKPGETVKISCKASGYTFTTAGMQWVX$_{1c}$KMPGKGFKWIGWINTHSGDPKYAEDFKGRFAFSLETYASTAYLQISNLKNEDTAX$_{2c}$YFCARTHIYDGYNYAMDYWGQGTSVTV<br>Where X$_{1c}$ may be a conservative amino acid substitution to lysine (K) or glutamine (Q) or is lysine or glutamine<br>Where X$_{2c}$ may be conservative amino acid substitution to serine (S) or threonine (T) or is serine or threonine |
| 118 | consensus VLs of 4B3, 5D8 and 9C9 | EIVLTQSPX$_{1d}$X$_{2d}$MAASPGEKVTITCSVSSSISSSNLHWYQQKSETSPKPWIYX$_{3d}$TSNLASGVPX$_{4d}$RFSGSGSGTSYSLTISSX$_{5d}$EAEDAATYYCQQWSSYPLTFGX$_{6d}$GTKLEX$_{7d}$X$_{8d}$<br>Where X$_{1d}$ may be a conservative amino acid substitution to alanine (A), threonine (T) or valine (V) or is alanine, threonine or valine<br>Where X$_{2d}$ may be a conservative amino acid substitution to leucine (L) or phenylalanine (F) or is leucine or phenylalanine<br>Where X$_{3d}$ may be a conservative amino acid substitution to glycine (G) or aspartic acid (D) or is glycine or glutamic acid<br>Where X$_{4d}$ may be a conservative amino acid substitution to isoleucine (I) or valine (V) or is isoleucine or valine<br>Where X$_{5d}$ may be a conservative amino acid substitution to methionine (M) or valine (V) or is methionine or valine<br>Where X$_{6d}$ may be a conservative amino acid substitution to alanine (A) or serine (S) or is alanine or serine<br>Where X$_{7d}$ may be a conservative amino acid substitution to isoleucine (I) or leucine (L) or is isoleucine or leucine<br>Where X$_{8d}$ may be a conservative amino acid substitution to lysine (K) or glutamic acid (E) or is lysine or glutamic acid |
| 119 | Amino acid residues 1 to 76 of EGFRvIII | LEEKKGNYVVTDHGSCVRACGADSYEMEEDGVRKCKKCEGPCRKVCNGIGIGEFKDSLSINATNIKHFKNCTSISG |
| 120 | Amino acid residues 1 to 62 of EGFRvIII | LEEKKGNYVVTDHGSCVRACGADSYEMEEDGVRKCKKCEGPCRKVCNGIGIGEFKDSLSINA |
| 121 | Amino acid residues 1 to 49 of EGFRvIII | LEEKKGNYVVTDHGSCVRACGADSYEMEEDGVRKCKKCEGPCRKVCNGI |

SEQUENCE TABLE
In some sequences, CDRs are underlined and indicated in bold

| Seq. ID | Description | Sequence |
|---|---|---|
| 122 | Amino acid residues 1 to 45 of EGFRvIII | LEEKKGNYVVTDHGSCVRACGADSYEMEEDGVRKCKKCEGPCRKV |
| 123 | Amino acid residues 1 to 37 of EGFRvIII | LEEKKGNYVVTDHGSCVRACGADSYEMEEDGVRKCKK |
| 124 | Amino acid residues 1 to 33 of EGFRvIII | LEEKKGNYVVTDHGSCVRACGADSYEMEEDGVR |
| 125 | Amino acid residues 1 to 18 of EGFRvIII | LEEKKGNYVVTDHGSCVR |
| 126 | Amino acid residues 3 to 49 of EGFRvIII | EKKGNYVVTDHGSCVRACGADSYEMEEDGVRKCKKCEGPCRKVCNGI |
| 127 | Amino acid residues 3 to 45 of EGFRvIII | EKKGNYVVTDHGSCVRACGADSYEMEEDGVRKCKKCEGPCRKV |
| 128 | Amino acid residues 3 to 37 of EGFRvIII | EKKGNYVVTDHGSCVRACGADSYEMEEDGVRKCKK |
| 129 | Amino acid residues 3 to 18 of EGFRvIII | EKKGNYVVTDHGSCVR |
| 130 | Amino acid residues 6 to 49 of EGFRvIII | GNYVVTDHGSCVRACGADSYEMEEDGVRKCKKCEGPCRKVCNGI |
| 131 | Amino acid residues 6 to 45 of EGFRvIII | GNYVVTDHGSCVRACGADSYEMEEDGVRKCKKCEGPCRKV |
| 132 | Amino acid residues 6 to 37 of EGFRvIII | GNYVVTDHGSCVRACGADSYEMEEDGVRKCKK |
| 133 | Amino acid residues 10 to 49 of EGFRvIII | VTDHGSCVRACGADSYEMEEDGVRKCKKCEGPCRKVCNGI |
| 134 | Amino acid residues 10 to 45 of EGFRvIII | VTDHGSCVRACGADSYEMEEDGVRKCKKCEGPCRKV |
| 135 | Amino acid residues 10 to 37 of EGFRvIII | VTDHGSCVRACGADSYEMEEDGVRKCKK |
| 136 | Amino acid residues 15 to 49 of EGFRvIII | SCVRACGADSYEMEEDGVRKCKKCEGPCRKVCNGI |
| 137 | Amino acid residues 15 to 45 of EGFRvIII | SCVRACGADSYEMEEDGVRKCKKCEGPCRKV |
| 138 | Amino acid residues 19 to 76 of EGFRvIII | ACGADSYEMEEDGVRKCKKCEGPCRKVCNGIGIGEFKDSLSINATNIKHFKNCTSISG |
| 139 | Amino acid residues 19 to 62 of EGFRvIII | ACGADSYEMEEDGVRKCKKCEGPCRKVCNGIGIGEFKDSLSINA |
| 140 | Amino acid residues 19 to 49 of EGFRvIII | ACGADSYEMEEDGVRKCKKCEGPCRKVCNGI |
| 141 | Amino acid residues 19 to 45 of EGFRvIII | ACGADSYEMEEDGVRKCKKCEGPCRKV |
| 142 | Amino acid residues 19 to 37 of EGFRvIII | ACGADSYEMEEDGVRKCKK |
| 143 | Amino acid residues 28 to 45 of EGFRvIII | EEDGVRKCKKCEGPCRKV |
| 144 | Amino acid residues 28 to 37 of EGFRvIII | EEDGVRKCKK |
| 145 | Amino acid residues 15 to 37 of EGFRvIII, with Ser15 to Ala mutation | ACVRACGADSYEMEEDGVRKCKK |

SEQUENCE TABLE
In some sequences, CDRs are underlined and indicated in bold

| Seq. ID | Description | Sequence |
|---|---|---|
| 146 | Amino acid residues 15 to 37 of EGFRvIII, with Cys16 to Ala mutation | SAVRACGADSYEMEEDGVRKCKK |
| 147 | Amino acid residues 15 to 37 of EGFRvIII, with Val17 to Ala mutation | SCARACGADSYEMEEDGVRKCKK |
| 148 | Amino acid residues 15 to 37 of EGFRvIII, with Arg18 to Ala mutation | SCVAACGADSYEMEEDGVRKCKK |
| 149 | Amino acid residues 15 to 37 of EGFRvIII, with Cys20 to Ala mutation | SCVRAAGADSYEMEEDGVRKCKK |
| 150 | Amino acid residues 15 to 37 of EGFRvIII, with Gly21 to Ala mutation | SCVRACAADSYEMEEDGVRKCKK |
| 151 | Amino acid residues 15 to 37 of EGFRvIII, with Asp23 to Ala mutation | SCVRACGAASYEMEEDGVRKCKK |
| 152 | Amino acid residues 15 to 37 of EGFRvIII, with Ser24 to Ala mutation | SCVRACGADAYEMEEDGVRKCKK |
| 153 | Amino acid residues 15 to 37 of EGFRvIII, with Tyr25 to Ala mutation | SCVRACGADSAEMEEDGVRKCKK |
| 154 | Amino acid residues 15 to 37 of EGFRvIII, with Glu26 to Ala mutation | SCVRACGADSYAMEEDGVRKCKK |
| 155 | Amino acid residues 15 to 37 of EGFRvIII, with Met27 to Ala mutation | SCVRACGADSYEAEEDGVRKCKK |
| 156 | Amino acid residues 15 to 37 of EGFRvIII, with Glu28 to Ala mutation | SCVRACGADSYEMAEDGVRKCKK |
| 157 | Amino acid residues 15 to 37 of EGFRvIII, with Glu29 to Ala mutation | SCVRACGADSYEMEADGVRKCKK |
| 158 | Amino acid residues 15 to 37 of EGFRvIII, with Asp30 to Ala mutation | SCVRACGADSYEMEEAGVRKCKK |
| 159 | Amino acid residues 15 to 37 of EGFRvIII, with Gly31 to Ala mutation | SCVRACGADSYEMEEDAVRKCKK |
| 160 | Amino acid residues 15 to 37 of EGFRvIII, with Val32 to Ala mutation | SCVRACGADSYEMEEDGARKCKK |
| 161 | Amino acid residues 15 to 37 of EGFRvIII, with Arg33 to Ala mutation | SCVRACGADSYEMEEDGVAKCKK |
| 162 | Amino acid residues 15 to 37 of EGFRvIII, with Lys34 to Ala mutation | SCVRACGADSYEMEEDGVRACKK |
| 163 | Amino acid residues 15 to 37 of EGFRvIII, with Cys35 to Ala mutation | SCVRACGADSYEMEEDGVRKAKK |

SEQUENCE TABLE
In some sequences, CDRs are underlined and indicated in bold

| Seq. ID | Description | Sequence |
|---|---|---|
| 164 | Amino acid residues 15 to 37 of EGFRvIII, with Lys36 to Ala mutation | SCVRACGADSYEMEEDGVRKCAK |
| 165 | Amino acid residues 15 to 37 of EGFRvIII, with Lys37 to Ala mutation | SCVRACGADSYEMEEDGVRKCKA |
| 166 | Amino acid sequence for single-chain variable fragment composed of VH, linker, VL sequence derived from 5G6 antibody Linker sequence including restriction sites underlined but any suitable linker in the art may be used | EVQLQQSGAELARPGASVKMSCKASGYTFTSYWMHWVKQRPGQGLEWIGAIYP GNSDISYNQKFKGKAKLTAVTSATTAYMELSSLTNEDSAVYYCTLYDYDPDYW GQGTTLTVSSGTGGGSGGGGSGGGGSDVVMTQTPLTLSVTIGQPASISCKSSQ SLLDSDGKTYLNWLLQRPGQSPKRLIYLASKLDSGVPDRFTGSGSGTDFTLKI SRVEAEDLGVYYCWQATHFPWTEGGGTKLEIK |
| 167 | Amino acid sequence for single-chain variable fragment composed of VH, linker, VL sequence derived from 4E11 antibody Linker sequence including restriction sites underlined but any suitable linker in the art may be used | DVQLQESGPGLVKPSQSLSLTCTVTGYSITSDYAWNWIRQFPGNKLEWMGYIG YNGRTSYNPSLKSRISITRDTSKNQFFLQLNYVTTEDTATFYCARLGRGFAYW GQGTLVTVSAGTGGGSGGGGSGGGGSDVDILMTQSPSSMSVSLGDTVSITCHA SQGINSNIGWLLQKPGKSFKGLIYHGTNLEDGVPSRFSGSGSGTDYSLTISSL ESEDFADYYCVQYAQFPYTEGGGTKLEIK |
| 168 | Amino Acid exemplary sequence for 5G6-CD28-CD3zeta containing chimeric antigen receptor molecule Composed of 5G6 scFV, a CD8 hinge, human CD28 transmembrane domain, human CD28-signaling domain, and human CD3-zeta signaling domain | MLRLLLALNLFPSIQVTGEVQLQQSGAELARPGASVKMSCKASGYTFTSYWMH WVKQRPGQGLEWIGAIYPGNSDISYNQKFKGKAKLTAVTSATTAYMELSSLTN EDSAVYYCTLYDYDPDYWGQGTTLTVSSGTGGGSGGGGSGGGGSDVVMTQTPL TLSVTIGQPASISCKSSQSLLDSDGKTYLNWLLQRPGQSPKRLIYLASKLDSG VPDRFTGSGSGTDFTLKISRVEAEDLGVYYCWQATHFPWTEGGGTKLEIKTTT PAPRPPTPAPTIASQPLSLRPEACRPAAGGAVHTRGLDFACDPSKPFWVLVVV GGVLACYSLLVTVAFIIFWVRSKRSRLLHSDYMNMTPRRPGPTRKHYQPYAPP RDFAAYRSASLRVKFSRSADAPAYQQGQNQLYNELNLGRREEYDVLDKRRGRD PEMGGKPQRRKNPQEGLYNELQKDKMAEAYSEIGMKGERRRGKGHDGLYQGLS TATKDTYDALHMQALPPR |
| 169 | Amino Acid exemplary sequence for 4E11-CD28-CD3zeta containing chimeric antigen receptor molecule Composed of 4E11 scFV, a CD8 hinge, human CD28 transmembrane domain, human CD28-signaling domain, and human CD3-zeta signaling domain | MLRLLLALNLFPSIQVTGDVQLQESGPGLVKPSQSLSLTCTVTGYSITSDYAW NWIRQFPGNKLEWMGYIGYNGRTSYNPSLKSRISITRDTSKNQFFLQLNYVTT EDTATFYCARLGRGFAYWGQGTLVTVSAGTGGGSGGGGSGGGGSDVDILMTQS PSSMSVSLGDTVSITCHASQGINSNIGWLLQKPGKSFKGLIYHGTNLEDGVPS RFSGSGSGTDYSLTISSLESEDFADYYCVQYAQFPYTGGGTKLEIKTTTPAP RPPTPAPTIASQPLSLRPEACRPAAGGAVHTRGLDFACDPSKPFWVLVVVGGV LACYSLLVTVAFIIFWVRSKRSRLLHSDYMNMTPRRPGPTRKHYQPYAPPRDF AAYRSASLRVKFSRSADAPAYQQGQNQLYNELNLGRREEYDVLDKRRGRDPEM GGKPQRRKNPQEGLYNELQKDKMAEAYSEIGMKGERRRGKGHDGLYQGLSTAT KDTYDALHMQALPPR |
| 170 | Amino acid sequence for 4E11 bi-specific Tcell engager exemplary sequence Linker sequences underlined, but any suitable linker in the art may be used CD3-specific scFv engager shown in bold | DVQLQESGPGLVKPSQSLSLTCTVTGYSITSDYAWNWIRQFPGNKLEWMGYIG YNGRTSYNPSLKSRISITRDTSKNQFFLQLNYVTTEDTATFYCARLGRGFAYW GQGTLVTVSAKTTPPSVYPLAPGSLGTGGGSGGGGSGGGGSDVDILMTQSPSS MSVSLGDTVSITCHASQGINSNIGWLLQKPGKSFKGLIYHGTNLEDGVPSRFS GSGSGTDYSLTISSLESEDFADYYCVQYAQFPYTGGGTKLEIKRADAAPTVS IFPPSSKLGDLGGGGSRDDIKLQQSGAELARPGASVKMSCKTSGYTFTRYTM HWVKQRPGQGLEWIGYINPSRGYTNYNQKFKDKATLTTDKSSSTAYMQLSSLT SEDSAVYYCARYYDDHYCLDYWGQGTTLTVSSVEGGSGGSGGSGGSGGVDDIQ LTQSPAIMSASPGEKVTMTCRASSSVSYMNWYQQKSGTSPKRWIYDTSKVASG VPYRFSGSGSGTSYSLTISSMEAEDAATYYCQQWSSNPLTFGAGTKLELK |
| 171 | Exemplary linker | GTGGGGSGGGGSGGGGSDV |

The invention claimed is:

1. An antigen-binding agent comprising an antigen-binding domain of an antibody that specifically binds to epidermal growth factor receptor variant III (EGFRvIII), wherein the antigen-binding domain comprises:
   a. a light chain variable region comprising a CDRL1 having the amino acid sequence set forth in SEQ ID NO:8, a CDRL2 sequence having the amino acid sequence set forth in SEQ ID NO:9 and a CDRL3 sequence having the amino acid sequence set forth in SEQ ID NO:10 and a heavy chain variable region comprising a CDRH1 sequence having the amino acid sequence set forth in SEQ ID NO:13, a CDRH2 sequence having the amino acid sequence set forth in SEQ ID NO:14 and a CDRH3 sequence of SEQ ID NO:15;
   b. a light chain variable region comprising a CDRL1 having the amino acid sequence set forth in SEQ ID NO:18, a CDRL2 having the amino acid sequence set forth in SEQ ID NO:19 and a CDRL3 having the amino acid sequence set forth in SEQ ID NO: 20 and a heavy chain variable region comprising a CDRH1 having the amino acid sequence set forth in SEQ ID NO:23, a CDRH2 having the amino acid sequence set forth in SEQ ID NO:24 and a CDRH3 having the amino acid sequence set forth in SEQ ID NO:25;
   c. a light chain variable region comprising a CDRL1 having the amino acid sequence set forth in SEQ ID NO:28, a CDRL2 having the amino acid sequence set forth in SEQ ID NO:29 and a CDRL3 having the amino acid sequence set forth in SEQ ID NO: 30 and a heavy chain variable region comprising a CDRH1 having the amino acid sequence set forth in SEQ ID NO:33, a CDRH2 having the amino acid sequence set forth in SEQ ID NO:34 and a CDRH3 having the amino acid sequence set forth in SEQ ID NO:35;
   d. a light chain variable region comprising a CDRL1 having the amino acid sequence set forth in SEQ ID NO:38, a CDRL2 having the amino acid sequence set forth in SEQ ID NO:39 and a CDRL3 having the amino acid sequence set forth in SEQ ID NO: 40 and a heavy chain variable region comprising a CDRH1 having the amino acid sequence set forth in SEQ ID NO:43, a CDRH2 having the amino acid sequence set forth in SEQ ID NO:44 and a CDRH3 having the amino acid sequence set forth in SEQ ID NO:45;
   e. a light chain variable region comprising a CDRL1 having the amino acid sequence set forth in SEQ ID NO:48, a CDRL2 having the amino acid sequence set forth in SEQ ID NO:49 and a CDRL3 having the amino acid sequence set forth in SEQ ID NO: 50 and a heavy chain variable region comprising a CDRH1 having the amino acid sequence set forth in SEQ ID NO:53, a CDRH2 having the amino acid sequence set forth in SEQ ID NO:54 and a CDRH3 having the amino acid sequence set forth in SEQ ID NO:55;
   f. a light chain variable region comprising a CDRL1 having the amino acid sequence set forth in SEQ ID NO:58, a CDRL2 having the amino acid sequence set forth in SEQ ID NO:59 and a CDRL3 having the amino acid sequence set forth in SEQ ID NO: 60 and a heavy chain variable region comprising a CDRH1 having the amino acid sequence set forth in SEQ ID NO:63, a CDRH2 having the amino acid sequence set forth in SEQ ID NO:64 and a CDRH3 having the amino acid sequence set forth in SEQ ID NO:65;
   g. a light chain variable region comprising a CDRL1 having the amino acid sequence set forth in SEQ ID NO:68, a CDRL2 having the amino acid sequence set forth in SEQ ID NO:69 and a CDRL3 having the amino acid sequence set forth in SEQ ID NO: 70 and a heavy chain variable region comprising a CDRH1 having the amino acid sequence set forth in SEQ ID NO:78, a CDRH2 having the amino acid sequence set forth in SEQ ID NO:79 and a CDRH3 having the amino acid sequence set forth in SEQ ID NO:80, and;
   h. a light chain variable region comprising a CDRL1 having the amino acid sequence set forth in SEQ ID NO:73, a CDRL2 having the amino acid sequence set forth in SEQ ID NO:74 and a CDRL3 having the amino acid sequence set forth in SEQ ID NO: 75 and a heavy chain variable region comprising a CDRH1 having the amino acid sequence set forth in SEQ ID NO:78, a CDRH2 having the amino acid sequence set forth in SEQ ID NO:79 and a CDRH3 having the amino acid sequence set forth in SEQ ID NO:80.

2. The antigen-binding agent of claim 1, wherein the antigen-binding agent comprises
   a. a light chain variable region comprising the amino acid sequence set forth in SEQ ID NO:7 or a variant at least 80% sequence identical to SEQ ID NO:7 and a heavy chain variable region comprising the amino acid sequence set forth in SEQ ID NO:12 or a variant at least 80% sequence identical to SEQ ID NO: 12;
   b. a light chain variable region comprising the amino acid sequence set forth in SEQ ID NO: 17 or a variant at least 80% sequence identical to SEQ ID NO:17 and a heavy chain variable region comprising the amino acid sequence set forth in SEQ ID NO:22 or a variant at least 80% sequence identical to SEQ ID NO:22;
   c. a light chain variable region comprising the amino acid sequence set forth in SEQ ID NO:27 or a variant at least 80% sequence identical to SEQ ID NO:27 and a heavy chain variable region comprising the amino acid sequence set forth in SEQ ID NO:32 or a variant at least 80% sequence identical to SEQ ID NO:32;
   d. a light chain variable region comprising the amino acid sequence set forth in SEQ ID NO: 37 or a variant at least 80% sequence identical to SEQ ID NO:37 and a heavy chain variable region comprising the amino acid sequence set forth in SEQ ID NO:42 or a variant at least 80% sequence identical to SEQ ID NO:42;

e. a light chain variable region comprising the amino acid sequence set forth in SEQ ID NO:47 or a variant at least 80% sequence identical to SEQ ID NO:47 and a heavy chain variable region comprising the amino acid sequence set forth in SEQ ID NO:52 or a variant at least 80% sequence identical to SEQ ID NO:52;

f. a light chain variable region comprising the amino acid sequence set forth in SEQ ID NO:57 or a variant at least 80% sequence identical to SEQ ID NO:57 and a heavy chain variable region comprising the amino acid sequence set forth in SEQ ID NO:62 or a variant at least 80% sequence identical to SEQ ID NO:62;

g. a light chain variable region comprising the amino acid sequence set forth in SEQ ID NO:67 or a variant at least 80% sequence identical to SEQ ID NO:67 and
- a heavy chain variable region comprising the amino acid sequence set forth in SEQ ID NO:77, 92, or 102 or a variant at least 80% sequence identical to SEQ ID NO:77, 92, or 102; or h. a light chain variable region comprising the amino acid sequence set forth in SEQ ID NO:72 or a variant at least 80% sequence identical to SEQ ID NO: 72 and
- a heavy chain variable region comprising the amino acid sequence set forth in SEQ ID NO:77 or 92 or a variant at least 80% sequence identical to SEQ ID NO:77 or 92.

3. The antigen-binding agent of claim 1, wherein the antigen-binding agent is an antibody or an antigen-binding fragment thereof, a chimeric antigen receptor, a bi-specific T-cell engager, a bispecific killer cell engager, a trispecific killer cell engager or any an immunotherapeutic compound.

4. The antigen-binding agent of claim 3, wherein the antibody is a monoclonal antibody, a polyclonal antibody, a humanized antibody, a chimeric antibody, a human antibody, a single chain antibody, or a multispecific antibody.

5. The antigen-binding agent of claim 3, wherein the antibody or antigen-binding fragment thereof comprises:

a. a light chain variable region comprising the amino acid sequence set forth in SEQ ID NO: 118 or a variant at least 80% sequence identical to SEQ ID NO:118 and a heavy chain variable region comprising the amino acid sequence set forth in SEQ ID NO: 116 or a variant at least 80% sequence identical to SEQ ID NO:116;

b. a light chain variable region comprising the amino acid sequence set forth in SEQ ID NO: 115 or a variant at least 80% sequence identical to SEQ ID NO:115 and a heavy chain variable region comprising the amino acid sequence set forth in SEQ ID NO: 116 or a variant at least 80% sequence identical to SEQ ID NO:116; or c. a light chain variable region comprising the amino acid sequence set forth in SEQ ID NO: 118 or a variant at least 80% sequence identical to SEQ ID NO:118 and a heavy chain variable region comprising the amino acid sequence set forth in SEQ ID NO:62 or a variant at least 80% sequence identical to SEQ ID NO:62.

6. The antigen-binding agent of claim 3, wherein the antibody or antigen-binding fragment thereof comprises:

a. a light chain variable region comprising the amino acid sequence set forth in SEQ ID NO:7 or a variant at least 80% sequence identical to SEQ ID NO:7 and a heavy chain variable region comprising the amino acid sequence set forth in SEQ ID NO: 12 or a variant at least 80% sequence identical to SEQ ID NO: 12;

b. a light chain variable region comprising the amino acid sequence set forth in SEQ ID NO: 17 or a variant at least 80% sequence identical to SEQ ID NO:17 and a heavy chain variable region comprising the amino acid sequence set forth in SEQ ID NO:22 or a variant at least 80% sequence identical to SEQ ID NO:22;

c. a light chain variable region comprising the amino acid sequence set forth in SEQ ID NO:27 or a variant at least 80% sequence identical to SEQ ID NO:27 and a heavy chain variable region comprising the amino acid sequence set forth in SEQ ID NO:32 or a variant at least 80% sequence identical to SEQ ID NO:32;

d. a light chain variable region comprising the amino acid sequence set forth in SEQ ID NO: 37 or a variant at least 80% sequence identical to SEQ ID NO:37 and a heavy chain variable region comprising the amino acid sequence set forth in SEQ ID NO:42 or a variant at least 80% sequence identical to SEQ ID NO:42;

e. a light chain variable region comprising the amino acid sequence set forth in SEQ ID NO:47 or a variant at least 80% sequence identical to SEQ ID NO:47 and a heavy chain variable region comprising the amino acid sequence set forth in SEQ ID NO:52 or a variant at least 80% sequence identical to SEQ ID NO:52;

f. a light chain variable region comprising the amino acid sequence set forth in SEQ ID NO:57 or a variant at least 80% sequence identical to SEQ ID NO:57 and a heavy chain variable region comprising the amino acid sequence set forth in SEQ ID NO:62 or a variant at least 80% sequence identical to SEQ ID NO:62;

g. a light chain variable region comprising the amino acid sequence set forth in SEQ ID NO:67 or a variant at least 80% sequence identical to SEQ ID NO:67 and
- a heavy chain variable region comprising the amino acid sequence set forth in SEQ ID NO:77, 92, or 102, or a variant at least 80% sequence identical to SEQ ID NO:77, 92, or 102; or h. a light chain variable region comprising the amino acid sequence set forth in SEQ ID NO: 72 or a variant at least 80% sequence identical to SEQ ID NO: 72 and
- a heavy chain variable region comprising the amino acid sequence set forth in SEQ ID NO:77 or 92 or a variant at least 80% sequence identical to SEQ ID NO:77 or 92.

7. The antigen-binding agent of claim 3, wherein the antibody or antigen-binding fragment thereof comprises a human IgG1 constant region, a human IgG2 constant region or both.

8. The antigen-binding agent of claim 3, wherein the antibody or antigen-binding fragment thereof comprises a sequence selected from the group consisting of:

a. a light chain comprising the amino acid sequence set forth in SEQ ID NO: 108 or a variant at least 80% sequence identical to SEQ ID NO: 108 and a heavy chain comprising the amino acid sequence set forth in SEQ ID NO: 107 or a variant at least 80% sequence identical to SEQ ID NO: 107, and;

b. a light chain comprising the amino acid sequence set forth in SEQ ID NO:110 or a variant at least 80% sequence identical to SEQ ID NO: 110 and a heavy chain comprising the amino acid sequence set forth in SEQ ID NO: 109 or a variant at least 80% sequence identical to SEQ ID NO: 109.

9. The antigen-binding agent of claim 3, wherein the antigen-binding fragment comprises a scFv, a Fab, a Fab' or a (Fab')$_2$.

10. The antigen-binding agent of claim 3, wherein the antibody or antigen-binding fragment thereof is linked to a cargo molecule.

11. The antigen-binding agent of claim 10, wherein the cargo molecule comprises a cytotoxic agent, a cytostatic agent, an anti-cancer agent or a radiotherapeutic.

12. A pharmaceutical composition comprising the antigen-binding agent of claim 1 and a pharmaceutically acceptable carrier, diluent or excipient.

13. A nucleic acid molecule encoding a light chain variable region and/or a heavy chain variable region of the antigen-binding agent of claim 1.

14. The nucleic acid molecule of claim 13, wherein the nucleic acid is selected from the group consisting of:
  a. a nucleic acid molecule comprising a sequence at least 80% identical to the nucleotide sequence set forth in SEQ ID NO: 11 and/or a nucleic acid molecule comprising a sequence at least 80% identical to the nucleotide sequence set forth in SEQ ID NO:16;
  b. a nucleic acid molecule comprising a sequence at least 80% identical to the nucleotide sequence set forth in SEQ ID NO:21 and/or a nucleic acid molecule comprising a sequence at least 80% identical to the nucleotide sequence set forth in SEQ ID NO:26;
  c. a nucleic acid molecule comprising a sequence at least 80% identical to the nucleotide sequence set forth in SEQ ID NO:31 and/or a nucleic acid molecule comprising a sequence at least 80% identical to the nucleotide sequence set forth in SEQ ID NO:36;
  d. a nucleic acid molecule comprising a sequence at least 80% identical to the nucleotide sequence set forth in SEQ ID NO:41 and/or a nucleic acid molecule comprising a sequence at least 80% identical to the nucleotide sequence set forth in SEQ ID NO:46;
  e. a nucleic acid molecule comprising a sequence at least 80% identical to the nucleotide sequence set forth in SEQ ID NO:51 and/or a nucleic acid molecule comprising a sequence at least 80% identical to the nucleotide sequence set forth in SEQ ID NO:56;
  f. a nucleic acid molecule comprising a sequence at least 80% identical to the nucleotide sequence set forth in SEQ ID NO:61 and/or a nucleic acid molecule comprising a sequence at least 80% identical to the nucleotide sequence set forth in SEQ ID NO:66;
  g. a nucleic acid molecule comprising the nucleotide sequence a sequence at least 80% identical to set forth in SEQ ID NO:71 and/or a nucleic acid comprising a sequence at least 80% identical to the nucleotide sequence set forth in SEQ ID NO:81;
  h. a nucleic acid comprising the nucleotide sequence a sequence at least 80% identical to set forth in SEQ ID NO:76 and/or a nucleic acid molecule comprising a sequence at least 80% identical to the nucleotide sequence set forth in SEQ ID NO:81;
  i. a nucleic acid molecule comprising a sequence at least 80% identical to the nucleotide sequence set forth in SEQ ID NO:86 and/or a nucleic acid molecule comprising a sequence at least 80% identical to the nucleotide sequence set forth in SEQ ID NO:96;
  j. a nucleic acid molecule comprising a sequence at least 80% identical to the nucleotide sequence set forth in SEQ ID NO:91 and/or a nucleic acid molecule comprising a sequence at least 80% identical to the nucleotide sequence set forth in SEQ ID NO:96; and
  k. a nucleic acid molecule comprising a sequence at least 80% identical to the nucleotide sequence set forth in SEQ ID NO:101 and/or a nucleic acid molecule comprising a sequence at least 80% identical to the nucleotide sequence set forth in SEQ ID NO:106.

15. A method of treating cancer, wherein the cancer comprises cells expressing EGFRvIII, the method comprising administering the antigent-binding agent of claim 1 to a subject in need thereof.

16. The method of claim 15, wherein the subject in need has or is suspected of having gliobastoma multiforme or a carcinoma.

17. A method of treating subject having a cancer associated with EGFRvIII expression, the method comprising administering cells expressing the antigen binding agent of claim 1, wherein the antigen-binding agent is a chimeric antigen receptor, a bi-specific T-cell engager, a bispecific killer cell engager or a trispecific killer cell engager.

18. An isolated cell population engineered to express the antigen-binding agent of claim 1.

19. The isolated cell population of claim 18, wherein the isolated cell population comprises T cells, Natural Killer (NK) cells, cytotoxic T cells, regulatory T cells, or a combination of any two or more thereof.

20. A pharmaceutical composition comprising the isolated cell population of claim 18 and a pharmaceutically acceptable buffer or excipient.

* * * * *

SEQUENCE LISTING

<160> NUMBER OF SEQ ID NOS: 171

<210> SEQ ID NO 1
<211> LENGTH: 1210
<212> TYPE: PRT

<213> ORGANISM: Homo sapiens

<400> SEQUENCE: 1

Met Arg Pro Ser Gly Thr Ala Gly Ala Ala Leu Leu Ala Leu Leu Ala
1               5                   10                  15

Ala Leu Cys Pro Ala Ser Arg Ala Leu Glu Glu Lys Lys Val Cys Gln
            20                  25                  30

Gly Thr Ser Asn Lys Leu Thr Gln Leu Gly Thr Phe Glu Asp His Phe
        35                  40                  45

Leu Ser Leu Gln Arg Met Phe Asn Asn Cys Glu Val Val Leu Gly Asn
    50                  55                  60

Leu Glu Ile Thr Tyr Val Gln Arg Asn Tyr Asp Leu Ser Phe Leu Lys
65                  70                  75                  80

Thr Ile Gln Glu Val Ala Gly Tyr Val Leu Ile Ala Leu Asn Thr Val
                85                  90                  95

Glu Arg Ile Pro Leu Glu Asn Leu Gln Ile Ile Arg Gly Asn Met Tyr
            100                 105                 110

Tyr Glu Asn Ser Tyr Ala Leu Ala Val Leu Ser Asn Tyr Asp Ala Asn
        115                 120                 125

Lys Thr Gly Leu Lys Glu Leu Pro Met Arg Asn Leu Gln Glu Ile Leu
    130                 135                 140

His Gly Ala Val Arg Phe Ser Asn Asn Pro Ala Leu Cys Asn Val Glu
145                 150                 155                 160

Ser Ile Gln Trp Arg Asp Ile Val Ser Ser Asp Phe Leu Ser Asn Met
                165                 170                 175

Ser Met Asp Phe Gln Asn His Leu Gly Ser Cys Gln Lys Cys Asp Pro
            180                 185                 190

Ser Cys Pro Asn Gly Ser Cys Trp Gly Ala Gly Glu Glu Asn Cys Gln
        195                 200                 205

Lys Leu Thr Lys Ile Ile Cys Ala Gln Gln Cys Ser Gly Arg Cys Arg
    210                 215                 220

Gly Lys Ser Pro Ser Asp Cys Cys His Asn Gln Cys Ala Ala Gly Cys
225                 230                 235                 240

Thr Gly Pro Arg Glu Ser Asp Cys Leu Val Cys Arg Lys Phe Arg Asp
                245                 250                 255

Glu Ala Thr Cys Lys Asp Thr Cys Pro Pro Leu Met Leu Tyr Asn Pro
            260                 265                 270

Thr Thr Tyr Gln Met Asp Val Asn Pro Glu Gly Lys Tyr Ser Phe Gly
        275                 280                 285

Ala Thr Cys Val Lys Lys Cys Pro Arg Asn Tyr Val Val Thr Asp His
    290                 295                 300

Gly Ser Cys Val Arg Ala Cys Gly Ala Asp Ser Tyr Glu Met Glu Glu
305                 310                 315                 320

Asp Gly Val Arg Lys Cys Lys Lys Cys Glu Gly Pro Cys Arg Lys Val
                325                 330                 335

Cys Asn Gly Ile Gly Ile Gly Glu Phe Lys Asp Ser Leu Ser Ile Asn
            340                 345                 350

Ala Thr Asn Ile Lys His Phe Lys Asn Cys Thr Ser Ile Ser Gly Asp
        355                 360                 365

Leu His Ile Leu Pro Val Ala Phe Arg Gly Asp Ser Phe Thr His Thr
    370                 375                 380

Pro Pro Leu Asp Pro Gln Glu Leu Asp Ile Leu Lys Thr Val Lys Glu
385                 390                 395                 400

```
Ile Thr Gly Phe Leu Leu Ile Gln Ala Trp Pro Glu Asn Arg Thr Asp
                405                 410                 415

Leu His Ala Phe Glu Asn Leu Glu Ile Ile Arg Gly Arg Thr Lys Gln
            420                 425                 430

His Gly Gln Phe Ser Leu Ala Val Val Ser Leu Asn Ile Thr Ser Leu
        435                 440                 445

Gly Leu Arg Ser Leu Lys Glu Ile Ser Asp Gly Asp Val Ile Ile Ser
450                 455                 460

Gly Asn Lys Asn Leu Cys Tyr Ala Asn Thr Ile Asn Trp Lys Lys Leu
465                 470                 475                 480

Phe Gly Thr Ser Gly Gln Lys Thr Lys Ile Ile Ser Asn Arg Gly Glu
            485                 490                 495

Asn Ser Cys Lys Ala Thr Gly Gln Val Cys His Ala Leu Cys Ser Pro
        500                 505                 510

Glu Gly Cys Trp Gly Pro Glu Pro Arg Asp Cys Val Ser Cys Arg Asn
        515                 520                 525

Val Ser Arg Gly Arg Glu Cys Val Asp Lys Cys Asn Leu Leu Glu Gly
        530                 535                 540

Glu Pro Arg Glu Phe Val Glu Asn Ser Glu Cys Ile Gln Cys His Pro
545                 550                 555                 560

Glu Cys Leu Pro Gln Ala Met Asn Ile Thr Cys Thr Gly Arg Gly Pro
            565                 570                 575

Asp Asn Cys Ile Gln Cys Ala His Tyr Ile Asp Gly Pro His Cys Val
        580                 585                 590

Lys Thr Cys Pro Ala Gly Val Met Gly Glu Asn Asn Thr Leu Val Trp
        595                 600                 605

Lys Tyr Ala Asp Ala Gly His Val Cys His Leu Cys His Pro Asn Cys
        610                 615                 620

Thr Tyr Gly Cys Thr Gly Pro Gly Leu Glu Gly Cys Pro Thr Asn Gly
625                 630                 635                 640

Pro Lys Ile Pro Ser Ile Ala Thr Gly Met Val Gly Ala Leu Leu Leu
            645                 650                 655

Leu Leu Val Val Ala Leu Gly Ile Gly Leu Phe Met Arg Arg Arg His
        660                 665                 670

Ile Val Arg Lys Arg Thr Leu Arg Arg Leu Leu Gln Glu Arg Glu Leu
        675                 680                 685

Val Glu Pro Leu Thr Pro Ser Gly Glu Ala Pro Asn Gln Ala Leu Leu
        690                 695                 700

Arg Ile Leu Lys Glu Thr Glu Phe Lys Lys Ile Lys Val Leu Gly Ser
705                 710                 715                 720

Gly Ala Phe Gly Thr Val Tyr Lys Gly Leu Trp Ile Pro Glu Gly Glu
            725                 730                 735

Lys Val Lys Ile Pro Val Ala Ile Lys Glu Leu Arg Glu Ala Thr Ser
        740                 745                 750

Pro Lys Ala Asn Lys Glu Ile Leu Asp Glu Ala Tyr Val Met Ala Ser
        755                 760                 765

Val Asp Asn Pro His Val Cys Arg Leu Leu Gly Ile Cys Leu Thr Ser
        770                 775                 780

Thr Val Gln Leu Ile Thr Gln Leu Met Pro Phe Gly Cys Leu Leu Asp
785                 790                 795                 800

Tyr Val Arg Glu His Lys Asp Asn Ile Gly Ser Gln Tyr Leu Leu Asn
            805                 810                 815

Trp Cys Val Gln Ile Ala Lys Gly Met Asn Tyr Leu Glu Asp Arg Arg
```

820                 825                     830
Leu Val His Arg Asp Leu Ala Ala Arg Asn Val Leu Val Lys Thr Pro
                835                     840                 845

Gln His Val Lys Ile Thr Asp Phe Gly Leu Ala Lys Leu Leu Gly Ala
    850                     855                 860

Glu Lys Glu Tyr His Ala Glu Gly Gly Lys Val Pro Ile Lys Trp
865                 870                 875                     880

Met Ala Leu Glu Ser Ile Leu His Arg Ile Tyr Thr His Gln Ser Asp
                885                 890                 895

Val Trp Ser Tyr Gly Val Thr Val Trp Glu Leu Met Thr Phe Gly Ser
                900                 905                 910

Lys Pro Tyr Asp Gly Ile Pro Ala Ser Glu Ile Ser Ser Ile Leu Glu
            915                 920                 925

Lys Gly Glu Arg Leu Pro Gln Pro Pro Ile Cys Thr Ile Asp Val Tyr
        930                 935                 940

Met Ile Met Val Lys Cys Trp Met Ile Asp Ala Asp Ser Arg Pro Lys
945                 950                 955                 960

Phe Arg Glu Leu Ile Ile Glu Phe Ser Lys Met Ala Arg Asp Pro Gln
                965                 970                 975

Arg Tyr Leu Val Ile Gln Gly Asp Glu Arg Met His Leu Pro Ser Pro
                980                 985                 990

Thr Asp Ser Asn Phe Tyr Arg Ala Leu Met Asp Glu Glu Asp Met Asp
                995                 1000                1005

Asp Val Val Asp Ala Asp Glu Tyr Leu Ile Pro Gln Gln Gly Phe
        1010                1015                1020

Phe Ser Ser Pro Ser Thr Ser Arg Thr Pro Leu Leu Ser Ser Leu
    1025                1030                1035

Ser Ala Thr Ser Asn Asn Ser Thr Val Ala Cys Ile Asp Arg Asn
    1040                1045                1050

Gly Leu Gln Ser Cys Pro Ile Lys Glu Asp Ser Phe Leu Gln Arg
    1055                1060                1065

Tyr Ser Ser Asp Pro Thr Gly Ala Leu Thr Glu Asp Ser Ile Asp
    1070                1075                1080

Asp Thr Phe Leu Pro Val Pro Glu Tyr Ile Asn Gln Ser Val Pro
    1085                1090                1095

Lys Arg Pro Ala Gly Ser Val Gln Asn Pro Val Tyr His Asn Gln
    1100                1105                1110

Pro Leu Asn Pro Ala Pro Ser Arg Asp Pro His Tyr Gln Asp Pro
    1115                1120                1125

His Ser Thr Ala Val Gly Asn Pro Glu Tyr Leu Asn Thr Val Gln
    1130                1135                1140

Pro Thr Cys Val Asn Ser Thr Phe Asp Ser Pro Ala His Trp Ala
    1145                1150                1155

Gln Lys Gly Ser His Gln Ile Ser Leu Asp Asn Pro Asp Tyr Gln
    1160                1165                1170

Gln Asp Phe Phe Pro Lys Glu Ala Lys Pro Asn Gly Ile Phe Lys
    1175                1180                1185

Gly Ser Thr Ala Glu Asn Ala Glu Tyr Leu Arg Val Ala Pro Gln
    1190                1195                1200

Ser Ser Glu Phe Ile Gly Ala
    1205                1210

<210> SEQ ID NO 2

<211> LENGTH: 1869
<212> TYPE: DNA
<213> ORGANISM: Homo sapiens

<400> SEQUENCE: 2

| | | | | | |
|---|---|---|---|---|---|
| ctggaggaaa | agaaagtttg | ccaaggcacg | agtaacaagc | tcacgcagtt | gggcactttt | 60 |
| gaagatcatt | ttctcagcct | ccagaggatg | ttcaataact | gtgaggtggt | ccttgggaat | 120 |
| ttggaaatta | cctatgtgca | gaggaattat | gatctttcct | tcttaaagac | catccaggag | 180 |
| gtggctggtt | atgtcctcat | tgccctcaac | acagtggagc | gaattccttt | ggaaaacctg | 240 |
| cagatcatca | gaggaaatat | gtactacgaa | aattcctatg | ccttagcagt | cttatctaac | 300 |
| tatgatgcaa | ataaaaccgg | actgaaggag | ctgcccatga | gaaatttaca | ggaaatcctg | 360 |
| catggcgccg | tgcggttcag | caacaaccct | gccctgtgca | acgtggagag | catccagtgg | 420 |
| cgggacatag | tcagcagtga | ctttctcagc | aacatgtcga | tggacttcca | gaaccacctg | 480 |
| ggcagctgcc | aaaagtgtga | tccaagctgt | cccaatggga | gctgctgggg | tgcaggagag | 540 |
| gagaactgcc | agaaactgac | caaaatcatc | tgtgcccagc | agtgctccgg | cgcgctgccgt | 600 |
| ggcaagtccc | ccagtgactg | ctgccacaac | cagtgtgctg | caggctgcac | aggcccccgg | 660 |
| gagagcgact | gcctggtctg | ccgcaaattc | cgagacgaag | ccacgtgcaa | ggacacctgc | 720 |
| cccccactca | tgctctacaa | ccccaccacg | taccagatgg | atgtgaaccc | cgagggcaaa | 780 |
| tacagctttg | gtgccacctg | cgtgaagaag | tgtccccgta | attatgtggt | gacagatcac | 840 |
| ggctcgtgcg | tccgagcctg | tggggccgac | agctatgaga | tggaggaaga | cggcgtccgc | 900 |
| aagtgtaaga | agtgcgaagg | ccttgccgc | aaagtgtgta | acggaatagg | tattggtgaa | 960 |
| tttaaagact | cactctccat | aaatgctacg | aatattaaac | acttcaaaaa | ctgcacctcc | 1020 |
| atcagtggcg | atctccacat | cctgccggtg | gcatttaggg | gtgactcctt | cacacatact | 1080 |
| cctcctctgg | atccacagga | actggatatt | ctgaaaaccg | taaggaaat | cacagggttt | 1140 |
| ttgctgattc | aggcttggcc | tgaaaacagg | acggacctcc | atgcctttga | gaacctagaa | 1200 |
| atcatacgcg | gcaggaccaa | gcaacatggt | cagttttctc | ttgcagtcgt | cagcctgaac | 1260 |
| ataacatcct | tgggattacg | ctcccctcaag | gagataagtg | atggagatgt | gataatttca | 1320 |
| ggaaacaaaa | atttgtgcta | tgcaaataca | ataaactgga | aaaaactgtt | tgggacctcc | 1380 |
| ggtcagaaaa | ccaaaattat | aagcaacaga | ggtgaaaaca | gctgcaaggc | cacaggccag | 1440 |
| gtctgccatg | ccttgtgctc | ccccgagggc | tgctgggc | cggagcccag | ggactgcgtc | 1500 |
| tcttgccgga | atgtcagccg | aggcagggaa | tgcgtggaca | agtgcaacct | tctggagggt | 1560 |
| gagccaaggg | agtttgtgga | gaactctgag | tgcatacagt | gccacccaga | gtgcctgcct | 1620 |
| caggccatga | acatcacctg | cacaggacgg | ggaccagaca | actgtatcca | gtgtgcccac | 1680 |
| tacattgacg | gcccccactg | cgtcaagacc | tgcccggcag | gagtcatggg | agaaaacaac | 1740 |
| accctggtct | ggaagtacgc | agacgccggc | catgtgtgcc | acctgtgcca | tccaaactgc | 1800 |
| acctacggat | gcactgggcc | aggtcttgaa | ggctgtccaa | cgaatgggcc | taagatcccg | 1860 |
| tccatcgcc | | | | | | 1869 |

<210> SEQ ID NO 3
<211> LENGTH: 621
<212> TYPE: PRT
<213> ORGANISM: Homo sapiens

<400> SEQUENCE: 3

Leu Glu Glu Lys Lys Val Cys Gln Gly Thr Ser Asn Lys Leu Thr Gln

```
  1               5                   10                  15
Leu Gly Thr Phe Glu Asp His Phe Leu Ser Leu Gln Arg Met Phe Asn
                20                  25                  30

Asn Cys Glu Val Val Leu Gly Asn Leu Glu Ile Thr Tyr Val Gln Arg
                35                  40                  45

Asn Tyr Asp Leu Ser Phe Leu Lys Thr Ile Gln Glu Val Ala Gly Tyr
        50                  55                  60

Val Leu Ile Ala Leu Asn Thr Val Glu Arg Ile Pro Leu Glu Asn Leu
 65                 70                  75                  80

Gln Ile Ile Arg Gly Asn Met Tyr Tyr Glu Asn Ser Tyr Ala Leu Ala
                85                  90                  95

Val Leu Ser Asn Tyr Asp Ala Asn Lys Thr Gly Leu Lys Glu Leu Pro
                100                 105                 110

Met Arg Asn Leu Gln Glu Ile Leu His Gly Ala Val Arg Phe Ser Asn
                115                 120                 125

Asn Pro Ala Leu Cys Asn Val Glu Ser Ile Gln Trp Arg Asp Ile Val
        130                 135                 140

Ser Ser Asp Phe Leu Ser Asn Met Ser Met Asp Phe Gln Asn His Leu
145                 150                 155                 160

Gly Ser Cys Gln Lys Cys Asp Pro Ser Cys Pro Asn Gly Ser Cys Trp
                165                 170                 175

Gly Ala Gly Glu Glu Asn Cys Gln Lys Leu Thr Lys Ile Ile Cys Ala
                180                 185                 190

Gln Gln Cys Ser Gly Arg Cys Arg Gly Lys Ser Pro Ser Asp Cys Cys
                195                 200                 205

His Asn Gln Cys Ala Ala Gly Cys Thr Gly Pro Arg Glu Ser Asp Cys
        210                 215                 220

Leu Val Cys Arg Lys Phe Arg Asp Glu Ala Thr Cys Lys Asp Thr Cys
225                 230                 235                 240

Pro Pro Leu Met Leu Tyr Asn Pro Thr Thr Tyr Gln Met Asp Val Asn
                245                 250                 255

Pro Glu Gly Lys Tyr Ser Phe Gly Ala Thr Cys Val Lys Lys Cys Pro
                260                 265                 270

Arg Asn Tyr Val Val Thr Asp His Gly Ser Cys Val Arg Ala Cys Gly
        275                 280                 285

Ala Asp Ser Tyr Glu Met Glu Glu Asp Gly Val Arg Lys Cys Lys Lys
        290                 295                 300

Cys Glu Gly Pro Cys Arg Lys Val Cys Asn Gly Ile Gly Ile Gly Glu
305                 310                 315                 320

Phe Lys Asp Ser Leu Ser Ile Asn Ala Thr Asn Ile Lys His Phe Lys
                325                 330                 335

Asn Cys Thr Ser Ile Ser Gly Asp Leu His Ile Leu Pro Val Ala Phe
                340                 345                 350

Arg Gly Asp Ser Phe Thr His Thr Pro Pro Leu Asp Pro Gln Glu Leu
                355                 360                 365

Asp Ile Leu Lys Thr Val Lys Glu Ile Thr Gly Phe Leu Leu Ile Gln
        370                 375                 380

Ala Trp Pro Glu Asn Arg Thr Asp Leu His Ala Phe Glu Asn Leu Glu
385                 390                 395                 400

Ile Ile Arg Gly Arg Thr Lys Gln His Gly Gln Phe Ser Leu Ala Val
                405                 410                 415

Val Ser Leu Asn Ile Thr Ser Leu Gly Leu Arg Ser Leu Lys Glu Ile
                420                 425                 430
```

Ser Asp Gly Asp Val Ile Ile Ser Gly Asn Lys Asn Leu Cys Tyr Ala
    435                 440                 445

Asn Thr Ile Asn Trp Lys Lys Leu Phe Gly Thr Ser Gly Gln Lys Thr
450                 455                 460

Lys Ile Ile Ser Asn Arg Gly Glu Asn Ser Cys Lys Ala Thr Gly Gln
465                 470                 475                 480

Val Cys His Ala Leu Cys Ser Pro Glu Gly Cys Trp Gly Pro Glu Pro
            485                 490                 495

Arg Asp Cys Val Ser Cys Arg Asn Val Ser Arg Gly Arg Glu Cys Val
            500                 505                 510

Asp Lys Cys Asn Leu Leu Glu Gly Glu Pro Arg Glu Phe Val Glu Asn
            515                 520                 525

Ser Glu Cys Ile Gln Cys His Pro Glu Cys Leu Pro Gln Ala Met Asn
    530                 535                 540

Ile Thr Cys Thr Gly Arg Gly Pro Asp Asn Cys Ile Gln Cys Ala His
545                 550                 555                 560

Tyr Ile Asp Gly Pro His Cys Val Lys Thr Cys Pro Ala Gly Val Met
                565                 570                 575

Gly Glu Asn Asn Thr Leu Val Trp Lys Tyr Ala Asp Ala Gly His Val
            580                 585                 590

Cys His Leu Cys His Pro Asn Cys Thr Tyr Gly Cys Thr Gly Pro Gly
    595                 600                 605

Leu Glu Gly Cys Pro Thr Asn Gly Pro Lys Ile Pro Ser
    610                 615                 620

<210> SEQ ID NO 4
<211> LENGTH: 996
<212> TYPE: DNA
<213> ORGANISM: Artificial Sequence
<220> FEATURE:
<223> OTHER INFORMATION: Human EGFRvIII ectodomain cDNA sequence
      (nucleotides 1-996)

<400> SEQUENCE: 4
ctggaagaga agaaaggcaa ctacgtcgtg accgaccacg gcagctgtgt gcgggcttgt      60
ggcgccgata gctacgagat ggaagaggac ggcgtgcgga agtgcaagaa gtgcgagggc     120
ccctgccgga agtgtgcaa cggcatcggc atcggagagt tcaaggacag cctgagcatc     180
aacgccacca acatcaagca cttcaagaac tgcaccagca tcagcggcga cctgcacatc     240
ctgcccgtgg cctttagagg cgacagcttc acccacaccc ccccactgga ccccaggaa      300 ctggacatcc tgaaaaccgt gaaagagatc accggctttc tgctgattca ggcctggccc     360
gagaaccgga cagacctgca cgccttcgag aacctggaaa tcatccgggg caggaccaag     420
cagcacggcc agttttctct ggccgtggtg tccctgaaca tcaccagcct gggcctgcgg     480
agcctgaaag aaatcagcga cggcgacgtg atcatctccg gcaacaagaa cctgtgctac     540
gccaacacca tcaactggaa gaagctgttc ggcacctccg gccagaaaac aaagatcatc     600
agcaaccggg gcgagaacag ctgcaaggcc acaggacaag tgtgccacgc cctgtgtagc     660
cctgagggct gttggggacc cgagcccaga gattgcgtgt cctgcagaaa cgtgtcccgg     720
ggcagagaat gcgtggacaa gtgcaacctg ctggaaggcg agccccgcga gttcgtggaa     780
aacagcgagt gcatccagtg ccaccccgag tgtctgcccc aggccatgaa cattacctgc     840
accggcagag gccccgacaa ctgtatccag tgcgcccact acatcgacgg cccccactgc     900
gtgaaaacct gtcctgctgg cgtgatggga gagaacaaca ccctcgtgtg gaagtacgcc     960
gacgccggcc atgtgtgcca cctgtgtcac cccaat 996

<210> SEQ ID NO 5
<211> LENGTH: 332
<212> TYPE: PRT
<213> ORGANISM: Artificial Sequence
<220> FEATURE:
<223> OTHER INFORMATION: Human EGFRvIII ectodomain amino acid sequence
      (amino acids 1-332)

<400> SEQUENCE: 5

```
Leu Glu Glu Lys Lys Gly Asn Tyr Val Val Thr Asp His Gly Ser Cys
1               5                   10                  15

Val Arg Ala Cys Gly Ala Asp Ser Tyr Glu Met Glu Glu Asp Gly Val
            20                  25                  30

Arg Lys Cys Lys Lys Cys Glu Gly Pro Cys Arg Lys Val Cys Asn Gly
35                  40                  45

Ile Gly Ile Gly Glu Phe Lys Asp Ser Leu Ser Ile Asn Ala Thr Asn
50                  55                  60

Ile Lys His Phe Lys Asn Cys Thr Ser Ile Ser Gly Asp Leu His Ile
65                  70                  75                  80

Leu Pro Val Ala Phe Arg Gly Asp Ser Phe Thr His Thr Pro Pro Leu
                85                  90                  95

Asp Pro Gln Glu Leu Asp Ile Leu Lys Thr Val Lys Glu Ile Thr Gly
            100                 105                 110

Phe Leu Leu Ile Gln Ala Trp Pro Glu Asn Arg Thr Asp Leu His Ala
115                 120                 125

Phe Glu Asn Leu Glu Ile Ile Arg Gly Arg Thr Lys Gln His Gly Gln
130                 135                 140

Phe Ser Leu Ala Val Val Ser Leu Asn Ile Thr Ser Leu Gly Leu Arg
145                 150                 155                 160

Ser Leu Lys Glu Ile Ser Asp Gly Asp Val Ile Ile Ser Gly Asn Lys
                165                 170                 175

Asn Leu Cys Tyr Ala Asn Thr Ile Asn Trp Lys Lys Leu Phe Gly Thr
            180                 185                 190

Ser Gly Gln Lys Thr Lys Ile Ile Ser Asn Arg Gly Glu Asn Ser Cys
        195                 200                 205

Lys Ala Thr Gly Gln Val Cys His Ala Leu Cys Ser Pro Glu Gly Cys
210                 215                 220

Trp Gly Pro Glu Pro Arg Asp Cys Val Ser Cys Arg Asn Val Ser Arg
225                 230                 235                 240

Gly Arg Glu Cys Val Asp Lys Cys Asn Leu Leu Glu Gly Glu Pro Arg
                245                 250                 255

Glu Phe Val Glu Asn Ser Glu Cys Ile Gln Cys His Pro Glu Cys Leu
            260                 265                 270

Pro Gln Ala Met Asn Ile Thr Cys Thr Gly Arg Gly Pro Asp Asn Cys
        275                 280                 285

Ile Gln Cys Ala His Tyr Ile Asp Gly Pro His Cys Val Lys Thr Cys
290                 295                 300

Pro Ala Gly Val Met Gly Glu Asn Asn Thr Leu Val Trp Lys Tyr Ala
305                 310                 315                 320

Asp Ala Gly His Val Cys His Leu Cys His Pro Asn
                325                 330
```

<210> SEQ ID NO 6

```
<211> LENGTH: 23
<212> TYPE: PRT
<213> ORGANISM: Artificial Sequence
<220> FEATURE:
<223> OTHER INFORMATION: Human EGFRvIII amino acid residues 15 to 37

<400> SEQUENCE: 6

Ser Cys Val Arg Ala Cys Gly Ala Asp Ser Tyr Glu Met Glu Glu Asp
1               5                   10                  15

Gly Val Arg Lys Cys Lys Lys
            20

<210> SEQ ID NO 7
<211> LENGTH: 112
<212> TYPE: PRT
<213> ORGANISM: Artificial Sequence
<220> FEATURE:
<223> OTHER INFORMATION: 5G6 light chain variable region

<400> SEQUENCE: 7

Asp Val Val Met Thr Gln Thr Pro Leu Thr Leu Ser Val Thr Ile Gly
1               5                   10                  15

Gln Pro Ala Ser Ile Ser Cys Lys Ser Ser Gln Ser Leu Leu Asp Ser
            20                  25                  30

Asp Gly Lys Thr Tyr Leu Asn Trp Leu Leu Gln Arg Pro Gly Gln Ser
        35                  40                  45

Pro Lys Arg Leu Ile Tyr Leu Ala Ser Lys Leu Asp Ser Gly Val Pro
    50                  55                  60

Asp Arg Phe Thr Gly Ser Gly Ser Gly Thr Asp Phe Thr Leu Lys Ile
65                  70                  75                  80

Ser Arg Val Glu Ala Glu Asp Leu Gly Val Tyr Tyr Cys Trp Gln Ala
                85                  90                  95

Thr His Phe Pro Trp Thr Phe Gly Gly Gly Thr Lys Leu Glu Ile Lys
            100                 105                 110

<210> SEQ ID NO 8
<211> LENGTH: 16
<212> TYPE: PRT
<213> ORGANISM: Artificial Sequence
<220> FEATURE:
<223> OTHER INFORMATION: 5G6 CDRL1

<400> SEQUENCE: 8

Lys Ser Ser Gln Ser Leu Leu Asp Ser Asp Gly Lys Thr Tyr Leu Asn
1               5                   10                  15

<210> SEQ ID NO 9
<211> LENGTH: 7
<212> TYPE: PRT
<213> ORGANISM: Artificial Sequence
<220> FEATURE:
<223> OTHER INFORMATION: 5G6 CDRL2

<400> SEQUENCE: 9

Leu Ala Ser Lys Leu Asp Ser
1               5

<210> SEQ ID NO 10
<211> LENGTH: 9
<212> TYPE: PRT
<213> ORGANISM: Artificial Sequence
<220> FEATURE:
<223> OTHER INFORMATION: 5G6 CDRL3
```

<400> SEQUENCE: 10

Trp Gln Ala Thr His Phe Pro Trp Thr
1               5

<210> SEQ ID NO 11
<211> LENGTH: 336
<212> TYPE: DNA
<213> ORGANISM: Artificial Sequence
<220> FEATURE:
<223> OTHER INFORMATION: 5G6 - Light chain variable region cDNA

<400> SEQUENCE: 11

```
gatgttgtga tgacccagac tccactcact ttgtcggtta ccattggaca accagcctcc    60
atctcttgca agtcaagtca gagcctctta gatagtgatg gaaagacata tttgaattgg   120
ttgttacaga ggcctggcca gtctccaaag cgcctaatct atctggcgtc taaactggac   180
tctggagtcc ctgacaggtt cactggcagt ggatcaggga cagatttcac actgaaaatc   240
agcagagtgg aggctgagga tttgggagtt tattattgct ggcaagctac acattttccg   300
tggacgttcg gtggaggcac caagctggaa atcaaa                             336
```

<210> SEQ ID NO 12
<211> LENGTH: 116
<212> TYPE: PRT
<213> ORGANISM: Artificial Sequence
<220> FEATURE:
<223> OTHER INFORMATION: 5G6 heavy chain variable region

<400> SEQUENCE: 12

Glu Val Gln Leu Gln Gln Ser Gly Ala Glu Leu Ala Arg Pro Gly Ala
1               5                   10                  15

Ser Val Lys Met Ser Cys Lys Ala Ser Gly Tyr Thr Phe Thr Ser Tyr
                20                  25                  30

Trp Met His Trp Val Lys Gln Arg Pro Gly Gln Gly Leu Glu Trp Ile
            35                  40                  45

Gly Ala Ile Tyr Pro Gly Asn Ser Asp Ile Ser Tyr Asn Gln Lys Phe
        50                  55                  60

Lys Gly Lys Ala Lys Leu Thr Ala Val Thr Ser Ala Thr Ala Tyr
65                  70                  75                  80

Met Glu Leu Ser Ser Leu Thr Asn Glu Asp Ser Ala Val Tyr Tyr Cys
                85                  90                  95

Thr Leu Tyr Asp Tyr Asp Pro Asp Tyr Trp Gly Gln Gly Thr Thr Leu
                100                 105                 110

Thr Val Ser Ser
            115

<210> SEQ ID NO 13
<211> LENGTH: 5
<212> TYPE: PRT
<213> ORGANISM: Artificial Sequence
<220> FEATURE:
<223> OTHER INFORMATION: 5G6 CDRH1

<400> SEQUENCE: 13

Ser Tyr Trp Met His
1               5

<210> SEQ ID NO 14
<211> LENGTH: 17
<212> TYPE: PRT
<213> ORGANISM: Artificial Sequence

<220> FEATURE:
<223> OTHER INFORMATION: 5G6 CDRH2

<400> SEQUENCE: 14

Ala Ile Tyr Pro Gly Asn Ser Asp Ile Ser Tyr Asn Gln Lys Phe Lys
1               5                   10                  15

Gly

<210> SEQ ID NO 15
<211> LENGTH: 7
<212> TYPE: PRT
<213> ORGANISM: Artificial Sequence
<220> FEATURE:
<223> OTHER INFORMATION: 5G6 CDRH3

<400> SEQUENCE: 15

Tyr Asp Tyr Asp Pro Asp Tyr
1               5

<210> SEQ ID NO 16
<211> LENGTH: 348
<212> TYPE: DNA
<213> ORGANISM: Artificial Sequence
<220> FEATURE:
<223> OTHER INFORMATION: 5G6 - Heavy chain variable region cDNA

<400> SEQUENCE: 16
gaggtccaac tgcagcagtc tggggctgag ctggcaagac ctggggcttc agtgaagatg      60
tcctgcaagg cttctggcta cacctttacc agctactgga tgcactgggt aaaacagagg     120
cctggacagg gtctggaatg gattggcgct atttatcctg gaaatagtga tattagctac     180
aatcagaagt tcaagggcaa ggccaaactg actgcagtca catccgccac cactgcctac     240
atggagctca gcagcctaac aaatgaggac tctgcggtct attactgtac cctctatgat     300
tacgaccctg actactgggg ccaaggcacc actctcacag tctcctca                 348

<210> SEQ ID NO 17
<211> LENGTH: 113
<212> TYPE: PRT
<213> ORGANISM: Artificial Sequence
<220> FEATURE:
<223> OTHER INFORMATION: 1A8 light chain variable region

<400> SEQUENCE: 17

Asp Ile Val Met Thr Gln Ser Pro Ser Ser Leu Ala Met Ser Val Gly
1               5                   10                  15

Gln Lys Val Thr Met Asn Cys Lys Ser Ser Gln Ser Leu Leu Asn Ser
            20                  25                  30

Ser Asn Gln Lys Asn Tyr Leu Ala Trp Phe Gln Gln Lys Pro Gly Gln
        35                  40                  45

Ser Pro Lys Leu Leu Val Tyr Phe Ala Ser Thr Arg Glu Ser Gly Val
    50                  55                  60

Pro Asp Arg Phe Ile Gly Ser Gly Ser Gly Thr Asp Phe Thr Leu Thr
65                  70                  75                  80

Ile Ser Ser Val Gln Ala Glu Asp Leu Ala Asp Tyr Phe Cys Gln Gln
                85                  90                  95

His Tyr Ser Thr Pro Leu Thr Phe Gly Ala Gly Thr Lys Leu Glu Leu
            100                 105                 110

Lys

```
<210> SEQ ID NO 18
<211> LENGTH: 17
<212> TYPE: PRT
<213> ORGANISM: Artificial Sequence
<220> FEATURE:
<223> OTHER INFORMATION: 1A8 CDRL1

<400> SEQUENCE: 18

Lys Ser Ser Gln Ser Leu Leu Asn Ser Ser Asn Gln Lys Asn Tyr Leu
1               5                   10                  15

Ala

<210> SEQ ID NO 19
<211> LENGTH: 7
<212> TYPE: PRT
<213> ORGANISM: Artificial Sequence
<220> FEATURE:
<223> OTHER INFORMATION: 1A8 CDRL2

<400> SEQUENCE: 19

Phe Ala Ser Thr Arg Glu Ser
1               5

<210> SEQ ID NO 20
<211> LENGTH: 9
<212> TYPE: PRT
<213> ORGANISM: Artificial Sequence
<220> FEATURE:
<223> OTHER INFORMATION: 1A8 CDRL3

<400> SEQUENCE: 20

Gln Gln His Tyr Ser Thr Pro Leu Thr
1               5

<210> SEQ ID NO 21
<211> LENGTH: 339
<212> TYPE: DNA
<213> ORGANISM: Artificial Sequence
<220> FEATURE:
<223> OTHER INFORMATION: 1A8 light chain variable region cDNA

<400> SEQUENCE: 21
gacattgtga tgacacagtc tccatcctcc ctggctatgt cagtaggaca gaaggtcact      60
atgaactgca gtccagtca gagccttta aatagtagca atcaaaagaa ctatttggcc     120
tggttccagc agaaaccagg acagtctcct aaacttctgg tatactttgc ttccactagg    180
gaatctgggg tccctgatcg cttcataggc agtggatctg ggacagattt cactcttacc    240
atcagcagtg tgcaggctga agacctggca gattacttct gtcagcaaca ttatagcact    300
cctctcacgt tcggtgctgg gaccaagctg gagctgaaa                           339

<210> SEQ ID NO 22
<211> LENGTH: 114
<212> TYPE: PRT
<213> ORGANISM: Artificial Sequence
<220> FEATURE:
<223> OTHER INFORMATION: 1A8 heavy chain variable region

<400> SEQUENCE: 22

Glu Val Gln Leu Gln Gln Ser Gly Ala Glu Leu Val Arg Pro Gly Ala
1               5                   10                  15

Leu Val Lys Leu Ser Cys Lys Ala Ser Gly Phe Asn Ile Lys Asp Tyr
                20                  25                  30

Tyr Met His Trp Val Lys Gln Arg Pro Glu Gln Gly Leu Glu Trp Ile
```

```
                35                  40                  45
Gly Trp Ile Asp Pro Glu Asn Gly Asn Thr Ile Tyr Asp Pro Lys Phe
            50                  55                  60
Gln Gly Lys Ala Thr Ile Thr Ala Asp Thr Ser Ser Asn Thr Ala Tyr
 65                  70                  75                  80
Leu Gln Leu Ser Ser Leu Ala Ser Glu Asp Thr Ala Val Tyr Tyr Cys
                85                  90                  95
Ala Arg Gly Trp Leu Leu Leu Trp Gly Gln Gly Thr Thr Leu Thr Val
            100                 105                 110
Ser Ser

<210> SEQ ID NO 23
<211> LENGTH: 5
<212> TYPE: PRT
<213> ORGANISM: Artificial Sequence
<220> FEATURE:
<223> OTHER INFORMATION: 1A8 CDRH1

<400> SEQUENCE: 23

Asp Tyr Tyr Met His
1               5

<210> SEQ ID NO 24
<211> LENGTH: 17
<212> TYPE: PRT
<213> ORGANISM: Artificial Sequence
<220> FEATURE:
<223> OTHER INFORMATION: 1A8 CDRH2

<400> SEQUENCE: 24

Trp Ile Asp Pro Glu Asn Gly Asn Thr Ile Tyr Asp Pro Lys Phe Gln
1               5                   10                  15
Gly

<210> SEQ ID NO 25
<211> LENGTH: 5
<212> TYPE: PRT
<213> ORGANISM: Artificial Sequence
<220> FEATURE:
<223> OTHER INFORMATION: 1A8 CDRH3

<400> SEQUENCE: 25

Gly Trp Leu Leu Leu
1               5

<210> SEQ ID NO 26
<211> LENGTH: 342
<212> TYPE: DNA
<213> ORGANISM: Artificial Sequence
<220> FEATURE:
<223> OTHER INFORMATION: 1A8 heavy chain variable region cDNA

<400> SEQUENCE: 26
gaggttcagc tgcagcagtc tggggctgag cttgtgaggc caggggcctt agtcaagttg      60
tcctgcaaag cttctggctt caacattaaa gactactata tgcactgggt gaagcagagg     120
cctgaacagg gcctggagtg gattggatgg attgatcctg agaatggtaa tactatatat     180
gacccgaagt tccagggcaa ggccactata acagcagaca catcctccaa cacagcctac     240
ctgcagctca gcagcctggc atctgaggac actgccgtct attactgtgc tagaggatgg     300
ttactacttt ggggccaagg caccactctc acagtctcct ca                        342
```

<210> SEQ ID NO 27
<211> LENGTH: 108
<212> TYPE: PRT
<213> ORGANISM: Artificial Sequence
<220> FEATURE:
<223> OTHER INFORMATION: 4B3 light chain variable region

<400> SEQUENCE: 27

Glu Ile Val Leu Thr Gln Ser Pro Ala Leu Met Ala Ala Ser Pro Gly
1               5                   10                  15

Glu Lys Val Thr Ile Thr Cys Ser Val Ser Ser Ser Ile Ser Ser Ser
            20                  25                  30

Asn Leu His Trp Tyr Gln Gln Lys Ser Glu Thr Ser Pro Lys Pro Trp
        35                  40                  45

Ile Tyr Gly Thr Ser Asn Leu Ala Ser Gly Val Pro Val Arg Phe Ser
    50                  55                  60

Gly Ser Gly Ser Gly Thr Ser Tyr Ser Leu Thr Ile Ser Ser Met Glu
65                  70                  75                  80

Ala Glu Asp Ala Ala Thr Tyr Tyr Cys Gln Gln Trp Ser Ser Tyr Pro
                85                  90                  95

Leu Thr Phe Gly Ala Gly Thr Lys Leu Glu Leu Glu
            100                 105

<210> SEQ ID NO 28
<211> LENGTH: 12
<212> TYPE: PRT
<213> ORGANISM: Artificial Sequence
<220> FEATURE:
<223> OTHER INFORMATION: 4B3 CDRL1

<400> SEQUENCE: 28

Ser Val Ser Ser Ser Ile Ser Ser Ser Asn Leu His
1               5                   10

<210> SEQ ID NO 29
<211> LENGTH: 7
<212> TYPE: PRT
<213> ORGANISM: Artificial Sequence
<220> FEATURE:
<223> OTHER INFORMATION: 4B3 CDRL2

<400> SEQUENCE: 29

Gly Thr Ser Asn Leu Ala Ser
1               5

<210> SEQ ID NO 30
<211> LENGTH: 9
<212> TYPE: PRT
<213> ORGANISM: Artificial Sequence
<220> FEATURE:
<223> OTHER INFORMATION: 4B3 CDRL3

<400> SEQUENCE: 30

Gln Gln Trp Ser Ser Tyr Pro Leu Thr
1               5

<210> SEQ ID NO 31
<211> LENGTH: 324
<212> TYPE: DNA
<213> ORGANISM: Artificial Sequence
<220> FEATURE:
<223> OTHER INFORMATION: 4B3 light chain variable region cDNA

<400> SEQUENCE: 31

-continued

```
gaaattgtgc tcacccagtc tccagcactc atggctgcat ctccagggga gaaggtcacc      60
atcacctgca gtgtcagctc aagtataagt tccagcaact tgcactggta ccagcagaag     120
tcagaaacct cccccaaacc ctggatttat ggcacatcca acctggcttc tggagtccct     180
gttcgcttca gtggcagtgg atctgggacc tcttattctc tcacaatcag cagcatggag     240
gctgaagatg ctgccactta ttactgtcaa cagtggagta gttacccact cacgttcggt     300
gctgggacca agctggaact ggaa                                            324
```

<210> SEQ ID NO 32
<211> LENGTH: 119
<212> TYPE: PRT
<213> ORGANISM: Artificial Sequence
<220> FEATURE:
<223> OTHER INFORMATION: 4B3 heavy chain variable region

<400> SEQUENCE: 32

```
Glu Val Gln Leu Gln Gln Ser Gly Pro Glu Leu Val Lys Pro Gly Ser
1               5                   10                  15

Ser Val Lys Ile Ser Cys Lys Ala Ser Gly Tyr Thr Phe Thr Asp Tyr
            20                  25                  30

Asn Met Asp Trp Val Lys Gln Ser His Gly Lys Ser Leu Glu Trp Ile
        35                  40                  45

Gly Thr Ile Asn Pro Asn Asn Gly Gly Thr Ser Tyr Asn Gln Lys Phe
    50                  55                  60

Lys Gly Lys Ala Thr Leu Thr Val Asp Lys Ser Ser Asn Thr Ala Tyr
65                  70                  75                  80

Met Glu Leu Arg Ser Leu Thr Ser Glu Asp Ser Ala Val Tyr Tyr Cys
                85                  90                  95

Ala Arg Gly Tyr Asp Tyr Asp Leu Trp Phe Ala Tyr Trp Gly Gln Gly
            100                 105                 110

Thr Leu Val Thr Val Ser Ala
        115
```

<210> SEQ ID NO 33
<211> LENGTH: 5
<212> TYPE: PRT
<213> ORGANISM: Artificial Sequence
<220> FEATURE:
<223> OTHER INFORMATION: 4B3 CDRH1

<400> SEQUENCE: 33

```
Asp Tyr Asn Met Asp
1               5
```

<210> SEQ ID NO 34
<211> LENGTH: 17
<212> TYPE: PRT
<213> ORGANISM: Artificial Sequence
<220> FEATURE:
<223> OTHER INFORMATION: 4B3 CDRH2

<400> SEQUENCE: 34

```
Thr Ile Asn Pro Asn Asn Gly Gly Thr Ser Tyr Asn Gln Lys Phe Lys
1               5                   10                  15

Gly
```

<210> SEQ ID NO 35
<211> LENGTH: 10
<212> TYPE: PRT

```
<213> ORGANISM: Artificial Sequence
<220> FEATURE:
<223> OTHER INFORMATION: 4B3 CDRH3

<400> SEQUENCE: 35

Gly Tyr Asp Tyr Asp Leu Trp Phe Ala Tyr
1               5                   10

<210> SEQ ID NO 36
<211> LENGTH: 357
<212> TYPE: DNA
<213> ORGANISM: Artificial Sequence
<220> FEATURE:
<223> OTHER INFORMATION: 4B3 heavy chain variable region cDNA

<400> SEQUENCE: 36
gaggtccagc tgcaacagtc tggacctgag ctggtgaagc ctgggtcttc agtgaagata      60
tcctgcaaag cttctggata cacattcact gactacaaca tggactgggt gaagcagagc     120
catggaaaga gccttgagtg gattggtact attaatccta acaatggtgg tactagctac     180
aaccagaagt tcaagggcaa ggccacattg actgtagaca gtcctccaa cacagcctac      240 atggagctcc gcagcctgac atctgaggac tctgcagtct attactgtgc aagaggctat     300
gattacgact gtggtttgc ttactgggc aagggactc tggtcactgt ctctgca           357

<210> SEQ ID NO 37
<211> LENGTH: 107
<212> TYPE: PRT
<213> ORGANISM: Artificial Sequence
<220> FEATURE:
<223> OTHER INFORMATION: 4E11 light chain variable region

<400> SEQUENCE: 37

Asp Ile Leu Met Thr Gln Ser Pro Ser Ser Met Ser Val Ser Leu Gly
1               5                   10                  15

Asp Thr Val Ser Ile Thr Cys His Ala Ser Gln Gly Ile Asn Ser Asn
            20                  25                  30

Ile Gly Trp Leu Leu Gln Lys Pro Gly Lys Ser Phe Lys Gly Leu Ile
        35                  40                  45

Tyr His Gly Thr Asn Leu Glu Asp Gly Val Pro Ser Arg Phe Ser Gly
    50                  55                  60

Ser Gly Ser Gly Thr Asp Tyr Ser Leu Thr Ile Ser Ser Leu Glu Ser
65                  70                  75                  80

Glu Asp Phe Ala Asp Tyr Tyr Cys Val Gln Tyr Ala Gln Phe Pro Tyr
                85                  90                  95

Thr Phe Gly Gly Gly Thr Lys Leu Glu Ile Lys
            100                 105

<210> SEQ ID NO 38
<211> LENGTH: 11
<212> TYPE: PRT
<213> ORGANISM: Artificial Sequence
<220> FEATURE:
<223> OTHER INFORMATION: 4E11 CDRL1

<400> SEQUENCE: 38

His Ala Ser Gln Gly Ile Asn Ser Asn Ile Gly
1               5                   10

<210> SEQ ID NO 39
<211> LENGTH: 7
<212> TYPE: PRT
```

```
<213> ORGANISM: Artificial Sequence
<220> FEATURE:
<223> OTHER INFORMATION: 4E11 CDRL2

<400> SEQUENCE: 39

His Gly Thr Asn Leu Glu Asp
1               5

<210> SEQ ID NO 40
<211> LENGTH: 9
<212> TYPE: PRT
<213> ORGANISM: Artificial Sequence
<220> FEATURE:
<223> OTHER INFORMATION: 4E11 CDRL3

<400> SEQUENCE: 40

Val Gln Tyr Ala Gln Phe Pro Tyr Thr
1               5

<210> SEQ ID NO 41
<211> LENGTH: 321
<212> TYPE: DNA
<213> ORGANISM: Artificial Sequence
<220> FEATURE:
<223> OTHER INFORMATION: 4E11 light chain variable region cDNA

<400> SEQUENCE: 41
gacatcctga tgacccaatc tccatcctcc atgtctgtat ctctgggaga cacagtcagc      60
atcacttgcc atgcaagtca gggcattaac agtaatatag gtggttgct gcagaaacca     120 gggaaatcat ttaagggcct gatctatcat ggaaccaact ggaagatgg agttccatca     180 aggttcagtg gcagtggatc tggaacagat tattctctca ccatcagcag cctggaatct     240
gaggattttg ctgactatta ctgtgtacag tatgctcagt ttccgtacac gttcggaggg     300
gggaccaaac tggaaataaa a                                               321

<210> SEQ ID NO 42
<211> LENGTH: 116
<212> TYPE: PRT
<213> ORGANISM: Artificial Sequence
<220> FEATURE:
<223> OTHER INFORMATION: 4E11 heavy chain variable region

<400> SEQUENCE: 42

Asp Val Gln Leu Gln Glu Ser Gly Pro Gly Leu Val Lys Pro Ser Gln
1               5                   10                  15

Ser Leu Ser Leu Thr Cys Thr Val Thr Gly Tyr Ser Ile Thr Ser Asp
            20                  25                  30

Tyr Ala Trp Asn Trp Ile Arg Gln Phe Pro Gly Asn Lys Leu Glu Trp
        35                  40                  45

Met Gly Tyr Ile Gly Tyr Asn Gly Arg Thr Ser Tyr Asn Pro Ser Leu
    50                  55                  60

Lys Ser Arg Ile Ser Ile Thr Arg Asp Thr Ser Lys Asn Gln Phe Phe
65                  70                  75                  80

Leu Gln Leu Asn Tyr Val Thr Thr Glu Asp Thr Ala Thr Phe Tyr Cys
                85                  90                  95

Ala Arg Leu Gly Arg Gly Phe Ala Tyr Trp Gly Gln Gly Thr Leu Val
            100                 105                 110

Thr Val Ser Ala
        115
```

```
<210> SEQ ID NO 43
<211> LENGTH: 6
<212> TYPE: PRT
<213> ORGANISM: Artificial Sequence
<220> FEATURE:
<223> OTHER INFORMATION: 4E11 CDRH1

<400> SEQUENCE: 43

Ser Asp Tyr Ala Trp Asn
1               5

<210> SEQ ID NO 44
<211> LENGTH: 16
<212> TYPE: PRT
<213> ORGANISM: Artificial Sequence
<220> FEATURE:
<223> OTHER INFORMATION: 4E11 CDRH2

<400> SEQUENCE: 44

Tyr Ile Gly Tyr Asn Gly Arg Thr Ser Tyr Asn Pro Ser Leu Lys Ser
1               5                   10                  15

<210> SEQ ID NO 45
<211> LENGTH: 7
<212> TYPE: PRT
<213> ORGANISM: Artificial Sequence
<220> FEATURE:
<223> OTHER INFORMATION: 4E11 CDRH3

<400> SEQUENCE: 45

Leu Gly Arg Gly Phe Ala Tyr
1               5

<210> SEQ ID NO 46
<211> LENGTH: 348
<212> TYPE: DNA
<213> ORGANISM: Artificial Sequence
<220> FEATURE:
<223> OTHER INFORMATION: 4E11 heavy chain variable region cDNA

<400> SEQUENCE: 46
gatgtgcagc ttcaggagtc gggacctggc ctggtgaaac cttctcagtc tctgtccctc      60
acctgcactg tcactggcta ctcaatcacc agtgattatg cctggaactg gatccggcag     120
tttccaggaa acaaactgga gtggatgggc tacataggct acaatggtag aactagttac     180
aacccatctc tcaaaagtcg aatctctatc actcgagaca catccaagaa ccagttcttc     240
ctgcagttga attatgtgac tactgaggac acagccacat tttactgtgc aagactgggc     300
cgagggtttg cttactgggg ccaagggact ctggtcactg tctctgca                  348

<210> SEQ ID NO 47
<211> LENGTH: 108
<212> TYPE: PRT
<213> ORGANISM: Artificial Sequence
<220> FEATURE:
<223> OTHER INFORMATION: 5D8 light chain variable region

<400> SEQUENCE: 47

Glu Ile Val Leu Thr Gln Ser Pro Val Phe Met Ala Ala Ser Pro Gly
1               5                   10                  15

Glu Lys Val Thr Ile Thr Cys Ser Val Ser Ser Ile Ser Ser Ser
                20                  25                  30

Asn Leu His Trp Tyr Gln Gln Lys Ser Glu Thr Ser Pro Lys Pro Trp
            35                  40                  45
```

```
Ile Tyr Gly Thr Ser Asn Leu Ala Ser Gly Val Pro Val Arg Phe Ser
        50                  55                  60
Gly Ser Gly Ser Gly Thr Ser Tyr Ser Leu Thr Ile Ser Ser Met Glu
 65                  70                  75                  80
Ala Glu Asp Ala Ala Thr Tyr Tyr Cys Gln Gln Trp Ser Ser Tyr Pro
                 85                  90                  95
Leu Thr Phe Gly Ala Gly Thr Lys Leu Glu Leu Lys
                100                 105
```

<210> SEQ ID NO 48
<211> LENGTH: 12
<212> TYPE: PRT
<213> ORGANISM: Artificial Sequence
<220> FEATURE:
<223> OTHER INFORMATION: 5D8 CDRL1

<400> SEQUENCE: 48

```
Ser Val Ser Ser Ser Ile Ser Ser Ser Asn Leu His
 1               5                   10
```

<210> SEQ ID NO 49
<211> LENGTH: 7
<212> TYPE: PRT
<213> ORGANISM: Artificial Sequence
<220> FEATURE:
<223> OTHER INFORMATION: 5D8 CDRL2

<400> SEQUENCE: 49

```
Gly Thr Ser Asn Leu Ala Ser
 1               5
```

<210> SEQ ID NO 50
<211> LENGTH: 9
<212> TYPE: PRT
<213> ORGANISM: Artificial Sequence
<220> FEATURE:
<223> OTHER INFORMATION: 5D8 CDRL3

<400> SEQUENCE: 50

```
Gln Gln Trp Ser Ser Tyr Pro Leu Thr
 1               5
```

<210> SEQ ID NO 51
<211> LENGTH: 324
<212> TYPE: DNA
<213> ORGANISM: Artificial Sequence
<220> FEATURE:
<223> OTHER INFORMATION: 5D8 light chain variable region cDNA

<400> SEQUENCE: 51

```
gaaattgtgc tcacccagtc tccagtattc atggctgcat ctccagggga gaaggtcacc        60
atcacctgca gtgtcagctc aagtataagt tccagcaact gcactggta ccagcagaag       120 tcagaaaccc tccccaaacc ctggatttat ggcacatcca acctggcttc tggagtccct       180
gttcgcttca gtggcagtgg atctgggacc tcttattctc tcacaatcag cagcatggag       240
gctgaagatg ctgccactta ttactgtcaa cagtggagta gttaccccact cacgttcggt      300 gctgggacca agctggagct gaaa                                              324
```

<210> SEQ ID NO 52
<211> LENGTH: 119
<212> TYPE: PRT
<213> ORGANISM: Artificial Sequence
<220> FEATURE:

<223> OTHER INFORMATION: 5D8 heavy chain variable region

<400> SEQUENCE: 52

Glu Val Gln Leu Gln Gln Ser Gly Pro Asp Leu Val Lys Pro Gly Ser
1               5                   10                  15

Ser Val Lys Ile Ser Cys Lys Ala Ser Gly Tyr Thr Phe Thr Asp Tyr
            20                  25                  30

Asn Ile Asp Trp Val Lys Gln Ser His Gly Lys Ser Leu Glu Trp Ile
        35                  40                  45

Gly Thr Ile Asn Pro Asn Tyr Gly Gly Thr Ser Tyr Asn Gln Lys Phe
    50                  55                  60

Lys Gly Lys Ala Thr Leu Thr Val Asp Lys Ser Ser Thr Ala Tyr
65                  70                  75                  80

Met Glu Leu Arg Ser Leu Thr Ser Glu Asp Ser Ala Val Tyr Tyr Cys
                85                  90                  95

Ala Arg Gly Tyr Asp Tyr Asp Leu Trp Phe Ala Tyr Trp Gly Gln Gly
            100                 105                 110

Thr Leu Val Thr Val Ser Ala
        115

<210> SEQ ID NO 53
<211> LENGTH: 5
<212> TYPE: PRT
<213> ORGANISM: Artificial Sequence
<220> FEATURE:
<223> OTHER INFORMATION: 5D8 CDRH1

<400> SEQUENCE: 53

Asp Tyr Asn Ile Asp
1               5

<210> SEQ ID NO 54
<211> LENGTH: 17
<212> TYPE: PRT
<213> ORGANISM: Artificial Sequence
<220> FEATURE:
<223> OTHER INFORMATION: 5D8 CDRH2

<400> SEQUENCE: 54

Thr Ile Asn Pro Asn Tyr Gly Gly Thr Ser Tyr Asn Gln Lys Phe Lys
1               5                   10                  15

Gly

<210> SEQ ID NO 55
<211> LENGTH: 10
<212> TYPE: PRT
<213> ORGANISM: Artificial Sequence
<220> FEATURE:
<223> OTHER INFORMATION: 5D8 CDRH3

<400> SEQUENCE: 55

Gly Tyr Asp Tyr Asp Leu Trp Phe Ala Tyr
1               5                   10

<210> SEQ ID NO 56
<211> LENGTH: 357
<212> TYPE: DNA
<213> ORGANISM: Artificial Sequence
<220> FEATURE:
<223> OTHER INFORMATION: 5D8 heavy chain variable region cDNA

<400> SEQUENCE: 56

```
gaggtccagc tgcaacagtc tggacctgac ctggtgaagc ctgggtcttc agtgaagatt      60
tcctgcaaag cttctggata cacattcact gactacaaca ttgactgggt gaagcagagc     120
catggaaaga gccttgagtg gattggaact attaatccta actatggtgg tacttcctac     180
aaccagaagt tcaagggcaa ggccacattg actgtagaca gtcctccag cacagcctac      240 atggagctcc gcagcctgac atctgaggac tctgcagtct attactgtgc aagaggctat     300
gattacgact gtggtttgc ttactggggc aagggactc tggtcactgt ctctgca          357
```

```
<210> SEQ ID NO 57
<211> LENGTH: 108
<212> TYPE: PRT
<213> ORGANISM: Artificial Sequence
<220> FEATURE:
<223> OTHER INFORMATION: 9C9 light chain variable region

<400> SEQUENCE: 57

Glu Ile Val Leu Thr Gln Ser Pro Thr Leu Met Ala Ala Ser Pro Gly
1               5                   10                  15

Glu Lys Val Thr Ile Thr Cys Ser Val Ser Ser Ile Ser Ser Ser
            20                  25                  30

Asn Leu His Trp Tyr Gln Gln Lys Ser Glu Thr Ser Pro Lys Pro Trp
        35                  40                  45

Ile Tyr Asp Thr Ser Asn Leu Ala Ser Gly Val Pro Ile Arg Phe Ser
    50                  55                  60

Gly Ser Gly Ser Gly Thr Ser Tyr Ser Leu Thr Ile Ser Ser Val Glu
65                  70                  75                  80

Ala Glu Asp Ala Ala Thr Tyr Tyr Cys Gln Gln Trp Ser Ser Tyr Pro
                85                  90                  95

Leu Thr Phe Gly Ser Gly Thr Lys Leu Glu Ile Lys
            100                 105
```

```
<210> SEQ ID NO 58
<211> LENGTH: 12
<212> TYPE: PRT
<213> ORGANISM: Artificial Sequence
<220> FEATURE:
<223> OTHER INFORMATION: 9C9 CDRL1

<400> SEQUENCE: 58

Ser Val Ser Ser Ser Ile Ser Ser Ser Asn Leu His
1               5                   10
```

```
<210> SEQ ID NO 59
<211> LENGTH: 7
<212> TYPE: PRT
<213> ORGANISM: Artificial Sequence
<220> FEATURE:
<223> OTHER INFORMATION: 9C9 CDRL2

<400> SEQUENCE: 59

Asp Thr Ser Asn Leu Ala Ser
1               5
```

```
<210> SEQ ID NO 60
<211> LENGTH: 9
<212> TYPE: PRT
<213> ORGANISM: Artificial Sequence
<220> FEATURE:
<223> OTHER INFORMATION: 9C9 CDRL3

<400> SEQUENCE: 60
```

Gln Gln Trp Ser Ser Tyr Pro Leu Thr
1               5

<210> SEQ ID NO 61
<211> LENGTH: 324
<212> TYPE: DNA
<213> ORGANISM: Artificial Sequence
<220> FEATURE:
<223> OTHER INFORMATION: 9C9 light chain variable region cDNA

<400> SEQUENCE: 61

```
gaaattgtgc tcacccagtc tccaacactc atggctgcat ctccagggga gaaggtcacc      60
atcacctgca gtgtcagctc aagtataagt tccagcaact tgcactggta ccagcagaag     120
tcagaaacct cccccaaacc ctggatttat gacacatcca acctggcttc tggagtccct     180
attcgcttca gtggcagtgg atctgggacc tcttattctc tcacaatcag cagcgtggag     240
gctgaagatg ctgccactta ttactgtcaa cagtggagta gttacccact cacgttcggc     300
tcggggacaa agttggaaat aaaa                                            324
```

<210> SEQ ID NO 62
<211> LENGTH: 114
<212> TYPE: PRT
<213> ORGANISM: Artificial Sequence
<220> FEATURE:
<223> OTHER INFORMATION: 9C9 heavy chain variable region

<400> SEQUENCE: 62

Gln Val Gln Leu Gln Gln Pro Gly Ala Glu Leu Val Lys Pro Gly Ala
1               5                   10                  15

Ser Val Lys Leu Ser Cys Lys Ala Ser Gly Tyr Thr Phe Thr Ser Tyr
            20                  25                  30

Trp Met His Trp Val Lys Gln Arg Pro Gly Gln Asp Leu Glu Trp Ile
        35                  40                  45

Gly Glu Ile Asp Pro Ser Asp Ser Tyr Thr Asn Tyr Asn Gln Lys Phe
    50                  55                  60

Lys Gly Lys Ala Thr Leu Thr Val Asp Lys Ser Ser Ser Thr Ala Tyr
65                  70                  75                  80

Ile Gln Leu Ser Ser Leu Thr Ser Glu Asp Ser Ala Leu Tyr Tyr Cys
                85                  90                  95

Ala Arg Phe Asp Phe Ala Tyr Trp Gly Gln Gly Thr Leu Val Thr Val
            100                 105                 110

Ser Ala

<210> SEQ ID NO 63
<211> LENGTH: 5
<212> TYPE: PRT
<213> ORGANISM: Artificial Sequence
<220> FEATURE:
<223> OTHER INFORMATION: 9C9 CDRH1

<400> SEQUENCE: 63

Ser Tyr Trp Met His
1               5

<210> SEQ ID NO 64
<211> LENGTH: 17
<212> TYPE: PRT
<213> ORGANISM: Artificial Sequence
<220> FEATURE:
<223> OTHER INFORMATION: 9C9 CDRH2

```
<400> SEQUENCE: 64

Glu Ile Asp Pro Ser Asp Ser Tyr Thr Asn Tyr Asn Gln Lys Phe Lys
1               5                   10                  15

Gly

<210> SEQ ID NO 65
<211> LENGTH: 5
<212> TYPE: PRT
<213> ORGANISM: Artificial Sequence
<220> FEATURE:
<223> OTHER INFORMATION: 9C9 CDRH3

<400> SEQUENCE: 65

Phe Asp Phe Ala Tyr
1               5

<210> SEQ ID NO 66
<211> LENGTH: 342
<212> TYPE: DNA
<213> ORGANISM: Artificial Sequence
<220> FEATURE:
<223> OTHER INFORMATION: 9C9 heavy chain variable region cDNA

<400> SEQUENCE: 66
caggtccaac tgcagcagcc tggggctgag cttgtgaagc ctggggcttc agtgaagctg      60
tcctgcaagg cttctggcta caccttcacc agctactgga tgcactgggt gaaacagagg     120
cctggacaag accttgagtg gatcggagag attgatcctt ctgatagtta tactaactac     180
aatcaaaagt tcaagggcaa ggccacattg actgtagaca atcctccag cacagcctac      240 attcagctca gcagcctgac atctgaggac tctgcgctct attactgtgc aagattcgat     300
tttgcttact ggggccaagg gactctggtc actgtctctg ca                        342

<210> SEQ ID NO 67
<211> LENGTH: 112
<212> TYPE: PRT
<213> ORGANISM: Artificial Sequence
<220> FEATURE:
<223> OTHER INFORMATION: 11B1 light chain 1 (L1) variable region
      (dominant)

<400> SEQUENCE: 67

Asp Val Val Met Thr Gln Thr Pro Leu Ser Leu Pro Val Ser Leu Gly
1               5                   10                  15

Asp Gln Ala Ser Ile Ser Cys Arg Ser Ser Gln Ser Leu Val Tyr Ser
                20                  25                  30

Asn Gly Asn Thr Tyr Leu His Trp Tyr Leu Gln Lys Pro Gly Gln Ser
            35                  40                  45

Pro Lys Leu Leu Ile Tyr Lys Val Ser Asn Arg Phe Ser Gly Val Pro
        50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Phe Cys Ser Gln Ser
                85                  90                  95

Thr His Val Pro Phe Thr Phe Gly Ser Gly Thr Lys Leu Glu Ile Lys
            100                 105                 110

<210> SEQ ID NO 68
<211> LENGTH: 16
<212> TYPE: PRT
<213> ORGANISM: Artificial Sequence
```

```
<220> FEATURE:
<223> OTHER INFORMATION: 11B1 L1 CDRL1

<400> SEQUENCE: 68

Arg Ser Ser Gln Ser Leu Val Tyr Ser Asn Gly Asn Thr Tyr Leu His
1               5                   10                  15

<210> SEQ ID NO 69
<211> LENGTH: 7
<212> TYPE: PRT
<213> ORGANISM: Artificial Sequence
<220> FEATURE:
<223> OTHER INFORMATION: 11B1 L1 CDRL2

<400> SEQUENCE: 69

Lys Val Ser Asn Arg Phe Ser
1               5

<210> SEQ ID NO 70
<211> LENGTH: 9
<212> TYPE: PRT
<213> ORGANISM: Artificial Sequence
<220> FEATURE:
<223> OTHER INFORMATION: 11B1 L1 CDRL3

<400> SEQUENCE: 70

Ser Gln Ser Thr His Val Pro Phe Thr
1               5

<210> SEQ ID NO 71
<211> LENGTH: 336
<212> TYPE: DNA
<213> ORGANISM: Artificial Sequence
<220> FEATURE:
<223> OTHER INFORMATION: 11B1 light chain 1 (L1) variable region cDNA
      (dominant)

<400> SEQUENCE: 71
gatgttgtga tgacccaaac tccactctcc ctgcctgtca gtcttggaga tcaagcctcc      60
atctcttgca gatctagtca gagccttgta tatagtaatg aaacacccta tttacattgg    120
tacctgcaga agccaggcca gtctccaaag ctcctgatct acaaagtttc caaccgattt    180
tctggggtcc cagacaggtt cagtggcagt ggatcaggga cagatttcac actcaagatc    240
agcagagtgg aggctgagga tctgggagtt tatttctgct ctcaaagtac acatgttcca    300
ttcacgttcg gctcggggac aaagttggaa ataaaa                              336

<210> SEQ ID NO 72
<211> LENGTH: 108
<212> TYPE: PRT
<213> ORGANISM: Artificial Sequence
<220> FEATURE:
<223> OTHER INFORMATION: 11B1 light chain 2 (L2) variable region

<400> SEQUENCE: 72

Glu Asn Val Leu Thr Gln Ser Pro Ala Ile Met Ser Ala Ser Leu Gly
1               5                   10                  15

Glu Lys Val Thr Met Ser Cys Arg Ala Ser Ser Ser Val Asn Tyr Met
                20                  25                  30

Tyr Trp Cys Gln Gln Lys Ser Asp Ala Ser Pro Lys Leu Trp Ile Tyr
            35                  40                  45

Tyr Thr Ser Asn Leu Ala Pro Gly Val Pro Ala Arg Phe Ser Gly Ser
        50                  55                  60
```

Gly Ser Gly Asn Ser Tyr Ser Leu Thr Ile Ser Ser Met Glu Gly Glu
65                  70                  75                  80

Asp Val Ala Thr Tyr Tyr Cys Gln Gln Phe Thr Ser Ser Pro Ser Met
                85                  90                  95

His Thr Phe Gly Gly Gly Thr Lys Leu Glu Ile Lys
            100                 105

<210> SEQ ID NO 73
<211> LENGTH: 10
<212> TYPE: PRT
<213> ORGANISM: Artificial Sequence
<220> FEATURE:
<223> OTHER INFORMATION: 11B1 L2 CDRL1

<400> SEQUENCE: 73

Arg Ala Ser Ser Ser Val Asn Tyr Met Tyr
1               5                   10

<210> SEQ ID NO 74
<211> LENGTH: 7
<212> TYPE: PRT
<213> ORGANISM: Artificial Sequence
<220> FEATURE:
<223> OTHER INFORMATION: 11B1 L2 CDRL2

<400> SEQUENCE: 74

Tyr Thr Ser Asn Leu Ala Pro
1               5

<210> SEQ ID NO 75
<211> LENGTH: 11
<212> TYPE: PRT
<213> ORGANISM: Artificial Sequence
<220> FEATURE:
<223> OTHER INFORMATION: 11B1 L2 CDRL3

<400> SEQUENCE: 75

Gln Gln Phe Thr Ser Ser Pro Ser Met His Thr
1               5                   10

<210> SEQ ID NO 76
<211> LENGTH: 324
<212> TYPE: DNA
<213> ORGANISM: Artificial Sequence
<220> FEATURE:
<223> OTHER INFORMATION: 11B1 light chain 2 (L2) variable region cDNA

<400> SEQUENCE: 76
gaaaatgtgc tcacccagtc tccagcaatc atgtctgcat ctctagggga gaaggtcacc      60
atgagctgca gggccagctc aagtgtaaat tacatgtact ggtgccagca gaagtcagat     120
gcctccccca aactatggat ttattacaca tccaacctgg ctcctggagt cccagctcgc     180
ttcagtggca gtgggtctgg gaactcttat tctctcacaa tcagcagcat ggagggtgaa     240
gatgttgcca cttattactg ccagcagttt actagttccc catccatgca cacgttcgga     300
gggggaccaa gctggaaat aaaa                                              324

<210> SEQ ID NO 77
<211> LENGTH: 122
<212> TYPE: PRT
<213> ORGANISM: Artificial Sequence
<220> FEATURE:
<223> OTHER INFORMATION: 11B1 heavy chain variable region

<400> SEQUENCE: 77

Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Thr Phe Thr Thr Ala
            20                  25                  30

Gly Met Gln Trp Val Lys Met Pro Gly Lys Gly Phe Lys Trp Ile
        35                  40                  45

Gly Trp Ile Asn Thr His Ser Gly Asp Pro Lys Tyr Ala Glu Asp Phe
        50                  55                  60

Lys Gly Arg Phe Ala Phe Ser Leu Glu Thr Tyr Ala Ser Thr Ala Tyr
65                  70                  75                  80

Leu Gln Ile Ser Asn Leu Lys Asn Glu Asp Thr Ala Ser Tyr Phe Cys
            85                  90                  95

Ala Arg Thr His Ile Tyr Asp Gly Tyr Asn Tyr Ala Met Asp Tyr Trp
            100                 105                 110

Gly Gln Gly Thr Ser Val Thr Val Ser Ser
        115                 120

<210> SEQ ID NO 78
<211> LENGTH: 5
<212> TYPE: PRT
<213> ORGANISM: Artificial Sequence
<220> FEATURE:
<223> OTHER INFORMATION: 11B1 CDRH1

<400> SEQUENCE: 78

Thr Ala Gly Met Gln
1               5

<210> SEQ ID NO 79
<211> LENGTH: 17
<212> TYPE: PRT
<213> ORGANISM: Artificial Sequence
<220> FEATURE:
<223> OTHER INFORMATION: 11B1 CDRH2

<400> SEQUENCE: 79

Trp Ile Asn Thr His Ser Gly Asp Pro Lys Tyr Ala Glu Asp Phe Lys
1               5                   10                  15

Gly

<210> SEQ ID NO 80
<211> LENGTH: 13
<212> TYPE: PRT
<213> ORGANISM: Artificial Sequence
<220> FEATURE:
<223> OTHER INFORMATION: 11B1 CDRH3

<400> SEQUENCE: 80

Thr His Ile Tyr Asp Gly Tyr Asn Tyr Ala Met Asp Tyr
1               5                   10

<210> SEQ ID NO 81
<211> LENGTH: 366
<212> TYPE: DNA
<213> ORGANISM: Artificial Sequence
<220> FEATURE:
<223> OTHER INFORMATION: 11B1 heavy chain variable region cDNA

<400> SEQUENCE: 81
cagatccagt tggtgcagtc tggacctgag ctgaagaagc tggagagaca agtcaagatc      60
tcctgcaagg cttctgggta taccttcaca actgctggaa tgcagtgggt aaaaaagatg     120

```
ccaggaaagg gttttaagtg gattggctgg ataaacaccc actctggaga tccaaaatat    180
gcagaagact tcaagggacg gtttgccttc tctttggaaa cctacgccag tactgcatat    240
ttgcagataa gcaacctcaa aaacgaggac actgcttcgt atttctgtgc gaggacccac    300
atctatgatg ttataacta tgctatggac tactggggtc aagggacctc agtcaccgtc    360
tcctca                                                                366
```

<210> SEQ ID NO 82
<211> LENGTH: 112
<212> TYPE: PRT
<213> ORGANISM: Artificial Sequence
<220> FEATURE:
<223> OTHER INFORMATION: 11C8 light chain 1 (L1) variable region (dominant)

<400> SEQUENCE: 82

```
Asp Val Val Met Thr Gln Thr Pro Leu Ser Leu Pro Val Ser Leu Gly
1               5                   10                  15

Asp Gln Ala Ser Ile Ser Cys Arg Ser Ser Gln Ser Leu Val Tyr Ser
            20                  25                  30

Asn Gly Asn Thr Tyr Leu His Trp Tyr Leu Gln Lys Pro Gly Gln Ser
        35                  40                  45

Pro Lys Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Phe Cys Ser Gln Ser
                85                  90                  95

Thr His Val Pro Phe Thr Phe Gly Ser Gly Thr Lys Leu Glu Ile Lys
            100                 105                 110
```

<210> SEQ ID NO 83
<211> LENGTH: 16
<212> TYPE: PRT
<213> ORGANISM: Artificial Sequence
<220> FEATURE:
<223> OTHER INFORMATION: 11C8 L1 CDRL1

<400> SEQUENCE: 83

```
Arg Ser Ser Gln Ser Leu Val Tyr Ser Asn Gly Asn Thr Tyr Leu His
1               5                   10                  15
```

<210> SEQ ID NO 84
<211> LENGTH: 7
<212> TYPE: PRT
<213> ORGANISM: Artificial Sequence
<220> FEATURE:
<223> OTHER INFORMATION: 11C8 L1 CDRL2

<400> SEQUENCE: 84

```
Lys Val Ser Asn Arg Phe Ser
1               5
```

<210> SEQ ID NO 85
<211> LENGTH: 9
<212> TYPE: PRT
<213> ORGANISM: Artificial Sequence
<220> FEATURE:
<223> OTHER INFORMATION: 11C8 L1 CDRL3

<400> SEQUENCE: 85

Ser Gln Ser Thr His Val Pro Phe Thr
1               5

<210> SEQ ID NO 86
<211> LENGTH: 336
<212> TYPE: DNA
<213> ORGANISM: Artificial Sequence
<220> FEATURE:
<223> OTHER INFORMATION: 11C8 light chain 1 (L1) variable region cDNA
      (dominant)

<400> SEQUENCE: 86
gatgttgtga tgacccaaac tccactctcc ctgcctgtca gtcttggaga tcaagcctcc    60
atctcttgca gatctagtca gagccttgta tatagtaatg gaaacaccta tttacattgg   120
tacctgcaga agccaggcca gtctccaaag ctcctgatct acaaagtttc caaccgattt   180
tctggggtcc cagacaggtt cagtggcagt ggatcaggga cagatttcac actcaagatc   240
agcagagtgg aggctgagga tctgggagtt tatttctgct ctcaaagtac acatgttcca   300
ttcacgttcg gctcggggac aaagttggaa ataaaa                              336

<210> SEQ ID NO 87
<211> LENGTH: 108
<212> TYPE: PRT
<213> ORGANISM: Artificial Sequence
<220> FEATURE:
<223> OTHER INFORMATION: 11C8 light chain 2 (L2) variable region

<400> SEQUENCE: 87

Glu Asn Val Leu Thr Gln Ser Pro Ala Ile Met Ser Ala Ser Leu Gly
1               5                   10                  15

Glu Lys Val Thr Met Ser Cys Arg Ala Ser Ser Ser Val Asn Tyr Met
            20                  25                  30

Tyr Trp Cys Gln Gln Lys Ser Asp Ala Ser Pro Lys Leu Trp Ile Tyr
        35                  40                  45

Tyr Thr Ser Asn Leu Ala Pro Gly Val Pro Ala Arg Phe Ser Gly Ser
    50                  55                  60

Gly Ser Gly Asn Ser Tyr Ser Leu Thr Ile Ser Ser Met Glu Gly Glu
65                  70                  75                  80

Asp Val Ala Thr Tyr Tyr Cys Gln Gln Phe Thr Ser Ser Pro Ser Met
                85                  90                  95

His Thr Phe Gly Gly Gly Thr Lys Leu Glu Ile Lys
            100                 105

<210> SEQ ID NO 88
<211> LENGTH: 10
<212> TYPE: PRT
<213> ORGANISM: Artificial Sequence
<220> FEATURE:
<223> OTHER INFORMATION: 11C8 L2 CDRL1

<400> SEQUENCE: 88

Arg Ala Ser Ser Ser Val Asn Tyr Met Tyr
1               5                   10

<210> SEQ ID NO 89
<211> LENGTH: 7
<212> TYPE: PRT
<213> ORGANISM: Artificial Sequence
<220> FEATURE:
<223> OTHER INFORMATION: 11C8 L2 CDRL2

<400> SEQUENCE: 89

```
Tyr Thr Ser Asn Leu Ala Pro
1               5
```

<210> SEQ ID NO 90
<211> LENGTH: 11
<212> TYPE: PRT
<213> ORGANISM: Artificial Sequence
<220> FEATURE:
<223> OTHER INFORMATION: 11C8 L2 CDRL3

<400> SEQUENCE: 90

```
Gln Gln Phe Thr Ser Ser Pro Ser Met His Thr
1               5                   10
```

<210> SEQ ID NO 91
<211> LENGTH: 324
<212> TYPE: DNA
<213> ORGANISM: Artificial Sequence
<220> FEATURE:
<223> OTHER INFORMATION: 11C8 light chain 2 (L2) variable region cDNA

<400> SEQUENCE: 91

```
gaaaatgtgc tcacccagtc tccagcaatc atgtctgcat ctctagggga gaaggtcacc      60
atgagctgca gggccagctc aagtgtaaat tacatgtact ggtgccagca gaagtcagat     120
gcctccccca aactatggat ttattacaca tccaacctgg ctcctggagt cccagctcgc     180
ttcagtggca gtgggtctgg gaactcttat tctctcacaa tcagcagcat ggagggtgaa     240
gatgttgcca cttattactg ccagcagttt actagttccc catccatgca cacgttcgga     300 gggggggacca agctggaaat aaaa                                           324
```

<210> SEQ ID NO 92
<211> LENGTH: 122
<212> TYPE: PRT
<213> ORGANISM: Artificial Sequence
<220> FEATURE:
<223> OTHER INFORMATION: 11C8 heavy chain variable region

<400> SEQUENCE: 92

```
Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Thr Phe Thr Thr Ala
            20                  25                  30

Gly Met Gln Trp Val Gln Lys Met Pro Gly Lys Gly Phe Lys Trp Ile
        35                  40                  45

Gly Trp Ile Asn Thr His Ser Gly Asp Pro Lys Tyr Ala Glu Asp Phe
    50                  55                  60

Lys Gly Arg Phe Ala Phe Ser Leu Glu Thr Tyr Ala Ser Thr Ala Tyr
65                  70                  75                  80

Leu Gln Ile Ser Asn Leu Lys Asn Glu Asp Thr Ala Ser Tyr Phe Cys
                85                  90                  95

Ala Arg Thr His Ile Tyr Asp Gly Tyr Asn Tyr Ala Met Asp Tyr Trp
            100                 105                 110

Gly Gln Gly Thr Ser Val Thr Val Ser Ser
        115                 120
```

<210> SEQ ID NO 93
<211> LENGTH: 5
<212> TYPE: PRT
<213> ORGANISM: Artificial Sequence
<220> FEATURE:

```
<223> OTHER INFORMATION: 11C8 CDRH1

<400> SEQUENCE: 93

Thr Ala Gly Met Gln
1               5

<210> SEQ ID NO 94
<211> LENGTH: 17
<212> TYPE: PRT
<213> ORGANISM: Artificial Sequence
<220> FEATURE:
<223> OTHER INFORMATION: 11C8 CDRH2

<400> SEQUENCE: 94

Trp Ile Asn Thr His Ser Gly Asp Pro Lys Tyr Ala Glu Asp Phe Lys
1               5                   10                  15

Gly

<210> SEQ ID NO 95
<211> LENGTH: 13
<212> TYPE: PRT
<213> ORGANISM: Artificial Sequence
<220> FEATURE:
<223> OTHER INFORMATION: 11C8 CDRH3

<400> SEQUENCE: 95

Thr His Ile Tyr Asp Gly Tyr Asn Tyr Ala Met Asp Tyr
1               5                   10

<210> SEQ ID NO 96
<211> LENGTH: 366
<212> TYPE: DNA
<213> ORGANISM: Artificial Sequence
<220> FEATURE:
<223> OTHER INFORMATION: 11C8 heavy chain variable region cDNA

<400> SEQUENCE: 96
cagatccagt tggtgcagtc tggacctgag ctgaagaagc ctggagagac agtcaagatc      60
tcctgcaagg cttctgggta taccttcaca actgctggaa tgcagtgggt acaaaagatg     120
ccaggaaagg gttttaagtg gattggctgg ataaacaccc actctggaga tccaaaatat     180
gcagaagact tcaagggacg gtttgccttc tctttggaaa cctacgccag tactgcatat     240
ttgcagataa gcaacctcaa aaacgaggac actgcttcgt atttctgtgc gaggaccccac     300 atctatgatg gttacaacta tgctatggac tactggggtc aagggaccct cagtcaccgtc     360 tcctca                                                                366

<210> SEQ ID NO 97
<211> LENGTH: 112
<212> TYPE: PRT
<213> ORGANISM: Artificial Sequence
<220> FEATURE:
<223> OTHER INFORMATION: 11H3 light chain variable region

<400> SEQUENCE: 97

Asp Val Val Met Thr Gln Thr Pro Leu Ser Leu Pro Val Ser Leu Gly
1               5                   10                  15

Asp Gln Ala Ser Ile Ser Cys Arg Ser Ser Gln Ser Leu Val Tyr Ser
                20                  25                  30

Asn Gly Asn Thr Tyr Leu His Trp Tyr Leu Gln Lys Pro Gly Gln Ser
            35                  40                  45

Pro Lys Leu Leu Ile Tyr Lys Val Ser Asn Arg Phe Ser Gly Val Pro
```

```
                    50                  55                  60
Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Phe Cys Gln Ser
                85                  90                  95

Thr His Val Pro Phe Thr Phe Gly Ser Gly Thr Lys Leu Glu Ile Lys
            100                 105                 110

<210> SEQ ID NO 98
<211> LENGTH: 16
<212> TYPE: PRT
<213> ORGANISM: Artificial Sequence
<220> FEATURE:
<223> OTHER INFORMATION: 11H3 CDRL1

<400> SEQUENCE: 98

Arg Ser Ser Gln Ser Leu Val Tyr Ser Asn Gly Asn Thr Tyr Leu His
1               5                   10                  15

<210> SEQ ID NO 99
<211> LENGTH: 7
<212> TYPE: PRT
<213> ORGANISM: Artificial Sequence
<220> FEATURE:
<223> OTHER INFORMATION: 11H3 CDRL2

<400> SEQUENCE: 99

Lys Val Ser Asn Arg Phe Ser
1               5

<210> SEQ ID NO 100
<211> LENGTH: 9
<212> TYPE: PRT
<213> ORGANISM: Artificial Sequence
<220> FEATURE:
<223> OTHER INFORMATION: 11H3 CDRL3

<400> SEQUENCE: 100

Ser Gln Ser Thr His Val Pro Phe Thr
1               5

<210> SEQ ID NO 101
<211> LENGTH: 336
<212> TYPE: DNA
<213> ORGANISM: Artificial Sequence
<220> FEATURE:
<223> OTHER INFORMATION: 11H3 light chain variable region cDNA

<400> SEQUENCE: 101
gatgttgtga tgacccaaac tccactctcc ctgcctgtca gtcttggaga tcaagcctcc      60
atctcttgca gatctagtca gagccttgta tatagtaatg gaaacaccta tttacattgg     120
tacctgcaga agccaggcca gtctccaaag ctcctgatct acaaagtttc caaccgattt     180
tctggggtcc cagacaggtt cagtggcagt ggatcaggga cagatttcac actcaagatc     240
agcagagtgg aggctgagga tctgggagtt tatttctgct ctcaaagtac acatgttcca     300
ttcacgttcg gctcggggac aaagttggaa ataaaa                                336

<210> SEQ ID NO 102
<211> LENGTH: 122
<212> TYPE: PRT
<213> ORGANISM: Artificial Sequence
<220> FEATURE:
<223> OTHER INFORMATION: 11H3 heavy chain variable region
```

<400> SEQUENCE: 102

Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Thr Phe Thr Thr Ala
            20                  25                  30

Gly Met Gln Trp Val Gln Lys Met Pro Gly Lys Gly Phe Lys Trp Ile
        35                  40                  45

Gly Trp Ile Asn Thr His Ser Gly Asp Pro Lys Tyr Ala Glu Asp Phe
    50                  55                  60

Lys Gly Arg Phe Ala Phe Ser Leu Glu Thr Tyr Ala Ser Thr Ala Tyr
65                  70                  75                  80

Leu Gln Ile Ser Asn Leu Lys Asn Glu Asp Thr Ala Thr Tyr Phe Cys
                85                  90                  95

Ala Arg Thr His Ile Tyr Asp Gly Tyr Asn Tyr Ala Met Asp Tyr Trp
            100                 105                 110

Gly Gln Gly Thr Ser Val Thr Val Ser Ser
        115                 120

<210> SEQ ID NO 103
<211> LENGTH: 5
<212> TYPE: PRT
<213> ORGANISM: Artificial Sequence
<220> FEATURE:
<223> OTHER INFORMATION: 11H3 CDRH1

<400> SEQUENCE: 103

Thr Ala Gly Met Gln
1               5

<210> SEQ ID NO 104
<211> LENGTH: 17
<212> TYPE: PRT
<213> ORGANISM: Artificial Sequence
<220> FEATURE:
<223> OTHER INFORMATION: 11H3 CDRH2

<400> SEQUENCE: 104

Trp Ile Asn Thr His Ser Gly Asp Pro Lys Tyr Ala Glu Asp Phe Lys
1               5                   10                  15

Gly

<210> SEQ ID NO 105
<211> LENGTH: 13
<212> TYPE: PRT
<213> ORGANISM: Artificial Sequence
<220> FEATURE:
<223> OTHER INFORMATION: 11H3 CDRH3

<400> SEQUENCE: 105

Thr His Ile Tyr Asp Gly Tyr Asn Tyr Ala Met Asp Tyr
1               5                   10

<210> SEQ ID NO 106
<211> LENGTH: 366
<212> TYPE: DNA
<213> ORGANISM: Artificial Sequence
<220> FEATURE:
<223> OTHER INFORMATION: 11H3 heavy chain variable region cDNA

<400> SEQUENCE: 106
cagatccagt tggtgcagtc tggacctgag ctgaagaagc ctggagagac agtcaagatc    60

```
tcctgcaagg cttctgggta taccttcaca actgctggaa tgcagtgggt acaaaagatg      120
ccaggaaagg gttttaagtg gattggctgg ataaacaccc actctggaga tccaaaatat      180
gcagaagact tcaagggacg gtttgccttc tctttggaaa cctacgccag cactgcatat      240
ttgcagataa gcaacctcaa aaacgaggac actgctacgt atttctgtgc gaggaccccat     300 atctatgatg ttataatta tgctatggac tactggggtc aaggaacctc agtcaccgtc       360
tcctca                                                                  366
```

<210> SEQ ID NO 107
<211> LENGTH: 445
<212> TYPE: PRT
<213> ORGANISM: Artificial Sequence
<220> FEATURE:
<223> OTHER INFORMATION: 4E11 Heavy chain human IgG1

<400> SEQUENCE: 107

```
Asp Val Gln Leu Gln Glu Ser Gly Pro Gly Leu Val Lys Pro Ser Gln
1               5                   10                  15

Ser Leu Ser Leu Thr Cys Thr Val Thr Gly Tyr Ser Ile Thr Ser Asp
                20                  25                  30

Tyr Ala Trp Asn Trp Ile Arg Gln Phe Pro Gly Asn Lys Leu Glu Trp
            35                  40                  45

Met Gly Tyr Ile Gly Tyr Asn Gly Arg Thr Ser Tyr Asn Pro Ser Leu
        50                  55                  60

Lys Ser Arg Ile Ser Ile Thr Arg Asp Thr Ser Lys Asn Gln Phe Phe
65                  70                  75                  80

Leu Gln Leu Asn Tyr Val Thr Thr Glu Asp Thr Ala Thr Phe Tyr Cys
                85                  90                  95

Ala Arg Leu Gly Arg Gly Phe Ala Tyr Trp Gly Gln Gly Thr Leu Val
            100                 105                 110

Thr Val Ser Ala Ala Ser Thr Lys Gly Pro Ser Val Phe Pro Leu Ala
        115                 120                 125

Pro Ser Ser Lys Ser Thr Ser Gly Gly Thr Ala Ala Leu Gly Cys Leu
    130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Gln Thr Tyr Ile Cys Asn Val Asn His Lys Pro Ser Asn Thr
        195                 200                 205

Lys Val Asp Lys Lys Val Glu Pro Lys Ser Cys Asp Lys Thr His Thr
    210                 215                 220

Cys Pro Pro Cys Pro Ala Pro Glu Leu Leu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser His Glu Asp Pro Glu Val
            260                 265                 270

Lys Phe Asn Trp Tyr Val Asp Gly Val Glu Val His Asn Ala Lys Thr
        275                 280                 285

Lys Pro Arg Glu Glu Gln Tyr Asn Ser Thr Tyr Arg Val Val Ser Val
    290                 295                 300
```

```
Leu Thr Val Leu His Gln Asp Trp Leu Asn Gly Lys Glu Tyr Lys Cys
305                 310                 315                 320

Lys Val Ser Asn Lys Ala Leu Pro Ala Pro Ile Glu Lys Thr Ile Ser
                325                 330                 335

Lys Ala Lys Gly Gln Pro Arg Glu Pro Gln Val Tyr Thr Leu Pro Pro
            340                 345                 350

Ser Arg Asp Glu Leu Thr Lys Asn Gln Val Ser Leu Thr Cys Leu Val
        355                 360                 365

Lys Gly Phe Tyr Pro Ser Asp Ile Ala Val Glu Trp Glu Ser Asn Gly
    370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Gln Gly Asn Val Phe Ser Cys Ser Val Met His Glu Ala Leu His
            420                 425                 430

Asn His Tyr Thr Gln Lys Ser Leu Ser Leu Ser Pro Gly
        435                 440                 445

<210> SEQ ID NO 108
<211> LENGTH: 214
<212> TYPE: PRT
<213> ORGANISM: Artificial Sequence
<220> FEATURE:
<223> OTHER INFORMATION: 4E11 Light chain human Kappa

<400> SEQUENCE: 108

Asp Ile Leu Met Thr Gln Ser Pro Ser Ser Met Ser Val Ser Leu Gly
1               5                   10                  15

Asp Thr Val Ser Ile Thr Cys His Ala Ser Gln Gly Ile Asn Ser Asn
            20                  25                  30

Ile Gly Trp Leu Leu Gln Lys Pro Gly Lys Ser Phe Lys Gly Leu Ile
        35                  40                  45

Tyr His Gly Thr Asn Leu Glu Asp Gly Val Pro Ser Arg Phe Ser Gly
    50                  55                  60

Ser Gly Ser Gly Thr Asp Tyr Ser Leu Thr Ile Ser Ser Leu Glu Ser
65                  70                  75                  80

Glu Asp Phe Ala Asp Tyr Tyr Cys Val Gln Tyr Ala Gln Phe Pro Tyr
                85                  90                  95

Thr Phe Gly Gly Gly Thr Lys Leu Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210
```

<210> SEQ ID NO 109
<211> LENGTH: 445
<212> TYPE: PRT
<213> ORGANISM: Artificial Sequence
<220> FEATURE:
<223> OTHER INFORMATION: 5G6 Heavy chain human IgG1

<400> SEQUENCE: 109

```
Glu Val Gln Leu Gln Gln Ser Gly Ala Glu Leu Ala Arg Pro Gly Ala
1               5                   10                  15

Ser Val Lys Met Ser Cys Lys Ala Ser Gly Tyr Thr Phe Thr Ser Tyr
            20                  25                  30

Trp Met His Trp Val Lys Gln Arg Pro Gly Gln Gly Leu Glu Trp Ile
        35                  40                  45

Gly Ala Ile Tyr Pro Gly Asn Ser Asp Ile Ser Tyr Asn Gln Lys Phe
    50                  55                  60

Lys Gly Lys Ala Lys Leu Thr Ala Val Thr Ser Ala Thr Thr Ala Tyr
65                  70                  75                  80

Met Glu Leu Ser Ser Leu Thr Asn Glu Asp Ser Ala Val Tyr Tyr Cys
                85                  90                  95

Thr Leu Tyr Asp Tyr Asp Pro Asp Tyr Trp Gly Gln Gly Thr Thr Leu
            100                 105                 110

Thr Val Ser Ser Ala Ser Thr Lys Gly Pro Ser Val Phe Pro Leu Ala
        115                 120                 125

Pro Ser Ser Lys Ser Thr Ser Gly Gly Thr Ala Ala Leu Gly Cys Leu
    130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Gln Thr Tyr Ile Cys Asn Val Asn His Lys Pro Ser Asn Thr
        195                 200                 205

Lys Val Asp Lys Lys Val Glu Pro Lys Ser Cys Asp Lys Thr His Thr
    210                 215                 220

Cys Pro Pro Cys Pro Ala Pro Glu Leu Leu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser His Glu Asp Pro Glu Val
            260                 265                 270

Lys Phe Asn Trp Tyr Val Asp Gly Val Glu Val His Asn Ala Lys Thr
        275                 280                 285

Lys Pro Arg Glu Glu Gln Tyr Asn Ser Thr Tyr Arg Val Val Ser Val
    290                 295                 300

Leu Thr Val Leu His Gln Asp Trp Leu Asn Gly Lys Glu Tyr Lys Cys
305                 310                 315                 320

Lys Val Ser Asn Lys Ala Leu Pro Ala Pro Ile Glu Lys Thr Ile Ser
                325                 330                 335

Lys Ala Lys Gly Gln Pro Arg Glu Pro Gln Val Tyr Thr Leu Pro Pro
            340                 345                 350

Ser Arg Asp Glu Leu Thr Lys Asn Gln Val Ser Leu Thr Cys Leu Val
        355                 360                 365
```

Lys Gly Phe Tyr Pro Ser Asp Ile Ala Val Glu Trp Glu Ser Asn Gly
            370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Gln Gly Asn Val Phe Ser Cys Ser Val Met His Glu Ala Leu His
            420                 425                 430

Asn His Tyr Thr Gln Lys Ser Leu Ser Leu Ser Pro Gly
            435                 440                 445

<210> SEQ ID NO 110
<211> LENGTH: 219
<212> TYPE: PRT
<213> ORGANISM: Artificial Sequence
<220> FEATURE:
<223> OTHER INFORMATION: 5G6 Light chain human Kappa

<400> SEQUENCE: 110

Asp Val Val Met Thr Gln Thr Pro Leu Thr Leu Ser Val Thr Ile Gly
1               5                   10                  15

Gln Pro Ala Ser Ile Ser Cys Lys Ser Ser Gln Ser Leu Leu Asp Ser
            20                  25                  30

Asp Gly Lys Thr Tyr Leu Asn Trp Leu Leu Gln Arg Pro Gly Gln Ser
        35                  40                  45

Pro Lys Arg Leu Ile Tyr Leu Ala Ser Lys Leu Asp Ser Gly Val Pro
    50                  55                  60

Asp Arg Phe Thr Gly Ser Gly Ser Gly Thr Asp Phe Thr Leu Lys Ile
65                  70                  75                  80

Ser Arg Val Glu Ala Glu Asp Leu Gly Val Tyr Tyr Cys Trp Gln Ala
                85                  90                  95

Thr His Phe Pro Trp Thr Phe Gly Gly Gly Thr Lys Leu Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215

<210> SEQ ID NO 111
<211> LENGTH: 449
<212> TYPE: PRT
<213> ORGANISM: Artificial Sequence
<220> FEATURE:
<223> OTHER INFORMATION: 13.1.2 Heavy chain human IgG1

<400> SEQUENCE: 111

Gln Val Gln Leu Val Glu Ser Gly Gly Gly Val Val Gln Pro Gly Arg

-continued

```
1               5                   10                  15
Ser Leu Arg Leu Ser Cys Ala Ala Ser Gly Phe Thr Phe Ser Ser Tyr
            20                  25                  30

Gly Met His Trp Val Arg Gln Ala Pro Gly Lys Gly Leu Glu Trp Val
            35                  40                  45

Ala Val Ile Trp Tyr Asp Gly Ser Asn Lys Tyr Tyr Val Asp Ser Val
 50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                85                  90                  95

Ala Arg Asp Gly Trp Gln Gln Leu Ala Pro Phe Asp Tyr Trp Gly Gln
            100                 105                 110

Gly Thr Leu Val Thr Val Ser Ser Ala Ser Thr Lys Gly Pro Ser Val
            115                 120                 125

Phe Pro Leu Ala Pro Ser Ser Lys Ser Thr Ser Gly Gly Thr Ala Ala
            130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
            195                 200                 205

Pro Ser Asn Thr Lys Val Asp Lys Lys Val Glu Pro Lys Ser Cys Asp
            210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
            275                 280                 285

Asn Ala Lys Thr Lys Pro Arg Glu Glu Gln Tyr Asn Ser Thr Tyr Arg
            290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Asp Glu Leu Thr Lys Asn Gln Val Ser Leu
            355                 360                 365

Thr Cys Leu Val Lys Gly Phe Tyr Pro Ser Asp Ile Ala Val Glu Trp
            370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430
```

Glu Ala Leu His Asn His Tyr Thr Gln Lys Ser Leu Ser Leu Ser Pro
        435                 440                 445
Gly

<210> SEQ ID NO 112
<211> LENGTH: 219
<212> TYPE: PRT
<213> ORGANISM: Artificial Sequence
<220> FEATURE:
<223> OTHER INFORMATION: 13.1.2 Light chain human Kappa

<400> SEQUENCE: 112

Asp Ile Val Met Thr Gln Thr Pro Leu Ser Ser Pro Val Thr Leu Gly
1               5                   10                  15

Gln Pro Ala Ser Ile Ser Cys Arg Ser Ser Gln Ser Leu Val His Ser
            20                  25                  30

Asp Gly Asn Thr Tyr Leu Ser Trp Leu His Gln Arg Pro Gly Gln Pro
        35                  40                  45

Pro Arg Leu Leu Ile Tyr Lys Ile Ser Asn Arg Phe Ser Gly Val Pro
    50                  55                  60

Asp Arg Phe Ser Gly Ser Gly Ala Gly Thr Ala Phe Thr Leu Lys Ile
65                  70                  75                  80

Ser Arg Val Glu Ala Glu Asp Val Gly Val Tyr Tyr Cys Met Gln Ala
                85                  90                  95

Thr Gln Leu Pro Arg Thr Phe Gly Gln Gly Thr Lys Val Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215

<210> SEQ ID NO 113
<211> LENGTH: 20
<212> TYPE: PRT
<213> ORGANISM: Artificial Sequence
<220> FEATURE:
<223> OTHER INFORMATION: N-terminal light chain signal sequence

<400> SEQUENCE: 113

Met Val Leu Gln Thr Gln Val Phe Ile Ser Leu Leu Leu Trp Ile Ser
1               5                   10                  15

Gly Ala Tyr Gly
            20

<210> SEQ ID NO 114
<211> LENGTH: 19
<212> TYPE: PRT
<213> ORGANISM: Artificial Sequence

```
<220> FEATURE:
<223> OTHER INFORMATION: N-terminal heavy chain signal sequence

<400> SEQUENCE: 114

Met Asp Trp Thr Trp Arg Ile Leu Phe Leu Val Ala Ala Ala Thr Gly
1               5                   10                  15

Thr His Ala

<210> SEQ ID NO 115
<211> LENGTH: 108
<212> TYPE: PRT
<213> ORGANISM: Artificial Sequence
<220> FEATURE:
<223> OTHER INFORMATION: consensus VLs of 4B3 and 5D8
<220> FEATURE:
<221> NAME/KEY: MISC_FEATURE
<222> LOCATION: (9)..(9)
<223> OTHER INFORMATION: X is a conservative amino acid substitution to
      alanine (A) or valine (V) or is alanine or valine
<220> FEATURE:
<221> NAME/KEY: MISC_FEATURE
<222> LOCATION: (10)..(10)
<223> OTHER INFORMATION: X is a conservative amino acid substitution to
      leucine (L) or phenylalanine (F) or is leucine or phenylalanine
<220> FEATURE:
<221> NAME/KEY: MISC_FEATURE
<222> LOCATION: (108)..(108)
<223> OTHER INFORMATION: X is a conservative amino acid substitution to
      lysine (K) or glutamic acid (E) or is lysine or glutamic acid

<400> SEQUENCE: 115

Glu Ile Val Leu Thr Gln Ser Pro Xaa Xaa Met Ala Ala Ser Pro Gly
1               5                   10                  15

Glu Lys Val Thr Ile Thr Cys Ser Val Ser Ser Ile Ser Ser
            20                  25                  30

Asn Leu His Trp Tyr Gln Gln Lys Ser Glu Thr Ser Pro Lys Pro Trp
            35                  40                  45

Ile Tyr Gly Thr Ser Asn Leu Ala Ser Gly Val Pro Val Arg Phe Ser
        50                  55                  60

Gly Ser Gly Ser Gly Thr Ser Tyr Ser Leu Thr Ile Ser Ser Met Glu
65                  70                  75                  80

Ala Glu Asp Ala Ala Thr Tyr Tyr Cys Gln Gln Trp Ser Ser Tyr Pro
                85                  90                  95

Leu Thr Phe Gly Ala Gly Thr Lys Leu Glu Leu Xaa
            100                 105

<210> SEQ ID NO 116
<211> LENGTH: 119
<212> TYPE: PRT
<213> ORGANISM: Artificial Sequence
<220> FEATURE:
<223> OTHER INFORMATION: consensus VHs of 4B3 and 5D8
<220> FEATURE:
<221> NAME/KEY: MISC_FEATURE
<222> LOCATION: (10)..(10)
<223> OTHER INFORMATION: X is a conservative amino acid substitution to
      glutamic acid (E) or aspartic acid (D) or is glutamic acid or
      aspartic acid
<220> FEATURE:
<221> NAME/KEY: MISC_FEATURE
<222> LOCATION: (34)..(34)
<223> OTHER INFORMATION: X is a conservative amino acid substitution to
      methionine (M) or isoleucine (I) or is methionine or isoleucine
<220> FEATURE:
<221> NAME/KEY: MISC_FEATURE
<222> LOCATION: (55)..(55)
<223> OTHER INFORMATION: X is a conservative amino acid substitution to
      asparagine (N) or tyrosine (Y) or is asparagine or tyrosine
```

```
<220> FEATURE:
<221> NAME/KEY: MISC_FEATURE
<222> LOCATION: (77)..(77)
<223> OTHER INFORMATION: X is a conservative amino acid substitution to
      asparagine (N) or serine (S) or is asparagine or serine

<400> SEQUENCE: 116

Glu Val Gln Leu Gln Gln Ser Gly Pro Xaa Leu Val Lys Pro Gly Ser
1               5                   10                  15

Ser Val Lys Ile Ser Cys Lys Ala Ser Gly Tyr Thr Phe Thr Asp Tyr
            20                  25                  30

Asn Xaa Asp Trp Val Lys Gln Ser His Gly Lys Ser Leu Glu Trp Ile
        35                  40                  45

Gly Thr Ile Asn Pro Asn Xaa Gly Gly Thr Ser Tyr Asn Gln Lys Phe
50                  55                  60

Lys Gly Lys Ala Thr Leu Thr Val Asp Lys Ser Ser Xaa Thr Ala Tyr
65                  70                  75                  80

Met Glu Leu Arg Ser Leu Thr Ser Glu Asp Ser Ala Val Tyr Tyr Cys
                85                  90                  95

Ala Arg Gly Tyr Asp Tyr Asp Leu Trp Phe Ala Tyr Trp Gly Gln Gly
            100                 105                 110

Thr Leu Val Thr Val Ser Ala
            115

<210> SEQ ID NO 117
<211> LENGTH: 120
<212> TYPE: PRT
<213> ORGANISM: Artificial Sequence
<220> FEATURE:
<223> OTHER INFORMATION: Consensus of VHs of 11B1, 11C8 and 11H3
<220> FEATURE:
<221> NAME/KEY: MISC_FEATURE
<222> LOCATION: (38)..(38)
<223> OTHER INFORMATION: X is a conservative amino acid substitution to
      lysine (K) or glutamine (Q) or is lysine or glutamine
<220> FEATURE:
<221> NAME/KEY: MISC_FEATURE
<222> LOCATION: (93)..(93)
<223> OTHER INFORMATION: X is conservative amino acid substitution to
      serine (S) or threonine (T) or is serine or threonine

<400> SEQUENCE: 117

Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Thr Phe Thr Thr Ala
            20                  25                  30

Gly Met Gln Trp Val Xaa Lys Met Pro Gly Lys Gly Phe Lys Trp Ile
        35                  40                  45

Gly Trp Ile Asn Thr His Ser Gly Asp Pro Lys Tyr Ala Glu Asp Phe
50                  55                  60

Lys Gly Arg Phe Ala Phe Ser Leu Glu Thr Tyr Ala Ser Thr Ala Tyr
65                  70                  75                  80

Leu Gln Ile Ser Asn Leu Lys Asn Glu Asp Thr Ala Xaa Tyr Phe Cys
                85                  90                  95

Ala Arg Thr His Ile Tyr Asp Gly Tyr Asn Tyr Ala Met Asp Tyr Trp
            100                 105                 110

Gly Gln Gly Thr Ser Val Thr Val
            115                 120

<210> SEQ ID NO 118
<211> LENGTH: 108
```

```
<212> TYPE: PRT
<213> ORGANISM: Artificial Sequence
<220> FEATURE:
<223> OTHER INFORMATION: consensus VLs of 4B3, 5D8 and 9C9
<220> FEATURE:
<221> NAME/KEY: MISC_FEATURE
<222> LOCATION: (9)..(9)
<223> OTHER INFORMATION: X is a conservative amino acid substitution to
      alanine (A), threonine (T) or valine (V) or is alanine, threonine
      or valine
<220> FEATURE:
<221> NAME/KEY: MISC_FEATURE
<222> LOCATION: (10)..(10)
<223> OTHER INFORMATION: X is a conservative amino acid substitution to
      leucine (L) or phenylalanine (F) or is leucine or phenylalanine
<220> FEATURE:
<221> NAME/KEY: MISC_FEATURE
<222> LOCATION: (51)..(51)
<223> OTHER INFORMATION: X is a conservative amino acid substitution to
      glycine (G) or aspartic acid (D) or is glycine or glutamic acid
<220> FEATURE:
<221> NAME/KEY: MISC_FEATURE
<222> LOCATION: (61)..(61)
<223> OTHER INFORMATION: X is a conservative amino acid substitution to
      isoleucine (I) or valine (V) or is isoleucine or valine
<220> FEATURE:
<221> NAME/KEY: MISC_FEATURE
<222> LOCATION: (79)..(79)
<223> OTHER INFORMATION: X is a conservative amino acid substitution to
      methionine (M) or valine (V) or is methionine or valine
<220> FEATURE:
<221> NAME/KEY: MISC_FEATURE
<222> LOCATION: (101)..(101)
<223> OTHER INFORMATION: X is a conservative amino acid substitution to
      alanine (A) or serine (S) or is alanine or serine
<220> FEATURE:
<221> NAME/KEY: MISC_FEATURE
<222> LOCATION: (107)..(107)
<223> OTHER INFORMATION: X is a conservative amino acid substitution to
      isoleucine (I) or leucine (L) or is isoleucine or leucine
<220> FEATURE:
<221> NAME/KEY: MISC_FEATURE
<222> LOCATION: (108)..(108)
<223> OTHER INFORMATION: X is a conservative amino acid substitution to
      lysine (K) or glutamic acid (E) or is lysine or glutamic acid

<400> SEQUENCE: 118

Glu Ile Val Leu Thr Gln Ser Pro Xaa Xaa Met Ala Ala Ser Pro Gly
1               5                   10                  15

Glu Lys Val Thr Ile Thr Cys Ser Val Ser Ser Ile Ser Ser
            20                  25                  30

Asn Leu His Trp Tyr Gln Gln Lys Ser Glu Thr Ser Pro Lys Pro Trp
            35                  40                  45

Ile Tyr Xaa Thr Ser Asn Leu Ala Ser Gly Val Pro Xaa Arg Phe Ser
50                  55                  60

Gly Ser Gly Ser Gly Thr Ser Tyr Ser Leu Thr Ile Ser Ser Xaa Glu
65                  70                  75                  80

Ala Glu Asp Ala Ala Thr Tyr Tyr Cys Gln Gln Trp Ser Ser Tyr Pro
                85                  90                  95

Leu Thr Phe Gly Xaa Gly Thr Lys Leu Glu Xaa Xaa
                100                 105

<210> SEQ ID NO 119
<211> LENGTH: 76
<212> TYPE: PRT
<213> ORGANISM: Artificial Sequence
<220> FEATURE:
<223> OTHER INFORMATION: Amino acid residues 1 to 76 of EGFRvIII

<400> SEQUENCE: 119
```

```
Leu Glu Glu Lys Lys Gly Asn Tyr Val Val Thr Asp His Gly Ser Cys
1               5                   10                  15

Val Arg Ala Cys Gly Ala Asp Ser Tyr Glu Met Glu Glu Asp Gly Val
            20                  25                  30

Arg Lys Cys Lys Lys Cys Glu Gly Pro Cys Arg Lys Val Cys Asn Gly
        35                  40                  45

Ile Gly Ile Gly Glu Phe Lys Asp Ser Leu Ser Ile Asn Ala Thr Asn
    50                  55                  60

Ile Lys His Phe Lys Asn Cys Thr Ser Ile Ser Gly
65                  70                  75

<210> SEQ ID NO 120
<211> LENGTH: 62
<212> TYPE: PRT
<213> ORGANISM: Artificial Sequence
<220> FEATURE:
<223> OTHER INFORMATION: Amino acid residues 1 to 62 of EGFRvIII

<400> SEQUENCE: 120

Leu Glu Glu Lys Lys Gly Asn Tyr Val Val Thr Asp His Gly Ser Cys
1               5                   10                  15

Val Arg Ala Cys Gly Ala Asp Ser Tyr Glu Met Glu Glu Asp Gly Val
            20                  25                  30

Arg Lys Cys Lys Lys Cys Glu Gly Pro Cys Arg Lys Val Cys Asn Gly
        35                  40                  45

Ile Gly Ile Gly Glu Phe Lys Asp Ser Leu Ser Ile Asn Ala
    50                  55                  60

<210> SEQ ID NO 121
<211> LENGTH: 49
<212> TYPE: PRT
<213> ORGANISM: Artificial Sequence
<220> FEATURE:
<223> OTHER INFORMATION: Amino acid residues 1 to 49 of EGFRvIII

<400> SEQUENCE: 121

Leu Glu Glu Lys Lys Gly Asn Tyr Val Val Thr Asp His Gly Ser Cys
1               5                   10                  15

Val Arg Ala Cys Gly Ala Asp Ser Tyr Glu Met Glu Glu Asp Gly Val
            20                  25                  30

Arg Lys Cys Lys Lys Cys Glu Gly Pro Cys Arg Lys Val Cys Asn Gly
        35                  40                  45

Ile

<210> SEQ ID NO 122
<211> LENGTH: 45
<212> TYPE: PRT
<213> ORGANISM: Artificial Sequence
<220> FEATURE:
<223> OTHER INFORMATION: Amino acid residues 1 to 45 of EGFRvIII

<400> SEQUENCE: 122

Leu Glu Glu Lys Lys Gly Asn Tyr Val Val Thr Asp His Gly Ser Cys
1               5                   10                  15

Val Arg Ala Cys Gly Ala Asp Ser Tyr Glu Met Glu Glu Asp Gly Val
            20                  25                  30

Arg Lys Cys Lys Lys Cys Glu Gly Pro Cys Arg Lys Val
        35                  40                  45

<210> SEQ ID NO 123
```

```
<211> LENGTH: 37
<212> TYPE: PRT
<213> ORGANISM: Artificial Sequence
<220> FEATURE:
<223> OTHER INFORMATION: Amino acid residues 1 to 37 of EGFRvIII

<400> SEQUENCE: 123

Leu Glu Glu Lys Lys Gly Asn Tyr Val Val Thr Asp His Gly Ser Cys
1               5                   10                  15

Val Arg Ala Cys Gly Ala Asp Ser Tyr Glu Met Glu Glu Asp Gly Val
            20                  25                  30

Arg Lys Cys Lys Lys
        35

<210> SEQ ID NO 124
<211> LENGTH: 33
<212> TYPE: PRT
<213> ORGANISM: Artificial Sequence
<220> FEATURE:
<223> OTHER INFORMATION: Amino acid residues 1 to 33 of EGFRvIII

<400> SEQUENCE: 124

Leu Glu Glu Lys Lys Gly Asn Tyr Val Val Thr Asp His Gly Ser Cys
1               5                   10                  15

Val Arg Ala Cys Gly Ala Asp Ser Tyr Glu Met Glu Glu Asp Gly Val
            20                  25                  30

Arg

<210> SEQ ID NO 125
<211> LENGTH: 18
<212> TYPE: PRT
<213> ORGANISM: Artificial Sequence
<220> FEATURE:
<223> OTHER INFORMATION: Amino acid residues 1 to 18 of EGFRvIII

<400> SEQUENCE: 125

Leu Glu Glu Lys Lys Gly Asn Tyr Val Val Thr Asp His Gly Ser Cys
1               5                   10                  15

Val Arg

<210> SEQ ID NO 126
<211> LENGTH: 47
<212> TYPE: PRT
<213> ORGANISM: Artificial Sequence
<220> FEATURE:
<223> OTHER INFORMATION: Amino acid residues 3 to 49 of EGFRvIII

<400> SEQUENCE: 126

Glu Lys Lys Gly Asn Tyr Val Val Thr Asp His Gly Ser Cys Val Arg
1               5                   10                  15

Ala Cys Gly Ala Asp Ser Tyr Glu Met Glu Glu Asp Gly Val Arg Lys
            20                  25                  30

Cys Lys Lys Cys Glu Gly Pro Cys Arg Lys Val Cys Asn Gly Ile
        35                  40                  45

<210> SEQ ID NO 127
<211> LENGTH: 43
<212> TYPE: PRT
<213> ORGANISM: Artificial Sequence
<220> FEATURE:
<223> OTHER INFORMATION: Amino acid residues 3 to 45 of EGFRvIII

<400> SEQUENCE: 127
```

Glu Lys Lys Gly Asn Tyr Val Val Thr Asp His Gly Ser Cys Val Arg
1               5                   10                  15

Ala Cys Gly Ala Asp Ser Tyr Glu Met Glu Glu Asp Gly Val Arg Lys
                20                  25                  30

Cys Lys Lys Cys Glu Gly Pro Cys Arg Lys Val
        35                  40

<210> SEQ ID NO 128
<211> LENGTH: 35
<212> TYPE: PRT
<213> ORGANISM: Artificial Sequence
<220> FEATURE:
<223> OTHER INFORMATION: Amino acid residues 3 to 37 of EGFRvIII

<400> SEQUENCE: 128

Glu Lys Lys Gly Asn Tyr Val Val Thr Asp His Gly Ser Cys Val Arg
1               5                   10                  15

Ala Cys Gly Ala Asp Ser Tyr Glu Met Glu Glu Asp Gly Val Arg Lys
                20                  25                  30

Cys Lys Lys
        35

<210> SEQ ID NO 129
<211> LENGTH: 16
<212> TYPE: PRT
<213> ORGANISM: Artificial Sequence
<220> FEATURE:
<223> OTHER INFORMATION: Amino acid residues 3 to 18 of EGFRvIII

<400> SEQUENCE: 129

Glu Lys Lys Gly Asn Tyr Val Val Thr Asp His Gly Ser Cys Val Arg
1               5                   10                  15

<210> SEQ ID NO 130
<211> LENGTH: 44
<212> TYPE: PRT
<213> ORGANISM: Artificial Sequence
<220> FEATURE:
<223> OTHER INFORMATION: Amino acid residues 6 to 49 of EGFRvIII

<400> SEQUENCE: 130

Gly Asn Tyr Val Val Thr Asp His Gly Ser Cys Val Arg Ala Cys Gly
1               5                   10                  15

Ala Asp Ser Tyr Glu Met Glu Glu Asp Gly Val Arg Lys Cys Lys Lys
                20                  25                  30

Cys Glu Gly Pro Cys Arg Lys Val Cys Asn Gly Ile
        35                  40

<210> SEQ ID NO 131
<211> LENGTH: 40
<212> TYPE: PRT
<213> ORGANISM: Artificial Sequence
<220> FEATURE:
<223> OTHER INFORMATION: Amino acid residues 6 to 45 of EGFRvIII

<400> SEQUENCE: 131

Gly Asn Tyr Val Val Thr Asp His Gly Ser Cys Val Arg Ala Cys Gly
1               5                   10                  15

Ala Asp Ser Tyr Glu Met Glu Glu Asp Gly Val Arg Lys Cys Lys Lys
                20                  25                  30

Cys Glu Gly Pro Cys Arg Lys Val
        35                  40

<210> SEQ ID NO 132
<211> LENGTH: 32
<212> TYPE: PRT
<213> ORGANISM: Artificial Sequence
<220> FEATURE:
<223> OTHER INFORMATION: Amino acid residues 6 to 37 of EGFRvIII

<400> SEQUENCE: 132

Gly Asn Tyr Val Val Thr Asp His Gly Ser Cys Val Arg Ala Cys Gly
1               5                   10                  15

Ala Asp Ser Tyr Glu Met Glu Glu Asp Gly Val Arg Lys Cys Lys Lys
            20                  25                  30

<210> SEQ ID NO 133
<211> LENGTH: 40
<212> TYPE: PRT
<213> ORGANISM: Artificial Sequence
<220> FEATURE:
<223> OTHER INFORMATION: Amino acid residues 10 to 49 of EGFRvIII

<400> SEQUENCE: 133

Val Thr Asp His Gly Ser Cys Val Arg Ala Cys Gly Ala Asp Ser Tyr
1               5                   10                  15

Glu Met Glu Glu Asp Gly Val Arg Lys Cys Lys Lys Cys Glu Gly Pro
            20                  25                  30

Cys Arg Lys Val Cys Asn Gly Ile
        35                  40

<210> SEQ ID NO 134
<211> LENGTH: 36
<212> TYPE: PRT
<213> ORGANISM: Artificial Sequence
<220> FEATURE:
<223> OTHER INFORMATION: Amino acid residues 10 to 45 of EGFRvIII

<400> SEQUENCE: 134

Val Thr Asp His Gly Ser Cys Val Arg Ala Cys Gly Ala Asp Ser Tyr
1               5                   10                  15

Glu Met Glu Glu Asp Gly Val Arg Lys Cys Lys Lys Cys Glu Gly Pro
            20                  25                  30

Cys Arg Lys Val
        35

<210> SEQ ID NO 135
<211> LENGTH: 28
<212> TYPE: PRT
<213> ORGANISM: Artificial Sequence
<220> FEATURE:
<223> OTHER INFORMATION: Amino acid residues 10 to 37 of EGFRvIII

<400> SEQUENCE: 135

Val Thr Asp His Gly Ser Cys Val Arg Ala Cys Gly Ala Asp Ser Tyr
1               5                   10                  15

Glu Met Glu Glu Asp Gly Val Arg Lys Cys Lys Lys
            20                  25

<210> SEQ ID NO 136
<211> LENGTH: 35
<212> TYPE: PRT
<213> ORGANISM: Artificial Sequence
<220> FEATURE:
<223> OTHER INFORMATION: Amino acid residues 15 to 49 of EGFRvIII

<400> SEQUENCE: 136

Ser Cys Val Arg Ala Cys Gly Ala Asp Ser Tyr Glu Met Glu Glu Asp
1               5                   10                  15

Gly Val Arg Lys Cys Lys Lys Cys Glu Gly Pro Cys Arg Lys Val Cys
            20                  25                  30

Asn Gly Ile
        35

<210> SEQ ID NO 137
<211> LENGTH: 31
<212> TYPE: PRT
<213> ORGANISM: Artificial Sequence
<220> FEATURE:
<223> OTHER INFORMATION: Amino acid residues 15 to 45 of EGFRvIII

<400> SEQUENCE: 137

Ser Cys Val Arg Ala Cys Gly Ala Asp Ser Tyr Glu Met Glu Glu Asp
1               5                   10                  15

Gly Val Arg Lys Cys Lys Lys Cys Glu Gly Pro Cys Arg Lys Val
            20                  25                  30

<210> SEQ ID NO 138
<211> LENGTH: 58
<212> TYPE: PRT
<213> ORGANISM: Artificial Sequence
<220> FEATURE:
<223> OTHER INFORMATION: Amino acid residues 19 to 76 of EGFRvIII

<400> SEQUENCE: 138

Ala Cys Gly Ala Asp Ser Tyr Glu Met Glu Glu Asp Gly Val Arg Lys
1               5                   10                  15

Cys Lys Lys Cys Glu Gly Pro Cys Arg Lys Val Cys Asn Gly Ile Gly
            20                  25                  30

Ile Gly Glu Phe Lys Asp Ser Leu Ser Ile Asn Ala Thr Asn Ile Lys
        35                  40                  45

His Phe Lys Asn Cys Thr Ser Ile Ser Gly
        50                  55

<210> SEQ ID NO 139
<211> LENGTH: 44
<212> TYPE: PRT
<213> ORGANISM: Artificial Sequence
<220> FEATURE:
<223> OTHER INFORMATION: Amino acid residues 19 to 62 of EGFRvIII

<400> SEQUENCE: 139

Ala Cys Gly Ala Asp Ser Tyr Glu Met Glu Glu Asp Gly Val Arg Lys
1               5                   10                  15

Cys Lys Lys Cys Glu Gly Pro Cys Arg Lys Val Cys Asn Gly Ile Gly
            20                  25                  30

Ile Gly Glu Phe Lys Asp Ser Leu Ser Ile Asn Ala
        35                  40

<210> SEQ ID NO 140
<211> LENGTH: 31
<212> TYPE: PRT
<213> ORGANISM: Artificial Sequence
<220> FEATURE:
<223> OTHER INFORMATION: Amino acid residues 19 to 49 of EGFRvIII

<400> SEQUENCE: 140

Ala Cys Gly Ala Asp Ser Tyr Glu Met Glu Glu Asp Gly Val Arg Lys
1               5                   10                  15

```
Cys Lys Lys Cys Glu Gly Pro Cys Arg Lys Val Cys Asn Gly Ile
            20                  25                  30

<210> SEQ ID NO 141
<211> LENGTH: 27
<212> TYPE: PRT
<213> ORGANISM: Artificial Sequence
<220> FEATURE:
<223> OTHER INFORMATION: Amino acid residues 19 to 45 of EGFRvIII

<400> SEQUENCE: 141

Ala Cys Gly Ala Asp Ser Tyr Glu Met Glu Glu Asp Gly Val Arg Lys
1               5                   10                  15

Cys Lys Lys Cys Glu Gly Pro Cys Arg Lys Val
            20                  25

<210> SEQ ID NO 142
<211> LENGTH: 19
<212> TYPE: PRT
<213> ORGANISM: Artificial Sequence
<220> FEATURE:
<223> OTHER INFORMATION: Amino acid residues 19 to 37 of EGFRvIII

<400> SEQUENCE: 142

Ala Cys Gly Ala Asp Ser Tyr Glu Met Glu Glu Asp Gly Val Arg Lys
1               5                   10                  15

Cys Lys Lys

<210> SEQ ID NO 143
<211> LENGTH: 18
<212> TYPE: PRT
<213> ORGANISM: Artificial Sequence
<220> FEATURE:
<223> OTHER INFORMATION: Amino acid residues 28 to 45 of EGFRvIII

<400> SEQUENCE: 143

Glu Glu Asp Gly Val Arg Lys Cys Lys Lys Cys Glu Gly Pro Cys Arg
1               5                   10                  15

Lys Val

<210> SEQ ID NO 144
<211> LENGTH: 10
<212> TYPE: PRT
<213> ORGANISM: Artificial Sequence
<220> FEATURE:
<223> OTHER INFORMATION: Amino acid residues 28 to 37 of EGFRvIII

<400> SEQUENCE: 144

Glu Glu Asp Gly Val Arg Lys Cys Lys Lys
1               5                   10

<210> SEQ ID NO 145
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Ser15 to Ala mutation

<400> SEQUENCE: 145

Ala Cys Val Arg Ala Cys Gly Ala Asp Ser Tyr Glu Met Glu Glu Asp
1               5                   10                  15

Gly Val Arg Lys Cys Lys Lys
            20
```

<210> SEQ ID NO 146
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Cys16 to Ala mutation

<400> SEQUENCE: 146

Ser Ala Val Arg Ala Cys Gly Ala Asp Ser Tyr Glu Met Glu Glu Asp
1               5                   10                  15

Gly Val Arg Lys Cys Lys Lys
            20

<210> SEQ ID NO 147
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Val17 to Ala mutation

<400> SEQUENCE: 147

Ser Cys Ala Arg Ala Cys Gly Ala Asp Ser Tyr Glu Met Glu Glu Asp
1               5                   10                  15

Gly Val Arg Lys Cys Lys Lys
            20

<210> SEQ ID NO 148
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Arg18 to Ala mutation

<400> SEQUENCE: 148

Ser Cys Val Ala Ala Cys Gly Ala Asp Ser Tyr Glu Met Glu Glu Asp
1               5                   10                  15

Gly Val Arg Lys Cys Lys Lys
            20

<210> SEQ ID NO 149
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Cys20 to Ala mutation

<400> SEQUENCE: 149

Ser Cys Val Arg Ala Ala Gly Ala Asp Ser Tyr Glu Met Glu Glu Asp
1               5                   10                  15

Gly Val Arg Lys Cys Lys Lys
            20

<210> SEQ ID NO 150
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Gly21 to Ala mutation

<400> SEQUENCE: 150

```
Ser Cys Val Arg Ala Cys Ala Ala Asp Ser Tyr Glu Met Glu Glu Asp
1               5                   10                  15

Gly Val Arg Lys Cys Lys Lys
            20
```

<210> SEQ ID NO 151
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Asp23 to Ala mutation

<400> SEQUENCE: 151

```
Ser Cys Val Arg Ala Cys Gly Ala Ala Ser Tyr Glu Met Glu Glu Asp
1               5                   10                  15

Gly Val Arg Lys Cys Lys Lys
            20
```

<210> SEQ ID NO 152
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Ser24 to Ala mutation

<400> SEQUENCE: 152

```
Ser Cys Val Arg Ala Cys Gly Ala Asp Ala Tyr Glu Met Glu Glu Asp
1               5                   10                  15

Gly Val Arg Lys Cys Lys Lys
            20
```

<210> SEQ ID NO 153
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Tyr25 to Ala mutation

<400> SEQUENCE: 153

```
Ser Cys Val Arg Ala Cys Gly Ala Asp Ser Ala Glu Met Glu Glu Asp
1               5                   10                  15

Gly Val Arg Lys Cys Lys Lys
            20
```

<210> SEQ ID NO 154
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Glu26 to Ala mutation

<400> SEQUENCE: 154

```
Ser Cys Val Arg Ala Cys Gly Ala Asp Ser Tyr Ala Met Glu Glu Asp
1               5                   10                  15

Gly Val Arg Lys Cys Lys Lys
            20
```

<210> SEQ ID NO 155
<211> LENGTH: 23
<212> TYPE: PRT

```
<213> ORGANISM: Artificial Sequence
<220> FEATURE:
<223> OTHER INFORMATION: Amino acid residues 15 to 37 of EGFRvIII, with
      Met27 to Ala mutation

<400> SEQUENCE: 155

Ser Cys Val Arg Ala Cys Gly Ala Asp Ser Tyr Glu Ala Glu Asp
1               5                   10                  15

Gly Val Arg Lys Cys Lys Lys
            20

<210> SEQ ID NO 156
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Glu28 to Ala mutation

<400> SEQUENCE: 156

Ser Cys Val Arg Ala Cys Gly Ala Asp Ser Tyr Glu Met Ala Glu Asp
1               5                   10                  15

Gly Val Arg Lys Cys Lys Lys
            20

<210> SEQ ID NO 157
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Glu29 to Ala mutation

<400> SEQUENCE: 157

Ser Cys Val Arg Ala Cys Gly Ala Asp Ser Tyr Glu Met Glu Ala Asp
1               5                   10                  15

Gly Val Arg Lys Cys Lys Lys
            20

<210> SEQ ID NO 158
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Asp30 to Ala mutation

<400> SEQUENCE: 158

Ser Cys Val Arg Ala Cys Gly Ala Asp Ser Tyr Glu Met Glu Glu Ala
1               5                   10                  15

Gly Val Arg Lys Cys Lys Lys
            20

<210> SEQ ID NO 159
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Gly31 to Ala mutation

<400> SEQUENCE: 159

Ser Cys Val Arg Ala Cys Gly Ala Asp Ser Tyr Glu Met Glu Glu Asp
1               5                   10                  15

Ala Val Arg Lys Cys Lys Lys
```

20

<210> SEQ ID NO 160
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Val32 to Ala mutation

<400> SEQUENCE: 160

Ser Cys Val Arg Ala Cys Gly Ala Asp Ser Tyr Glu Met Glu Glu Asp
1               5                   10                  15

Gly Ala Arg Lys Cys Lys Lys
            20

<210> SEQ ID NO 161
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Arg33 to Ala mutation

<400> SEQUENCE: 161

Ser Cys Val Arg Ala Cys Gly Ala Asp Ser Tyr Glu Met Glu Glu Asp
1               5                   10                  15

Gly Val Ala Lys Cys Lys Lys
            20

<210> SEQ ID NO 162
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Lys34 to Ala mutation

<400> SEQUENCE: 162

Ser Cys Val Arg Ala Cys Gly Ala Asp Ser Tyr Glu Met Glu Glu Asp
1               5                   10                  15

Gly Val Arg Ala Cys Lys Lys
            20

<210> SEQ ID NO 163
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Cys35 to Ala mutation

<400> SEQUENCE: 163

Ser Cys Val Arg Ala Cys Gly Ala Asp Ser Tyr Glu Met Glu Glu Asp
1               5                   10                  15

Gly Val Arg Lys Ala Lys Lys
            20

<210> SEQ ID NO 164
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Lys36 to Ala mutation

```
<400> SEQUENCE: 164

Ser Cys Val Arg Ala Cys Gly Ala Asp Ser Tyr Glu Met Glu Glu Asp
1               5                   10                  15

Gly Val Arg Lys Cys Ala Lys
            20

<210> SEQ ID NO 165
<211> LENGTH: 23
<212> TYPE: PRT
<213> ORGANISM: Artificial Sequence
<220> FEATURE:
<223> OTHER INFORMATION: Amino acid residues 15 to 37 of EGFRvIII, with
      Lys37 to Ala mutation

<400> SEQUENCE: 165

Ser Cys Val Arg Ala Cys Gly Ala Asp Ser Tyr Glu Met Glu Glu Asp
1               5                   10                  15

Gly Val Arg Lys Cys Lys Ala
            20

<210> SEQ ID NO 166
<211> LENGTH: 244
<212> TYPE: PRT
<213> ORGANISM: Artificial Sequence
<220> FEATURE:
<223> OTHER INFORMATION: Single-chain variable fragment composed of VH,
      linker, VL sequence derived from 5G6 antibody

<400> SEQUENCE: 166

Glu Val Gln Leu Gln Gln Ser Gly Ala Glu Leu Ala Arg Pro Gly Ala
1               5                   10                  15

Ser Val Lys Met Ser Cys Lys Ala Ser Gly Tyr Thr Phe Thr Ser Tyr
            20                  25                  30

Trp Met His Trp Val Lys Gln Arg Pro Gly Gln Gly Leu Glu Trp Ile
        35                  40                  45

Gly Ala Ile Tyr Pro Gly Asn Ser Asp Ile Ser Tyr Asn Gln Lys Phe
    50                  55                  60

Lys Gly Lys Ala Lys Leu Thr Ala Val Thr Ser Ala Thr Thr Ala Tyr
65                  70                  75                  80

Met Glu Leu Ser Ser Leu Thr Asn Glu Asp Ser Ala Val Tyr Tyr Cys
                85                  90                  95

Thr Leu Tyr Asp Tyr Asp Pro Asp Tyr Trp Gly Gln Gly Thr Thr Leu
            100                 105                 110

Thr Val Ser Ser Gly Thr Gly Gly Ser Gly Gly Gly Gly Ser Gly
        115                 120                 125

Gly Gly Gly Ser Asp Val Val Met Thr Gln Thr Pro Leu Thr Leu Ser
    130                 135                 140

Val Thr Ile Gly Gln Pro Ala Ser Ile Ser Cys Lys Ser Ser Gln Ser
145                 150                 155                 160

Leu Leu Asp Ser Asp Gly Lys Thr Tyr Leu Asn Trp Leu Leu Gln Arg
                165                 170                 175

Pro Gly Gln Ser Pro Lys Arg Leu Ile Tyr Leu Ala Ser Lys Leu Asp
            180                 185                 190

Ser Gly Val Pro Asp Arg Phe Thr Gly Ser Gly Ser Gly Thr Asp Phe
        195                 200                 205

Thr Leu Lys Ile Ser Arg Val Glu Ala Glu Asp Leu Gly Val Tyr Tyr
    210                 215                 220

Cys Trp Gln Ala Thr His Phe Pro Trp Thr Phe Gly Gly Gly Thr Lys
```

Leu Glu Ile Lys

<210> SEQ ID NO 167
<211> LENGTH: 241
<212> TYPE: PRT
<213> ORGANISM: Artificial Sequence
<220> FEATURE:
<223> OTHER INFORMATION: Single-chain variable fragment composed of VH,
      linker, VL sequence derived from 4E11 antibody

<400> SEQUENCE: 167

Asp Val Gln Leu Gln Glu Ser Gly Pro Gly Leu Val Lys Pro Ser Gln
1               5                   10                  15

Ser Leu Ser Leu Thr Cys Thr Val Thr Gly Tyr Ser Ile Thr Ser Asp
            20                  25                  30

Tyr Ala Trp Asn Trp Ile Arg Gln Phe Pro Gly Asn Lys Leu Glu Trp
        35                  40                  45

Met Gly Tyr Ile Gly Tyr Asn Gly Arg Thr Ser Tyr Asn Pro Ser Leu
    50                  55                  60

Lys Ser Arg Ile Ser Ile Thr Arg Asp Thr Ser Lys Asn Gln Phe Phe
65                  70                  75                  80

Leu Gln Leu Asn Tyr Val Thr Thr Glu Asp Thr Ala Thr Phe Tyr Cys
                85                  90                  95

Ala Arg Leu Gly Arg Gly Phe Ala Tyr Trp Gly Gln Gly Thr Leu Val
            100                 105                 110

Thr Val Ser Ala Gly Thr Gly Gly Ser Gly Gly Gly Gly Ser Gly
        115                 120                 125

Gly Gly Gly Ser Asp Val Asp Ile Leu Met Thr Gln Ser Pro Ser Ser
    130                 135                 140

Met Ser Val Ser Leu Gly Asp Thr Val Ser Ile Thr Cys His Ala Ser
145                 150                 155                 160

Gln Gly Ile Asn Ser Asn Ile Gly Trp Leu Leu Gln Lys Pro Gly Lys
                165                 170                 175

Ser Phe Lys Gly Leu Ile Tyr His Gly Thr Asn Leu Glu Asp Gly Val
            180                 185                 190

Pro Ser Arg Phe Ser Gly Ser Gly Ser Gly Thr Asp Tyr Ser Leu Thr
        195                 200                 205

Ile Ser Ser Leu Glu Ser Glu Asp Phe Ala Asp Tyr Tyr Cys Val Gln
    210                 215                 220

Tyr Ala Gln Phe Pro Tyr Thr Phe Gly Gly Gly Thr Lys Leu Glu Ile
225                 230                 235                 240

Lys

<210> SEQ ID NO 168
<211> LENGTH: 495
<212> TYPE: PRT
<213> ORGANISM: Artificial Sequence
<220> FEATURE:
<223> OTHER INFORMATION: CAR construct composed of 5G6 scFV, a CD8
      hinge, human CD28 transmembrane domain, human CD28-signaling
      domain, and human CD3-zeta signaling domain

<400> SEQUENCE: 168

Met Leu Arg Leu Leu Leu Ala Leu Asn Leu Phe Pro Ser Ile Gln Val
1               5                   10                  15

Thr Gly Glu Val Gln Leu Gln Gln Ser Gly Ala Glu Leu Ala Arg Pro
            20                  25                  30

-continued

```
Gly Ala Ser Val Lys Met Ser Cys Lys Ala Ser Gly Tyr Thr Phe Thr
         35                  40                  45
Ser Tyr Trp Met His Trp Val Lys Gln Arg Pro Gly Gln Gly Leu Glu
     50                  55                  60
Trp Ile Gly Ala Ile Tyr Pro Gly Asn Ser Asp Ile Ser Tyr Asn Gln
 65                  70                  75                  80
Lys Phe Lys Gly Lys Ala Lys Leu Thr Ala Val Thr Ser Ala Thr Thr
                 85                  90                  95
Ala Tyr Met Glu Leu Ser Ser Leu Thr Asn Glu Asp Ser Ala Val Tyr
                100                 105                 110
Tyr Cys Thr Leu Tyr Asp Tyr Asp Pro Asp Tyr Trp Gly Gln Gly Thr
            115                 120                 125
Thr Leu Thr Val Ser Ser Gly Thr Gly Gly Ser Gly Gly Gly Gly
        130                 135                 140
Ser Gly Gly Gly Gly Ser Asp Val Val Met Thr Gln Thr Pro Leu Thr
145                 150                 155                 160
Leu Ser Val Thr Ile Gly Gln Pro Ala Ser Ile Ser Cys Lys Ser Ser
                165                 170                 175
Gln Ser Leu Leu Asp Ser Asp Gly Lys Thr Tyr Leu Asn Trp Leu Leu
            180                 185                 190
Gln Arg Pro Gly Gln Ser Pro Lys Arg Leu Ile Tyr Leu Ala Ser Lys
        195                 200                 205
Leu Asp Ser Gly Val Pro Asp Arg Phe Thr Gly Ser Gly Ser Gly Thr
    210                 215                 220
Asp Phe Thr Leu Lys Ile Ser Arg Val Glu Ala Glu Asp Leu Gly Val
225                 230                 235                 240
Tyr Tyr Cys Trp Gln Ala Thr His Phe Pro Trp Thr Phe Gly Gly Gly
                245                 250                 255
Thr Lys Leu Glu Ile Lys Thr Thr Pro Ala Pro Arg Pro Pro Thr
            260                 265                 270
Pro Ala Pro Thr Ile Ala Ser Gln Pro Leu Ser Leu Arg Pro Glu Ala
        275                 280                 285
Cys Arg Pro Ala Ala Gly Gly Ala Val His Thr Arg Gly Leu Asp Phe
    290                 295                 300
Ala Cys Asp Pro Ser Lys Pro Phe Trp Val Leu Val Val Val Gly Gly
305                 310                 315                 320
Val Leu Ala Cys Tyr Ser Leu Leu Val Thr Val Ala Phe Ile Ile Phe
                325                 330                 335
Trp Val Arg Ser Lys Arg Ser Arg Leu Leu His Ser Asp Tyr Met Asn
            340                 345                 350
Met Thr Pro Arg Arg Pro Gly Pro Thr Arg Lys His Tyr Gln Pro Tyr
        355                 360                 365
Ala Pro Pro Arg Asp Phe Ala Ala Tyr Arg Ser Ala Ser Leu Arg Val
    370                 375                 380
Lys Phe Ser Arg Ser Ala Asp Ala Pro Ala Tyr Gln Gln Gly Gln Asn
385                 390                 395                 400
Gln Leu Tyr Asn Glu Leu Asn Leu Gly Arg Arg Glu Glu Tyr Asp Val
                405                 410                 415
Leu Asp Lys Arg Arg Gly Arg Asp Pro Glu Met Gly Gly Lys Pro Gln
            420                 425                 430
Arg Arg Lys Asn Pro Gln Glu Gly Leu Tyr Asn Glu Leu Gln Lys Asp
        435                 440                 445
```

Lys Met Ala Glu Ala Tyr Ser Glu Ile Gly Met Lys Gly Glu Arg Arg
            450                 455                 460

Arg Gly Lys Gly His Asp Gly Leu Tyr Gln Gly Leu Ser Thr Ala Thr
465                 470                 475                 480

Lys Asp Thr Tyr Asp Ala Leu His Met Gln Ala Leu Pro Pro Arg
                485                 490                 495

<210> SEQ ID NO 169
<211> LENGTH: 492
<212> TYPE: PRT
<213> ORGANISM: Artificial Sequence
<220> FEATURE:
<223> OTHER INFORMATION: CAR construct composed of 4E11 scFV, a CD8
      hinge, human CD28 transmembrane domain, human CD28-signaling
      domain, and human CD3-zeta signaling domain

<400> SEQUENCE: 169

Met Leu Arg Leu Leu Leu Ala Leu Asn Leu Phe Pro Ser Ile Gln Val
1               5                   10                  15

Thr Gly Asp Val Gln Leu Gln Glu Ser Gly Pro Gly Leu Val Lys Pro
                20                  25                  30

Ser Gln Ser Leu Ser Leu Thr Cys Thr Val Thr Gly Tyr Ser Ile Thr
            35                  40                  45

Ser Asp Tyr Ala Trp Asn Trp Ile Arg Gln Phe Pro Gly Asn Lys Leu
50                  55                  60

Glu Trp Met Gly Tyr Ile Gly Tyr Asn Gly Arg Thr Ser Tyr Asn Pro
65                  70                  75                  80

Ser Leu Lys Ser Arg Ile Ser Ile Thr Arg Asp Thr Ser Lys Asn Gln
                85                  90                  95

Phe Phe Leu Gln Leu Asn Tyr Val Thr Thr Glu Asp Thr Ala Thr Phe
            100                 105                 110

Tyr Cys Ala Arg Leu Gly Arg Gly Phe Ala Tyr Trp Gly Gln Gly Thr
        115                 120                 125

Leu Val Thr Val Ser Ala Gly Thr Gly Gly Ser Gly Gly Gly Gly
    130                 135                 140

Ser Gly Gly Gly Gly Ser Asp Val Asp Ile Leu Met Thr Gln Ser Pro
145                 150                 155                 160

Ser Ser Met Ser Val Ser Leu Gly Asp Thr Val Ser Ile Thr Cys His
                165                 170                 175

Ala Ser Gln Gly Ile Asn Ser Asn Ile Gly Trp Leu Leu Gln Lys Pro
            180                 185                 190

Gly Lys Ser Phe Lys Gly Leu Ile Tyr His Gly Thr Asn Leu Glu Asp
        195                 200                 205

Gly Val Pro Ser Arg Phe Ser Gly Ser Gly Ser Gly Thr Asp Tyr Ser
    210                 215                 220

Leu Thr Ile Ser Ser Leu Glu Ser Glu Asp Phe Ala Asp Tyr Tyr Cys
225                 230                 235                 240

Val Gln Tyr Ala Gln Phe Pro Tyr Thr Phe Gly Gly Gly Thr Lys Leu
                245                 250                 255

Glu Ile Lys Thr Thr Thr Pro Ala Pro Arg Pro Pro Thr Pro Ala Pro
            260                 265                 270

Thr Ile Ala Ser Gln Pro Leu Ser Leu Arg Pro Glu Ala Cys Arg Pro
        275                 280                 285

Ala Ala Gly Gly Ala Val His Thr Arg Gly Leu Asp Phe Ala Cys Asp
    290                 295                 300

Pro Ser Lys Pro Phe Trp Val Leu Val Val Val Gly Gly Val Leu Ala

```
305                 310                 315                 320
Cys Tyr Ser Leu Leu Val Thr Val Ala Phe Ile Ile Phe Trp Val Arg
                325                 330                 335

Ser Lys Arg Ser Arg Leu Leu His Ser Asp Tyr Met Asn Met Thr Pro
                340                 345                 350

Arg Arg Pro Gly Pro Thr Arg Lys His Tyr Gln Pro Tyr Ala Pro Pro
                355                 360                 365

Arg Asp Phe Ala Ala Tyr Arg Ser Ala Ser Leu Arg Val Lys Phe Ser
                370                 375                 380

Arg Ser Ala Asp Ala Pro Ala Tyr Gln Gln Gly Gln Asn Gln Leu Tyr
385                 390                 395                 400

Asn Glu Leu Asn Leu Gly Arg Arg Glu Glu Tyr Asp Val Leu Asp Lys
                405                 410                 415

Arg Arg Gly Arg Asp Pro Glu Met Gly Gly Lys Pro Arg Arg Lys
                420                 425                 430

Asn Pro Gln Glu Gly Leu Tyr Asn Glu Leu Gln Lys Asp Lys Met Ala
                435                 440                 445

Glu Ala Tyr Ser Glu Ile Gly Met Lys Gly Glu Arg Arg Arg Gly Lys
                450                 455                 460

Gly His Asp Gly Leu Tyr Gln Gly Leu Ser Thr Ala Thr Lys Asp Thr
465                 470                 475                 480

Tyr Asp Ala Leu His Met Gln Ala Leu Pro Pro Arg
                485                 490

<210> SEQ ID NO 170
<211> LENGTH: 527
<212> TYPE: PRT
<213> ORGANISM: Artificial Sequence
<220> FEATURE:
<223> OTHER INFORMATION: 4E11 bi-specific T cell engager exemplary
      sequence

<400> SEQUENCE: 170

Asp Val Gln Leu Gln Glu Ser Gly Pro Gly Leu Val Lys Pro Ser Gln
1               5                   10                  15

Ser Leu Ser Leu Thr Cys Thr Val Thr Gly Tyr Ser Ile Thr Ser Asp
                20                  25                  30

Tyr Ala Trp Asn Trp Ile Arg Gln Phe Pro Gly Asn Lys Leu Glu Trp
                35                  40                  45

Met Gly Tyr Ile Gly Tyr Asn Gly Arg Thr Ser Tyr Asn Pro Ser Leu
                50                  55                  60

Lys Ser Arg Ile Ser Ile Thr Arg Asp Thr Ser Lys Asn Gln Phe Phe
65                  70                  75                  80

Leu Gln Leu Asn Tyr Val Thr Thr Glu Asp Thr Ala Thr Phe Tyr Cys
                85                  90                  95

Ala Arg Leu Gly Arg Gly Phe Ala Tyr Trp Gly Gln Gly Thr Leu Val
                100                 105                 110

Thr Val Ser Ala Lys Thr Thr Pro Pro Ser Val Tyr Pro Leu Ala Pro
                115                 120                 125

Gly Ser Leu Gly Thr Gly Gly Ser Gly Gly Gly Ser Gly Gly
                130                 135                 140

Gly Gly Ser Asp Val Asp Ile Leu Met Thr Gln Ser Pro Ser Ser Met
145                 150                 155                 160

Ser Val Ser Leu Gly Asp Thr Val Ser Ile Thr Cys His Ala Ser Gln
                165                 170                 175
```

```
Gly Ile Asn Ser Asn Ile Gly Trp Leu Leu Gln Lys Pro Gly Lys Ser
                180                 185                 190

Phe Lys Gly Leu Ile Tyr His Gly Thr Asn Leu Glu Asp Gly Val Pro
            195                 200                 205

Ser Arg Phe Ser Gly Ser Gly Ser Gly Thr Asp Tyr Ser Leu Thr Ile
        210                 215                 220

Ser Ser Leu Glu Ser Glu Asp Phe Ala Asp Tyr Tyr Cys Val Gln Tyr
225                 230                 235                 240

Ala Gln Phe Pro Tyr Thr Phe Gly Gly Gly Thr Lys Leu Glu Ile Lys
                245                 250                 255

Arg Ala Asp Ala Ala Pro Thr Val Ser Ile Phe Pro Pro Ser Ser Lys
            260                 265                 270

Leu Gly Asp Leu Gly Gly Gly Ser Arg Asp Asp Asp Ile Lys Leu
        275                 280                 285

Gln Gln Ser Gly Ala Glu Leu Ala Arg Pro Gly Ala Ser Val Lys Met
        290                 295                 300

Ser Cys Lys Thr Ser Gly Tyr Thr Phe Thr Arg Tyr Thr Met His Trp
305                 310                 315                 320

Val Lys Gln Arg Pro Gly Gln Gly Leu Glu Trp Ile Gly Tyr Ile Asn
                325                 330                 335

Pro Ser Arg Gly Tyr Thr Asn Tyr Asn Gln Lys Phe Lys Asp Lys Ala
            340                 345                 350

Thr Leu Thr Thr Asp Lys Ser Ser Thr Ala Tyr Met Gln Leu Ser
        355                 360                 365

Ser Leu Thr Ser Glu Asp Ser Ala Val Tyr Tyr Cys Ala Arg Tyr Tyr
        370                 375                 380

Asp Asp His Tyr Cys Leu Asp Tyr Trp Gly Gln Gly Thr Thr Leu Thr
385                 390                 395                 400

Val Ser Ser Val Glu Gly Gly Ser Gly Gly Ser Gly Gly Ser Gly Gly
                405                 410                 415

Ser Gly Gly Val Asp Asp Ile Gln Leu Thr Gln Ser Pro Ala Ile Met
            420                 425                 430

Ser Ala Ser Pro Gly Glu Lys Val Thr Met Thr Cys Arg Ala Ser Ser
        435                 440                 445

Ser Val Ser Tyr Met Asn Trp Tyr Gln Gln Lys Ser Gly Thr Ser Pro
        450                 455                 460

Lys Arg Trp Ile Tyr Asp Thr Ser Lys Val Ala Ser Gly Val Pro Tyr
465                 470                 475                 480

Arg Phe Ser Gly Ser Gly Ser Gly Thr Ser Tyr Ser Leu Thr Ile Ser
                485                 490                 495

Ser Met Glu Ala Glu Asp Ala Ala Thr Tyr Tyr Cys Gln Gln Trp Ser
            500                 505                 510

Ser Asn Pro Leu Thr Phe Gly Ala Gly Thr Lys Leu Glu Leu Lys
        515                 520                 525

<210> SEQ ID NO 171
<211> LENGTH: 19
<212> TYPE: PRT
<213> ORGANISM: Artificial Sequence
```

```
<220> FEATURE:
<223> OTHER INFORMATION: Linker

<400> SEQUENCE: 171

Gly Thr Gly Gly Gly Gly Ser Gly Gly Gly Gly Ser Gly Gly Gly
1               5                   10                  15
Ser Asp Val
```